(12) United States Patent
Matsuda et al.

(10) Patent No.: US 6,667,940 B2
(45) Date of Patent: Dec. 23, 2003

(54) DISK INSERTION/EJECTION DEVICE HAVING A TRANSLATING ROLLER ARRANGEMENT

(75) Inventors: Takashi Matsuda, Tokyo (JP); Yasuyuki Nakanishi, Tokyo (JP); Ryoto Adachi, Tokyo (JP); Masahiro Ieda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/780,460

(22) Filed: Feb. 12, 2001

(65) Prior Publication Data

US 2001/0010675 A1 Aug. 2, 2001

Related U.S. Application Data

(63) Continuation of application No. PCT/JP99/03317, filed on Jun. 22, 1999.

(51) Int. Cl.$^7$ .............................................. G11B 33/02
(52) U.S. Cl. ..................................................... 369/77.1
(58) Field of Search .............................. 369/77.1, 75.1, 369/77.2, 30.52, 30.66, 30.67, 30.77, 30.87

(56) References Cited

U.S. PATENT DOCUMENTS 4,627,042 A * 12/1986 Hara .......................... 369/77.1
5,774,442 A *  6/1998 Nakamichi ................. 369/75.2

FOREIGN PATENT DOCUMENTS

| EP | 0 920 002 A2 |   | 6/1999 |
|----|--------------|---|--------|
| EP | 0 944 070 A1 |   | 9/1999 |
| JP | A63200354    | * | 8/1988 |
| JP | A10208361    | * | 8/1998 |
| JP | A11134756    | * | 5/1999 |

* cited by examiner

*Primary Examiner*—George J. Letscher
(74) *Attorney, Agent, or Firm*—Birch, Stewart, Kolasch, & Birch, LLP.

(57) ABSTRACT

A disk device is provided with a disk insertion/ejection means which performs insertion and ejection operations of a disk to the inside and outside the device and a displacement means which displaces said disk insertion/ejection means along a direction of disk insertion/ejection and wherein said displacement means is adapted to displace the disk insertion/ejection means in either a direction of disk insertion or disk ejection based on the operation of said disk.

5 Claims, 123 Drawing Sheets

1043b  101

2003  2102  2101  2101b  2103

FIG.14(c)
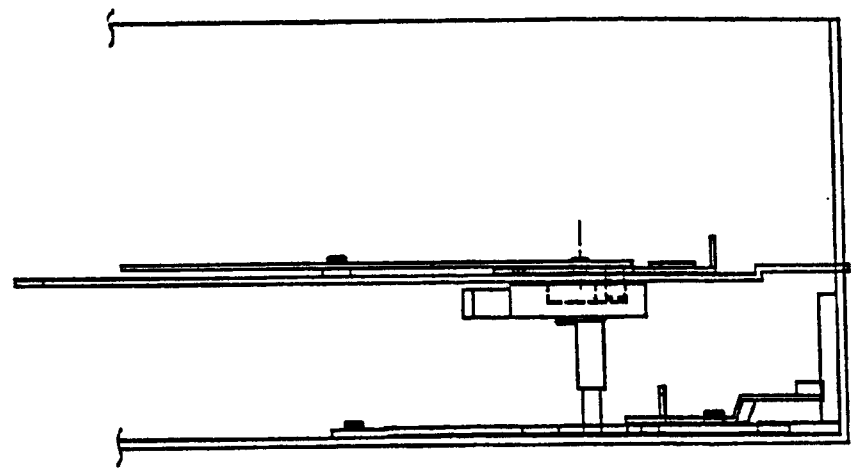
FIG.14(f)     FIG.14(e)     FIG.14(d)
 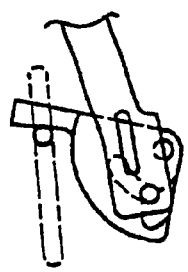 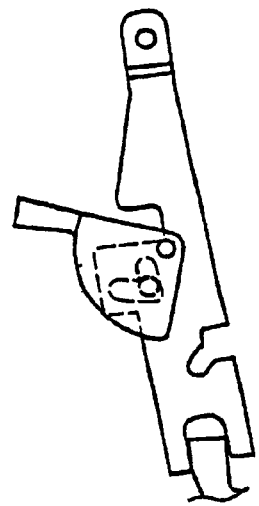

FIG.15(c)
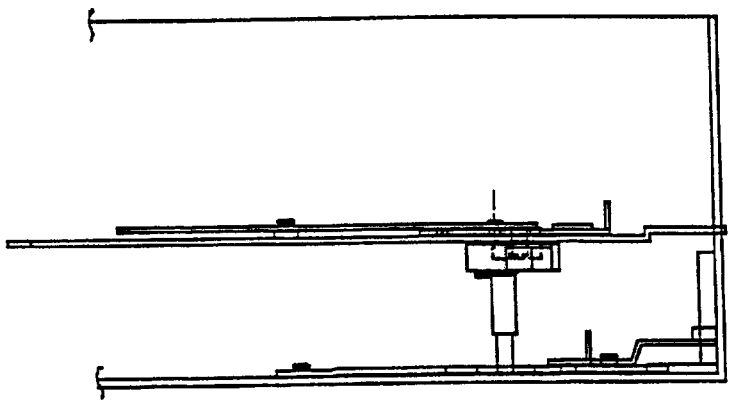
FIG.15(f)  FIG.15(e)  FIG.15(d)
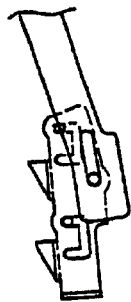 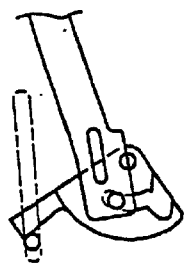 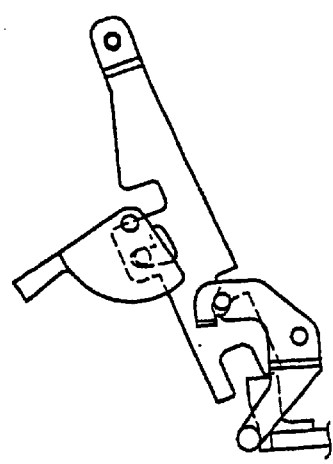

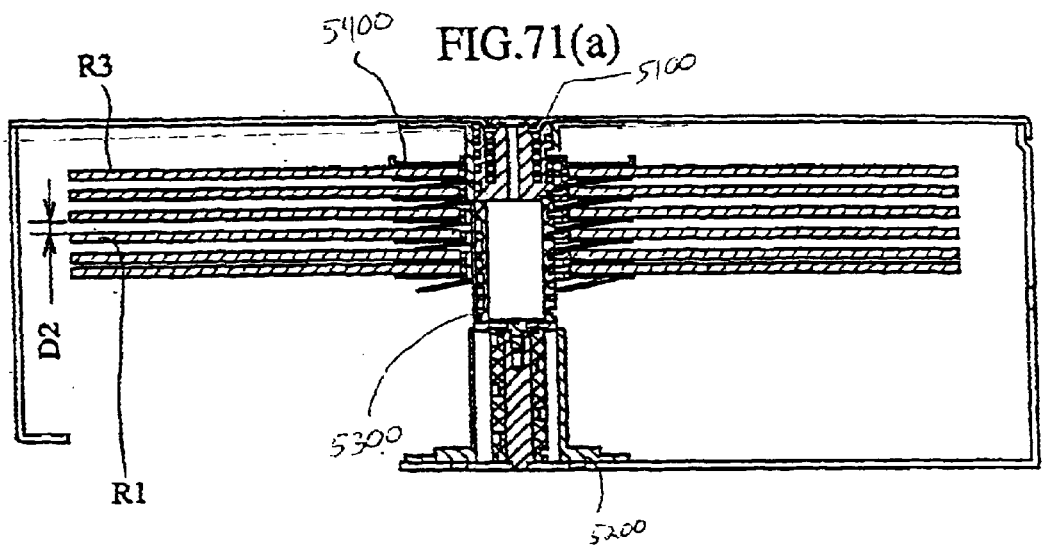
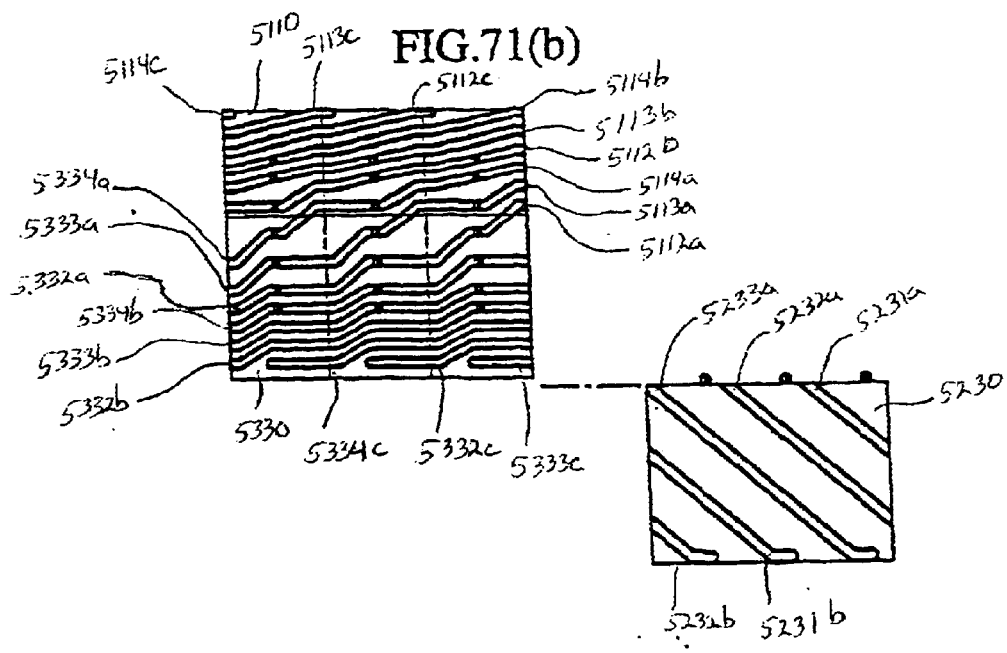

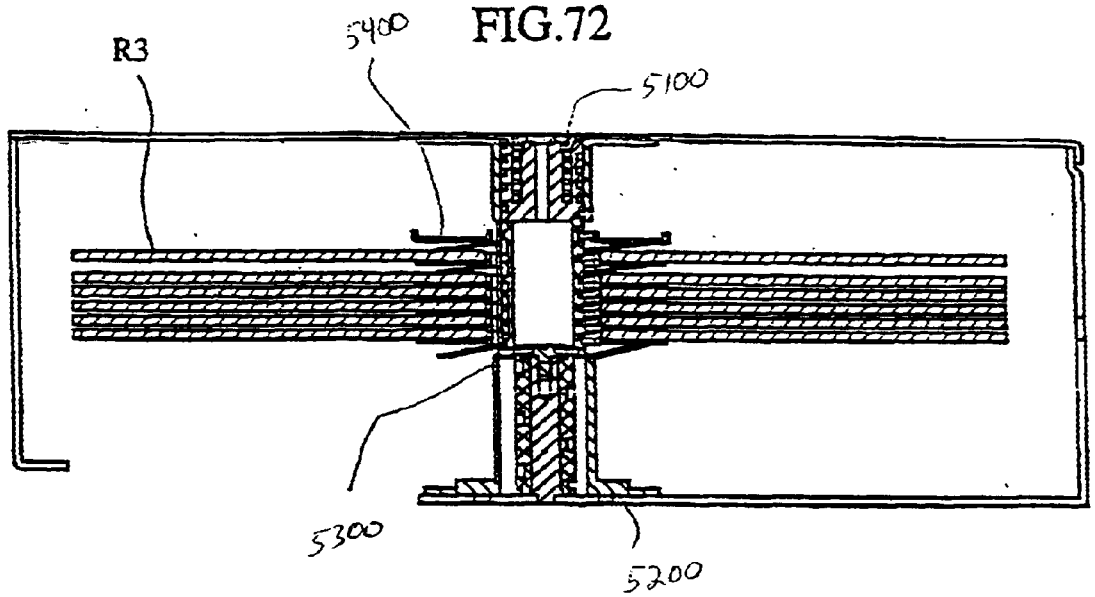
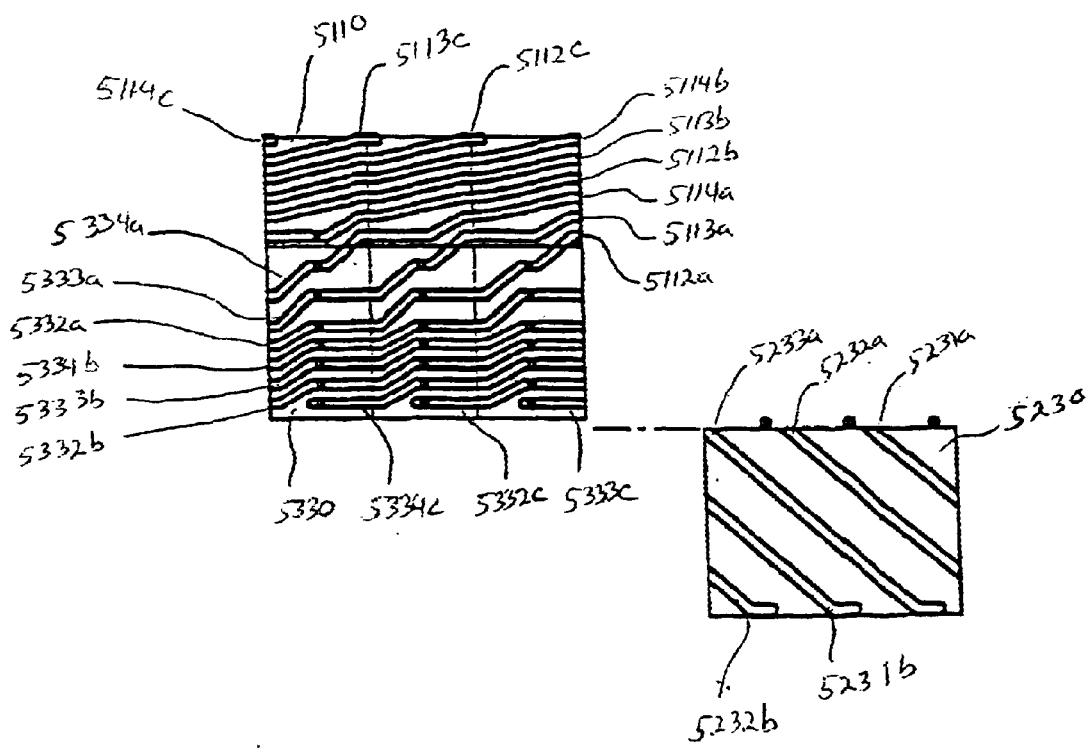
FIG.72

FIG.73
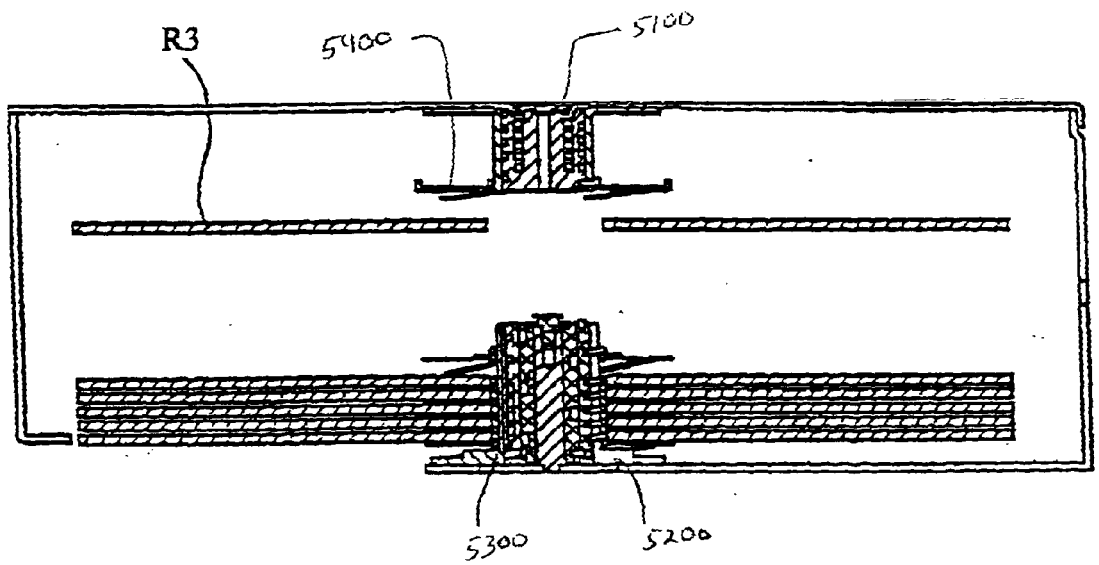
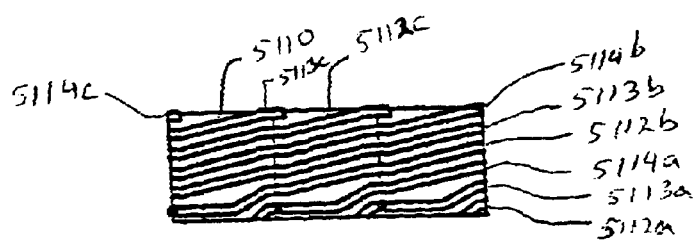
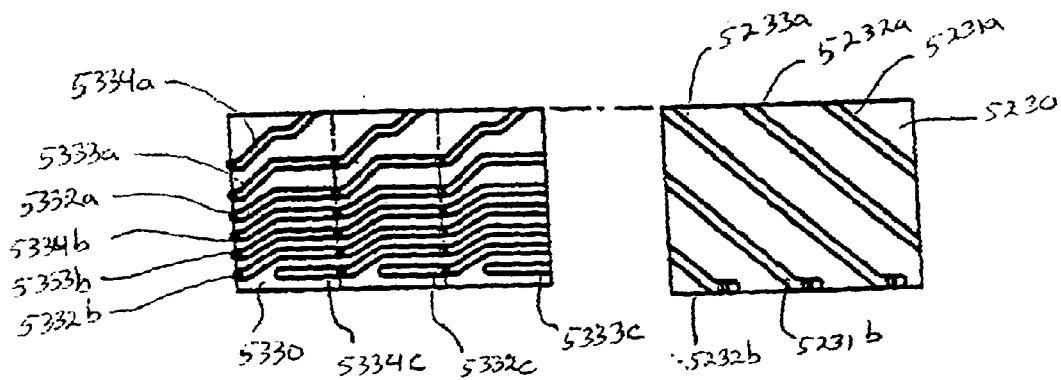

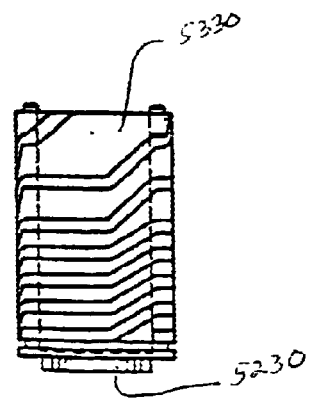

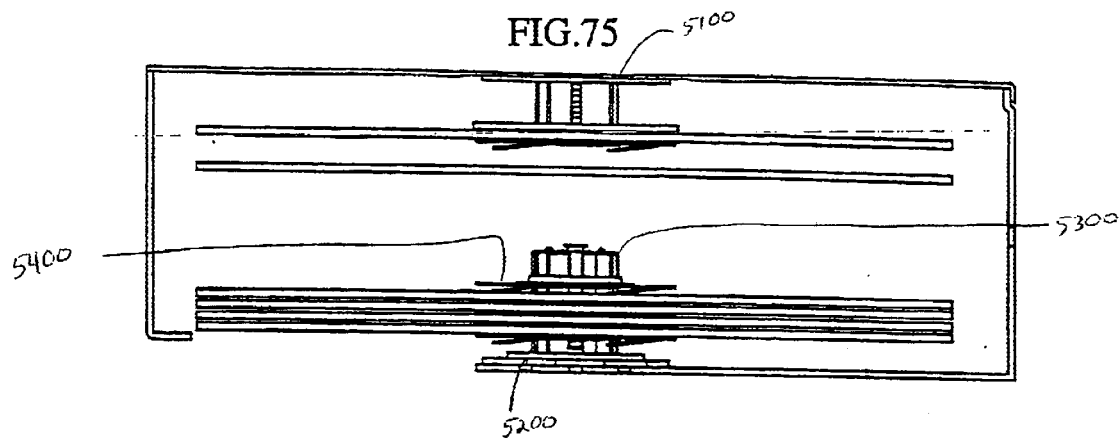
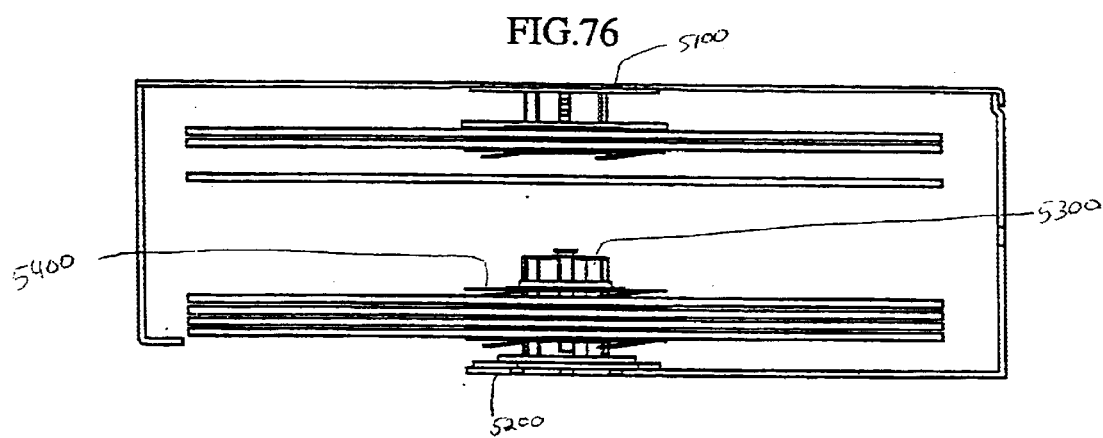
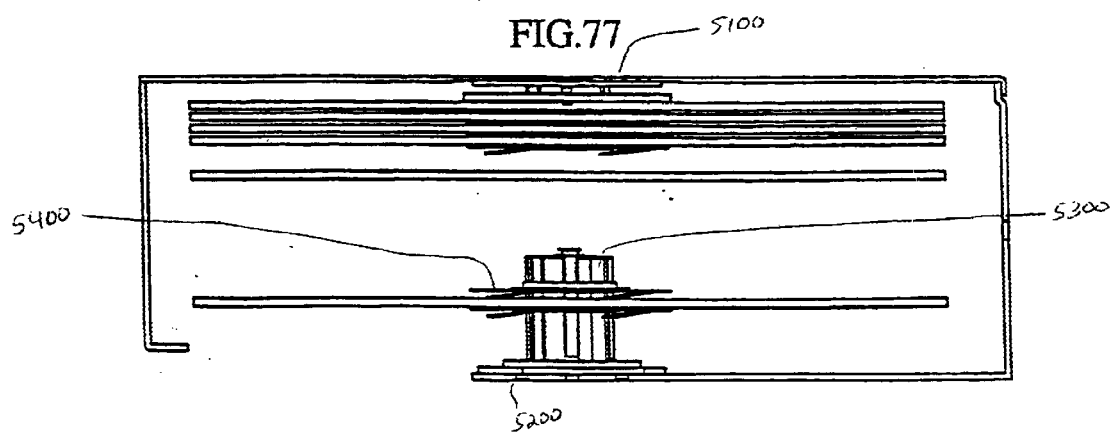

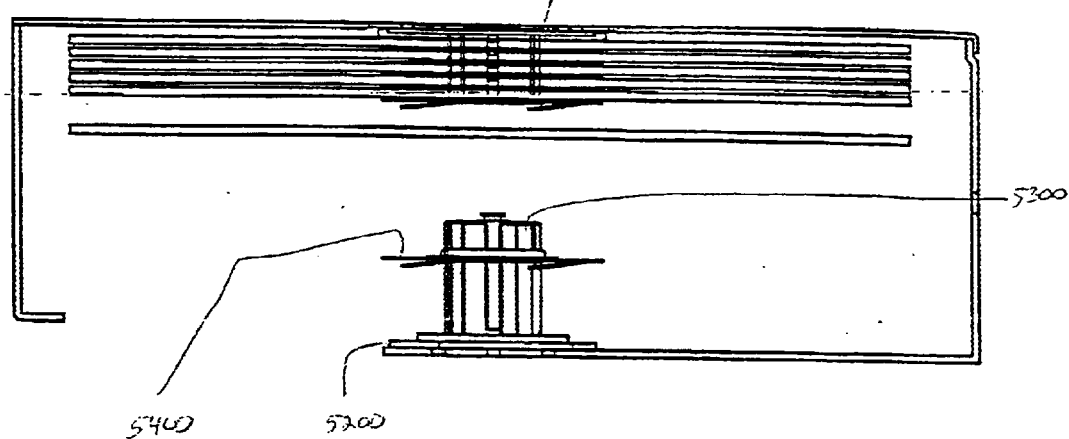
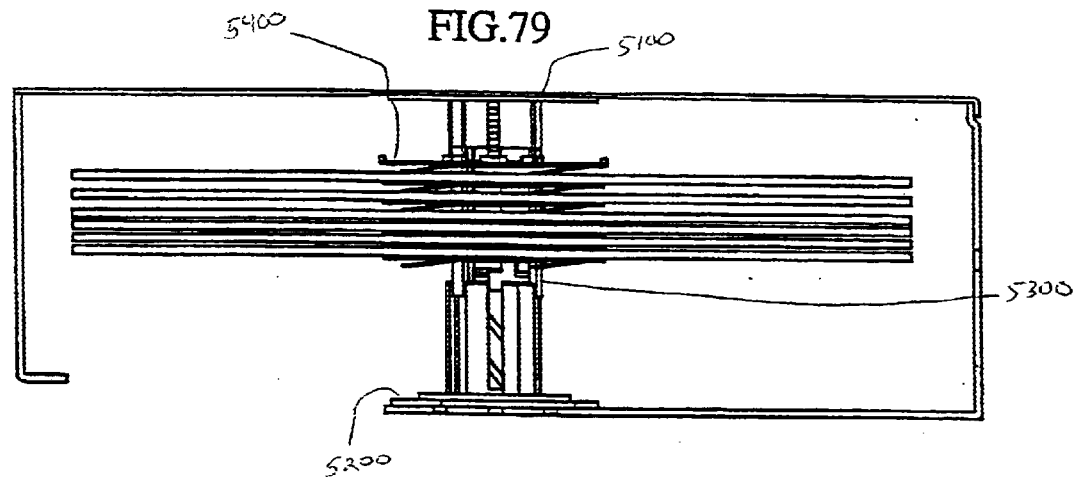
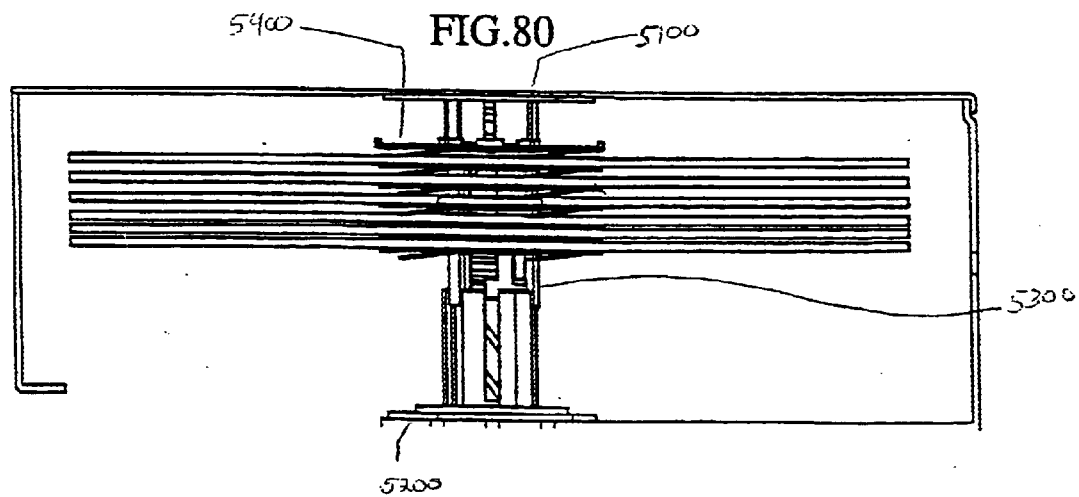

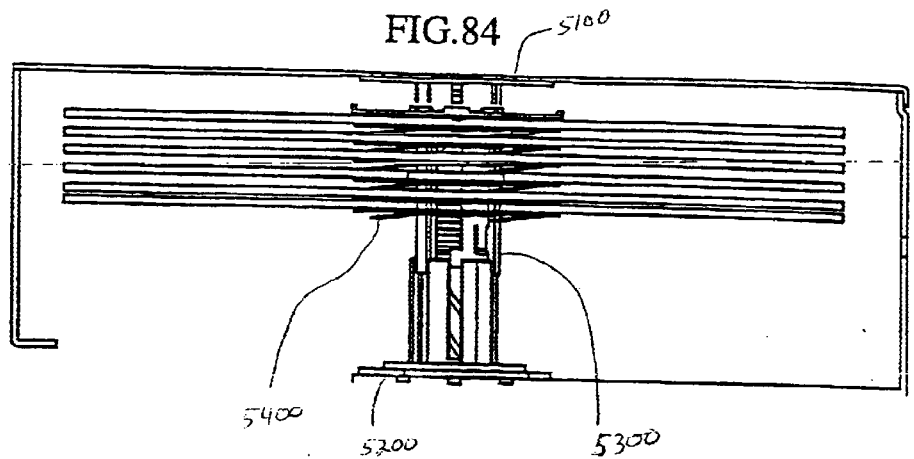
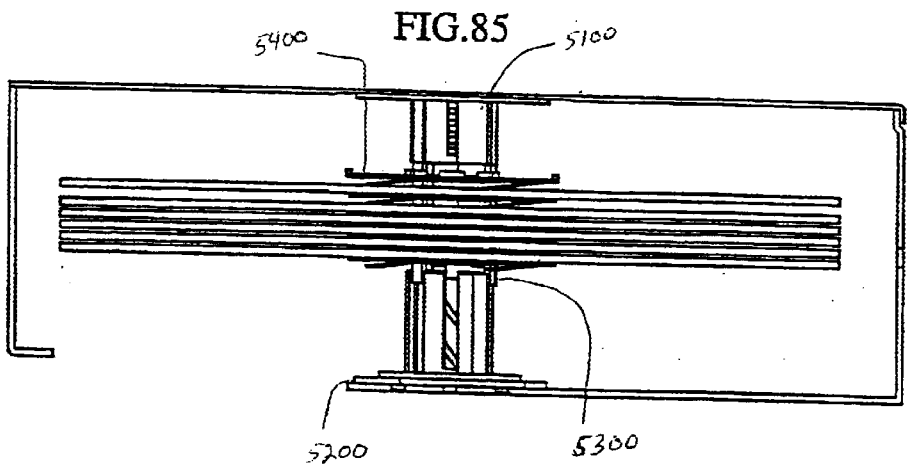
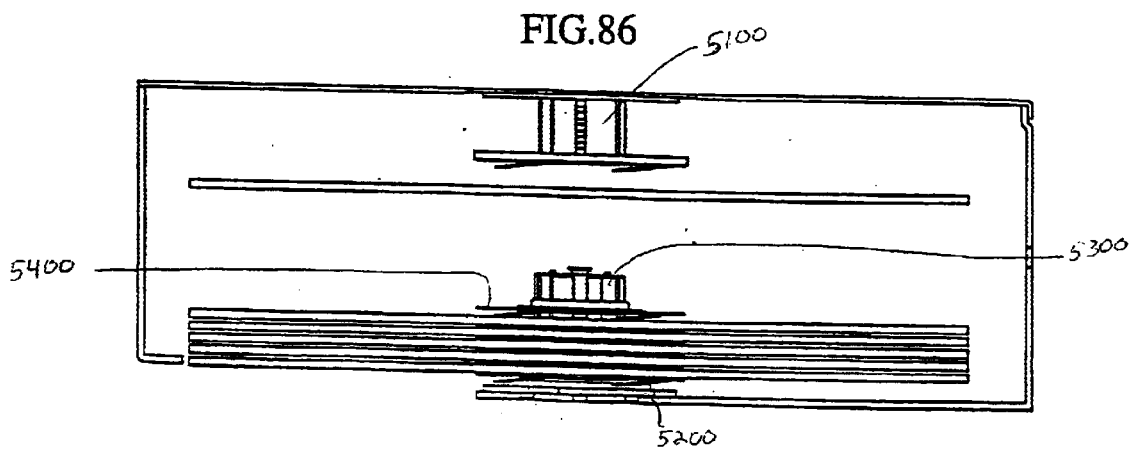

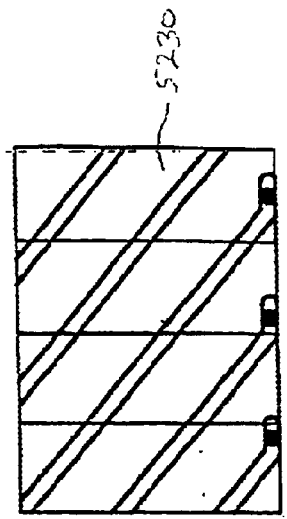
FIG.98(f)
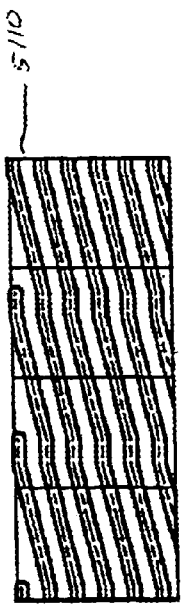
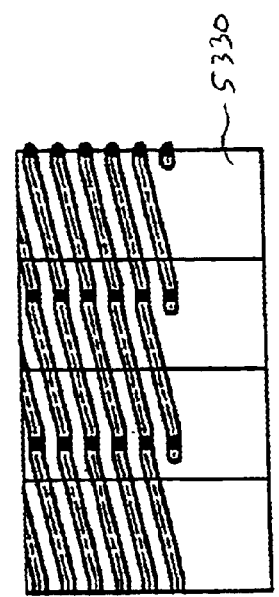
FIG.98(e)
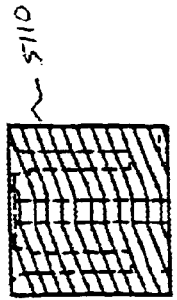
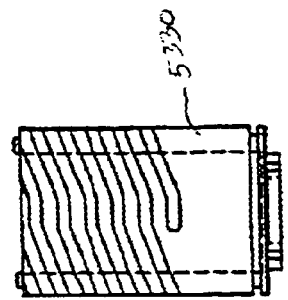
FIG.98(d)

FIG.99

4LOAD→#4PLAY

| | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| ① | DISK INSERTION/EJECTION MECHANISM | 2 | 2 | 2 | 3 | 3 | 3 | 3 | 4 | 4 | 4 | 4 | 4 | 4 | 4 | 4 | 4 | 4 | 4 | 4 |
| ② | DISK POSITION DETERMINATION MECHANISM (12cm) | 7 | 8 | 9 | 10 | 10 | 10 | 10 | 15 | 15 | 15 | 15 | 15 | 15 | 15 | 15 | 15 | 15 | 15 | 15 |
| ② | DISK POSITION DETERMINATION MECHANISM (8cm) | 11 | 11 | 11 | 12 | 12 | 12 | 12 | 15 | 15 | 15 | 15 | 15 | 15 | 15 | 15 | 15 | 15 | 15 | 15 |
| ③ | DISK ROLLER SWITCHING MECHANISM | 19 | 19 | 19 | 20 | 22 | 22 | 22 | 22 | 22 | 22 | 22 | 22 | 22 | 22 | 22 | 22 | 22 | 22 | 22 |
| ④ | SHUTTER MECHANISM | 16 | 16 | 16 | 16 | 17 | 17 | 17 | 17 | 17 | 17 | 18 | 18 | 18 | 18 | 18 | 18 | 18 | 18 | 18 |
| ⑤ | SWITCHING MECHANISM | 13 | 13 | 13 | 13 | 13 | 13 | 14 | 15 | 15 | 15 | 15 | 15 | 15 | 15 | 15 | 15 | 15 | 15 | 15 |
| ⑥ | DISK SUPPORT MECHANISM (12cm) | 25 | 25 | 25 | 25 | 26 | 27 | 27 | 27 | 27 | 28 | 29 | 29 | 29 | 30 | 30 | 30 | 30 | 30 | 30 |
| ⑥ | DISK SUPPORT MECHANISM (8cm) | 25 | 25 | 25 | 25 | 26 | 24 | 24 | 24 | 24 | 31 | 32 | 32 | 32 | 30 | 30 | 30 | 30 | 30 | 30 |
| ⑧ | DISK LOADING MECHANISM | 67 | 67 | 67 | 67 | 67 | 67 | 67 | 67 | 67 | 67 | 67 | 67 | 67 | 67 | 67 | 67 | 67 | 67 | 67 |
| ⑦ | DISK PLAYING MECHANISM (ROTATION) | 37<br>38<br>39<br>40<br>41 | 37<br>38<br>39<br>40<br>42 | 37<br>38<br>39<br>40<br>43 | 37<br>38<br>39<br>40<br>44 | 42a | 42 | 42 | 42 | 43 | 44 | 44 | | | | | | | | |
| ⑦ | DISK PLAYING MECHANISM (CLAMP) | | | | | | | | | | | | 45<br>46 | 47<br>48<br>49<br>50 | 47<br>48<br>49<br>51 | | | | | |
| ⑦ | DISK PLAYING MECHANISM (FLOAT LOCK) | | | | | | | | | | | | | | | 51 | 52 | 53<br>54<br>55 | 56<br>57<br>58<br>59 | 60 |

FIG.100

*#4PLAY→#4EJECT*

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| ① DISK INSERTION/EJECTION MECHANISM | 4 | 4 | 4 | 4 | 4 | 4 | 4 | 4 | 4 | 4 | 4 | 4 | 3 | 3 | 2 | 2 | 2 | 2 |
| ② DISK POSITION DETERMINATION MECHANISM (12cm) | 15 | 15 | 15 | 15 | 15 | 15 | 15 | 15 | 15 | 15 | 15 | 15 | 10 | 10 | 10 | 9 | 8 | 7 |
| DISK POSITION DETERMINATION MECHANISM (8cm) | 12 | 12 | 12 | 12 | 12 | 12 | 12 | 12 | 12 | 12 | 12 | 12 | 12 | 12 | 12 | 12 | 12 | 11 |
| ③ DISK ROLLER SWITCHING MECHANISM | 22 | 22 | 22 | 22 | 22 | 22 | 22 | 22 | 22 | 22 | 22 | 22 | 22 | 22 | 20 | 20 | 19 | 19 |
| ④ SHUTTER MECHANISM | 18 | 18 | 18 | 18 | 18 | 18 | 18 | 18 | 17 | 17 | 17 | 17 | 17 | 17 | 16 | 16 | 16 | 16 |
| ⑤ SWITCHING MECHANISM | 15 | 15 | 15 | 15 | 15 | 15 | 15 | 15 | 15 | 15 | 15 | 14 | 13 | 13 | 13 | 13 | 13 | 13 |
| ⑥ DISK SUPPORT MECHANISM (12cm) | 30 | 30 | 30 | 30 | 30 | 29 | 29 | 29 | 28 | 28 | 27 | 27 | 27 | 26 | 25 | 25 | 25 | 25 |
| DISK SUPPORT MECHANISM (8cm) | 30 | 30 | 30 | 30 | 30 | 32 | 32 | 32 | 31 | 31 | 24 | 24 | 24 | 26 | 25 | 25 | 25 | 25 |
| ⑧ DISK LOADING MECHANISM | 67 | 67 | 67 | 67 | 67 | 67 | 67 | 67 | 67 | 67 | 67 | 67 | 67 | 67 | 67 | 67 | 67 | 67 |
| DISK PLAYING MECHANISM (ROTATION) | | | | | | | | | 44 | 44 | 43 | 42 | 42 | 42a | 37 38 39 40 41 | 37 38 39 40 42 | 37 38 39 40 43 | 37 38 39 40 44 |
| ⑦ DISK PLAYING MECHANISM (CLAMP) | | | | | | | 47 48 49 50 | 47 48 49 50 | 45 46 | | | | | | | | | |
| DISK PLAYING MECHANISM (FLOAT LOCK) | 60 | 56 57 58 59 | 53 54 55 | 52 | 51 | 51 | | | | | | | | | | | | |

FIG.101

4PLAY → #1PLAY

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| ① | DISK INSERTION/ EJECTION MECHANISM | 4 | 4 | 4 | 4 | 4 | 4 | 4 | 4 | 4 | 4 | 4 | 5 | 5 | 5 | 6 | 6 | 6 | 6 | 6 | 5 | 4 | 4 | 4 | 4 | 4 | 4 | 4 | 4 | 4 | 4 | 4 |
| ② | DISK POSITION DETERMINATION MECHANISM (12cm) | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| ② | DISK POSITION DETERMINATION MECHANISM (8cm) | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| ③ | DISK ROLLER SWITCHING MECHANISM | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| ④ | SHUTTER MECHANISM | 18 | 18 | 18 | 18 | 18 | 18 | 18 | 18 | 17 | 17 | 17 | 17 | 17 | 17 | 17 | 17 | 17 | 17 | 17 | 17 | 17 | 17 | 17 | 18 | 18 | 18 | 18 | 18 | 18 | 18 | 18 |
| ⑤ | SWITCHING MECHANISM | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| ⑥ | DISK SUPPORT MECHANISM (12cm) | 30 | 30 | 30 | 30 | 30 | 29 | 29 | 29 | 28 | 28 | 27 | 27 | 27 | 27 | 27 | 27 | 26 | 26 | 27 | 27 | 27 | 27 | 28 | 29 | 29 | 29 | 30 | 30 | 30 | 30 | 30 |
| ⑥ | DISK SUPPORT MECHANISM (8cm) | 30 | 30 | 30 | 30 | 30 | 32 | 32 | 32 | 31 | 31 | 24 | 24 | 24 | 24 | 24 | 24 | 26 | 26 | 24 | 24 | 24 | 24 | 31 | 32 | 32 | 32 | 30 | 30 | 30 | 30 | 30 |
| ⑧ | DISK LOADING MECHANISM | 67 | 67 | 67 | 67 | 67 | 67 | 67 | 67 | 67 | 67 | 65 | | 68 | 69 | 66 | 70 | 71 | 72 | 72 | 65 | 65 | 65 | 65 | 65 | 65 | 65 | 65 | 65 | 65 | 65 | 65 |
| | | | | | | | | | | | | | | | | | | | | | 73 | 73 | 73 | 73 | 74 | 73 | 73 | 73 | 75 | 73 | 73 | 73 |
| ⑦ | DISK PLAYING MECHANISM (ROTATION) | | | | | | | | 44 | 44 | 43 | 42 | 42 | 42 | 42 | 42 | 42 | 42a | 42a | 42 | 42 | 42 | 43 | 44 | 44 | | | | | | | |
| ⑦ | DISK PLAYING MECHANISM (CLAMP) | | | | | | | 47 48 49 50 | 45 46 | | | | | | | | | | | | | | | | | 45 46 | 47 48 49 50 | 47 48 49 50 | | | | |
| ⑦ | DISK PLAYING MECHANISM (FLOAT LOCK) | 60 | 56 57 58 59 | 53 54 55 | 52 | 51 | 51 | | | | | | | | | | | | | | | | | | | | | | 51 | 52 | 53 54 55 | 56 57 58 59 |

FIG.102

4REFUGE→#1PLAY

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| ① DISK INSERTION/ EJECTION MECHANISM | 2 | 2 | 2 | 3 | 3 | 4 | 5 | 6 | 6 | 6 | 6 | 6 | 5 | 4 | 4 | 4 | 4 | 4 | 4 | 4 | 4 | 4 | 4 | 4 |
| ② DISK POSITION DETERMINATION MECHANISM (12cm) | 7 | 7 | 7 | 7 | 8 | 15 | 15 | 15 | 15 | 15 | 15 | 15 | 15 | 15 | 15 | 15 | 15 | 15 | 15 | 15 | 15 | 15 | 15 | 15 |
| DISK POSITION DETERMINATION MECHANISM (8cm) | 7 | 7 | 7 | 7 | 8 | 15 | 15 | 15 | 15 | 15 | 15 | 15 | 15 | 15 | 15 | 15 | 15 | 15 | 15 | 15 | 15 | 15 | 15 | 15 |
| ③ DISK ROLLER SWITCHING MECHANISM | 19 | 21 | 22 | 22 | 22 | 22 | 22 | 22 | 22 | 22 | 22 | 22 | 22 | 22 | 22 | 22 | 22 | 22 | 22 | 22 | 22 | 22 | 22 | 22 |
| ④ SHUTTER MECHANISM | 16 | 17 | 17 | 17 | 17 | 17 | 17 | 17 | 17 | 17 | 17 | 17 | 17 | 17 | 17 | 17 | 17 | 18 | 18 | 18 | 18 | 18 | 18 | 18 |
| ⑤ SWITCHING MECHANISM | 13 | 13 | 13 | 13 | 14 | 15 | 15 | 15 | 15 | 15 | 15 | 15 | 15 | 15 | 15 | 15 | 15 | 15 | 15 | 15 | 15 | 15 | 15 | 15 |
| ⑥ DISK SUPPORT MECHANISM (12cm) | 25 | 26 | 30 | 30 | 30 | 30 | 30 | 30 | 30 | 26 | 26 | 27 | 27 | 27 | 27 | 28 | 29 | 29 | 29 | 30 | 30 | 30 | 30 | 30 |
| DISK SUPPORT MECHANISM (8cm) | | | | | | | | | | 26 | 26 | 24 | 27 | 24 | 24 | 31 | 32 | 32 | 32 | 30 | 30 | 30 | 30 | 30 |
| ⑧ DISK LOADING MECHANISM | 92 | 92 | 92 | 92 | 92 | 92 | 65 | 66 | 93 | 93 | 94 | 94 | 95 | 95 | 95 | 95 | 96 | 95 | 95 | 95 | 97 | 95 | 95 | 95 |
| | | | | | | | | | | | | | 65 | 65 | 65 | 65 | 65 | 65 | 65 | 65 | 65 | 65 | 65 | 65 |
| DISK PLAYING MECHANISM (ROTATION) | 37 38 39 40 41 | 42a 42b | 42b | 42b | 42b | 42b | 42b | 42b | 42a | 42a | 42b | 42b | 42b | 42b | 43 | 44 | 44 | | | | | | | |
| ⑦ DISK PLAYING MECHANISM (CLAMP) | | | | | | | | | | | | | | | | | | 45 46 | 47 48 49 50 | 47 48 49 50 | | | | |
| DISK PLAYING MECHANISM (FLOAT LOCK) | | | | | | | | | | | | | | | | | | | | | 51 52 | 53 54 55 | 53 54 55 | 56 57 58 59 |

FIG. 103

4PLAY→#1REFUGE

| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| ① | DISK INSERTION/ EJECTION MECHANISM | 4 | 4 | 4 | 4 | 4 | 4 | 4 | 4 | 4 | 4 | 4 | 5 | 6 | 6 | 6 | 6 | 6 | 5 | 4 | 4 | 3 | 3 | 2 |
| ② | DISK POSITION DETERMINATION MECHANISM (12cm) | 15 | 15 | 15 | 15 | 15 | 15 | 15 | 15 | 15 | 15 | 15 | 15 | 15 | 15 | 15 | 15 | 15 | 15 | 15 | 8 | 7 | 7 | 7 |
| | DISK POSITION DETERMINATION MECHANISM (8cm) | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| ③ | DISK ROLLER SWITCHING MECHANISM | 22 | 22 | 22 | 22 | 22 | 22 | 22 | 22 | 22 | 22 | 22 | 22 | 22 | 22 | 21 | 22 | 22 | 22 | 22 | 22 | 22 | 21 | 19 |
| ④ | SHUTTER MECHANISM | 18 | 18 | 18 | 18 | 18 | 18 | 18 | 18 | 17 | 17 | 17 | 17 | 17 | 17 | 17 | 17 | 17 | 17 | 17 | 17 | 17 | 17 | 16 |
| ⑤ | SWITCHING MECHANISM | 15 | 15 | 15 | 15 | 15 | 15 | 15 | 15 | 15 | 15 | 15 | 15 | 15 | 15 | 15 | 15 | 15 | 15 | 15 | 14 | 13 | 13 | 13 |
| ⑥ | DISK SUPPORT MECHANISM (12cm) | 30 | 30 | 30 | 30 | 30 | 29 | 29 | 29 | 28 | 28 | 27 | 27 | 27 | 27 | 26 | 26 | 27 | 27 | 27 | 27 | 27 | 26 | 25 |
| | DISK SUPPORT MECHANISM (8cm) | 30 | 30 | 30 | 30 | 30 | 32 | 32 | 32 | 31 | 31 | 24 | 24 | 24 | 24 | 26 | 26 | 24 | 24 | 24 | 24 | 24 | 24 | 24 |
| ⑧ | DISK LOADING MECHANISM | 88 | 88 | 88 | 88 | 88 | 88 | 88 | 88 | 88 | 88 | 88 | 65 | 66 | 89 | 89 | 90 | 90 | 65 | 65 | 65 | 65 | 65 | 65 |
| ⑦ | DISK PLAYING MECHANISM (ROTATION) | | | | | | | | 44 | 44 | 43 | 42b | 42b | 42b | 42a | 42a | 42a | 42b | 42b | 42b | 42b | 42b | 42a | 37 38 39 40 41 |
| | DISK PLAYING MECHANISM (CLAMP) | | | | | | | 47 48 49 50 | 45 46 | | | | | | | | | | | | | | | |
| | DISK PLAYING MECHANISM (FLOAT LOCK) | 60 | 56 57 58 59 | 53 54 55 | 52 | 51 | 51 | | | | | | | | | | | | | | | | | |

DISK INSERTION/EJECTION DEVICE HAVING A TRANSLATING ROLLER ARRANGEMENT

CROSS-REFERENCE TO THE RELATED APPLICATION

This application is a continuation of international Application No. PCT/JP99/03317, whose international filing date is Jun. 22, 1999, the disclosures of which Application are incorporated by reference herein.

BACKGROUND OF THE INVENTION

1. Field of the Invention

The present invention relates to a disk device. In particular, the present invention relates to a disk device adapted to operate a plurality of disks selectively without using a detachable magazine.

2. Description of Related Art

FIG. 104 is a schematic cross sectional view showing the main components of a general conventional disk device adapted to operate a plurality of disks selectively. FIG. 105 is another schematic cross sectional view of main components.

In FIGS. 104 and 105, reference numeral 1 denotes a magazine loading interchangeable disks and 2 is a disk drive section. The disk drive section 2 comprises a disk motor 3, a disk clamp hub 13 provided on a shaft of the disk motor 3, a disk clamp 4, a disk roller 6 provided in the magazine 1 and transferring disks 8 transferred from the drive lever 5 driven by a drive means (not shown) to the disk drive section 2, a drive shaft 9 fixed to a housing 7 which supports the disk drive section 2, an inclined plate cam 10 which operates in direction A in the figure and being driven by the drive means, and a vertical guide plate 11.

In the above disk device, when extracting (hereafter selecting) a plurality of disks 8 loaded in the magazine 1, the drive shaft 9, inclined plate cam 10 and vertical guide plate 11 are respectively displaced. The disk rotation drive section 2 is displaced in the direction B shown in the figure to determine the position of the desired disk in the magazine 1.

Since the type of conventional disk device above arranges a disk loaded in the magazine 1 and a disk rotating near the disk drive section 2 in an orientation in which the disks are completely independent in a planar region, the problem of the length of the disk device arises. That is to say, the dimension D of the device is increased as a result.

A device as disclosed in JP-A-63-200354 for example has been proposed to solve problems such as the above. FIGS. 106 and 107 are schematic cross sectional views of a lateral cross section of main components. FIG. 108 is a schematic cross sectional view of an upper cross section of main components.

In FIGS. 106, 107 and 108, reference numeral 19 denotes a magazine loading an interchangeable disk, 21 is a disk motor, 22 is a disk clamp hub disposed on a shaft of the disk motor, and 23 is a disk clamp.

26 is a disk roller which transfers a disk 25, which is ejected by a drive lever 24 driven by a drive means (not shown), to a disk drive section and 27 is a subordinate roller which operates in an opposed direction to the disk roller 26.

32 is a pair of inclined plate cams which engage with a plurality of trays 31 in the magazine 19 and which operate so that when a disk displaces in a lateral direction, a gap E at least having a thickness greater than or equal to the thickness of the disk is provided with respect to the disk drive section 20 in an axial rotation direction of a disk 25 which is selected by the magazine displacement means (not shown).

The disk rotation drive means 20 is comprised of a disk motor 21, a disk clamp hub 22, a disk clamp 23, a drive lever 24, a disk 25, a disk roller 26, a subordinate roller 27, and an inclined plate cam 32.

The operation of the conventional disk device will be described below.

When any one of a plurality of disks 25 which are loaded in a magazine 19 is selected, the magazine 19 is displaced in a direction F as shown by the arrow in the figure by a drive means and positioned at a desired disk position in the magazine 19.

A drive lever 24 in the magazine 19 is operated, and the disk 25 slides the disk guide 35 in the magazine 19. The leading edge of the disk 25 is gripped between the disk roller 26 of the disk drive section 20 and the subordinate roller 27. After the disk is conveyed to a position of the disk clamp 23 and the disk clamp hub 22 which is provided on a shaft of the disk motor 21, the clamp position of the disk 25 is confirmed by a disk detection means (not shown). The roller 27 on the subordinate side of the disk clamp 23 and the disk roller 26 is displaced in the direction of the disk clamp hub 22 by the drive means and the disk 25 is clamped.

At the same time as the subordinate roller 27 displaces in the direction of the disk clamp hub 22, the pair of inclined plate cams 32 provided on the disk drive section 20 are displaced toward the magazine 19 by the drive means. A suitable gap E as shown in FIG. 107 is formed by the inclination of the tray 31.

Since a conventional disk device is comprised as shown above, the problem has arisen that disks can not be selectively inserted or retracted as required one at a time since a magazine case is required and that the size of the device is increased.

As a conventional disk device uses a conveyable magazine case, a complicated mechanism is required in order to separate each of the loading shelves loading disks in the disk device. When disks are played and a gap is formed between a played disk and an opposed disk, the gap may be enlarged as only one end can be opened. As a result, the problem has arisen that it becomes necessary to provide a space in the device which as a result, enlarges the size of the disk device to that degree.

As a result of the conventional disk device using a conveyable magazine case, it is extremely difficult to divide each loading shelf loading disks in the disk device by inclining each loading shelf.

In order to maintain a space in the disk device, the problem has arisen that the size of the device is increased.

Since the conventional disk device is constructed to retain a disk outer periphery when retaining a disk in the device, the problem arises that the number of components is increased when retaining sections must be provided which corresponds to disks with a plurality of differing diameters.

It has been proposed to solve the above problem by the provision of a retaining section with the functions of retaining a plurality of disks of differing diameters with a single retaining section. However when such a device is constructed in this way, since a retaining section which retains small diameter disk must be provided, the problem arises that the retaining section for small diameter disks abuts and damages the face of large diameter disks when such disks are also loaded.

SUMMARY OF THE INVENTION

The present invention is proposed to solve the above problems and has the object of providing a disk device with reduced dimensions which is adapted to store a plurality of disks without using a detachable magazine and to perform respective operations, that is to say, to selectively insert, eject and play each disk.

The present invention has the further object of providing a disk device with reduced space by the disposition of a disk loading position and disk playing position on the same rotational axis with respect to a disk insertion/ejection direction.

The present invention has the further object of providing a disk device which prevents damage to the face of a disk by supporting a section of the disk when a disk is inserted or ejected by a plurality of support sections.

A disk device of the present invention is provided with a disk insertion/ejection means which performs insertion and ejection operations of a disk to the inside and outside of the device and a displacement means which displaces a disk insertion/ejection means along a direction of disk insertion/ejection. The displacement means is adapted to displace the disk insertion/ejection means in either a direction of disk insertion or disk ejection based on the operation of said disk.

In such a manner, since it is possible to regulate the size of a space in the device based on a fixed operation of a disk, it is possible to downsize the device.

The present invention is provided with one drive means and a drive force transmission switching means which switches a drive force of said drive means to operate either when said disk insertion/ejection means performs an insertion/ejection operation on said disk or when said displacement means performs the operation of displacing the disk insertion/ejection means in either a direction of disk insertion or disk ejection based on the operation of said disk. With such an arrangement, it is possible to provide a single drive means with the dual functions of drive source required in disk insertion and ejection operations and drive source required when said disk insertion/ejection means is displaced in a direction of disk insertion or ejection. Thus it is possible to reduce the number of components, to reduce manufacturing costs and to downsize the device.

When the displacement means displaces the disk insertion/ejection means in a direction of disk insertion or ejection, the disk insertion ejection means is displaced in a direction of a rotational axis of the disk. By such an arrangement, it is possible to effectively make use of position on the route of disk insertion or ejection and to improve the operational freedom of the disk device.

BRIEF DESCRIPTION OF THE DRAWINGS

FIG. 3 (a) is an upper view of the inner components as seen from the upper surface of the device, (b) is a left lateral view of (a), and (c) is a right lateral view of (a).

FIG. 4 (a) is an upper view of the inner components as seen from the upper surface of the device, (b) is a left lateral view of (a), and (c) is a right lateral view of (a).

FIG. 5 (a) is an upper view of the inner components as seen from the upper surface of the device, (b) is a left lateral view of (a), and (c) is a right lateral view of (a).

FIG. 6 (a) is an upper view of the inner components as seen from the upper surface of the device, (b) is a left lateral view of (a), and (c) is a right lateral view of (a).

FIG. 7 (a) is an upper view of the inner components as seen from the upper surface of the device, (b) is a left lateral view of (a), (c) is a right lateral view of (a), and (d) is an explanatory drawing of the components.

FIG. 8 (a) is an upper view of the inner components as seen from the upper surface of the device, (b) is a left lateral view of (a), (c) is a right lateral view of (a), and (d) is an explanatory drawing of the components.

FIG. 9 (a) is an upper view of the inner components as seen from the upper surface of the device, (b) is a left lateral view of (a), (c) is a right lateral view of (a), and (d) is an explanatory drawing of the components.

FIG. 10 (a) is an upper view of the inner components as seen from the upper surface of the device, (b) is a left lateral view of (a), (c) is a right lateral view of (a), and (d) is an explanatory drawing of the components.

FIG. 11 (a) is an upper view of the inner components as seen from the upper surface of the device, (b) is a left lateral view of (a), (c) is a right lateral view of (a), and (d) is an explanatory drawing of the components.

FIG. 12 (a) is an upper view of the inner components as seen from the upper surface of the device, (b) is a left lateral view of (a), (c) is a right lateral view of (a), and (d) is an explanatory drawing of the components.

FIG. 13 (a) is an upper view of the inner components as seen from the upper surface of the device, (b) is a side view of (a), (c) is a rear view of (a), (d) is an explanatory drawing of the components, (e) is an explanatory drawing of the components, and (f) is an explanatory drawing of the components.

FIG. 14 (a) is an upper view of the inner components as seen from the upper surface of the device, (b) is a side view of (a), (c) is a rear view of (a), (d) is an explanatory drawing of the components, (e) is an explanatory drawing of the components, and (f) is an explanatory drawing of the components.

FIG. 15 (a) is an upper view of the inner components as seen from the upper surface of the device, (b) is a side view of (a), (c) is a rear view of (a), (d) is an explanatory drawing of the components, (e) is an explanatory drawing of the components, and (f) is an explanatory drawing of the components.

FIG. 16 (a) is an upper view of the inner components as seen from the upper surface of the device, (b) is a left lateral view of (a), (c) is a right lateral view of (a).

FIG. 17 (a) is an upper view of the inner components as seen from the upper surface of the device, (b) is a left lateral view of (a), (c) is a right lateral view of (a).

FIG. 18 (a) is an upper view of the inner components as seen from the upper surface of the device, (b) is a left lateral view of (a), (c) is a right lateral view of (a).

FIG. 19 (a) is an upper view of the inner components as seen from the upper surface of the device, (b) is a left lateral view of (a), and (c) is a rear view of (a).

FIG. 20 (a) is an upper view of the inner components as seen from the upper surface of the device, (b) is a left lateral view of (a), and (c) is a rear view of (a).

FIG. 21 (a) is an upper view of the inner components as seen from the upper surface of the device, (b) is a left lateral view of (a), and (c) is a rear view of (a).

FIG. 22 (a) is an upper view of the inner components as seen from the upper surface of the device, (b) is a left lateral view of (a), and (c) is a rear view of (a).

FIG. 23 (a) is an upper view of the inner components as seen from the upper surface of the device, (b) is a left lateral view of (a), and (c) is a rear view of (a).

FIG. 24 (a), (b) and (c) are explanatory views of the action of the components, and (d) is an explanatory view of the action.

FIG. 25 (a) is an upper view of the inner components as seen from the upper surface of the device, (b) is a left lateral view of (a), and (c) is a rear view of (a).

FIG. 26 (a) is an upper view of the inner components as seen from the upper surface of the device, (b) is a left lateral view of (a), and (c) is a rear view of (a).

FIG. 27 (a) is an upper view of the inner components as seen from the upper surface of the device, (b) is a left lateral view of (a), and (c) is a rear view of (a).

FIG. 28 (a) is an upper view of the inner components as seen from the upper surface of the device, (b) is a left lateral view of (a), and (c) is a rear view of (a).

FIG. 29 (a) is an upper view of the inner components as seen from the upper surface of the device, (b) is a left lateral view of (a), and (c) is a rear view of (a).

FIG. 30 (a) is an upper view of the inner components as seen from the upper surface of the device, (b) is a left lateral view of (a), and (c) is a rear view of (a).

FIG. 31 (a) is an upper view of the inner components as seen from the upper surface of the device, (b) is a left lateral view of (a), and (c) is a rear view of (a).

FIG. 32 (a) is an upper view of the inner components as seen from the upper surface of the device, (b) is a left lateral view of (a), and (c) is a rear view of (a).

FIG. 61 (a) shows a state of connection, (b) shows a state of disconnection.

FIG. 67 (a) is a cross-sectional view of the components, (b) is an explanatory view of (a).

FIG. 68 (a) is a cross-sectional view of the components, (b) is an explanatory view of (a).

FIG. 69 (a) is a cross-sectional view of the components, (b) is an explanatory view of (a).

FIG. 70 (a) is a cross-sectional view of the components, (b) is an explanatory view of (a).

FIG. 71 is an explanatory view of the action of a disk loading mechanism of the disk device as shown in FIG. 1. FIG. 71 (a) is a cross-sectional view of the components, (b) is an explanatory view of (a).

FIG. 72 is an explanatory view of the action of a disk loading mechanism of the disk device as shown in FIG. 1.
FIG. 72 (a) is a cross-sectional view of the components, (b) is an explanatory view of (a).

FIG. 73 is an explanatory view of the action of a disk loading mechanism of the disk device as shown in FIG. 1. FIG. 73 (a) is a cross-sectional view of the components, (b) is an explanatory view of (a).

FIG. 74 (a) shows a state of connection, (b) shows a state of disconnection.

FIG. 75 is an explanatory view of the action of the components of the disk loading mechanism of the disk device as shown in FIG. 1.

FIG. 76 is an explanatory view of the action of the components of the disk loading mechanism of the disk device as shown in FIG. 1.

FIG. 77 is an explanatory view of the action of the components of the disk loading mechanism of the disk device as shown in FIG. 1.

FIG. 78 is an explanatory view of the action of the components of the disk loading mechanism of the disk device as shown in FIG. 1.

FIG. 79 is an explanatory view of the action of the components of the disk loading mechanism of the disk device as shown in FIG. 1.

FIG. 80 is an explanatory view of the action of the components of the disk loading mechanism of the disk device as shown in FIG. 1.

FIG. 83 (a) is a cross-sectional view of the components, (b) is an explanatory view of (a).

FIG. 84 is an explanatory view of the action of the components of the disk loading mechanism of the disk device as shown in FIG. 1.

FIG. 85 is an explanatory view of the action of the components of the disk loading mechanism of the disk device as shown in FIG. 1.

FIG. 86 is an explanatory view of the action of the components of the disk loading mechanism of the disk device as shown in FIG. 1.

FIG. 99 is a state transition diagram which explains the action of the disk device as shown in FIG. 1.

FIG. 100 is a state transition diagram which explains the action of the disk device as shown in FIG. 1.

FIG. 101 is a state transition diagram which explains the action of the disk device as shown in FIG. 1.

FIG. 102 is a state transition diagram which explains the action of the disk device as shown in FIG. 1.

FIG. 103 is a state transition diagram which explains the action of the disk device as shown in FIG. 1.

DETAILED DESCRIPTION OF THE PREFERRED EMBODIMENTS

In order to describe the invention in greater detail, the preferred embodiments will be outlined below with reference to the accompanying figures.

Embodiment 1

Figure 1:
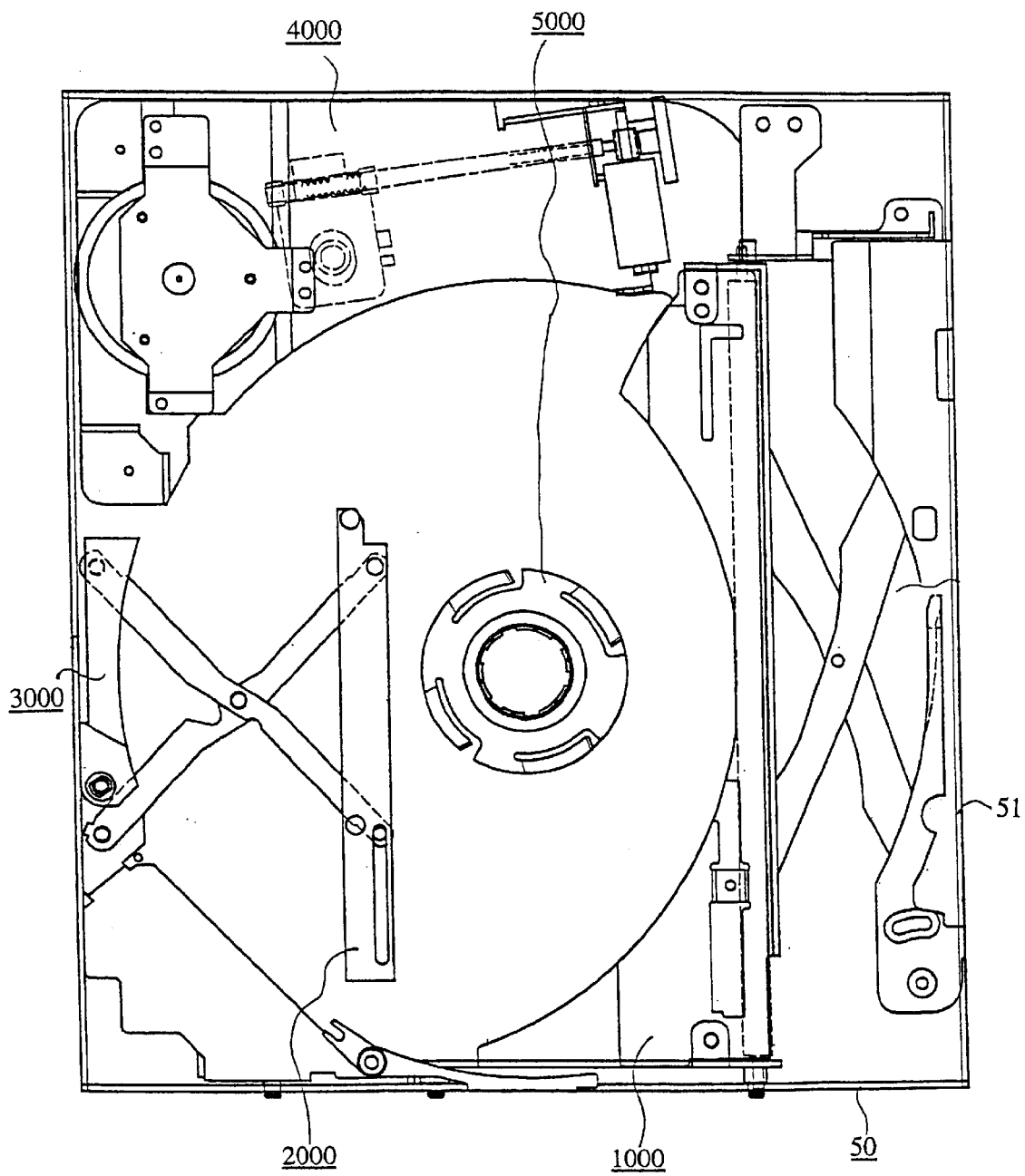
FIG. 1 is a schematic figure of a disk device according to a first embodiment of the present invention.
Figure 2A:
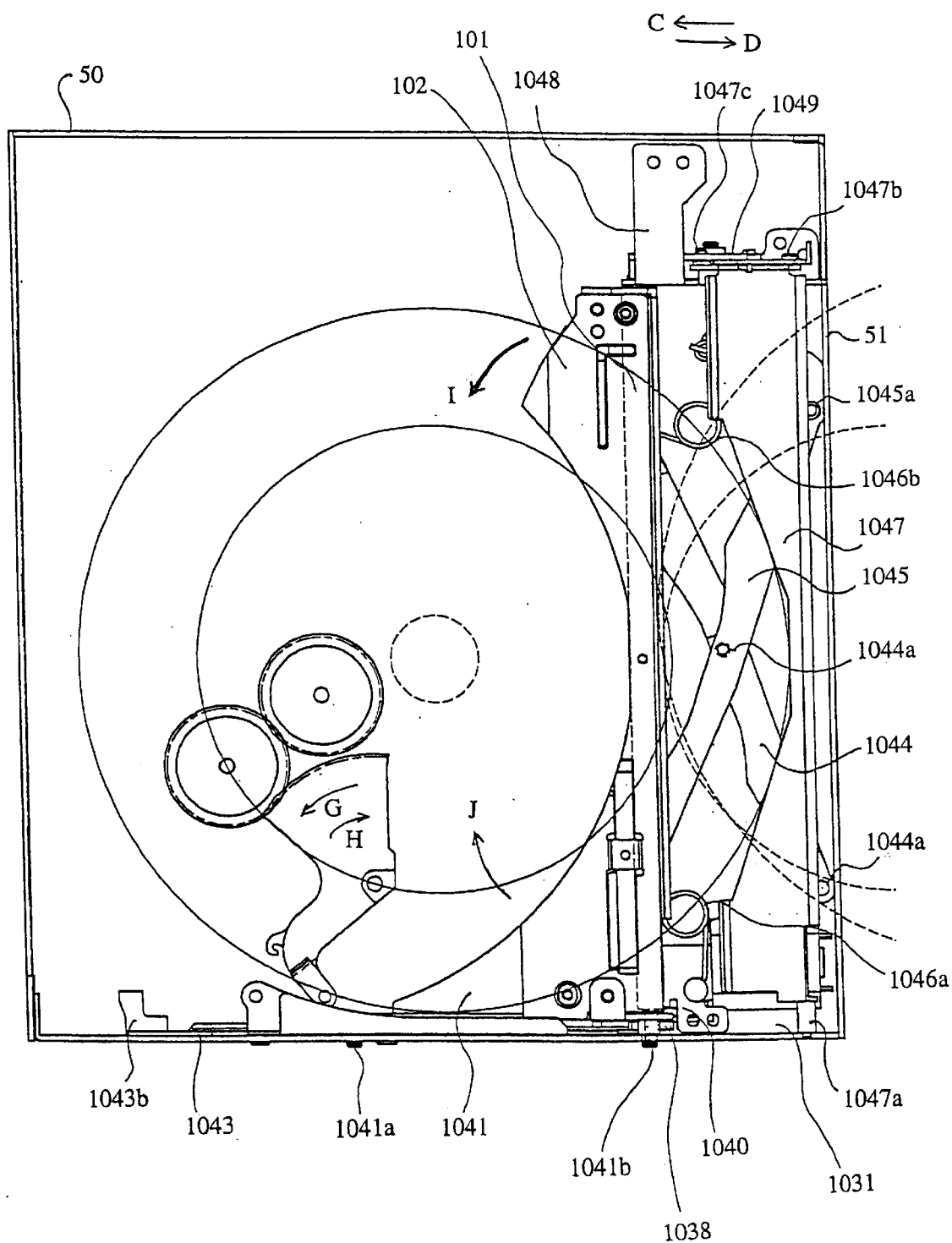
FIG. 2(a) is an upper view of the inner components as seen from the upper surface of the device, (b) is a left lateral view of (a), and (c) is a right lateral view of (a).
Figure 2B:
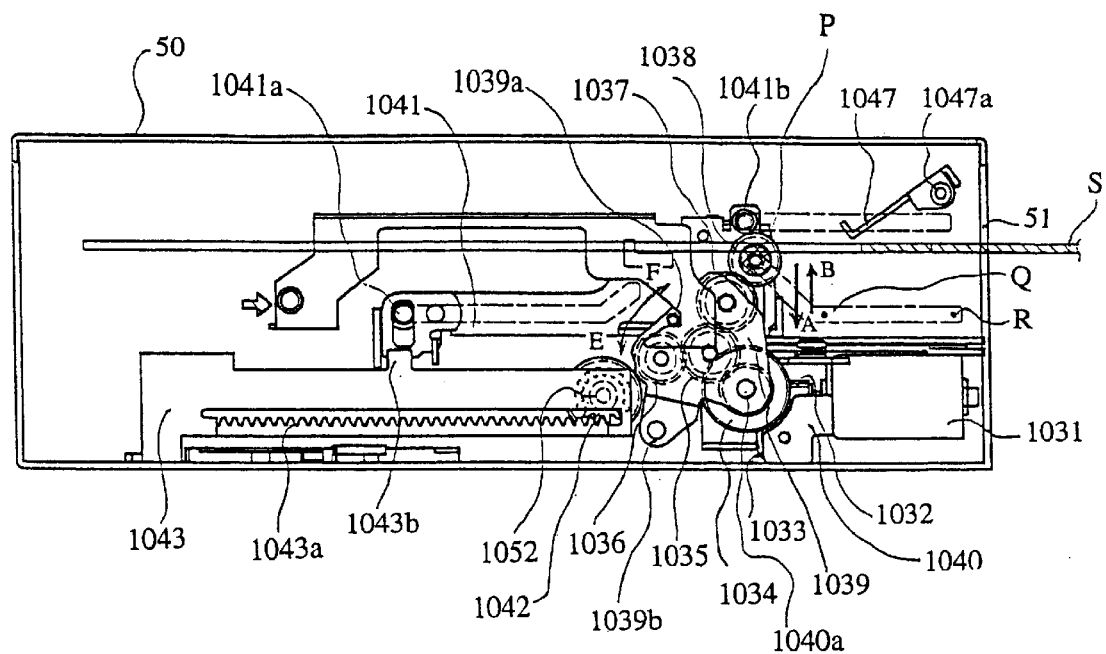
FIG. 2 shows the components of a disk insertion/ejection mechanism of the disk device as shown in FIG. 1.
Figure 2C:
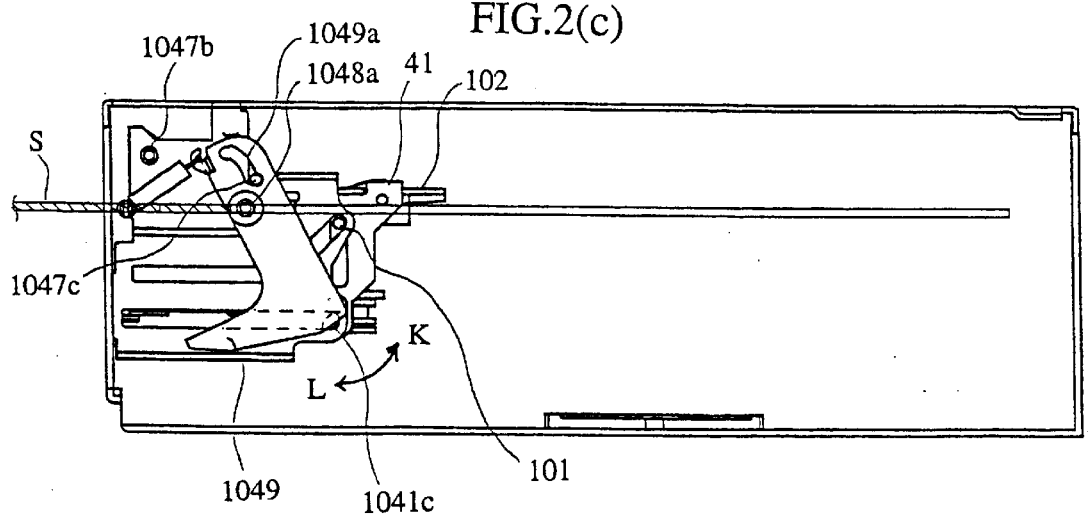
Figure 2D:
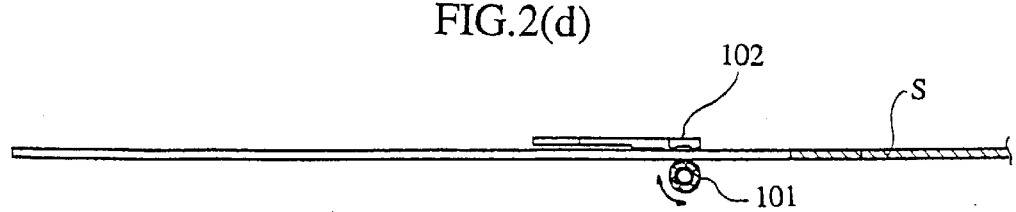

FIG. 1 is a schematic view of the inner components of a disk device according to a first embodiment of the present invention. The respective mechanisms of the disk device can be broadly divided into five sections.

The first section is a disk insertion/ejection mechanism 1000 which performs insertion and ejection of disks and which is disposed in proximity of a disk insertion mouth. The second section is a disk position determination mechanism 2000 which discriminates the diameter of a disk and which fixes the disk to a retained position in the device. The third section is a disk retaining mechanism 3000 which supports a disk which has been retained in a determined position by the disk position determination mechanism. The fourth section is a disk playing mechanism 4000 which performs playing of disks and which is supported by the disk retaining mechanism 3000. The fifth section is a disk loading mechanism 5000 which regulates the height of each disk which has been or will be retained and loaded in the device.

The basic operation of the disk device will be explained below.

First when the insertion of a disk into the disk device is detected, operations to convey a disk into the device are initiated by the disk insertion/ejection mechanism 1000.

A section of the disk position determination mechanism 2000 abuts with a peripheral edge of the disk and the diameter of the disk is discriminated. Based on the result of this determination, positional determination of the disk is performed by the disk position determination mechanism 2000 and the disk is set in a fixed position so that the disk rotation shaft is in a fixed position, that is to say, a playing position.

After the disk position determination mechanism 2000 has determined the position of the disk, the disk supporting mechanism 3000 supports the disk so that the disk maintains a set fixed position and maintains the height of the disk in the device.

Then when the disk retaining mechanism 3000 supports the disk, the disk playing mechanism 4000 is displaced to a playing position of the disk to be played by a rotational action. As a result, the playing operation of the disk is performed.

During the playing operation of the disk, the disk insertion/ejection mechanism 1000 displaces toward the disk insertion mouth 51 so as not to impede the playing of the disk.

On receipt of a disk ejection command, the sequence of operations described above is performed in reverse. That is to say, the playing of the disk by the disk playing mechanism 4000 is suspended. The disk retaining mechanism 3000 retains the disk and after the disk is retained, the disk playing mechanism 4000 rotates in a direction which is opposite to that during disk play and transfers the disk to a loaded position. Then a disk ejection operation is performed to eject the disk out of the device by the disk insertion/ejection mechanism 1000 and an entire sequence of operations is completed.

Although the description of the operations above only described the sequence of playing a disk inserted into the device and ejecting the disk out of the device, a sequence of operations will be explained with respect to performing switching operations of a plurality of disks loaded in a device from a disk during a playing operation to a disk which a user desired to play.

First, the playing operation of a first disk is terminated. The disk retaining mechanism 3000 retains the first disk and thereafter the disk playing mechanism 4000 rotates in a direction opposite to that during playing operations for the first disk and displaces to a loading position. At that time, a second disk is loaded in the disk loading mechanism 5000.

Then after the disk insertion/ejection mechanism 1000 is retracted towards a disk insertion mouth 51 to a fixed position which is not opposite the surface of the first disk, a section of the disk loading mechanism 5000 extends from a lower section of the device while loosely fixing the hole of the first disk to an upper section of the device. After completion of the connection operation with another section of the disk loading mechanism 1000, support of the first disk by the disk retaining mechanism 3000 is released. Thus the first disk is loaded only by the disk loading mechanism 5000.

When support of the first disk is released, the drive means initiates a driving operation. The disk loading mechanism

5000 which loosely fixes the disk is rotated and the height of a second disk is switched, that is to say, the desired disk, the second disk, is placed in a playing height. At the same time, the height of the first disk is switched based on the rotation of the disk loading mechanism 5000 so that the disk is loaded at a height that differs from a playing position.

After the second disk support operation wherein the disk retaining mechanism 3000 operates to support the second disk, the disk loading mechanism 5000 rotates in a direction opposite to that when the first disk is loaded. The disk loading mechanism 5000 separates from the hole of the second disk and retracts to a lower section of the device. The second disk at this time is supported only by the disk retaining mechanism 3000 and is set in a playing position.

After the disk insertion/ejection mechanism 1000 displaces to a fixed position in the device, the disk playing mechanism 4000 displaces towards the second disk in order to play the second disk. After reaching a fixed playing position, the support of the disk retaining mechanism 3000 is released, and after release, the second disk is played.

The basic operation of the disk device has the above functions. Firstly the main components of the overall disk device will be described below. Thereafter the five mechanisms referred to above will be described in detail.

(1. Main Components of Overall Disk Device)

Figure 3A:
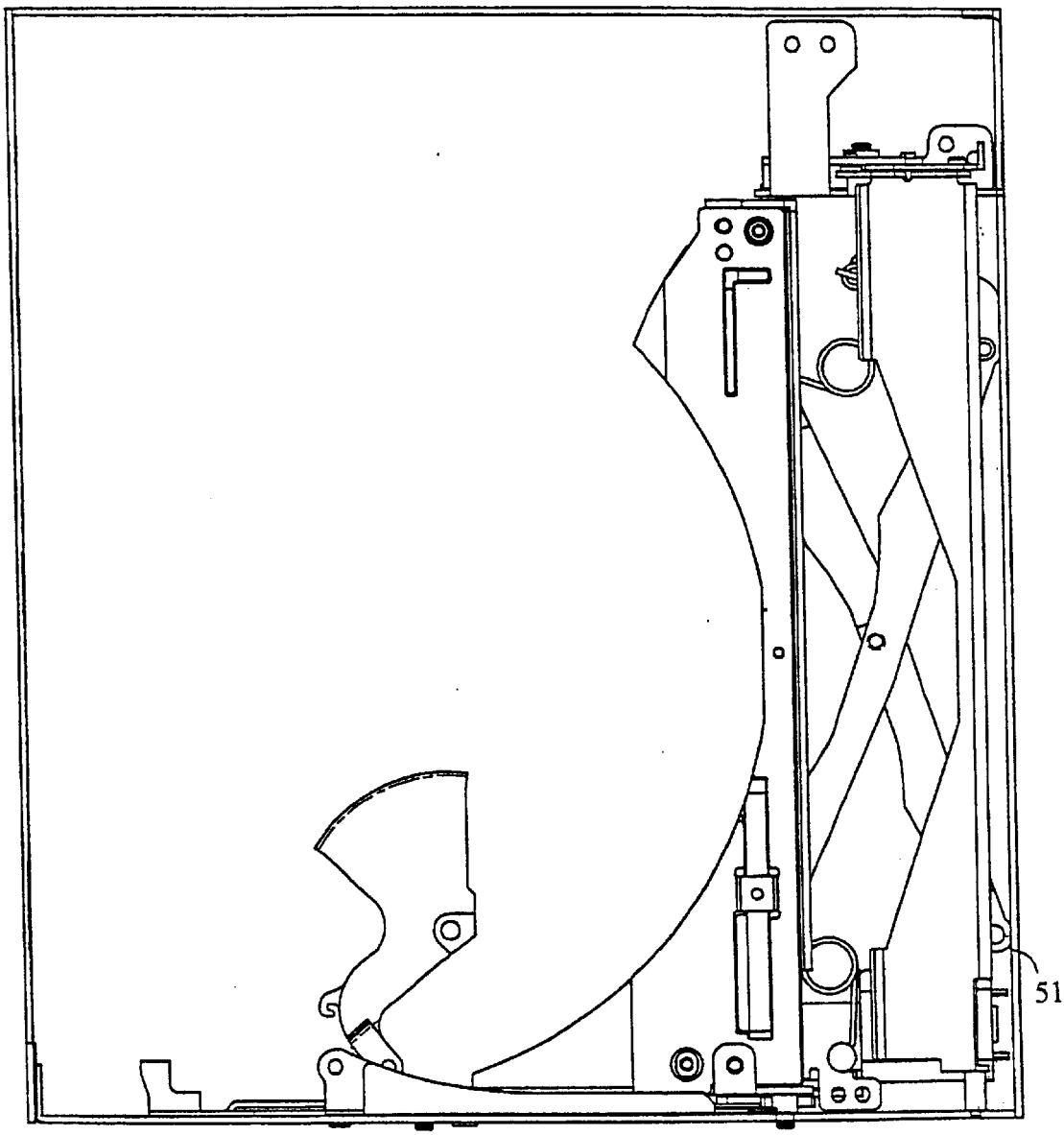
FIG. 3 shows the components of a disk insertion/ejection mechanism of the disk device as shown in FIG. 1.
Figure 3B:
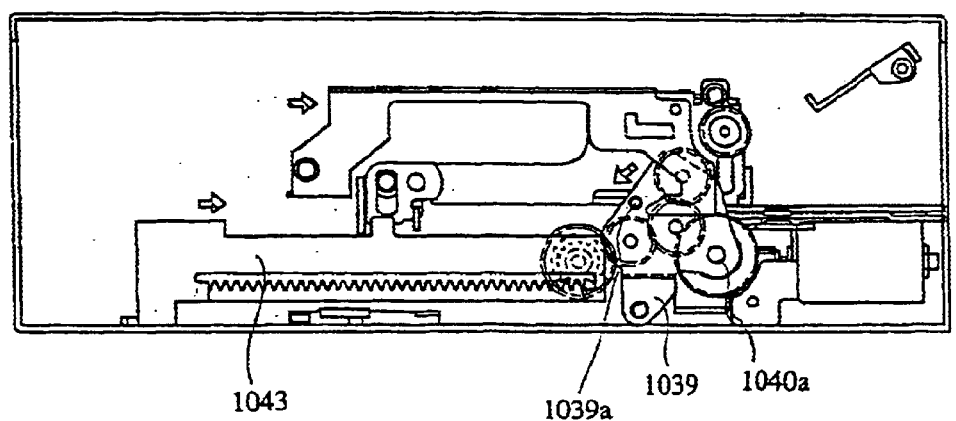
Figure 3C:
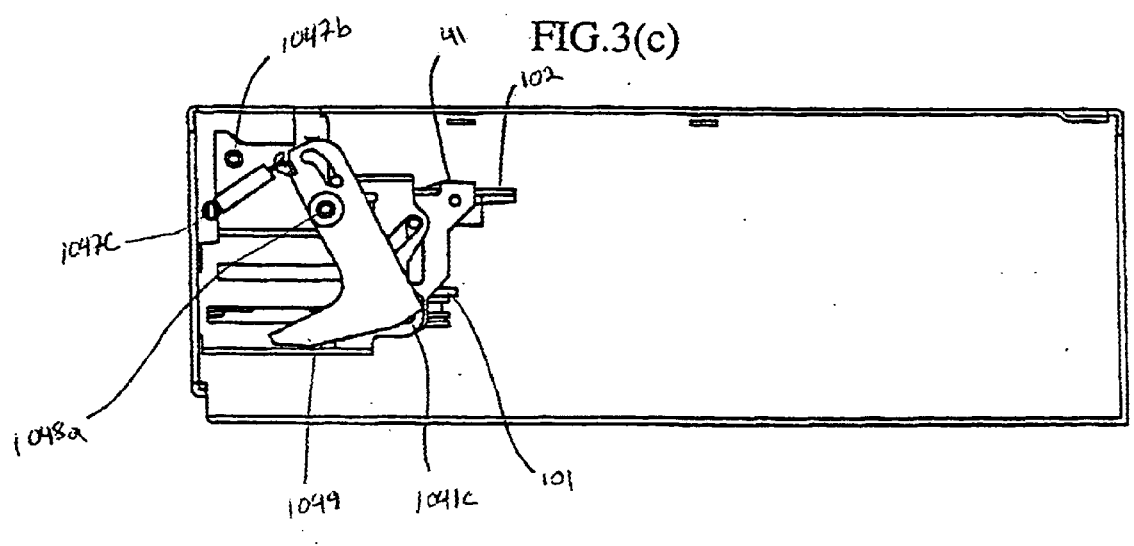
Figure 4A:
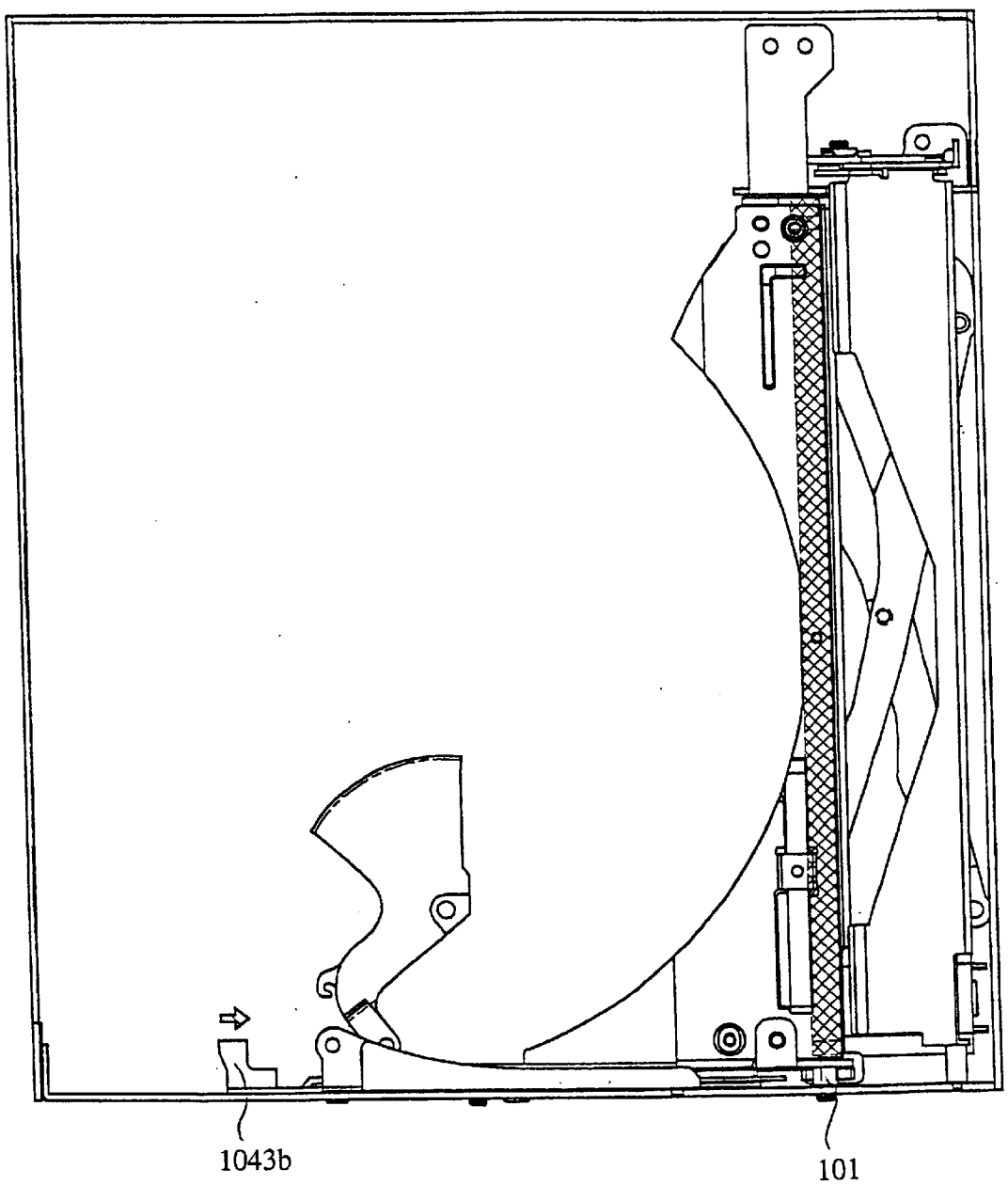
FIG. 4 shows the components of a disk insertion/ejection mechanism of the disk device as shown in FIG. 1.
Figure 4B:
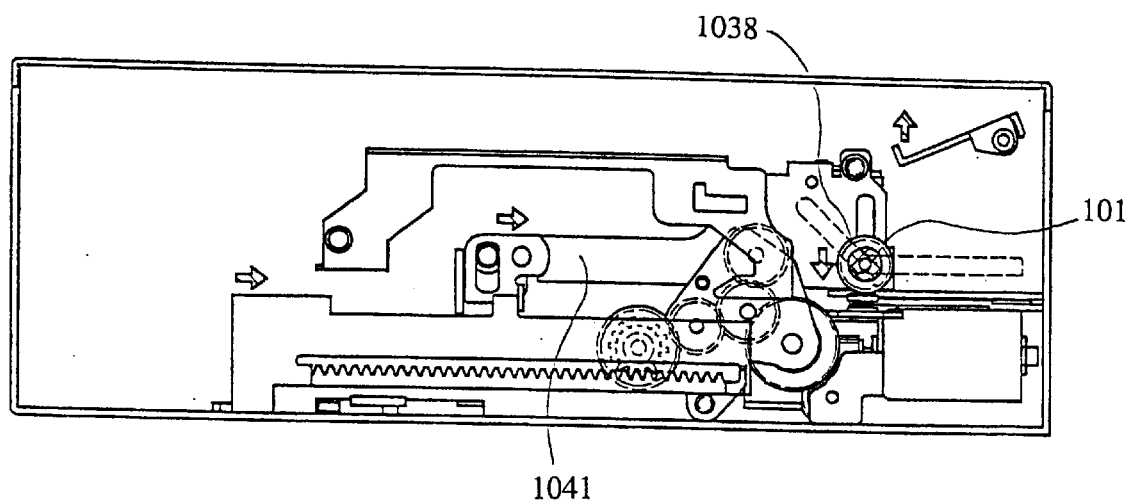
Figure 4C:
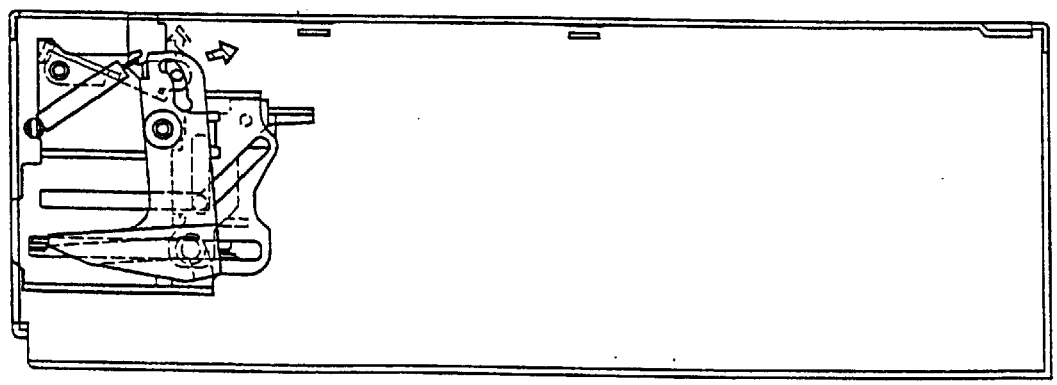
Figure 5A:
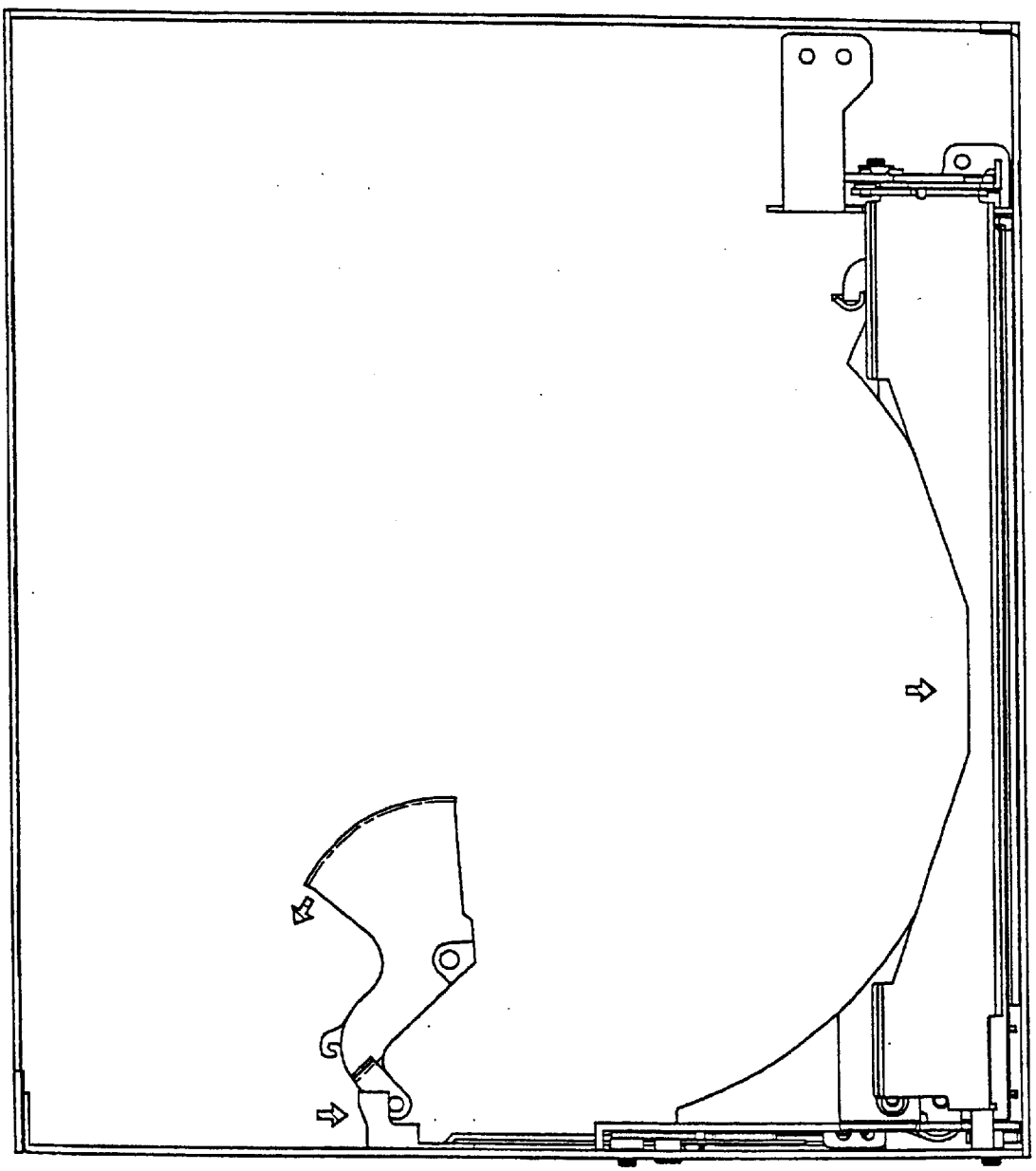
FIG. 5 shows the components of a disk insertion/ejection mechanism of the disk device as shown in FIG. 1.
Figure 5B:
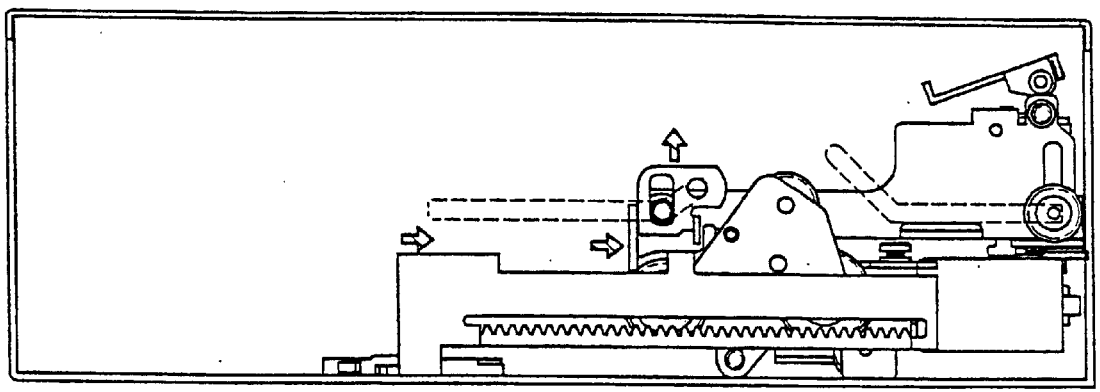
Figure 5C:
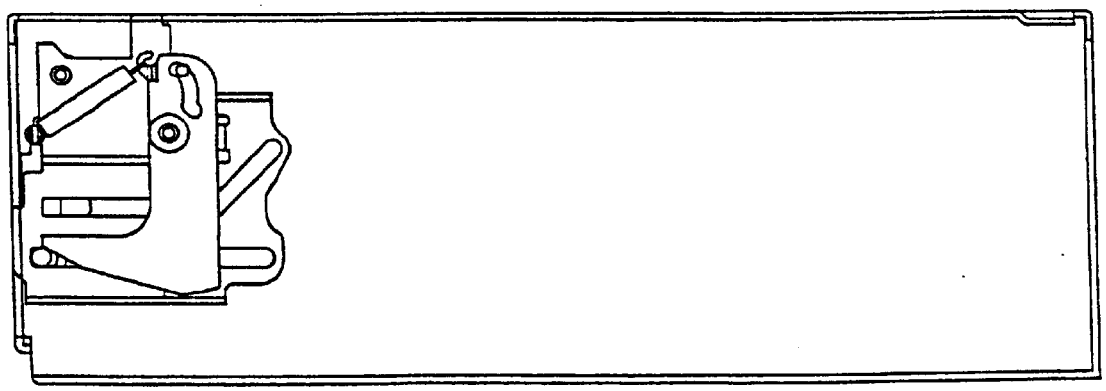

FIG. 1 shows a disk insertion/ejection mechanism 1000 which performs insertion and ejection of disks and which is disposed in proximity of a disk insertion mouth. FIG. 2 shows a disk position determination mechanism 2000 which discriminates the diameter of a disk and which fixes the disk to a retained position in the device. FIG. 3 shows a disk support mechanism 3000 which supports a disk which has been retained in a determined position by the disk position determination mechanism. FIG. 4 shows a disk playing mechanism 4000 which performs playing of disks and which is supported by the disk support mechanism. FIG. 5 shows a disk loading, mechanism which regulates the height of each disk which has been or will be retained and loaded in the device.

1000 is a disk insertion/ejection mechanism which allows insertion or ejection of disks into the housing 50. The disk insertion/ejection mechanism 1000 comprises a drive roller 101 which inserts or ejects a disk into the device, a disk biasing section 102 which disposed at a position facing the drive roller 101, and a roller displacement means 103 which displaces the drive roller 101 and the disk biasing section 102 in a range from near the disk insertion mouth 51 into the device. A disk inserted from the disk insertion mouth 51 is gripped between the drive roller 101 and the disk biasing section 102 and is inserted into the device by the rotating operation of the drive roller 101. 2000 is a disk position determination mechanism which comprises an abutting pin 201, a position determination section 202 and a link section 203. The abutting section 201 is disposed adjacent to the center of the disk conveying path. The pin abuts with a section of the disk peripheral section due to the disk insertion position with respect to the disk insertion mouth 51 and the disk diameter of the inserted disk. The position determination section 202 determines the position of disks of respective diameters to fixed positions in response to the diameters of the inserted disks. The link section 203 transmits the displacement of the abutting pin 201 to the fixed section (discussed below). The link section 203 of the disk position determination mechanism 2000 displaces to a position determination point for large disks and fixes the large disk to a fixed position. When a large diameter disk (for example with a diameter of 12 cm) is inserted and the large diameter disk abuts with the position determination section 202, the peripheral section of the disk abuts with the abutting pin 201. Thus the abutment of the fixed section (discussed below) which determines the position of the position determination section 202 is released. The position determination section 202 then passes the positional determination point for small disks (for example disk with an 8 cm diameter) from the disk insertion refuge position and thus displaces further away.

3000 is a disk retaining mechanism which retains a section of a disk surface near a peripheral section which has been inserted by the disk insertion/ejection mechanism 1000 and determined to a fixed position by the disk position determination mechanism 2000. The disk retaining mechanism 3000 comprises three retaining arms 3005, 3006, and 3012. The retaining arms 3005, 3006, and 3012 are normally refuged to three respective positions proximate to walls in the housing 50. The retaining arms are displaced to a proximate position to the disk and retain the disk only when the disk support operations are performed. At such times, the disk is retained at three support points by the retaining arms 3005, 3006, and 3012.

4000 is a disk playing mechanism for playing disks. The disk playing mechanism 4000 is adapted to refuge to a position near a wall of the housing 50 when not performing a playing operation of a disk (including a preparation for a playing operation) and to displace to a disk playing position only when performing disk playing operations.

The details of the above components will be described below. However a turntable which is provided at a position at which the disk is loaded, a drive motor which rotates and drives a disk mounted on the turntable and a pickup which reads information recorded on the disk are provided on the disk playing mechanism 4000.

5000 is a disk loading mechanism which retains and loads disks in the device and which regulates the height of a disk by a rotation operation. The disk loading mechanism 5000 operates when a second disk is loaded in the device, the disk playing device 4000 suspends the playing of the first disk and the second disk is played or when a plurality of disks are loaded in the device, a desired disk is selected from this plurality of disks and played or when a disk height is switched and a disk is loaded.

The disk loading mechanism 5000 places the surface of each disk inserted from the disk insertion/ejection mechanism 1000 into a roughly parallel orientation and retains and loads disks so that the center of the axis of rotation of each disk is approximately in line. In embodiment 1, the device is adapted to load six disks.

Although the overall structure of the device is described above, the details of the structure and operation of each mechanism will be described in detail below.

(2. Disk Insertion/Ejection Mechanism)

FIG. 2 to FIG. 6 show the disk insertion/ejection mechanism of the present invention. Figure (a) is an upper schematic view showing the components of the device as seen from an upper face of the device, (b) is a left lateral view of Figure (a) and shows the inner components as seen from the left side. Figure (c) is a right lateral view of Figure (a) and shows the inner components as seen from the right side.

FIG. 2(*d*) is an explanatory view of the positional relationship between a disk inserted into these disks and the drive roller 101 and disk biasing section 102. This figure corresponds to Figure (b), that is to say, to the left lateral view of the device.

In FIGS. 2 (a) to (*d*), 50 is a housing of the disk device, 51 is a disk insertion mouth through which disks S are inserted or ejected into or from the disk device, that is to say, into the housing 50. 101 is a drive roller which displaces a disk into or out of the disk device. 102 is a disk biasing section composed of plate metal which is disposed at a position opposite the drive roller 101 and which grips the disk with the drive roller when the drive roller 101 drives, that is to say, when the disk is displaced into the device. 103 is a roller displacement mechanism which displaces a roller mechanism comprised of the drive roller 101 and the disk biasing section 102 in the device along a disk conveying pathway (not shown).

The operation of the roller displacement mechanism 103 will be described below.

The roller displacement mechanism 103 is provided with a motor 1031 which acts as a drive source which drives the roller mechanism, which is comprised of a drive roller 101 and a disk biasing section 102, along a disk conveying path, a worm gear 1032 which is engaged to a rotational shaft of the motor 1031 and forms a gear on an outer peripheral section, gears 1033–1037 in which the rotation of the worm gear 1032 is transmitted between each gear, and a gear 1038 one section of which is engaged with an end of the drive roller 101 and which is engaged with a gear 1037 when performing disk insertion/ejection operations. The gear 1038 is linked to the rotating operation of the gear 1037 and drives the rotation of the drive roller 101.

The gears 1035–1037 are axially supported to rotate freely on a plate 1039. A hole is formed in a section of the center shaft which rotates the main body of the plate 1039. A projection 1040a is provided and a motor mounting plate 1040 is provided which disposes the motor 1031 on the housing 50. The projection 1040a supports and loosely fixes the gear 1034 and supports and loosely fixes the hole of the plate 1039.

The roller displacement mechanism 103 has an elongated hole 1041a, the length of which is formed in an approximately vertical direction with respect to the direction of disk insertion/ejection. When the displacement of the drive roller 101 is limited in the direction of disk insertion/ejection by the elongated hole 1041a, the drive roller 101 is displaced in an approximately vertical direction with respect to the direction of disk insertion/ejection. That is to say, a base 1041 is provided which displaces in direction A or direction B. On the base 1041, pins 1041a–1041c are provided which project towards the housing 50. Elongated holes 50a–50c are formed on a wall of the housing 50 which allow sliding of the pins 1041a–1041c in a fixed position with respect to the pins 1041a–1041c. As a result, the roller displacement mechanism 103 displaces in direction C or direction D due to the sliding action of the pins 1041a–1041c in the elongated holes 50a–50c.

Guide holes 50d, 50e which defined the sliding respectively of one end and the other end of the drive roller 101 are formed on each left and right lateral section of the housing 50 with respect to the direction of insertion/ejection of the disks in order to follow the direction of disk insertion from near the disk insertion mouth 51. The gap with the disk biasing section 102 from one end near the disk insertion mouth to a fixed position is marked by the letter X. The guide holes 50d, 50e are inclined so that from the fixed position, the drive roller 101 can gradually approach the disk biasing section 102 up to the interior of the device which is within the displaceable range of the drive roller 101. That is to say, the inclination is provided so that the gap with the disk biasing section 102 is smaller than X. In such a way, when a disk is inserted from the disk insertion mouth 51, the drive roller 101 is disposed on point P and when the disk is played, the drive roller 101 is displaced towards the disk insertion mouth to point Q. When the disk loading mechanism 5000 interchanges a disk, the drive roller 101 is displaced yet further towards the disk insertion 51 from point Q and disposed at point R.

A projection 52 is formed in the device on the lateral face of the housing 50. A gear 1042 which uses the projection 52 as a rotation shaft is engaged on the projection 52.

The plate 1039 is engaged with either the gear 1036 or the gear 1038 by displacement in either direction E or direction F so as to be linked with the switching lever discussed below. That is to say, when the plate 1039 displaces is direction E, the gear 1036 and the gear 1042 engage. When the plate 1039 displaces is direction F, the gear 1037 and the gear 1038 engage.

1043 is a rack plate which is disposed to be approximately parallel with a surface of the left lateral side of the housing 50. A rack section 1043a which engages with the gear 1042 plate 1043 is formed on a section of the rack plate 1043. The rack plate 1043 displaces in a direction of disk insertion/ejection by the rotating action of the gear 1042. That is to say, it displaces in direction C or direction D. During such displacement, the projection 1043b formed on a section of the rack plate 1043 abuts with a section of the base 1041 and the base 1041 also displaces in the same direction as the displacement of the rack plate 1043. Furthermore the projection 1043c formed on another section of the rack plate 1043 abuts with a section of the rotating lever (explained below) and the rotating lever also displaces in the direction G.

When the rack plate displaces in direction D, the rotation lever rotates in direction G and the rotation lever is biased in direction H by a biasing member (not shown). Thus when the rack plate 1043 displaces in direction C from a situation in which the rotation lever is biased in direction G, the abutment of the rack plate 1043 and the projection 1043c is released and the rack plate 1043 is returned in direction H by the biasing of the biasing member.

1044 is a first arm which forms a projection on both ends. One projection engages slidably with a hole formed on a front lateral section of the housing 50. The other projection engages slidably with an elongated hole (not shown) formed on the base 1041. 1045 is a second arm which forms a projection on both ends. One projection engages slidably with a hole formed on a front lateral section of the housing 50. The other projection engages slidably with an elongated hole (not shown) formed on the base 1041. A projection 1044a is formed in an approximately center section of the first arm 1044 and a hole is formed in an approximately center section of the second arm 1045. The projection 1044a is adapted to be loosely fixed into the hole of the second arm 1045.

1046 is a biasing means which biases the first arm 1044 in direction I and which biases the second arm 1045 in direction J. The biasing means 1046 is provided with a first spring 1046a and a second spring 1046b. One end of the first spring abuts with the proximity of the other end of the first arm 1044 and the other end abuts with the proximity of the other end of the second arm 1045. One end of the second spring abuts with the proximity of the other end of the second arm 1045 and the other end abuts with the proximity of the other end of the first arm 1045. By such an arrangement, the first arm 1044 and the second arm 1045 are normally biased in direction C, that is to say, the base 1041 is biased in direction C.

Furthermore smooth operation of the roller displacement mechanism is performed by the provision of the first arm 1044, the second arm 1045 and the biasing means 1046.

As shown in FIG. 2, when the biasing force of the biasing means 1046 is applied to the first and second arms 1044, 1045, the drive roller 101 as shown in FIG. 1 is disposed at point P, that is to say, it is disposed at a position which is most proximate to the disk biasing section 102.

Point P represents the most proximate position of the drive roller 101 and the disk biasing section 102. However needless to say, both components may abut.

1047 is a disk incline correction section. When a disk which is inserted from the disk insertion mouth 51 is not approximately parallel with the disk conveying path, that is to say, when the disk is inserted in an inclined state, the incline of the disk is corrected forcibly by a section of the above component abutting with a section of the disk so that the disk is conveyed approximately parallel with the disk conveying path. 1048 is a plate which guides the movement of the base 1041 in direction C and direction D. A hole which supports one of the rotational shafts of the disk incline correction section 1047 is provided in the housing 50. A hole which supports the other of the rotation shafts of the disk incline correction section 1047 is provided in the plate 1048. The disk incline correction section 1047 performs rotation operations using these holes as support points.

1049 is a lever which is disposed on the right lateral side of the housing by the plate 1048. The lever 1049 forms a hole on the surface opposite the plate 1048. A projection 1048a formed on the plate 1048 is supported with a play in the hole and the lever 1049 is adapted to rotate and displaces in direction K or direction L using the projection 1048a as a rotation shaft.

A cam groove 1049a and a cam groove 1049b are formed on the lever 1049.

A projection 1047a which is engaged with the hole formed on the housing 50, a projection 1047b which is engaged with the hole formed on the plate 1048, and a projection 1047c which is engaged with a cam groove 1049a which is formed on the lever 1049 are provided on the disk incline correction section 1047.

The operation of a series of disk insertion and ejection operations will be described referring to FIG. 2 to FIG. 6.

Figure 6A:
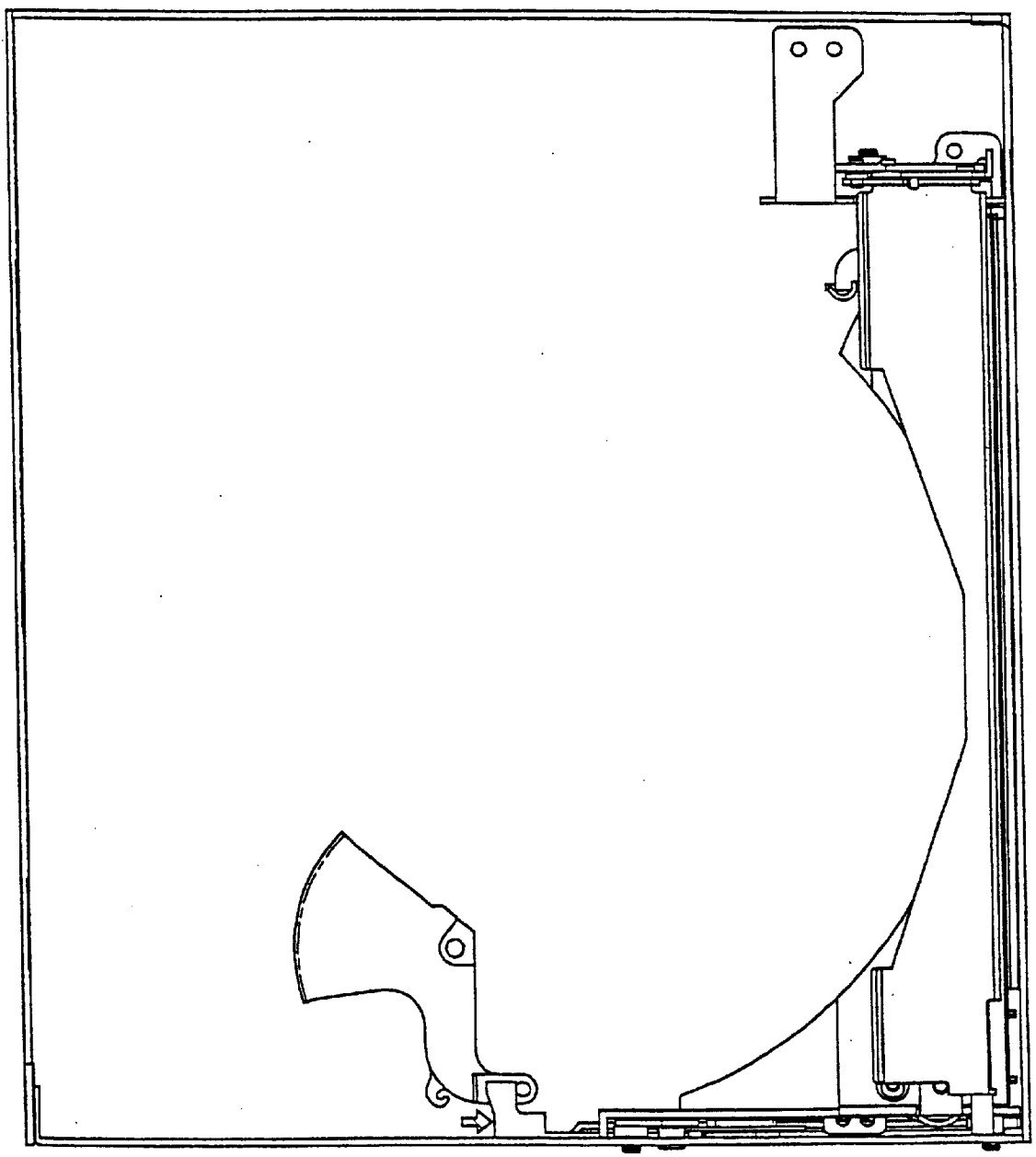
FIG. 6 shows the components of a disk insertion/ejection mechanism of the disk device as shown in FIG. 1.
Figure 6B:
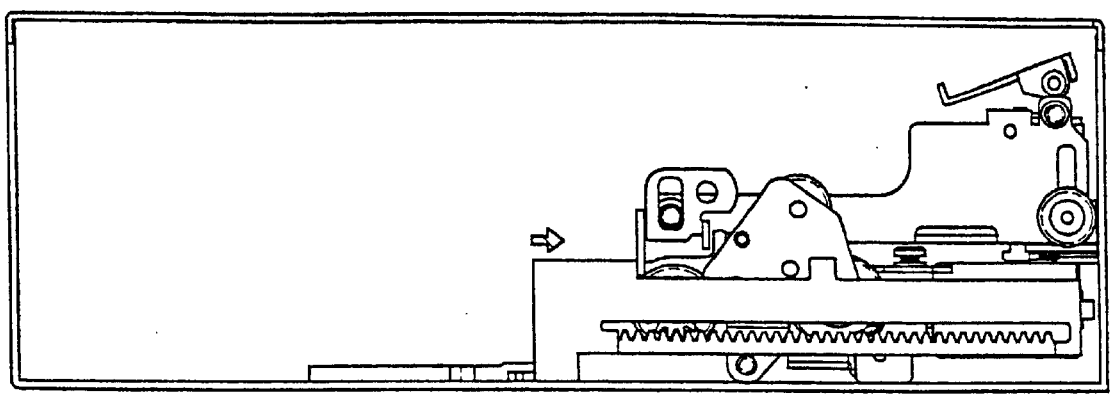
Figure 6C:
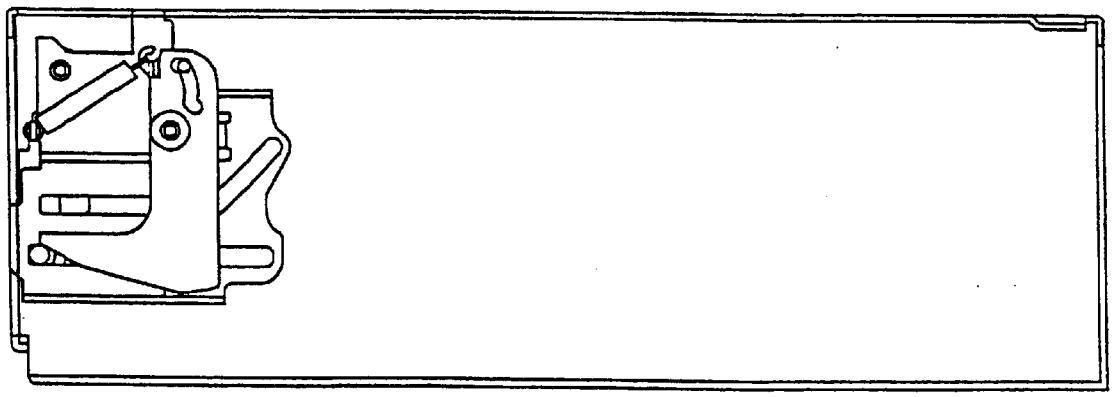
Figure 7A:
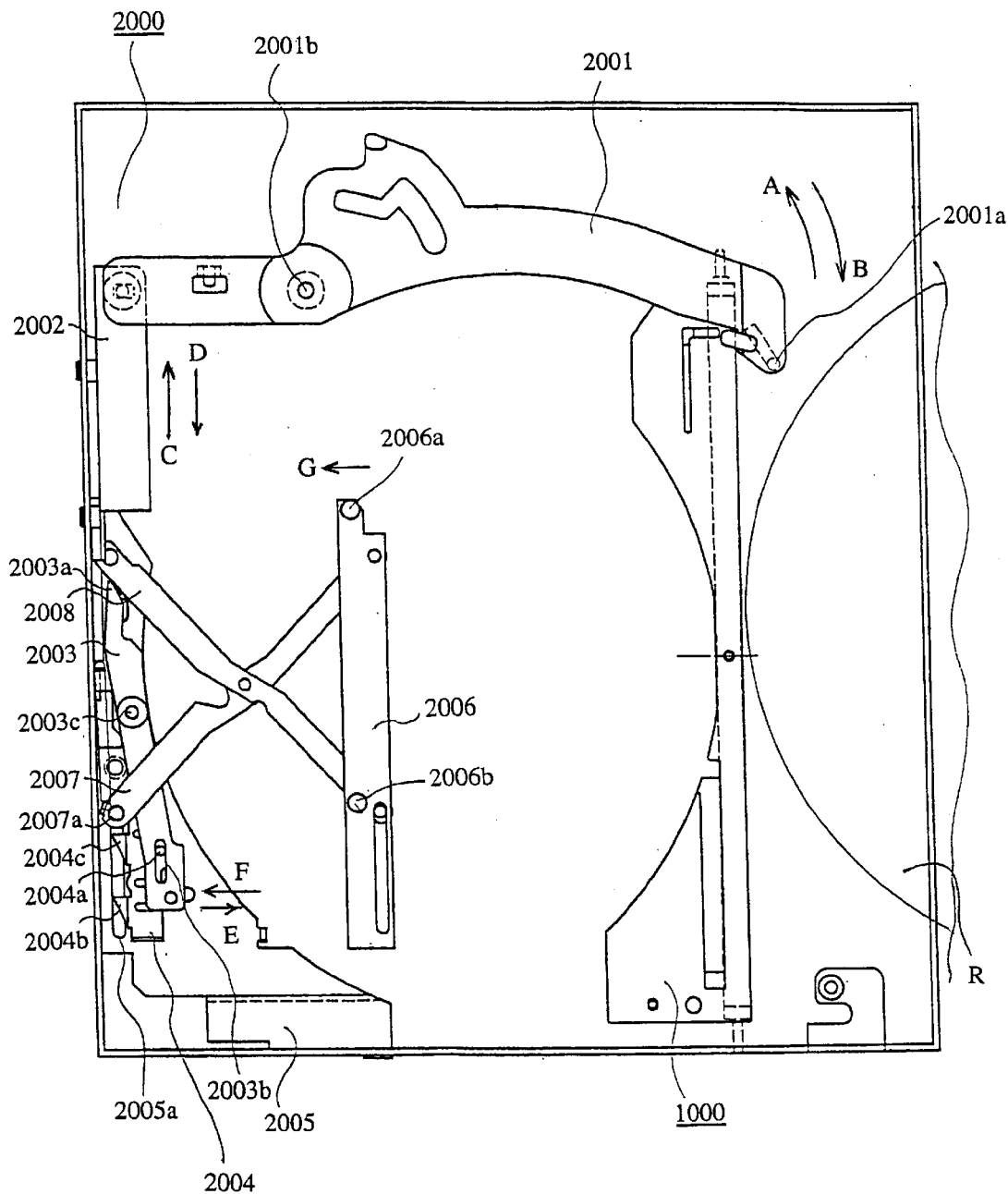
FIG. 7 shows the components of a disk position determination mechanism of the disk device as shown in FIG. 1.
Figure 7B:
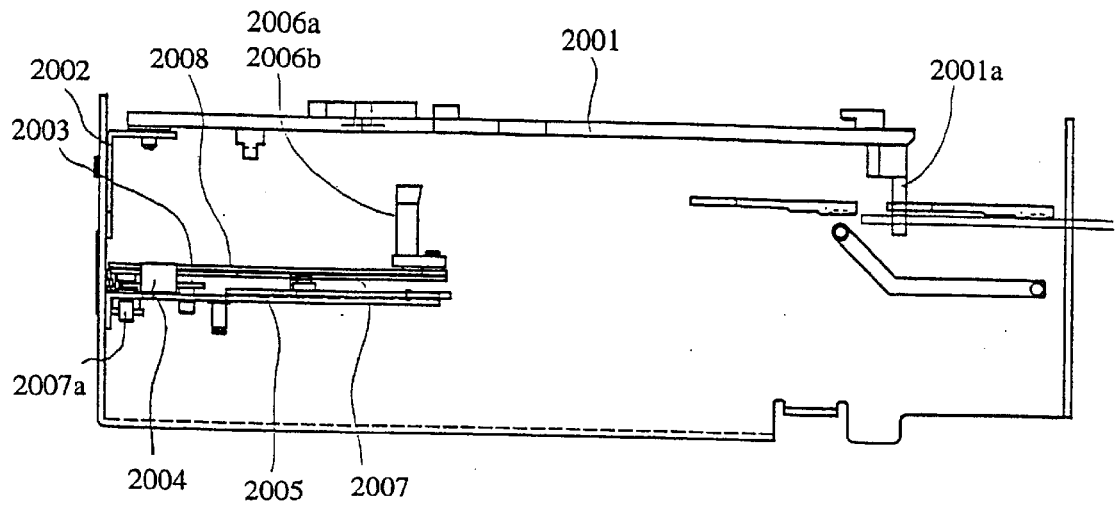
Figure 7C:
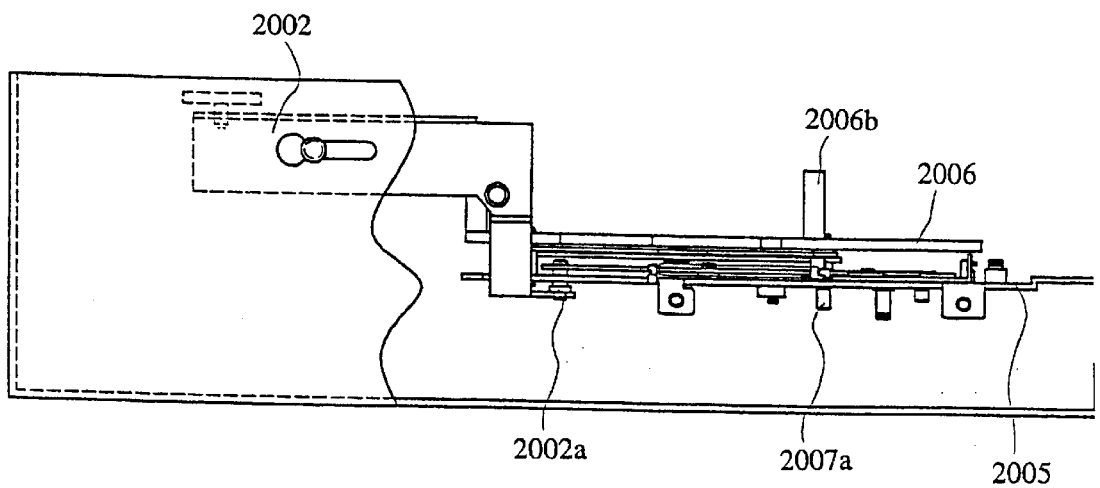
Figure 7D:
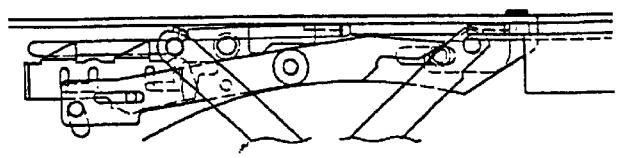
Figure 8A:
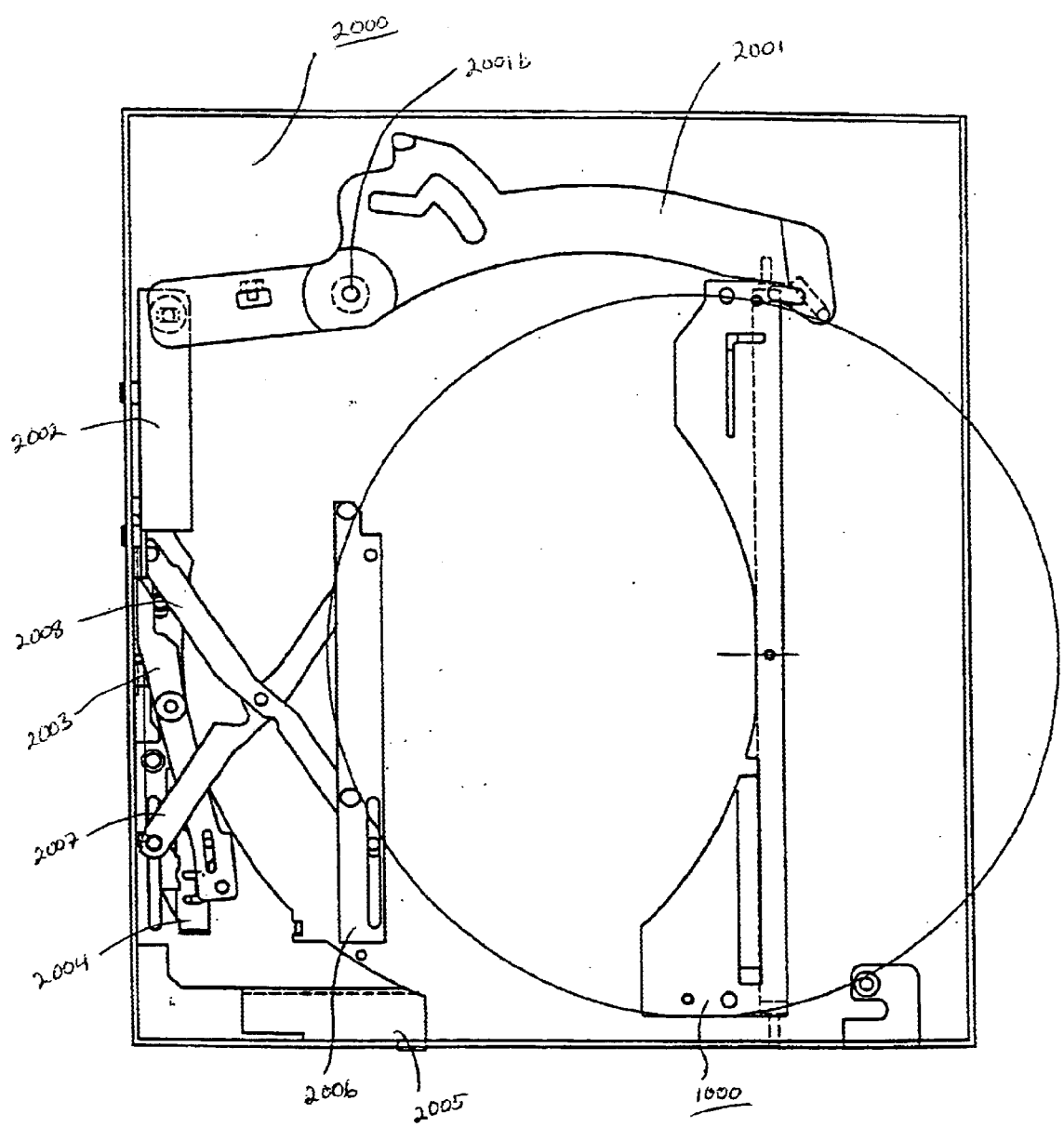
FIG. 8 shows the components of a disk position determination mechanism of the disk device as shown in FIG. 1.
Figure 8B:
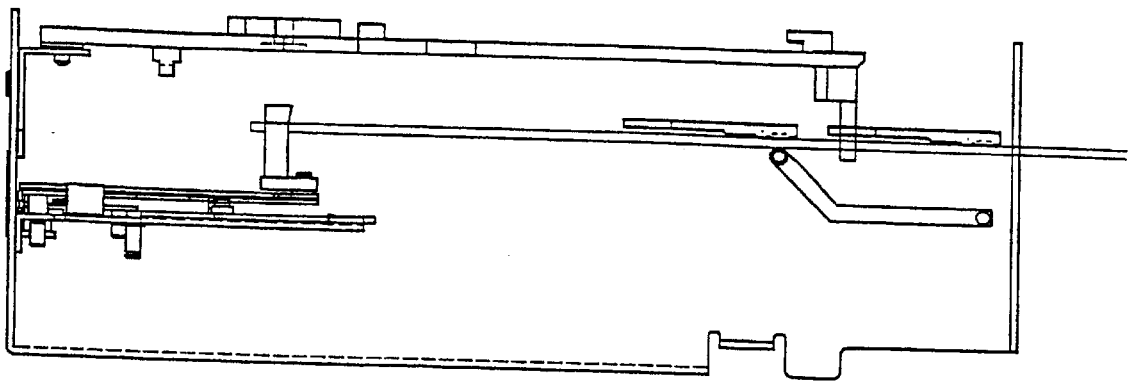
Figure 8C:
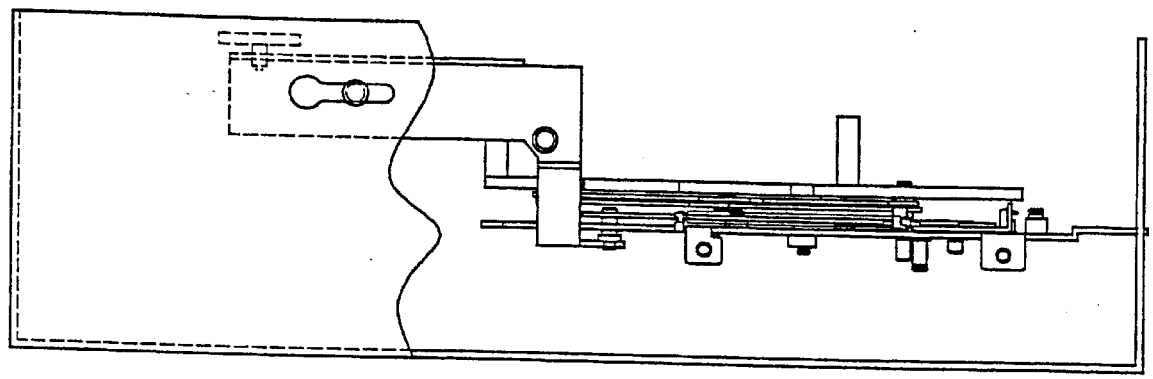
Figure 8D:
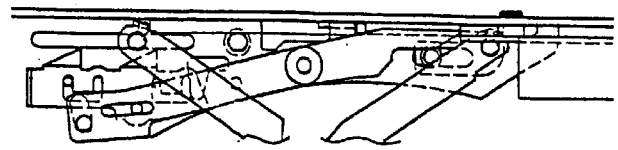
Figure 9A:
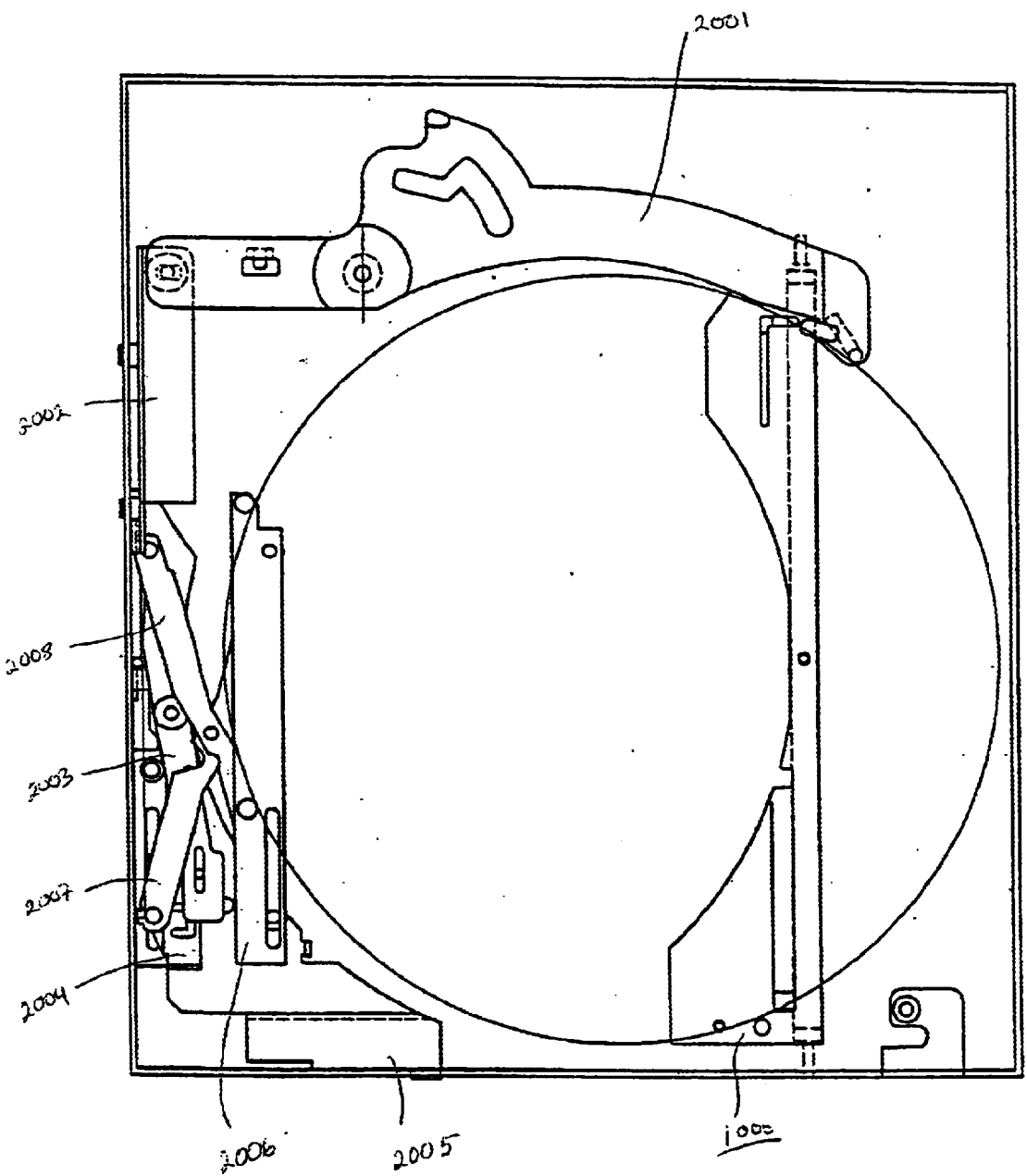
FIG. 9 shows the components of a disk position determination mechanism of the disk device as shown in FIG. 1.
Figure 9B:
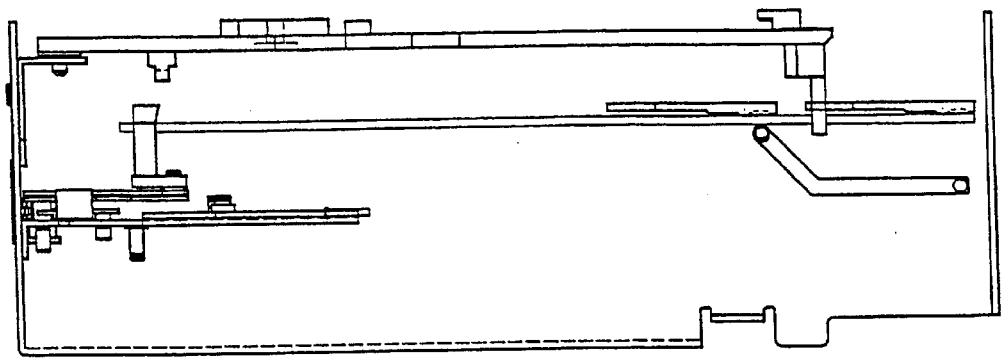
Figure 9C:
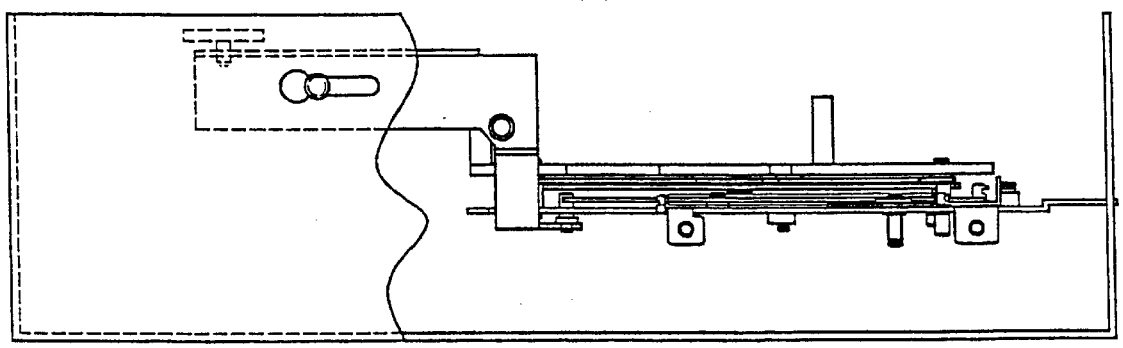
Figure 9D:
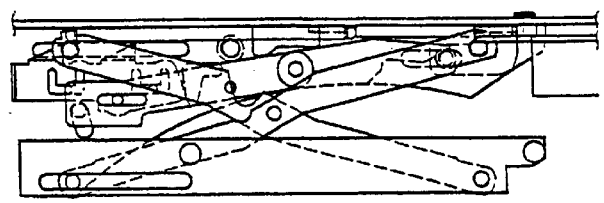
Figure 10A:
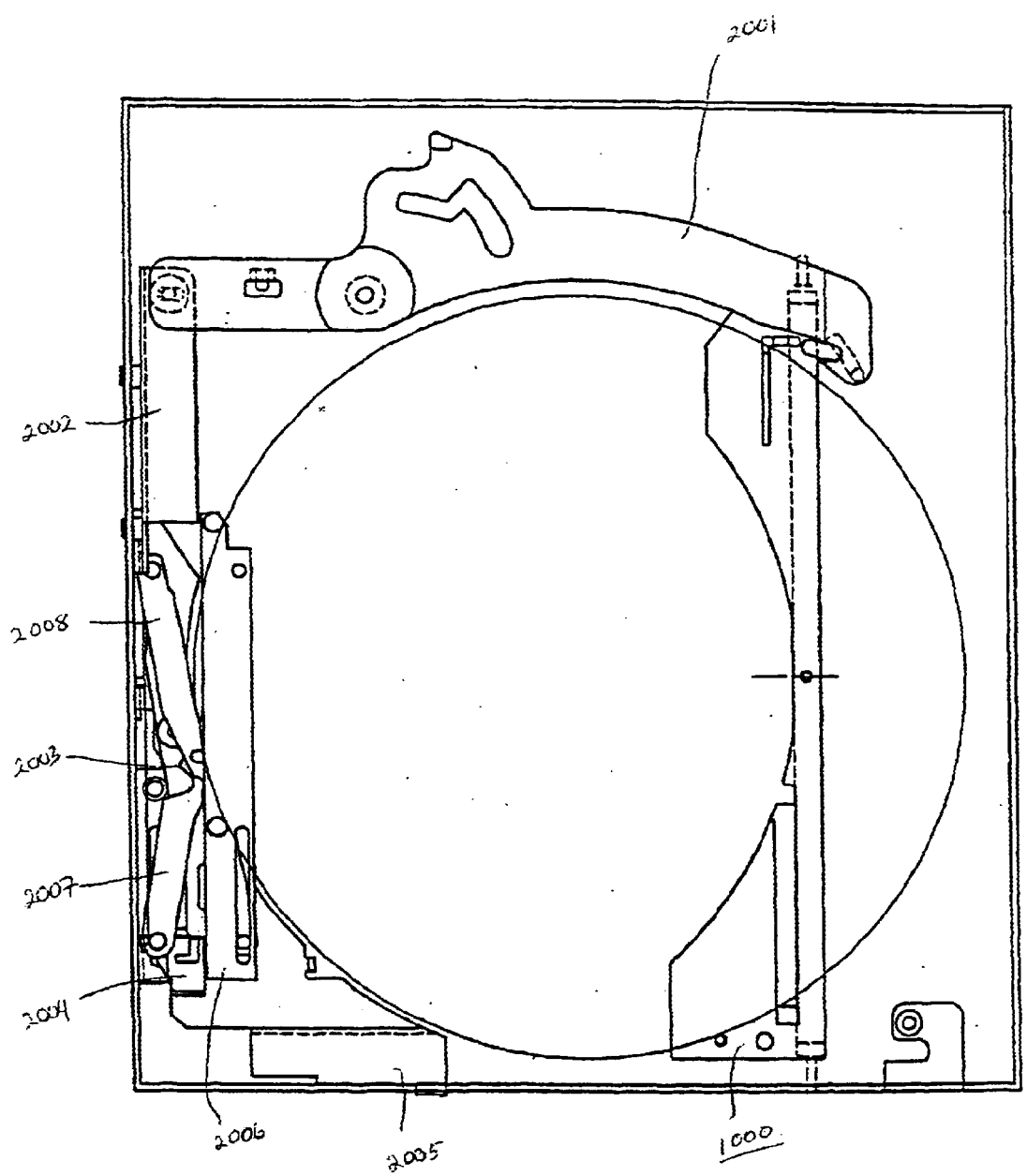
FIG. 10 shows the components of a disk position determination mechanism of the disk device as shown in FIG. 1.
Figure 10B:
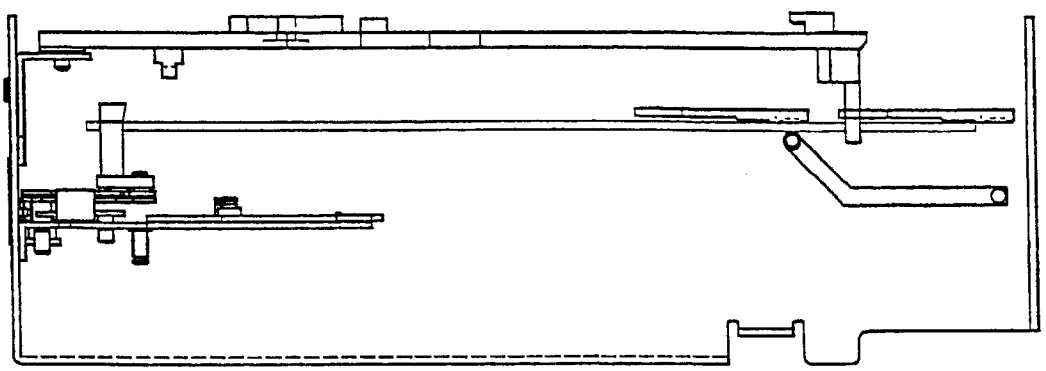
Figure 10C:
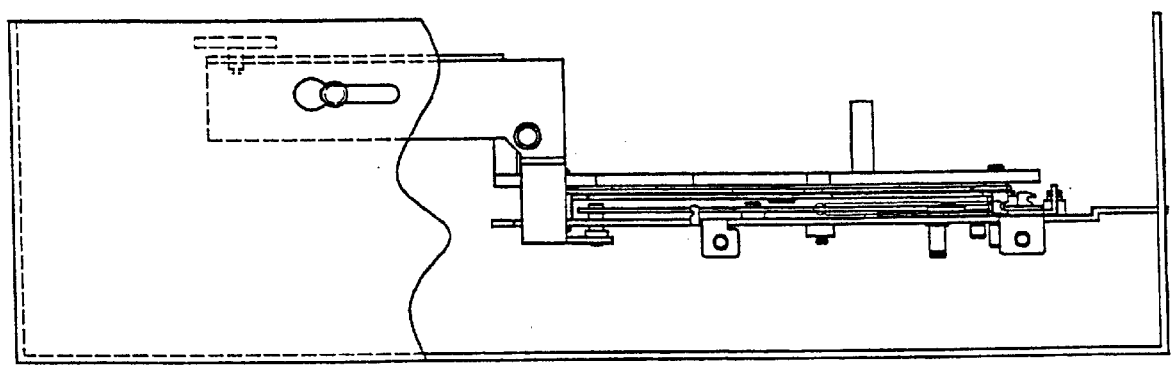
Figure 10D:
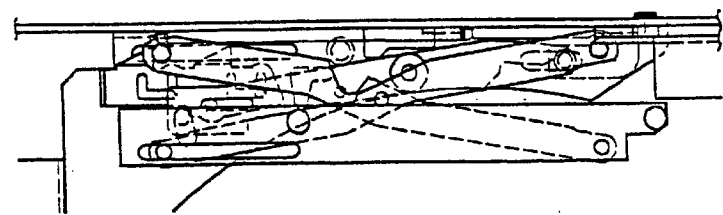
Figure 11A:
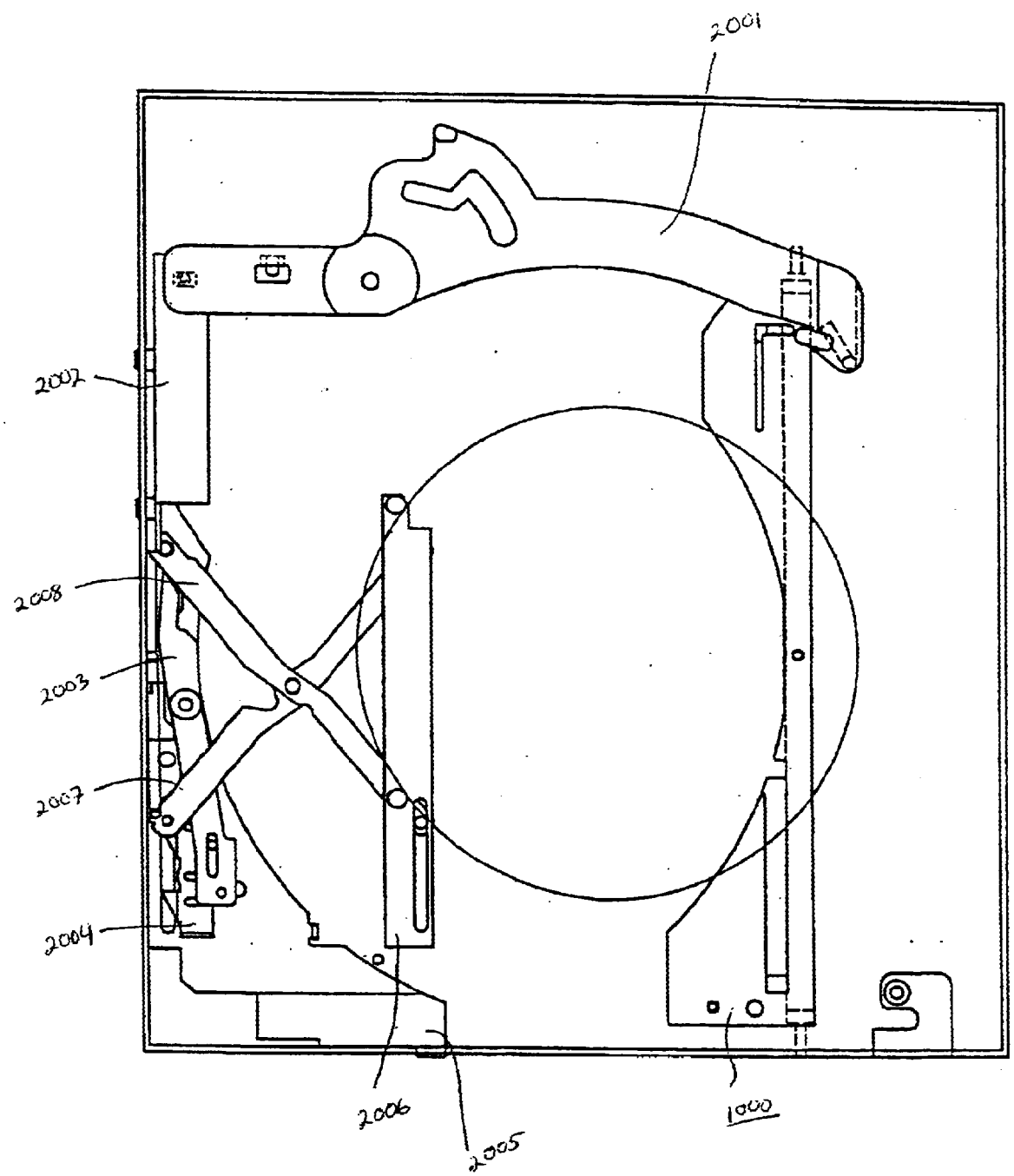
FIG. 11 shows the components of a disk position determination mechanism of the disk device as shown in FIG. 1.
Figure 11B:
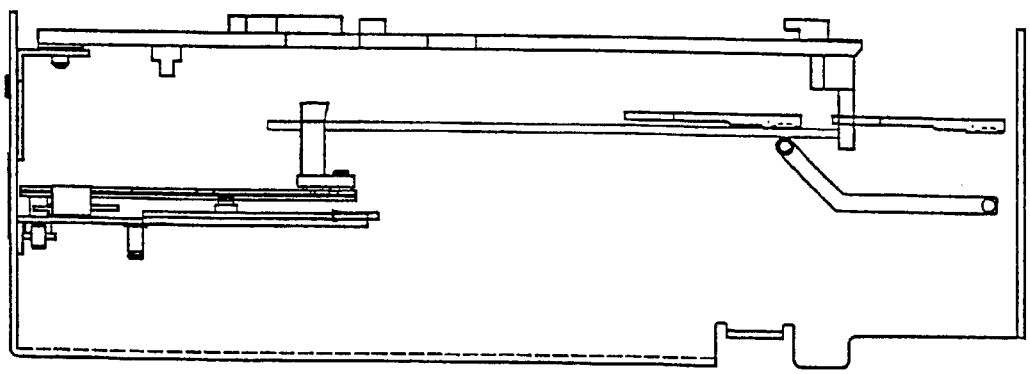
Figure 11C:
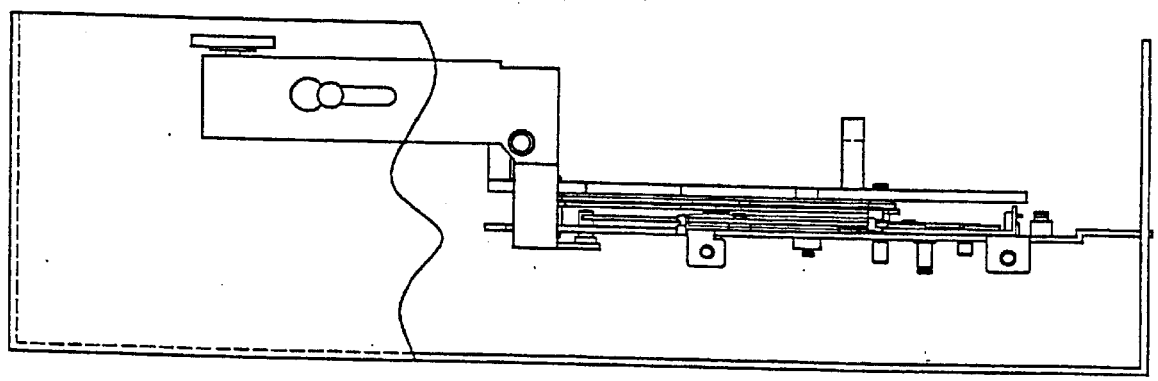
Figure 11D:
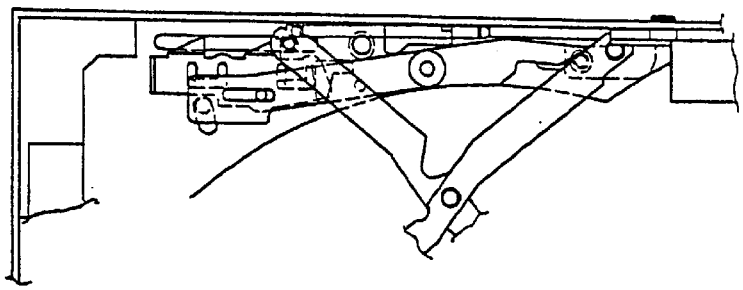
Figure 12A:
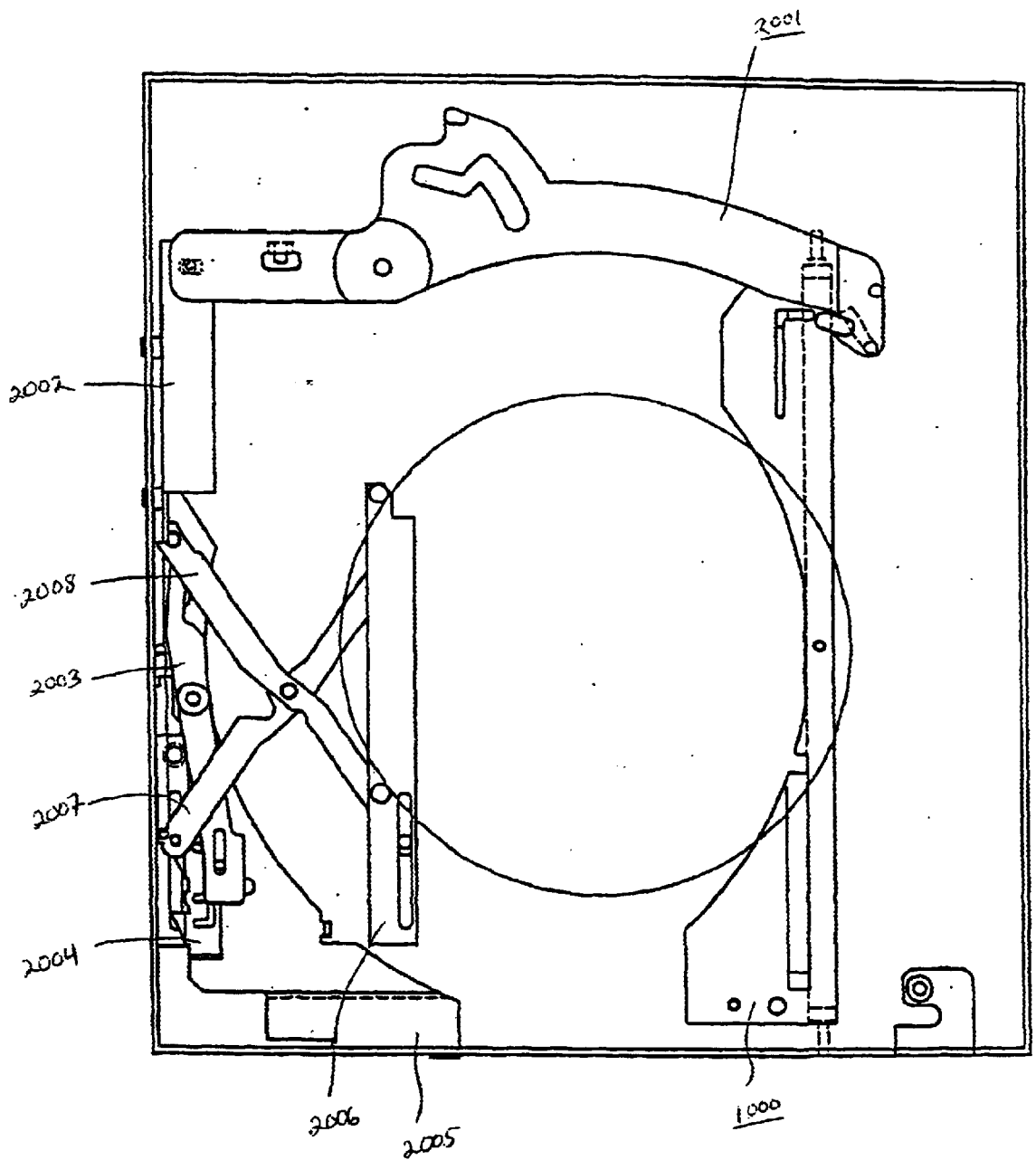
FIG. 12 shows the components of a disk position determination mechanism of the disk device as shown in FIG. 1.
Figure 12B:
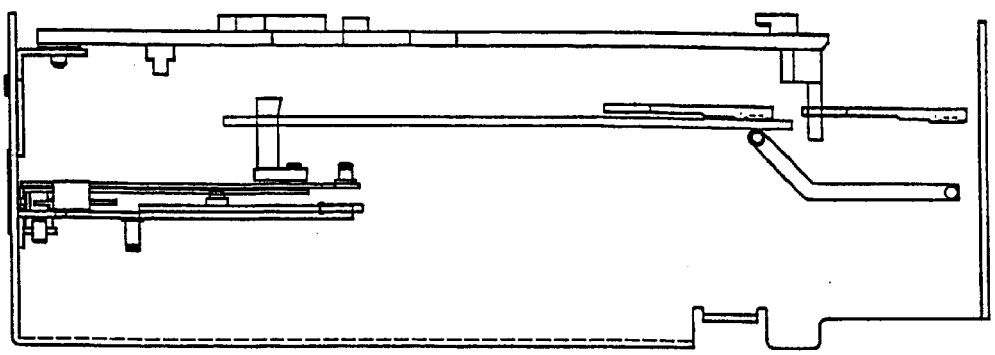
Figure 12C:
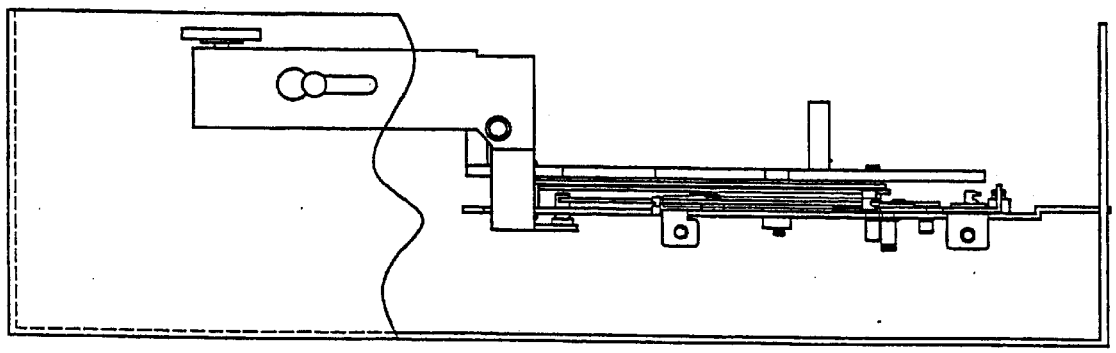
Figure 12D:
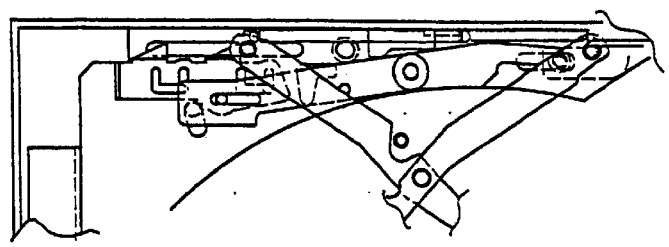

FIG. 2 shows the drive roller 101 rotating, that is to say, the device in a disk loading state. FIG. 3 shows the completion of the disk insertion operation from the operational state shown in FIG. 2. In order to play the disk, the disk insertion/ejection mechanism is displaced in direction A, that is to say, the rack plate 1043 can displace the roller displacement mechanism. That is to say, the gear 1042 and the gear 1039 are engaged. FIG. 4 shows the refuging of the operation as shown in FIG. 3, that is to say, a disk playing state. FIG. 5 and FIG. 6 show the completion of the refuging operation of the disk insertion/ejection mechanism from the state as shown in FIG. 4. FIG. 5 shows the member and the linkage loading state of the disk loading mechanism (discussed below) which performs height adjustment of the disk and changing of disks. FIG. 6 shows the rack plate 1043 displacing in direction A from the state as shown in FIG. 5. Linked to this displacement, the linked member (to be discussed below) is shown in a rotated position.

As shown in FIG. 2, the motor 1031 is started by detection of disk insertion and drive force is transmitted from the gear 1032 of the motor 1031 through the gear 1036 to the gear 1037. Since the plate 1039 at this time rotates in a clockwise direction, the gear 1037 and the gear 1038 engage and the gear 1038 rotates due to the rotations of the gear 1037. Since the engagement of the gear 1042 and the gear 1036 is released at this time in order to displace the rack plate 1043, the gear 1036 is rotated by the rotations of the gear 1035.

When the device is in a mode in which disk insertion operations are complete and a disk is played, the engagement of the gear 1037 and the gear 1038 is released at this time and the plate 1039 rotates in an anti-clockwise direction since it is necessary to refuge the disk insertion/ejection mechanism which interferes with the disk playing operation. The gear 1042 and the gear 1036 are engaged in order to displace the rack plate 1043. The rotation of the gear 1037 is continued at this time, however the rotation of the gear 1038 is suspended in order to release the engagement of the gear 1037. Since the gear 1042 and the gear 1036 are engaged, the rack plate 1043 is displaced and it is possible to refuge the disk insertion/ejection mechanism. FIG. 4 shows disk playing operation with the disk insertion/ejection mechanism in a refuged state. As stated above, when a disk is played, the device is adapted to refuge the disk insertion/ejection mechanism. Furthermore the device is adapted to operate the components of the disk loading mechanism to link with the disk insertion/ejection mechanism shown in the state in FIG. 6 from the state shown in FIG. 5.

(3. Disk Position Determination Mechanism)

FIG. 7 to FIG. 12 are related to the disk position determination mechanism. In each of the figures, Figure (a) shows an upper view of the components as seen from the upper surface of the device. (b) is a left side view of (a) showing the inner components as seen from the left surface. (c) is a rear view of (a) which shows the inner components as seen from the rear surface. (d) is a component view showing components determining the position of the disk position determination mechanism when the position of a large diameter disk is determined or when a disk is played.

FIG. 7 to FIG. 10 show the position determination operation for a large diameter disk. FIG. 11 and FIG. 12 show the position determination operation for a small diameter disk.

A switching mechanism 2100 and a shutter mechanism 2200 are contained in the disk position determination mechanism 2000. The disk position determination mechanism, the switching mechanism and the shutter mechanism will be described in order.

FIG. 7 shows the state of a disk as inserted. The disk position determination mechanism at this time is shown in a ready position for disk insertion. FIG. 8 shows an inserted disk in an abutting state with the position determination section 2006 (discussed below) which is disposed in the insertion ready position. FIG. 9 shows the position determination section 2006 as displaced from the position as shown in FIG. 8 towards to a position determination point. FIG. 10 shows the completion of the position determination operation to a position determination point for a large diameter disk after the completion of the operation as shown in FIG. 9.

FIG. 11 shows a small diameter disk being conveyed by the disk insertion/ejection mechanism. FIG. 12 shows the completion of the position determination operation to a position determination point for small diameter disks after the completion of the operation as shown in FIG. 11.

In FIGS. 7 (a)–(d), reference numeral 2000 denotes a disk position determination mechanism which accurately determines a disk playing position depending on the diameter of each disk whether the disk is a large diameter disk (for example a 12 cm CD) or a small diameter disk (for example an 8 cm CD). The disk position determination mechanism 2000 is comprised of the components below.

2001 is a rotatable arm forming an abutting pin 2001a on one end towards the disk insertion mouth and a hole 2001b to which a projection formed on the housing 50 is fixed with a play. The arm 2001 is adapted to rotate in direction A about the hole 2001a and extend by a section of the peripheral section of the inserted disk abutting with the abutting pin 2001a (refer to FIG. 7 (a)). The arm 2001 is normally biased in direction B due to a biasing means (not shown) such as a spring. That is to say, when the abutment of the disk with the abutting pin 2001a is released, the arm 2001 is adapted to return to the position as shown in FIG. 7 (a).

2002 is a plate which is linked to the other end of the arm 2001. When the arm 2001 rotates in direction A, the plate displaces in direction C and when the arm 2001 rotates in direction B, the plate displaces in direction D. A projection 2002a is provided on one end of the plate 2002.

2003 is a first rotatable lever on one end of which an abutting section 2003a is formed which abuts in response to the displaced position of the projection 2002a provided on the plate 2002. On another end of the first rotatable lever 2003 an elongated hole 2003b is formed. The first lever 2003 rotates about a hole 2003c in which a projection is fixed with a play which is formed on an approximately central section of the housing. The first lever 2003 rotates in direction E when the plate 2002 displaces in direction C and rotates in direction F when the plate 2002 displaces in direction D.

2004 is a second lever which forms stoppers 2004b, 2004c which limit the operation of the third lever 2007 to a fixed position by fixing a projection 2004a a section of which slides in the elongated hole 2003 formed on the first lever 2003 and by fixing a projection (discussed below) form on one end of the third lever 2007 to a fixed position The second lever 2004 is adapted to link with the first lever 2003 and to displace in the same direction as the direction of displacement of the first lever 2003.

2005 is a base plate one section of which is fixed to the housing 50. An elongated hole 2005a is formed on the base plate 2005 and allows a projection (to be discussed below) which is formed on one end of the third plate 2007 to slide therein.

2006 is a position determination section which determines the position of a disk and has projections 2006a, 2006b which project in an approximately perpendicular direction with respect to the disk surface towards the disk insertion mouth. The projections 2006a, 2006b are formed to abut with two points of the disk peripheral section and thus to determine the position of the disk. The position determination section 2006 varies an amount of displacement (displacement distance) in direction G in response to the diameter of the abutting disk (this point will be explained in detail in the description of the operation of the device).

2007 is a third lever on one end of which a projection 2007a is formed which is slidable in the elongated hole provided in the base plate 2005a. The other end supports a position determination section 2006 to rotate freely by the projections 2006a, 2006b at a position removed from the disk insertion mouth. When the position determination section 2006 displaces in direction G, the third lever 2007 also rotates in an anti-clockwise direction, that is to say, in direction G. The third lever 2007 and other related components will be described below.

2008 is a fourth lever one end of which is formed to rotate freely on a section of the base plate 2005. An approximately central section is layered on an approximately central section of the third lever 2007 to act as a center of rotation. The other end supports the position determination section 2006 to rotate freely by the projections 2006a, 2006b at a position removed from the disk insertion mouth. When the position determination section 2006 displaces in direction G, the fourth lever 2008 rotates in a clockwise position, that is to say, it displaces in direction G. Other components and related operations will be described below in the same way as the fourth lever 2008.

Figure 13A:
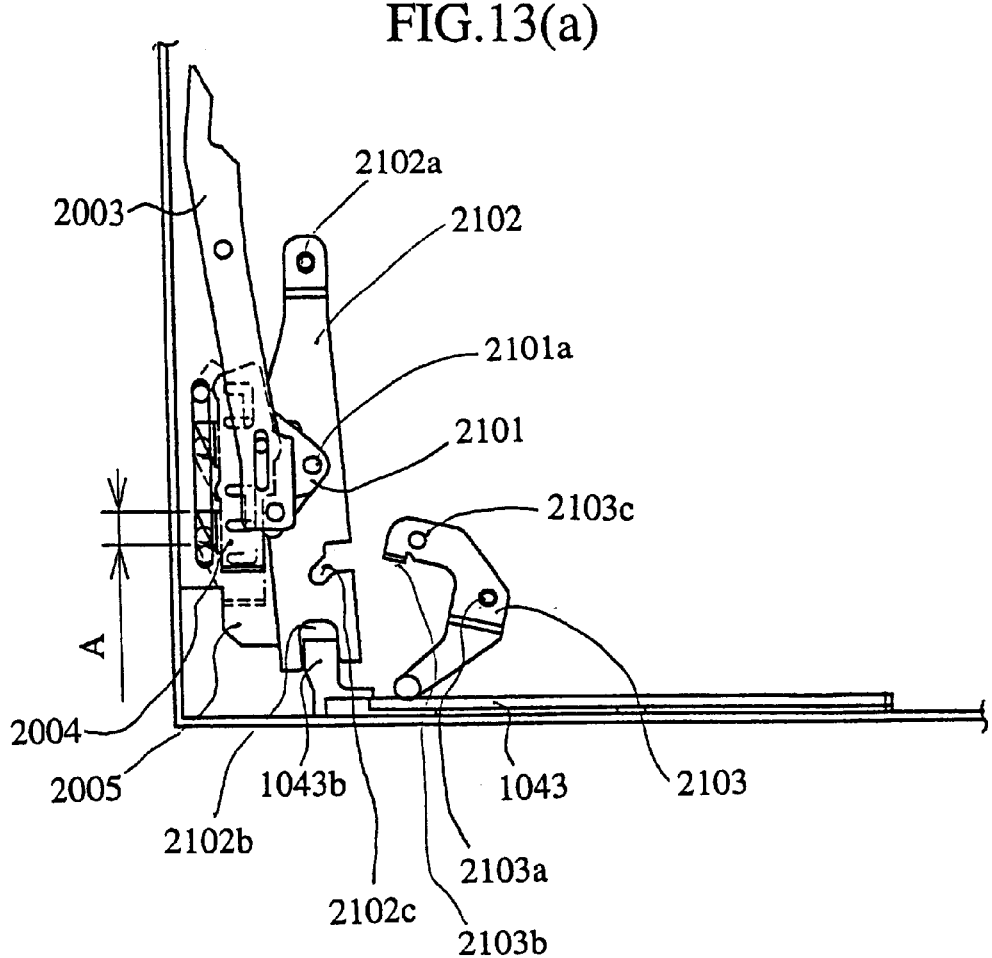
FIG. 13 shows the components of a disk position determination mechanism of the disk device as shown in FIG. 1.
Figure 13B:
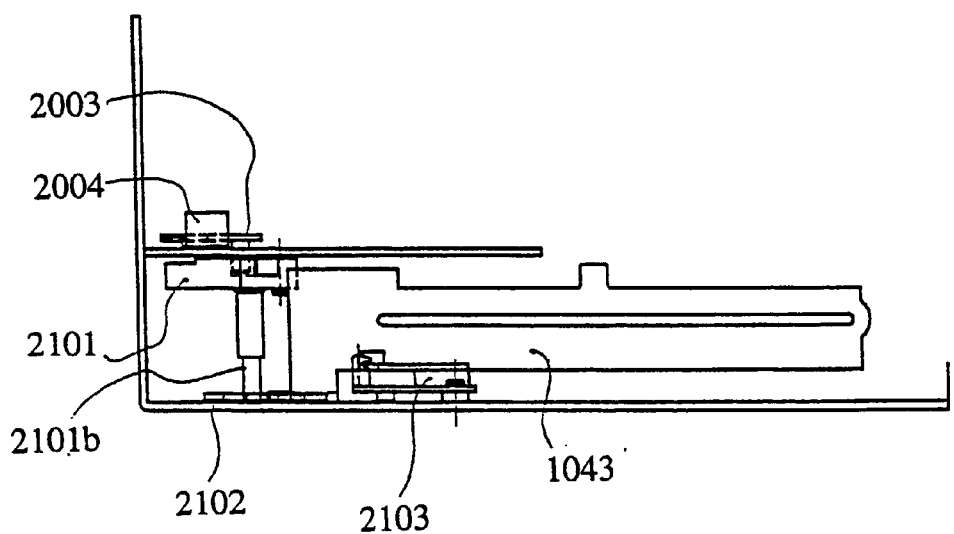
Figure 13C:
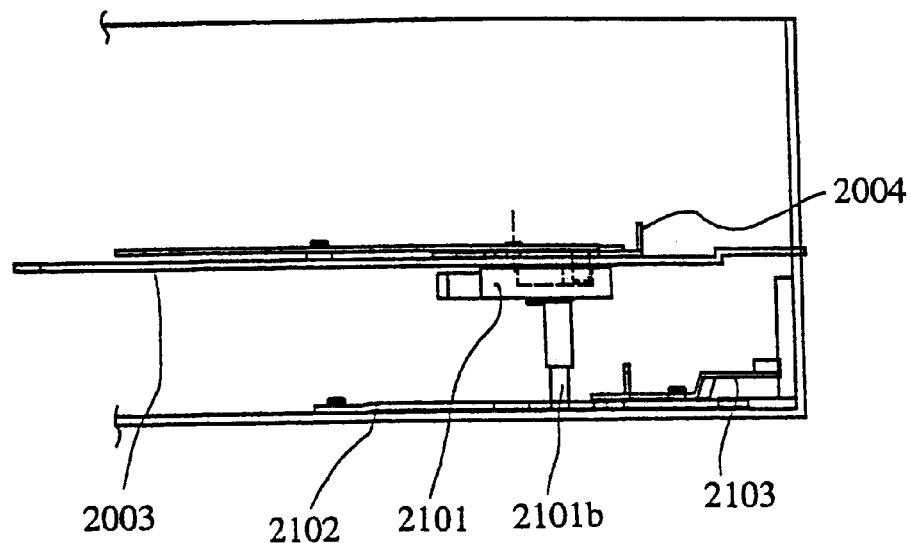
Figure 13F:
Figure 13E:
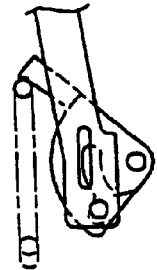
Figure 13D:
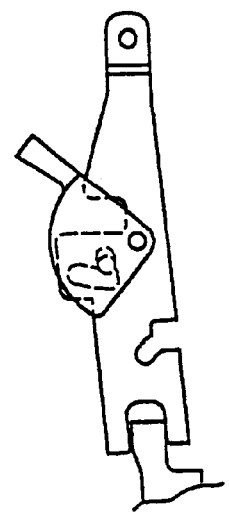
Figure 14A:
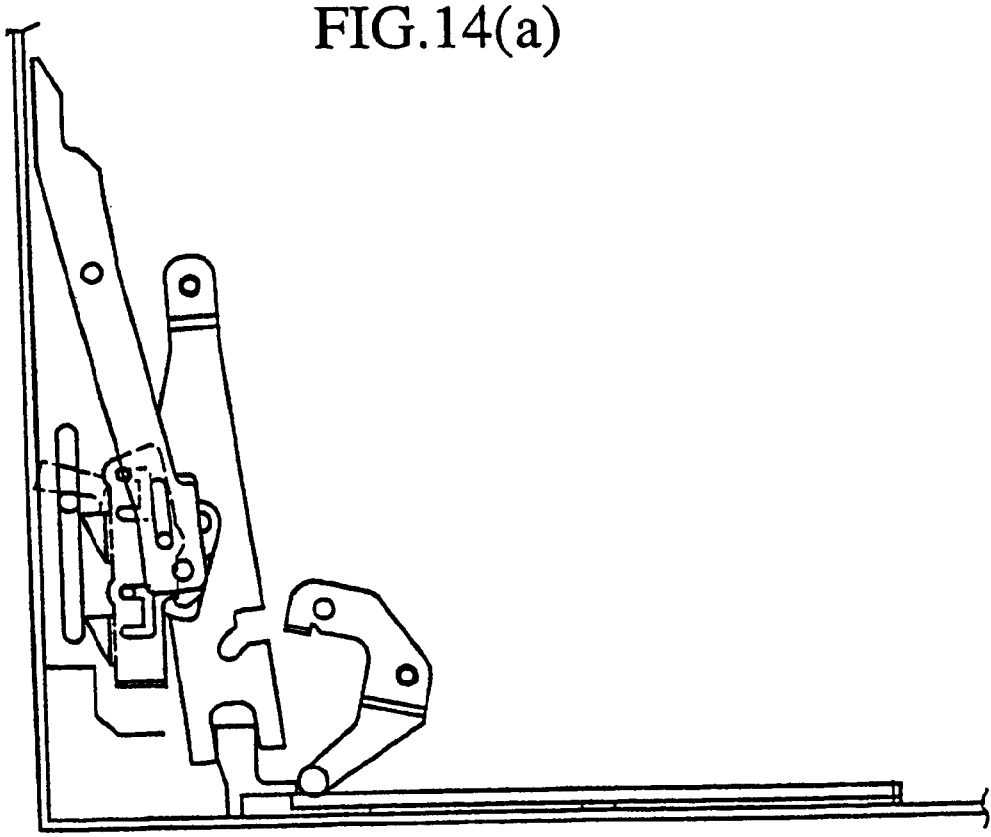
FIG. 14 shows the components of a disk position determination mechanism of the disk device as shown in FIG. 1.
Figure 14B:
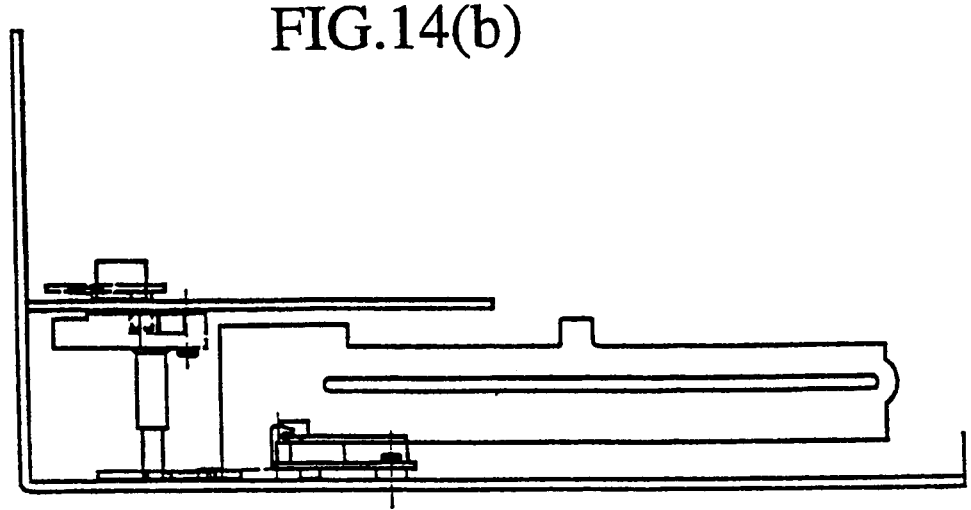
Figure 15A:
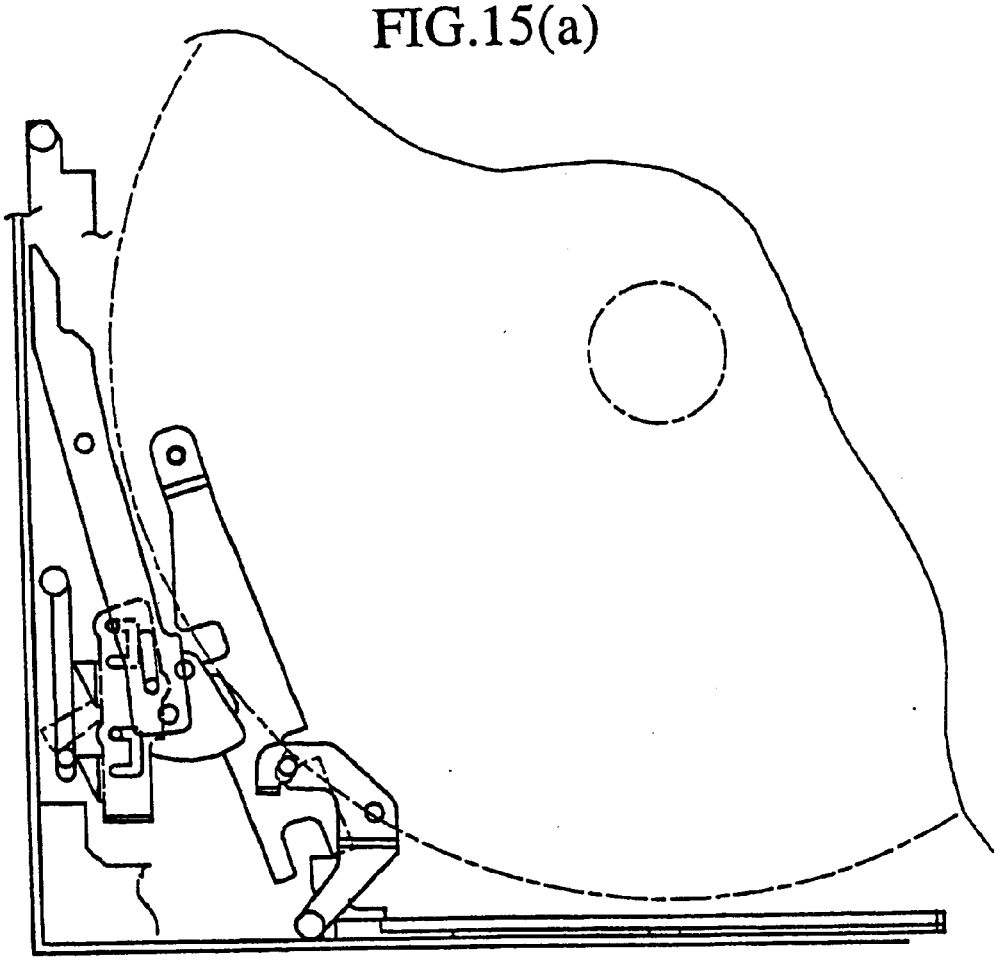
FIG. 15 shows the components of a disk position determination mechanism of the disk device as shown in FIG. 1.
Figure 15B:
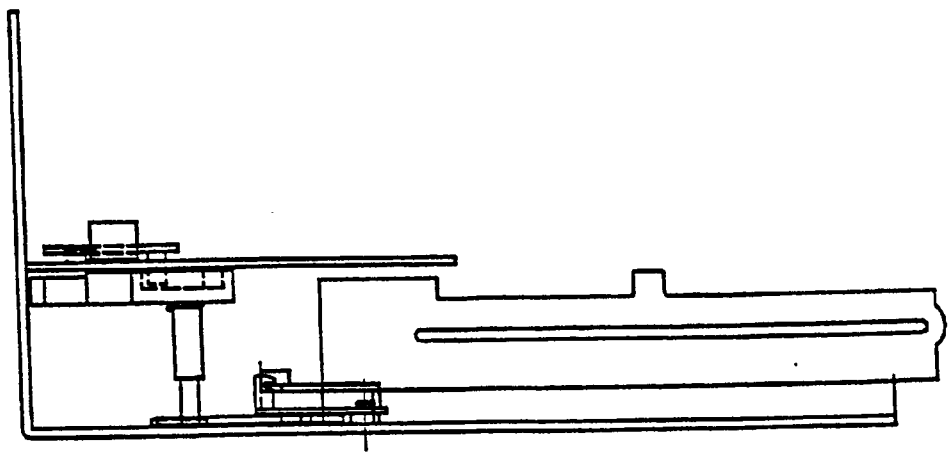

FIG. 13 to FIG. 15 show the components linked with the disk position determination. Figure (a) shows an upper view of the components as seen from the upper surface of the device. (b) is a left side view of (a) showing the components as seen from the left surface. (c) is a rear view of (a) which shows the components as seen from the rear surface. (d)–(f) are explanatory figures showing the structure of the components.

FIG. 13 shows the state of the device after the performance of disk positional determination by the disk position determination mechanism 2000 and before setting to a disk playing operation state. FIG. 14 shows the initiation of the rotation operation of the fifth lever 2101 (discussed below). FIG. 15 shows the refuged position of the disk position determination mechanism 2000 further in a rear direction together with the completion of the rotation operation of the fifth lever.

In FIG. 13, 2100 is a position determination refuge mechanism which is displaced further in direction G and disposed towards the rear of the housing when the position determination section 2006, the third lever 2007, and the fourth lever 2008 participate in disk playing operations with a large diameter disk disposed in a determined position (details of the operation are described below).

The position determination refuge mechanism 2100 comprises a projection 2101a, a fifth lever 2101 and a sixth lever. The projection 2101a acts as a rotation point and is fixed with a play in a hole formed in the base plate 2005 and the fifth lever 2101 has a projection 2101b formed at a position which differs from the projection 2101a. The sixth lever is formed along the housing, and has a support point 2102a which is provided to act as a rotation shaft one end being supported on the housing. The sixth lever forms another end 2102b in an indented shape. A section of the rack plate 1043 is fixed with a play in the indentation 2102b of the sixth plate 2102. When the rack plate 1043 displaces in direction A, the sixth lever 2102 is linked and displaces in direction A by rotating about the projection 2102a.

2103 is a seventh lever formed in a curved shape. The seventh lever 2103 forms a rotation point 2103a which is provided on an approximately central section, an abutting section 2103b which abuts with an upper surface of the rack plate 1043 when one end is in a mode other than disk play mode, and an engaging section 2103c which is fixed into the elongated hole 2102c formed on a section of the sixth lever 2102. The seventh lever 2103 is biased by a biasing means (not shown) so that the engaging section 2103c is normally in a state of abutment with the rack plate 1043. As a result, the seventh lever 2103 rotates to abut with the housing due to the biasing force of the biasing means. That is to say, the engagement means 2103c as shown in FIG. 15 is engaged with the elongated hole 2102c of the sixth lever 2102. When in such a state, the position determination section 2006, the third lever 2007, the fourth lever 2008 are displaced to refuge in the further position as shown in FIG. 10.

The operation of the invention will be described below.

Firstly, as shown in FIG. 13(d), when the rack plate 1043 is not displacing, the fifth lever 2101 does not rotate due to the positional relationship between the elongated hole 2012b formed on the sixth lever 2102 and the projection 2101a formed on the fifth lever 2101.

Then as shown in FIG. 14, when the rack plate 1043 begins to displace, since the sixth lever 2102 which is linked with the rack plate 1043 rotates in an anti-clockwise direction, the elongated hole 2012b formed on the sixth plate 2102 also displaces and the projection 2101a formed on the fifth lever 2101 rotates in an anti-clockwise direction being linked with this displacement. This is the result of the third lever 2007 rotating in an anti-clockwise direction due to the abutment of one end of the fifth lever 2101 and the third lever 2007.

The rack plate 1043 is further displaced from the position as shown in FIG. 14 to that as shown in FIG. 15. The sixth lever 2102 which is linked to the rack plate 1043 is further rotated in an anti-clockwise direction. Based on the displacement of the elongated hole 2012b formed on the sixth lever 2102, the projection 2101a formed on the fifth lever 2101 is further rotated in an anti-clockwise direction being linked with this displacement and reaches an operation completion position. Thus the position determination section 2006, the third lever 2007 and the fourth lever 2008 are shown as having reached an innermost position in the device.

The shutter mechanism will now be described.

Figure 16A:
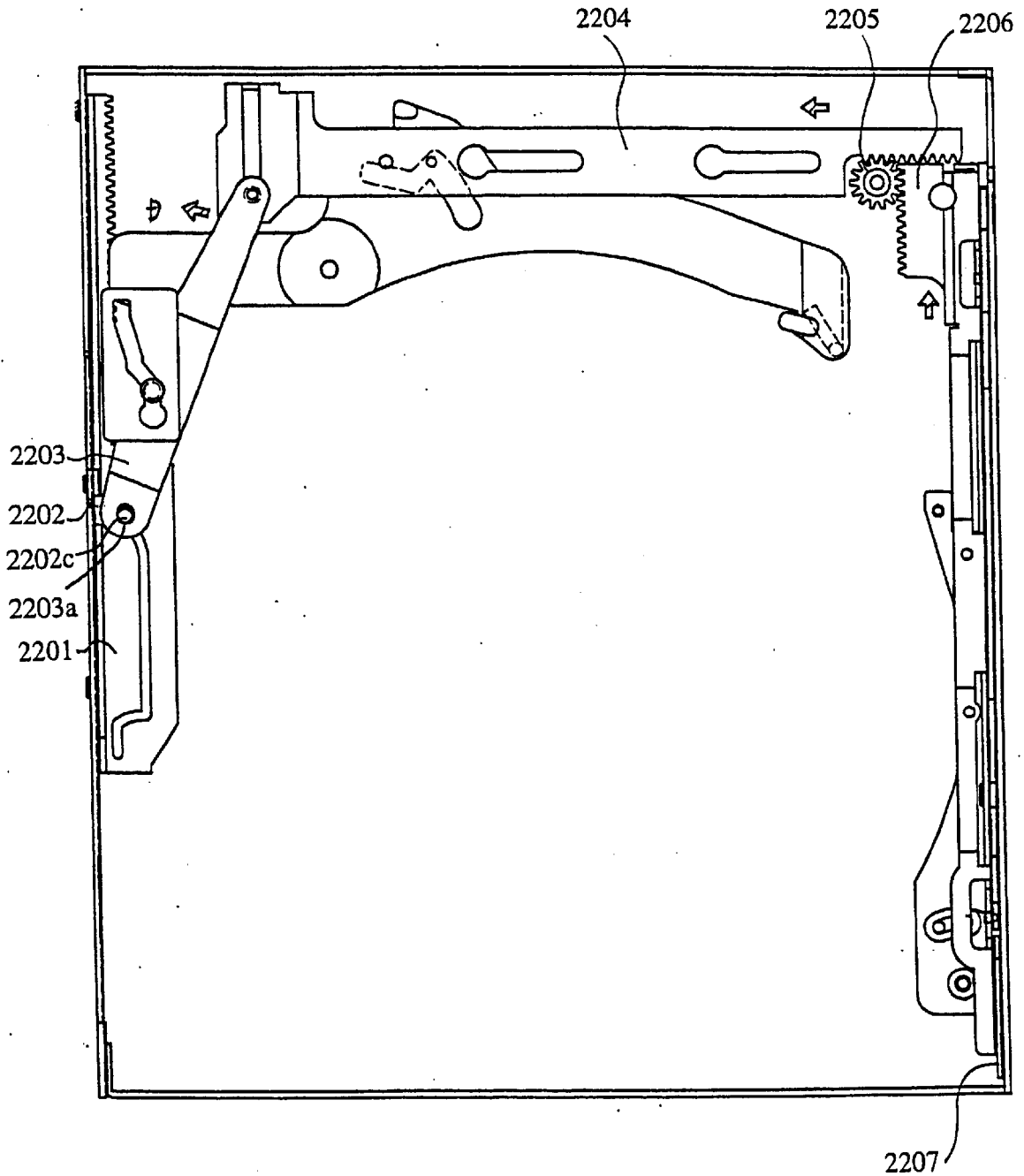
FIG. 16 shows the components of a disk retaining and shutter mechanism of the disk device as shown in FIG. 1.
Figure 16B:
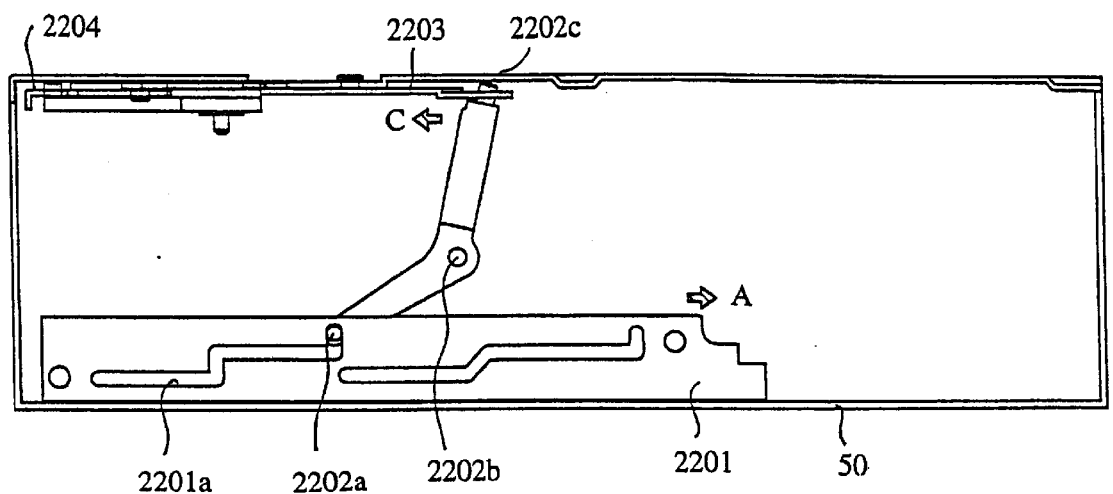
Figure 16C:
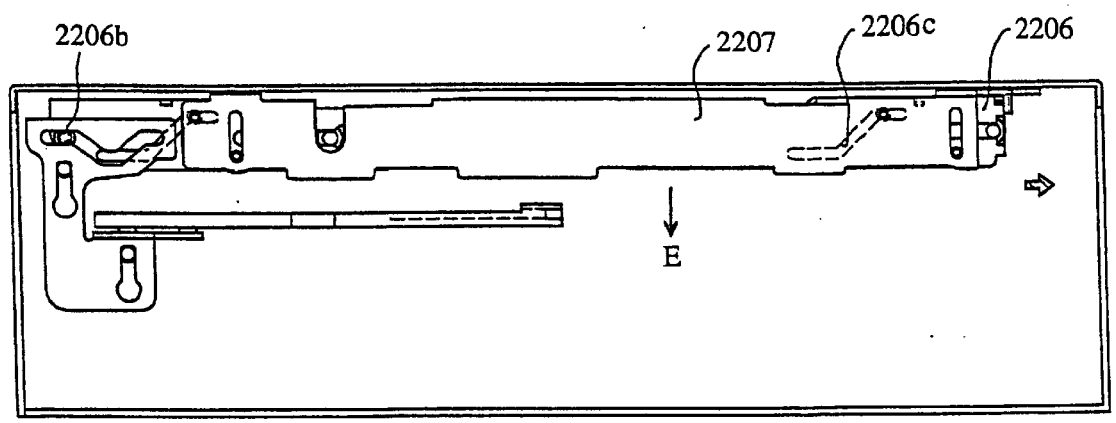

In FIG. 16, 2200 is a shutter mechanism which closes the disk insertion mouth so as not to allow the insertion of disks from the disk insertion mouth when the disk playing mechanism (described below) is operating. The shutter mechanism 2200 is formed from the components below.

2201 is a plate which is linked to the rotation operation of the gear (not shown) which engages with the drive motor (not shown) and which is adapted to displace in direction A or direction B due to the drive force of the drive motor. Elongated holes 2201a, 2201b are formed on the plate 2201.

2202 is an eighth lever on one end of which projections 2202a and 2202b are respectively formed. An approximately central section of the projection 2202b acts as a support point. A projection 2202c is formed which rotates in an anti-clockwise direction based on the displacement of the plate 2201. The projection 2202a of the eighth lever 2202 slides in an elongated hole 2201a in the plate 2201 and the projection 2202c displaces in direction C. 2203 is a ninth lever. At one end, a hole 2203a which engages with a projection 2202c is formed and a projection 2203b is adapted to slide in an elongated hole formed on a section of the housing (upper plate). On the other end, a projection 2203c is formed. When the plate 2201 displaces in direction A, the ninth lever 2203 is linked and rotates in direction D.

2204 is a tenth lever on one end of which a groove 2204a is formed which guides a projection 2203c of the ninth lever 2203 to slide freely and on the other end of which a rack section 2204b is formed. The tenth lever 2204 is adapted to be linked to the displacement of the ninth lever 2203. That is to say, when the ninth lever 2203 displaces in direction D, the tenth lever 2204 is linked to the displacement and rotates in direction D.

2205 is a gear which is engaged with the rack 2204b of the tenth lever 2204.

2206 is a plate which is provided with a rack 2206a formed on one end, a projection 2206b which is fixed with a play to an elongated hole formed in the base plate (discussed below) and an elongated hole 2206c which guides the projection formed on the shutter 2207 (discussed below) to slide freely. The plate 2206 is adapted to be linked with the displacement of the tenth lever 2204 in direction D and thus the gear section 2206 rotates in an anti-clockwise direction. Being linked to this rotation, the plate 2206 displaces in direction B.

A disk retaining mechanism 3000 (discussed below) is provided on the base plate which abuts with a face of a disk and supports the disk.

2207 is a shutter section which forms at both ends, elongated holes 2207a, 2207b in an axial direction of a disk which is inserted at both ends and which forms a projection 2207b which is fixed with a play to freely slide in an elongated hole 2206c formed on the plate 2206. The shutter section 2207 is linked to displace with the displacement of the plate 2206. When the plate 2206 displaces in direction B, the elongated hole 2206c formed on the plate 2206 is adapted to incline in direction E as shown in FIG. 16 (a). Thus the projection 2207c of the shutter section 2207 displaces in direction E due to the guide of the elongated hole 2206c, that is to say, the shutter section 2207 displaces towards the lower section of the device and disk insertion from the disk insertion hole can not be performed.

The elongated hole 2201a of the plate 2201 is structured as shown in FIG. 16 (a) and is adapted so that the shutter section 2207 and the support mechanism are displaced in an axial direction of the disk due to the elongated hole 2201a guiding the projection 2202a of the eighth lever 2202.

The operation of the invention will be described below.

Figure 17A:
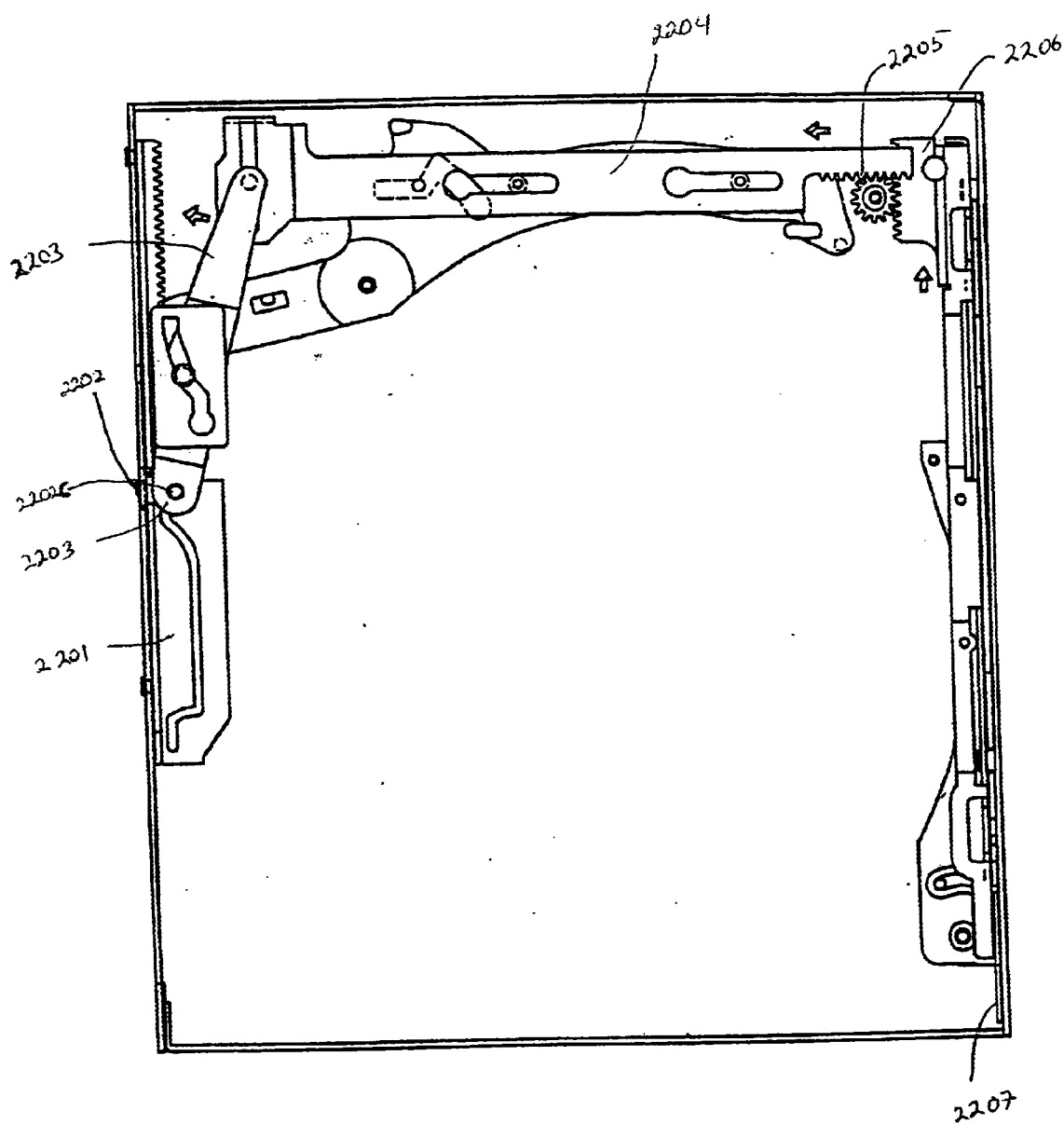
FIG. 17 shows the components of a disk retaining and shutter mechanism of the disk device as shown in FIG. 1.
Figure 17B:
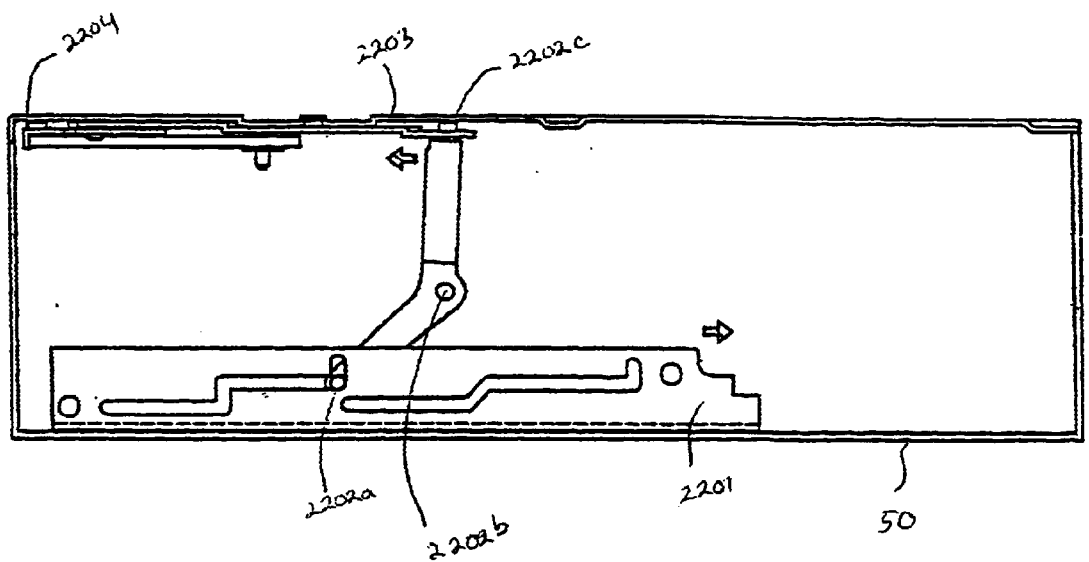
Figure 17C:
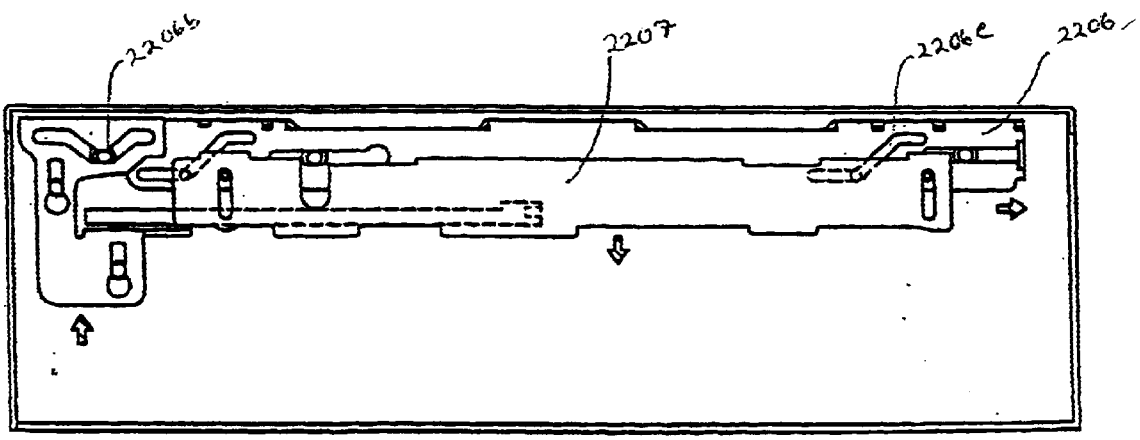
Figure 18A:
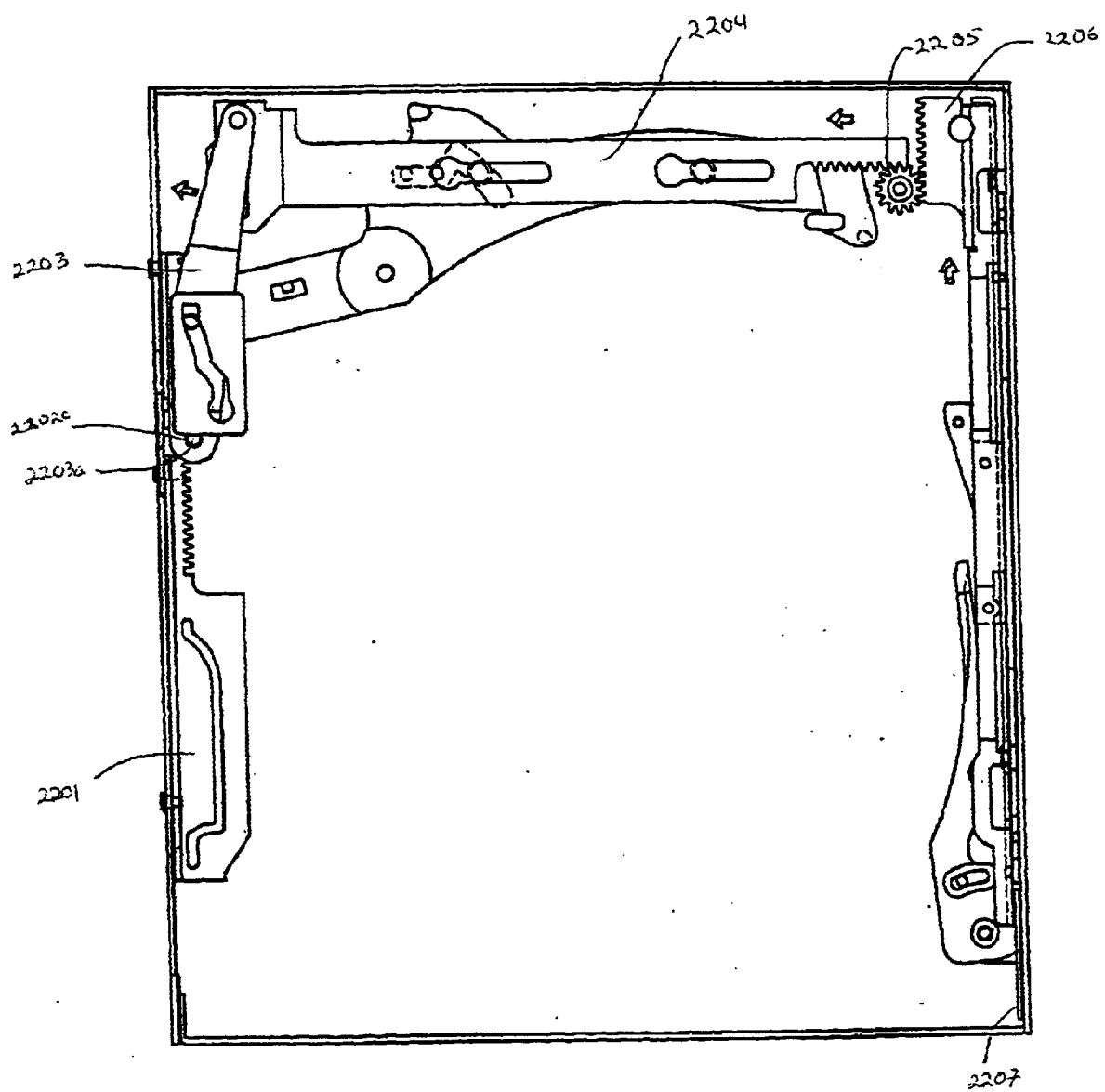
FIG. 18 shows the components of a disk retaining and shutter mechanism of the disk device as shown in FIG. 1.
Figure 18B:
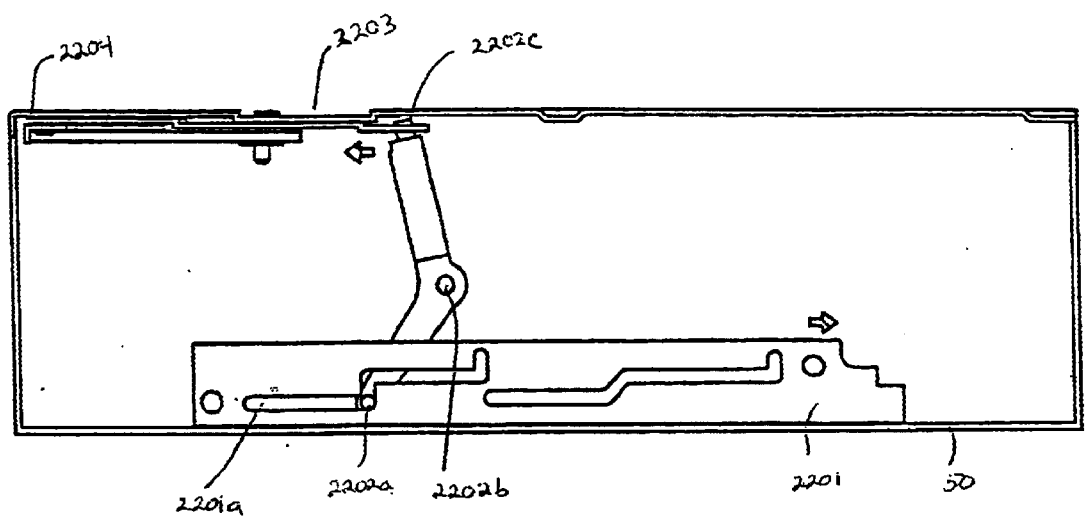
Figure 18C:
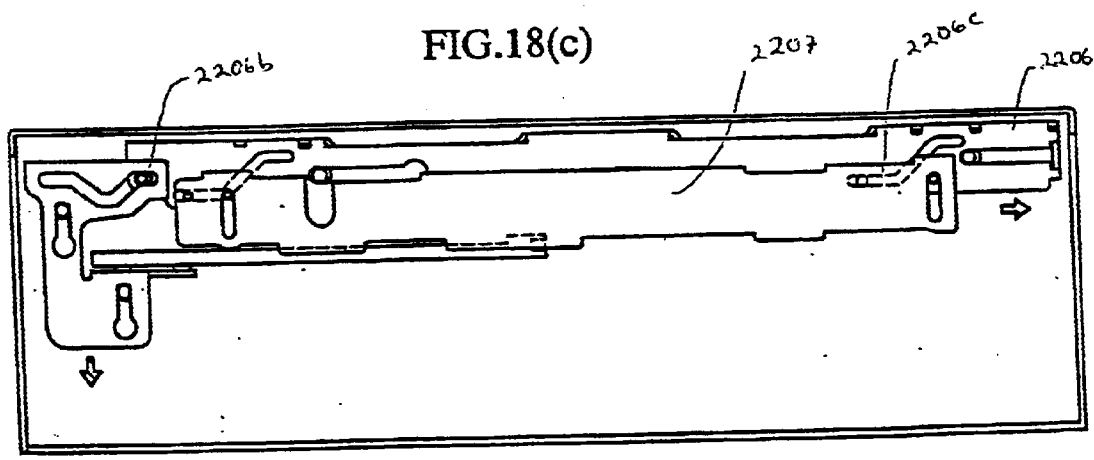

FIG. 16 to FIG. 18 show the shutter components linked with the disk position determination. Figure (a) shows an upper view of the components as seen from the upper surface of the device. (b) is a left side view of (a) showing the components as seen from the left surface. (c) is a right view of (a) which shows the components as seen from the right side.

The shutter mechanism 2200 is adapted to prevent double insertion of disks in order to maintain the operational mechanism of the device when disks which are loaded in the disk loading mechanism are changed or disks are played.

FIG. 16 shows the device in a state in which a disk can be inserted, that is to say, in a state in which the shutter is not operating so that there is no cover on the disk conveying path. From this state, the shutter 2207 and the base plate displace in linked movement due to the displacement of the plate 2201 in direction A.

In FIG. 17, the plate 2201 begins to displace in direction A and displaces so that the projection 2202a of the eighth lever 2202 is disposed to a lower section of the elongated hole 2201a formed on the plate 2201. As the shutter 2207 displaces downwardly, that is to say, covers the disk conveying path, disk insertion is prevented. When the shutter section 2207 is displaced, the disk retaining mechanism is displaced upwardly in linked motion and as shown in FIG. 17, the disk retaining mechanism is displaced to an upper section in the device. As the displacement of the rack plate 2201 continues, as shown in FIG. 18, the disk support mechanism is adapted to displace downwardly in the device.

FIG. 19 to FIG. 22 show the components of the drive force transmission switching mechanism 2300 which transmits and switches the drive force of the motor 1001 to one of the rack plate 1043 or the drive roller 101 provided on the disk insertion/ejection mechanism 1000. Figure (a) shows an upper view of the components as seen from the upper surface of the device. (b) is a left side view of (a) showing the components as seen from the left surface. (c) is a rear view of (a) which shows the components as seen from the rear side.

In FIG. 19 to FIG. 22, 2301 is a lever which is adapted to rotate about a rotation shaft 2301a. The lever 2301 forms an abutting section 2301b on one end. Together with the displacement of the second plate in direction A, since one end of the second plate and the abutting section 2301b also displace in direction A, the lever 2301 rotates in an anti-clockwise direction. That is to say, the stopper formed on the second lever 2004 which fixes the projection also displaces in direction A due to the displacement of the projection formed on the third lever 2007 in direction A. Thus since the second lever 2004 displaces in direction A, the lever 2301 rotates in an anti-clockwise direction.

A biasing means 2302 which is biased normally in direction B is attached to the lever 2301. The lever 2301 forms a projection 2301c on the other end.

2303 is a side plate which is provided with an elongated hole 2303 in which the projection 2301c of the lever 2301 slides. The side plate 2303 displaces in direction C or direction D along the left side of the housing 50. On a section of the side plate 2303, an engaging section 2303a is formed which engages with the projection 1039a formed on the plate 1039. The projection 1039a separates from and releases engagement with the engaging section 2303a when the side plate displaces in direction C. When the projection 1039a is engaged with the engaging section 2303a, the plate 1039 rotates in a clockwise direction. Thus the gear 1037 and the gear 1038 mesh and the drive roller 101 rotates. However when engagement with the engaging section 2303a is released, the plate 1039 rotates in an anti-clockwise direction, the engagement of the gear 1037 and the gear 1038 is released, the gear 1036 and the gear 1042 engage and the rack plate 1043 is displaced. That is to say, the disk insertion/ejection mechanism is displaced.

2304 is a cam plate (discussed in detail below) and 2305 is a plate. An engaging section 2305a is formed on one end of the plate 2305. One end of the cam plate 2304 abuts with the engaging section 2305a and the other end abuts with a section of the second plate 2004. As a result, when the cam plate 2304 displaces in direction A, the plate 2305 displaces in direction A due to linked motion. Furthermore the second plate 2004 also displaces in direction A and displaces the side plate 2303 in direction C through the lever 2301.

When the disk position determination mechanism 2000 is not in operation, that is to say, when a disk is not inserted, it is sometimes necessary to displace the disk insertion/ejection mechanism 1000. Thus the cam plate 2304 is adapted to displace in direction A due to being driven by the fixed drive source.

Of course, it is needless to say that even during a disk insertion/ejection operation by the disk insertion/ejection mechanism 1000, that is to say, when the third lever 2007 displaces, the side plate 2303 may be displaced.

Next the operation of the drive force transmission switching mechanism 2300 will be described with reference to FIG. 19 to FIG. 22.

Figure 19A:
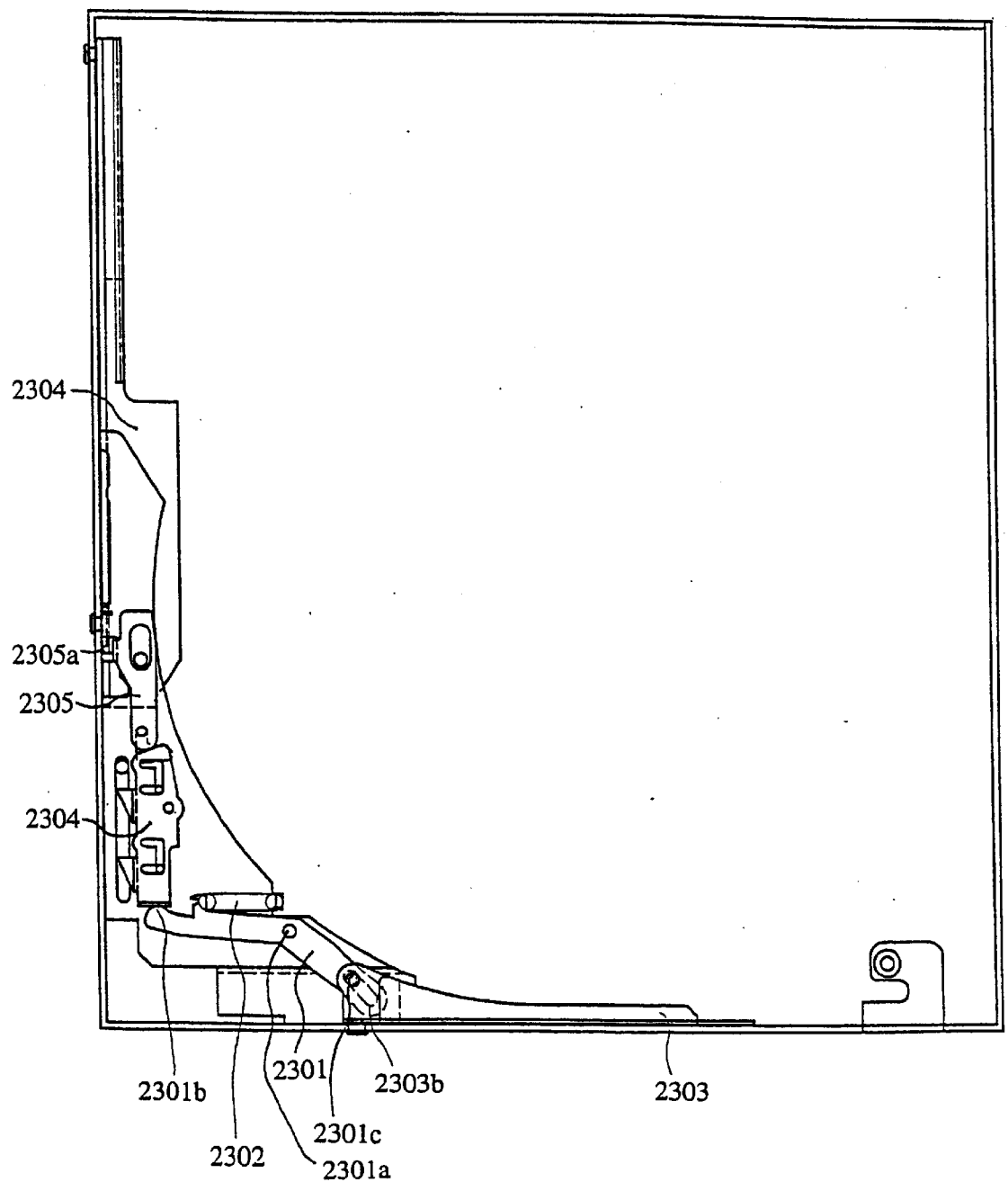
FIG. 19 shows the components of a drive force switching mechanism of the disk insertion/ejection mechanism of the disk device as shown in FIG. 1.
Figure 19B:
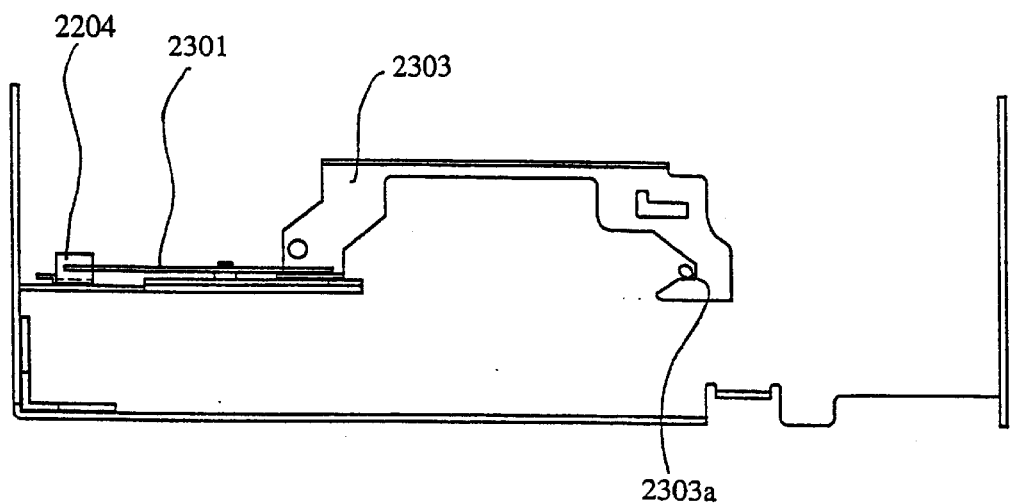
Figure 19C:
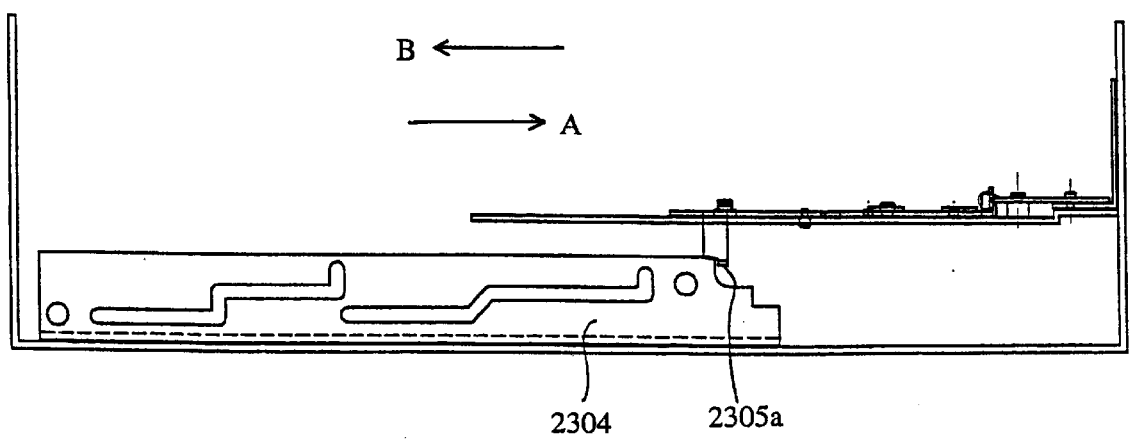
Figure 20A:
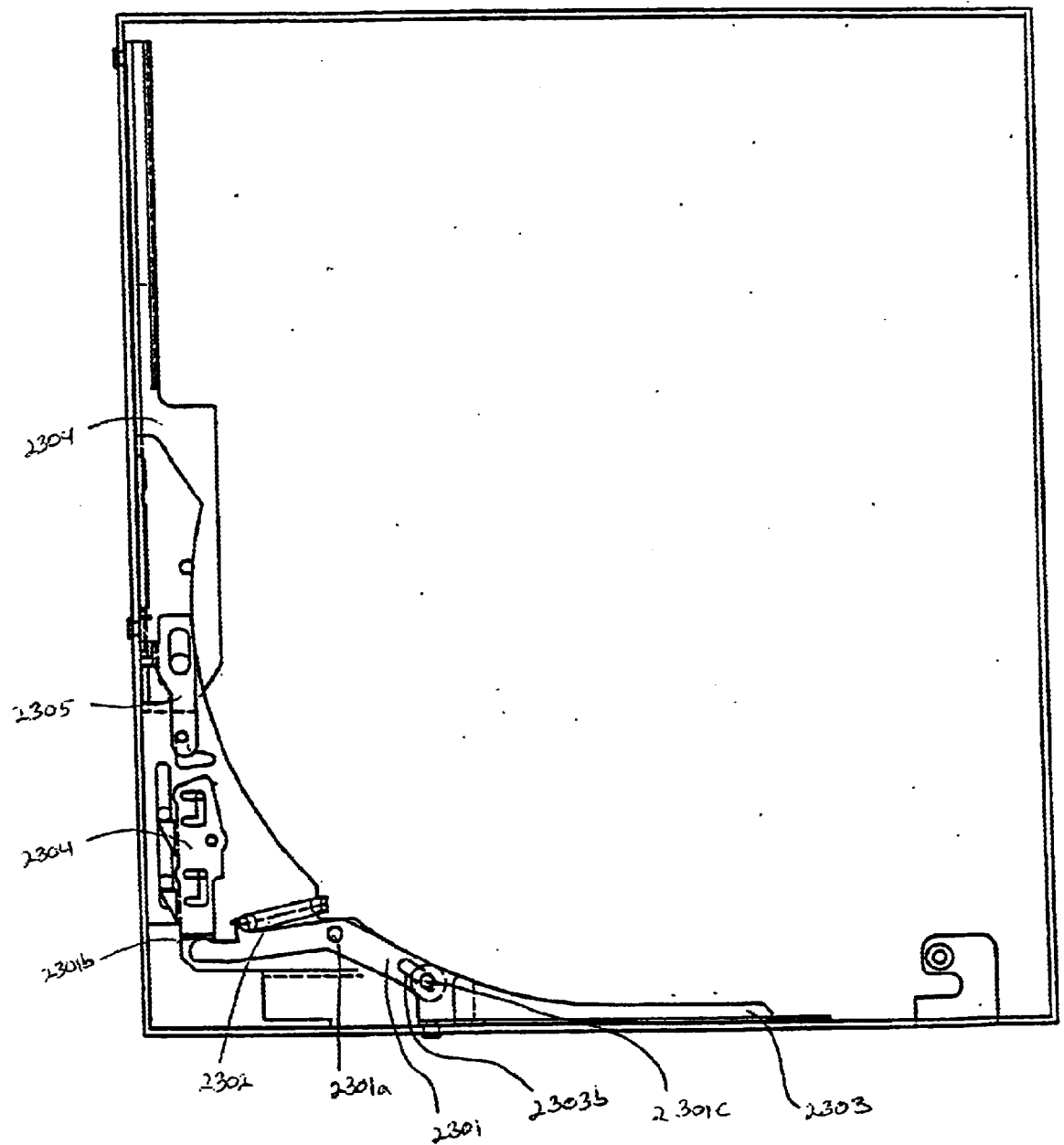
FIG. 20 shows the components of a drive force switching mechanism of the disk insertion/ejection mechanism of the disk device as shown in FIG. 1.
Figure 20B:
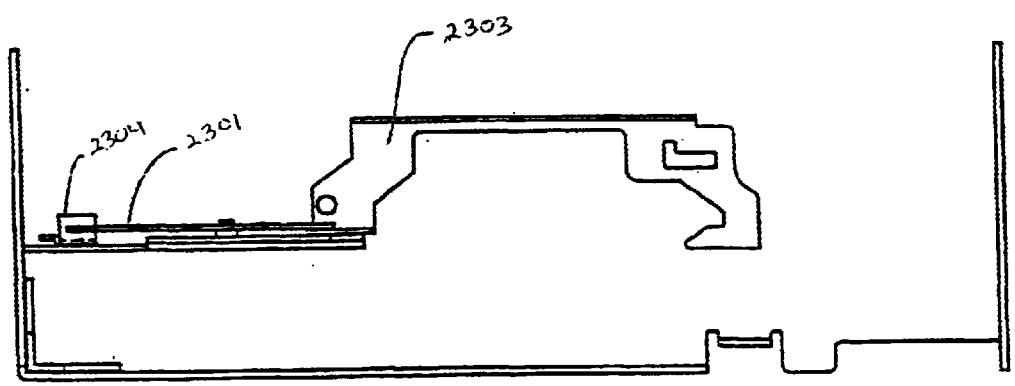
Figure 20C:
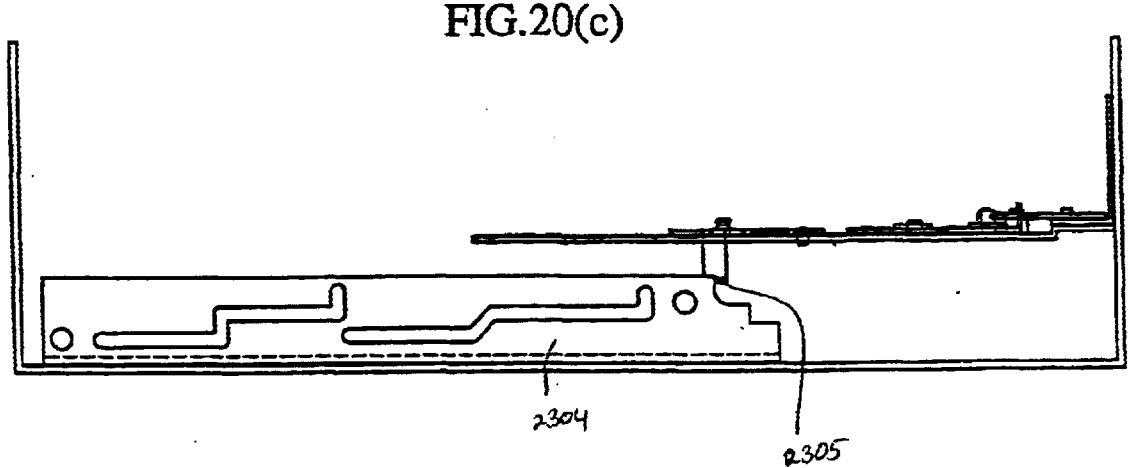
Figure 21A:
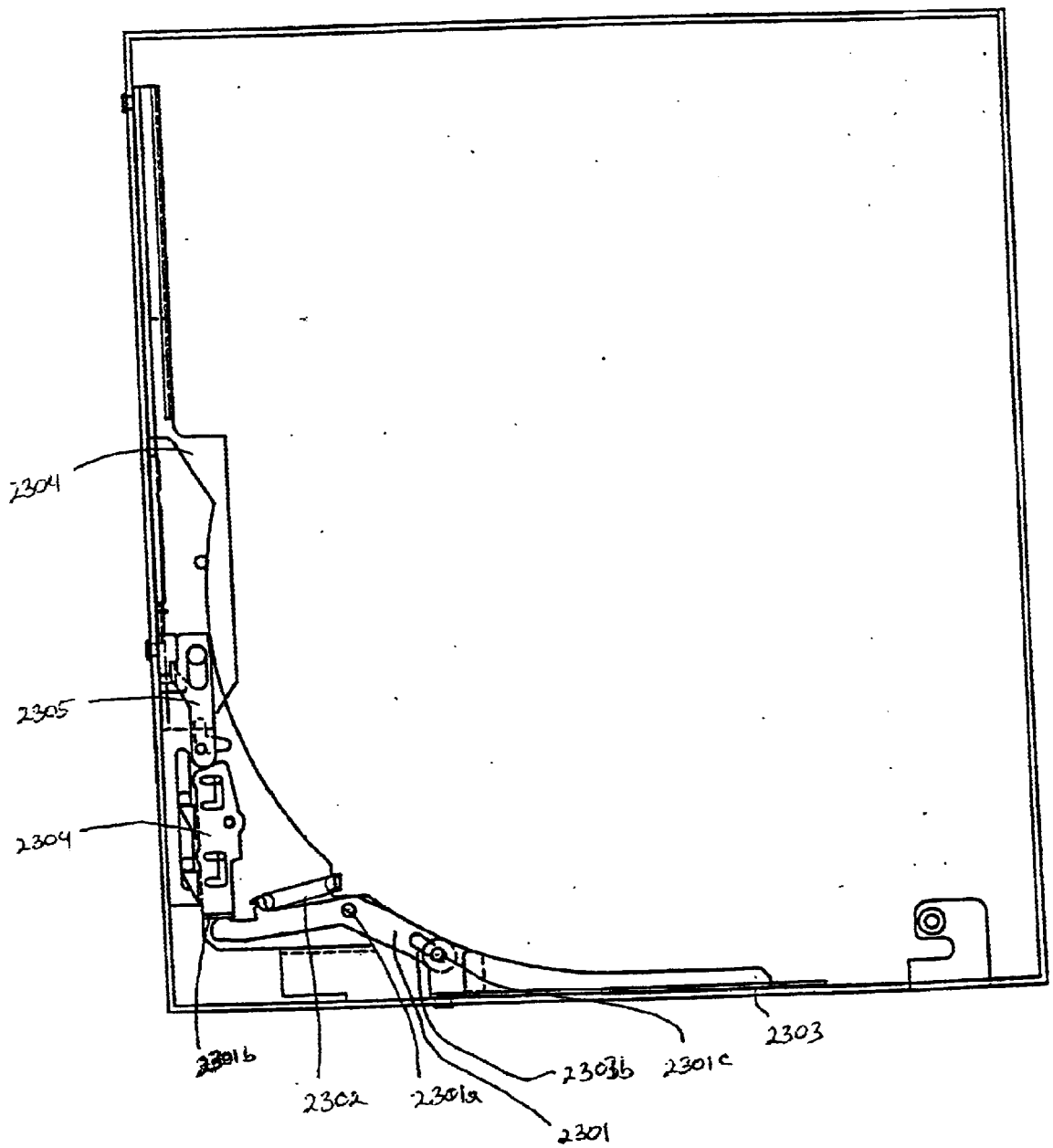
FIG. 21 shows the components of a drive force switching mechanism of the disk insertion/ejection mechanism of the disk device as shown in FIG. 1.
Figure 21B:
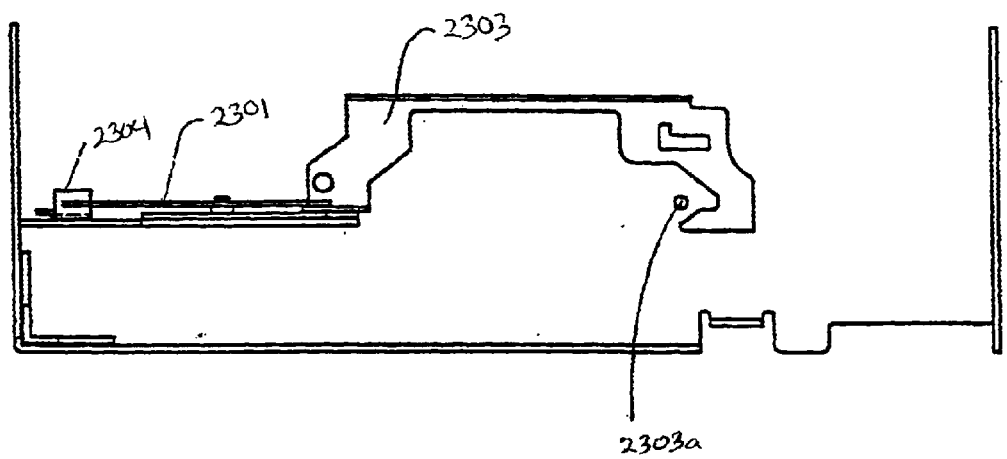
Figure 21C:
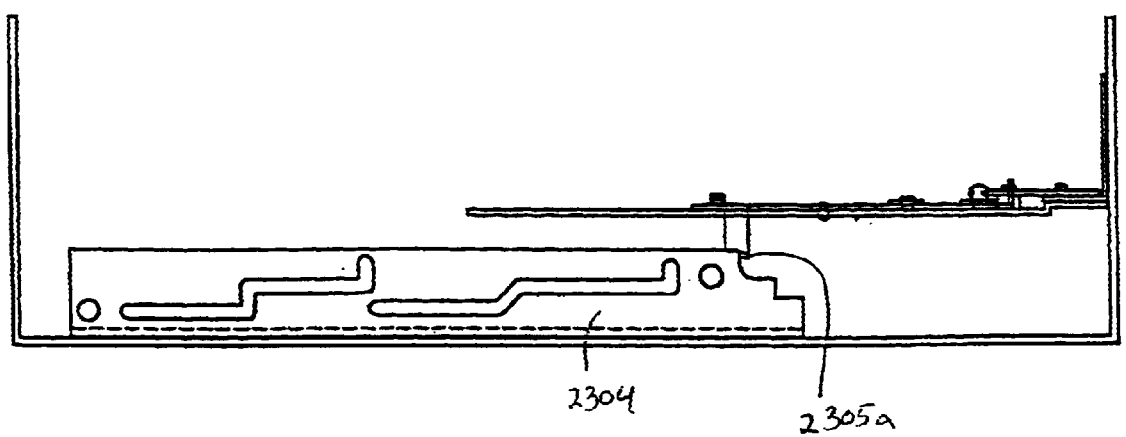

FIG. 19 shows the drive roller 101 rotating with the projection 1039a formed on the plate 1039 engaged to the engaging section 2303a of the side plate 2303. FIG. 20 shows the side plate 2303 displaced in direction C by the displacement of the third lever 2007 as a result of a disk inserted through the disk insertion/ejection mechanism 1000. The engagement of the projection 1039a of the plate 1039 with the engaging section 2303a is released and the plate 1039 rotates in an anti-clockwise direction. The gear 1037 meshes with the gear 1038 and the rack plate 1043 may be displaced. In FIG. 21, when the disk position determination mechanism 2000 does not operate, that is to say, when a disk is not inserted, the cam plate 2304 is displaced in direction A by being driven by the fixed drive source when it is required to displace the disk insertion/ejection mechanism 1000. The engagement of the projection 1039a of the plate 1039 and the engaging section 2303a is released and the plate 1039 rotates in an anti-clockwise direction. The gear 1037 meshes with the gear 1038 and the rack plate 1043 can be displaced.

Figure 22A:
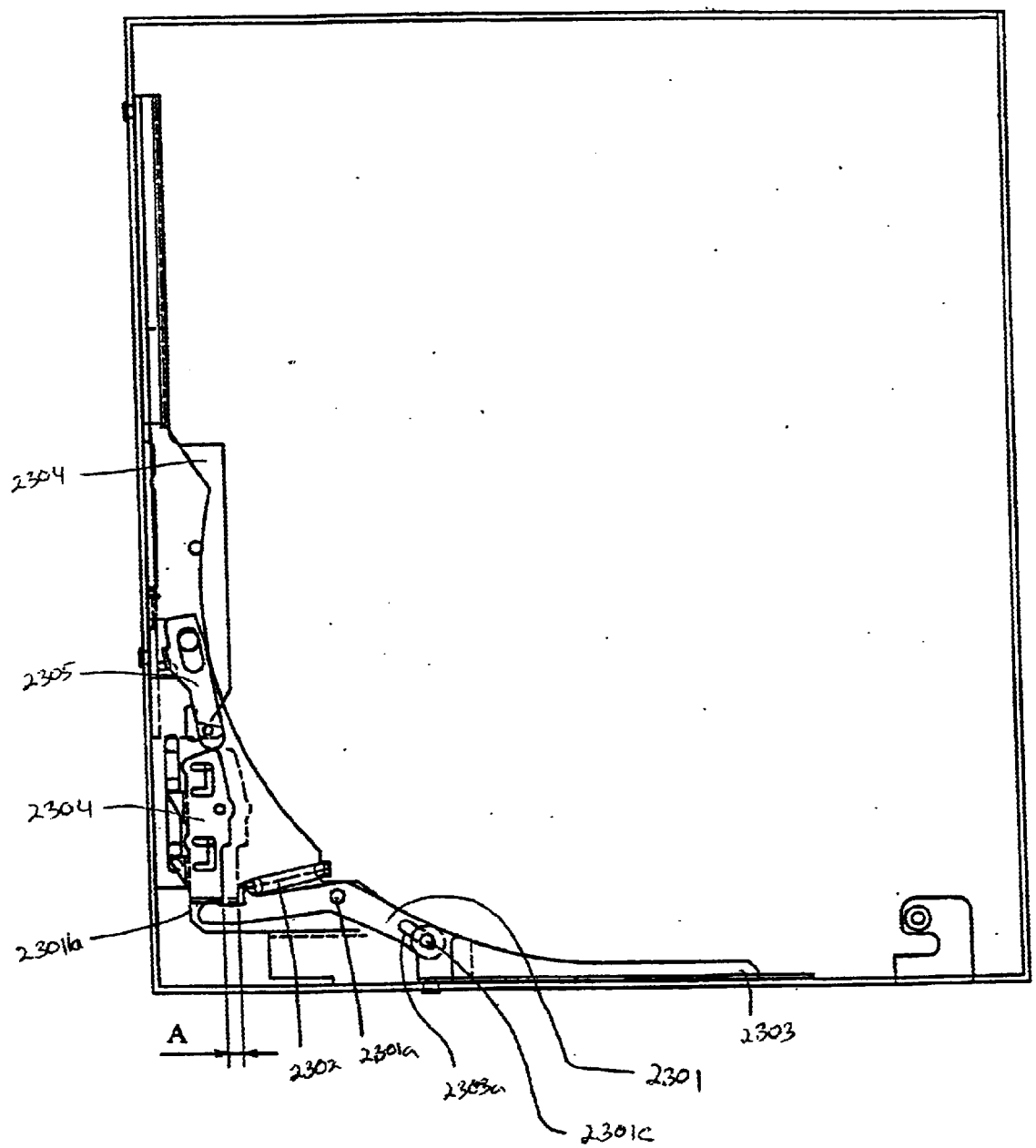
FIG. 22 shows the components of a drive force switching mechanism of the disk insertion/ejection mechanism of the disk device as shown in FIG. 1.
Figure 22B:
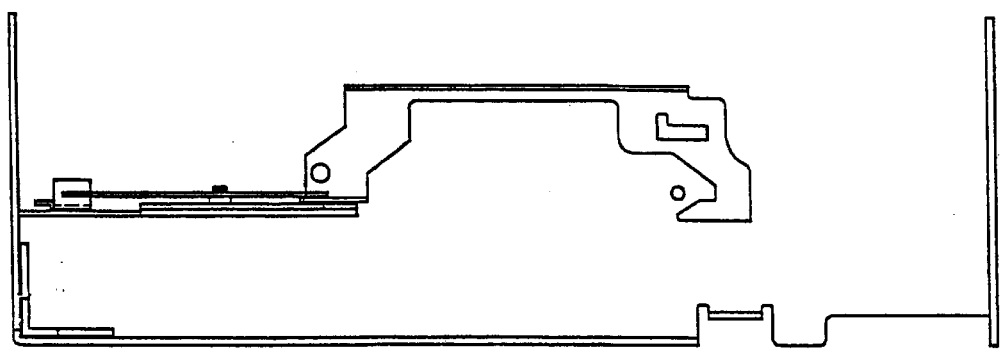
Figure 22C:
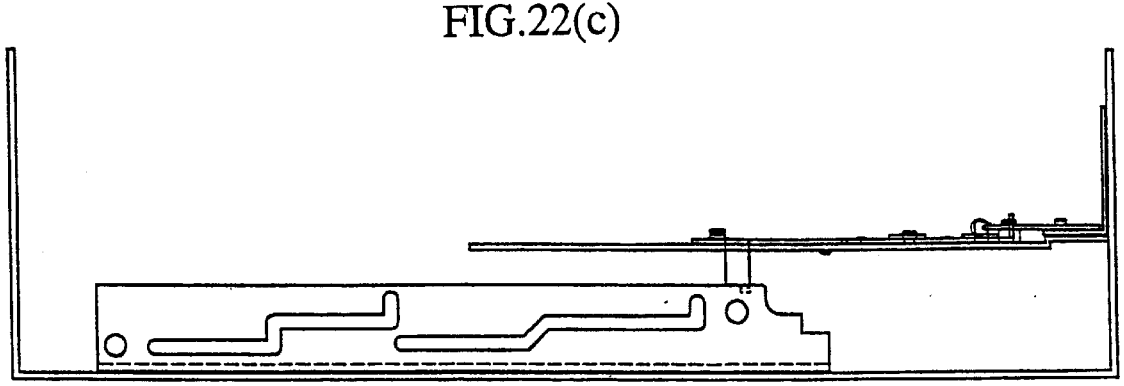

In FIG. 22, the cam plate 2304 is shown as further displaced in direction A, the engaging section 2305a of the plate 2305 completes the rotation operation of the plate 2305 by riding over the cam plate 2304.

(4. Disk Retaining Mechanism)

Figure 23A:
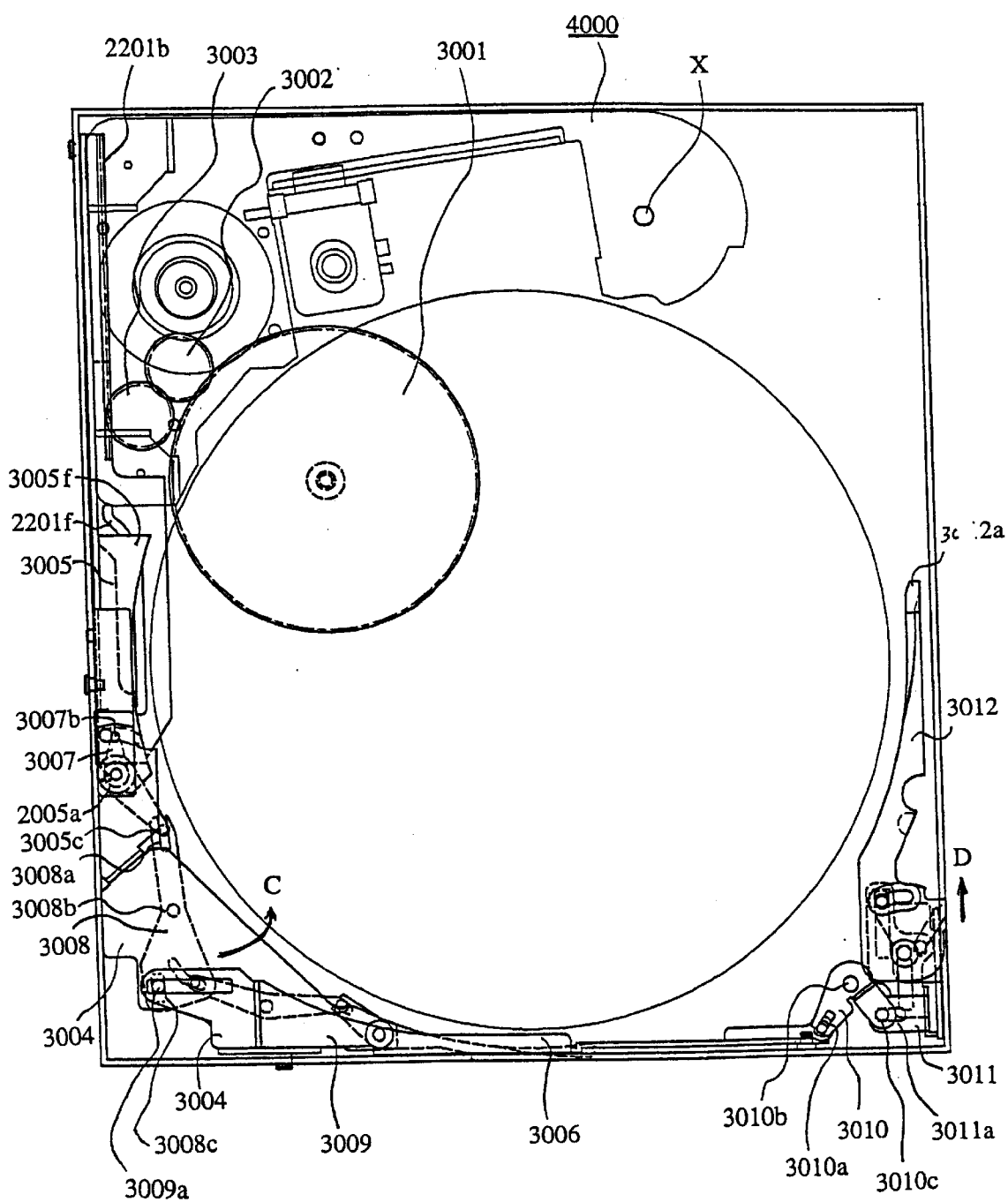
FIG. 23 is an overall view of the disk retaining mechanism of the disk device as shown in FIG. 1.
Figure 23B:
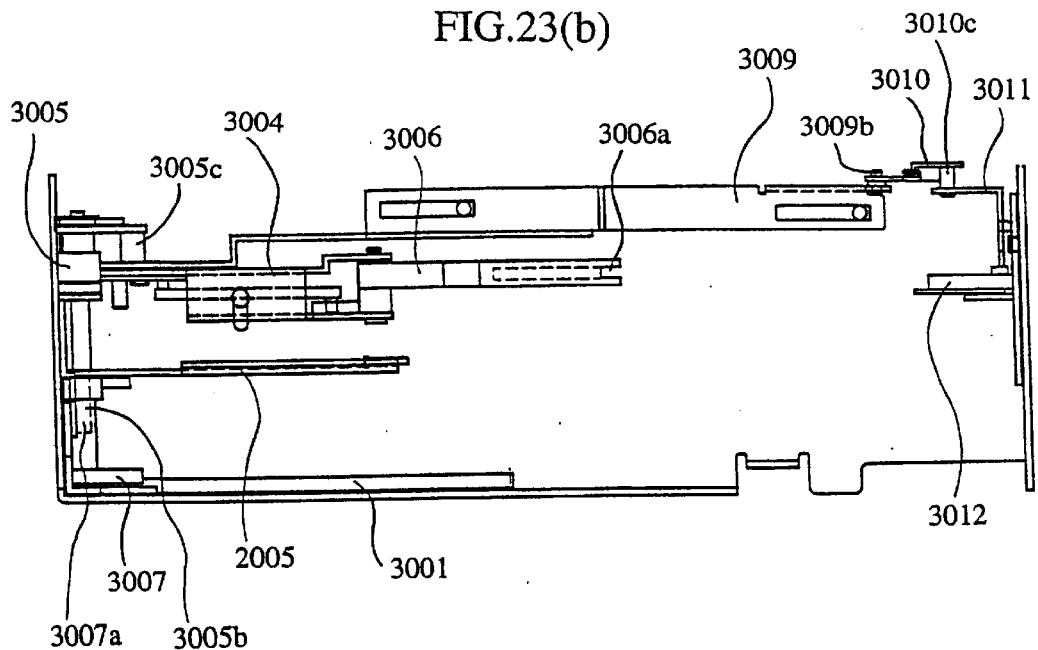
Figure 23C:
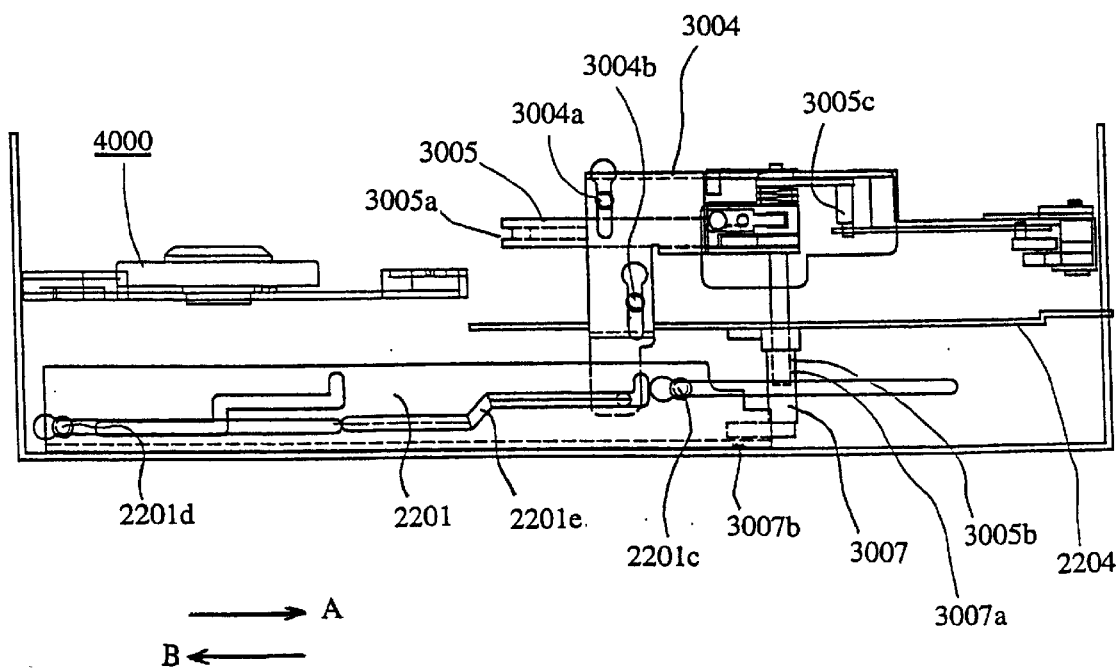

FIG. 23 is a view from the upper surface of the main components of the device. (b) is a left side view of (a) and shows inner components seen form the left side. (c) is a right side view of (a) and shows inner components seen form the right side. The structure and operation of the disk retaining mechanism 3000 will be described with reference to FIG. 23.

3001 is a gear which rotates due to a drive force from a motor (discussed below) disposed on a lower section of the disk playing mechanism 4000. The gear 3001 meshes with a gear 3002 and this gear 3002 meshes with a gear 3003. That is to say, the rotating operation of the gear 3001 is linked and the gear 3003 is adapted to rotate via the gear 3002.

FIG. 16 has already been described, however a rack section 2201b is formed which meshes with the gear 3003 on the plate 2202. Projections 2201c, 2201d are formed which are fixed with a play to be slidable respectively in the two elongated holes formed on the housing 50.

3004 is a base plate which forms an elongated hole in two positions in one corner of a lateral section on the side of the housing. Projections 3004a, 3004b are formed which are fixed with a play to slide respectively in these elongated holes. A projection 3004c is formed which is fixed with a play to slide in the elongated hole 2201e formed on the plate 2201. The base plate 3004 displaces together with the elongated hole 2201e of the plate 2201 in direction A when the plate 2201 displaces in direction A. The elongated hole 2201c inclines downwardly as a result, and the base plate 3004 also is depressed downwardly by the displacement of the plate 2201 in direction A. This is the result of the device being adapted to mount a designated disk supported by the support mechanism on the turntable (discussed below) of the disk playing mechanism which is disposed in proximity to the base plate 3004 as a result of the base plate 3004 being displaced downwardly.

First and second retaining arms 3005, 3006 are provided to rotate freely at a fixed interval on the base plate 3004. Respective grooves 3005a, 3006a are formed on the distal sections of the first and second retaining arms 3005, 3006. A section of the peripheral section of the disk engages with the grooves 3005a, 3006a and retains the disk.

Figure 24A:
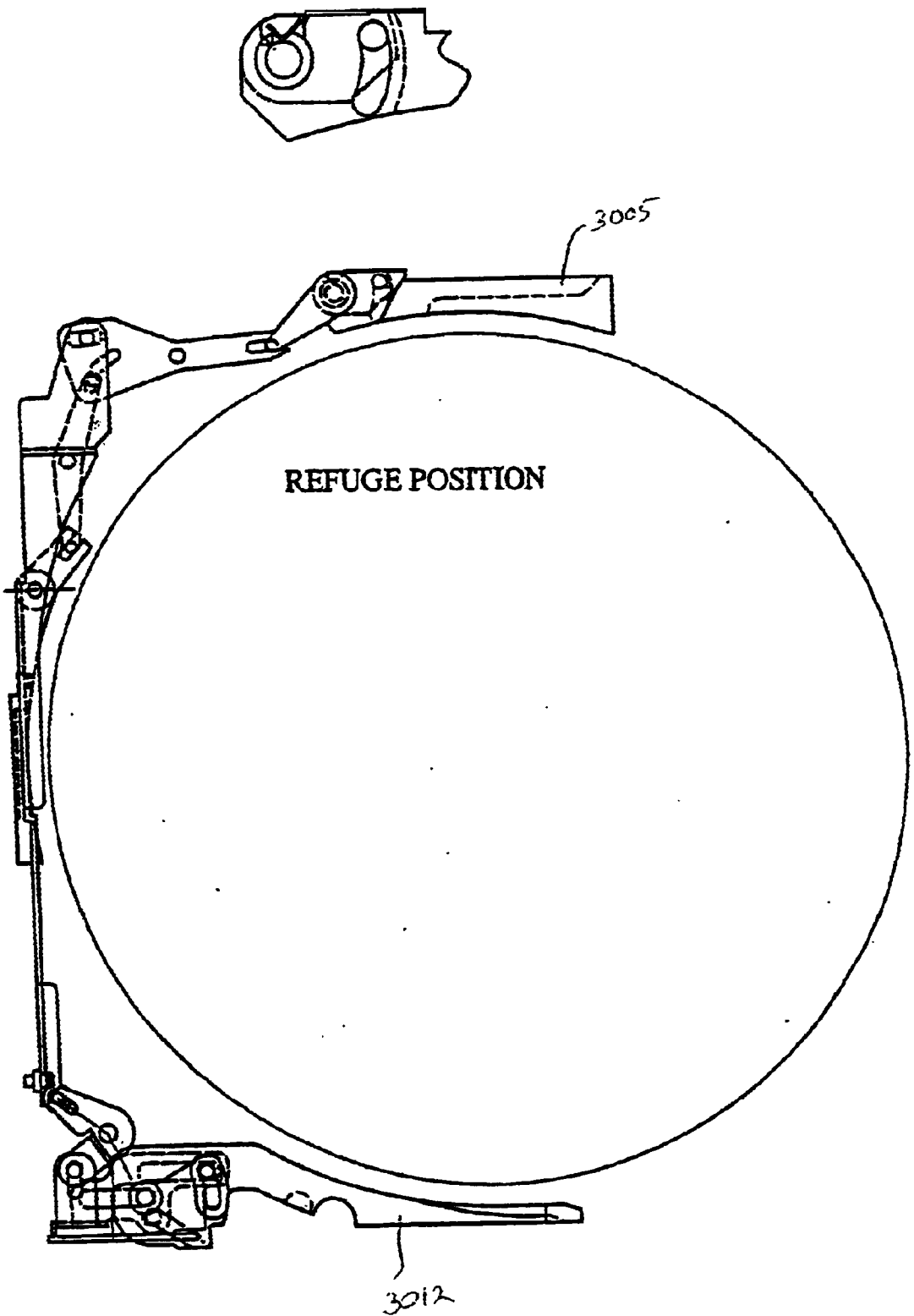
FIG. 24 is an explanatory view of the action of the components of the disk retaining mechanism of the disk device as shown in FIG. 23.
Figure 24B:
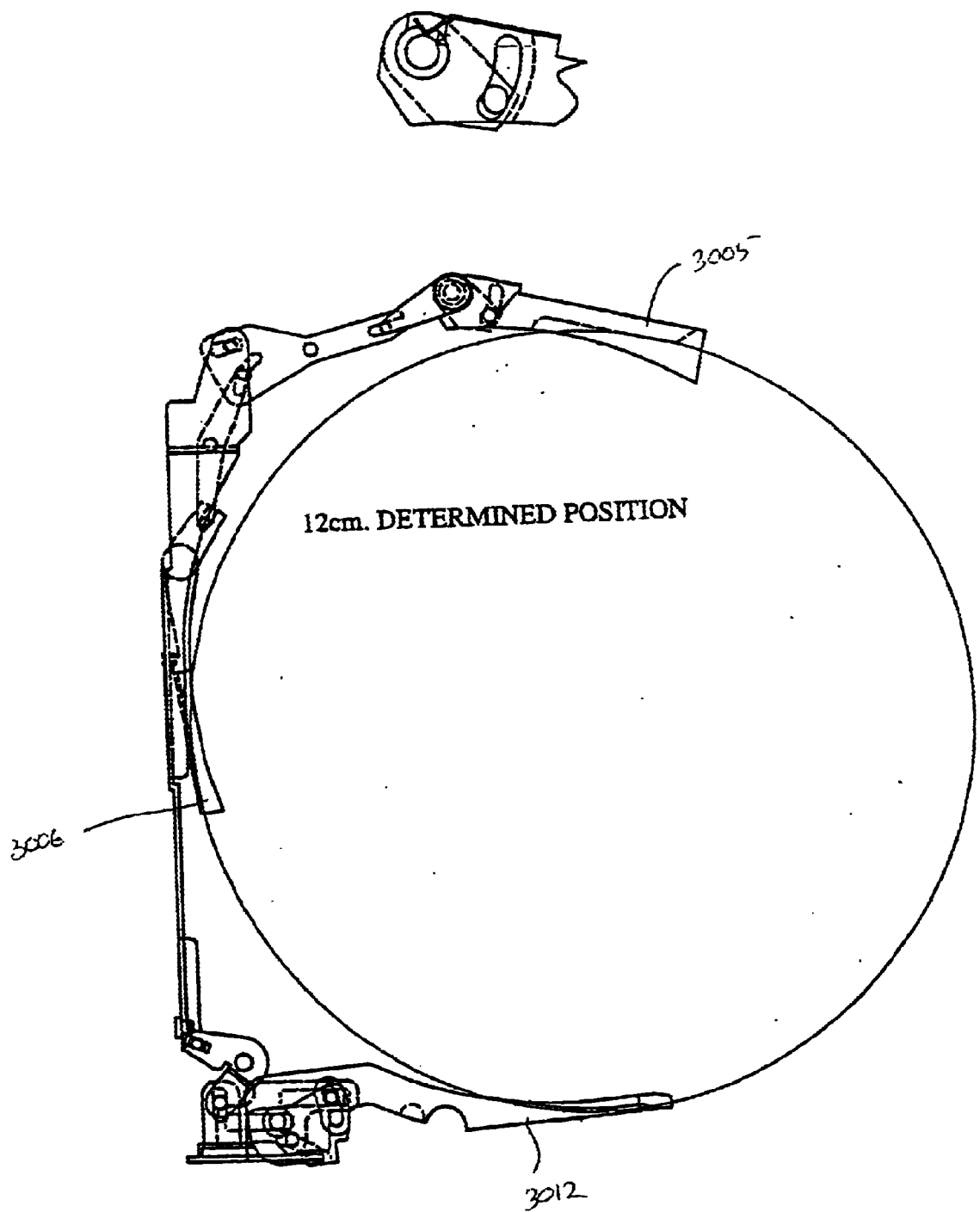
Figure 24C:
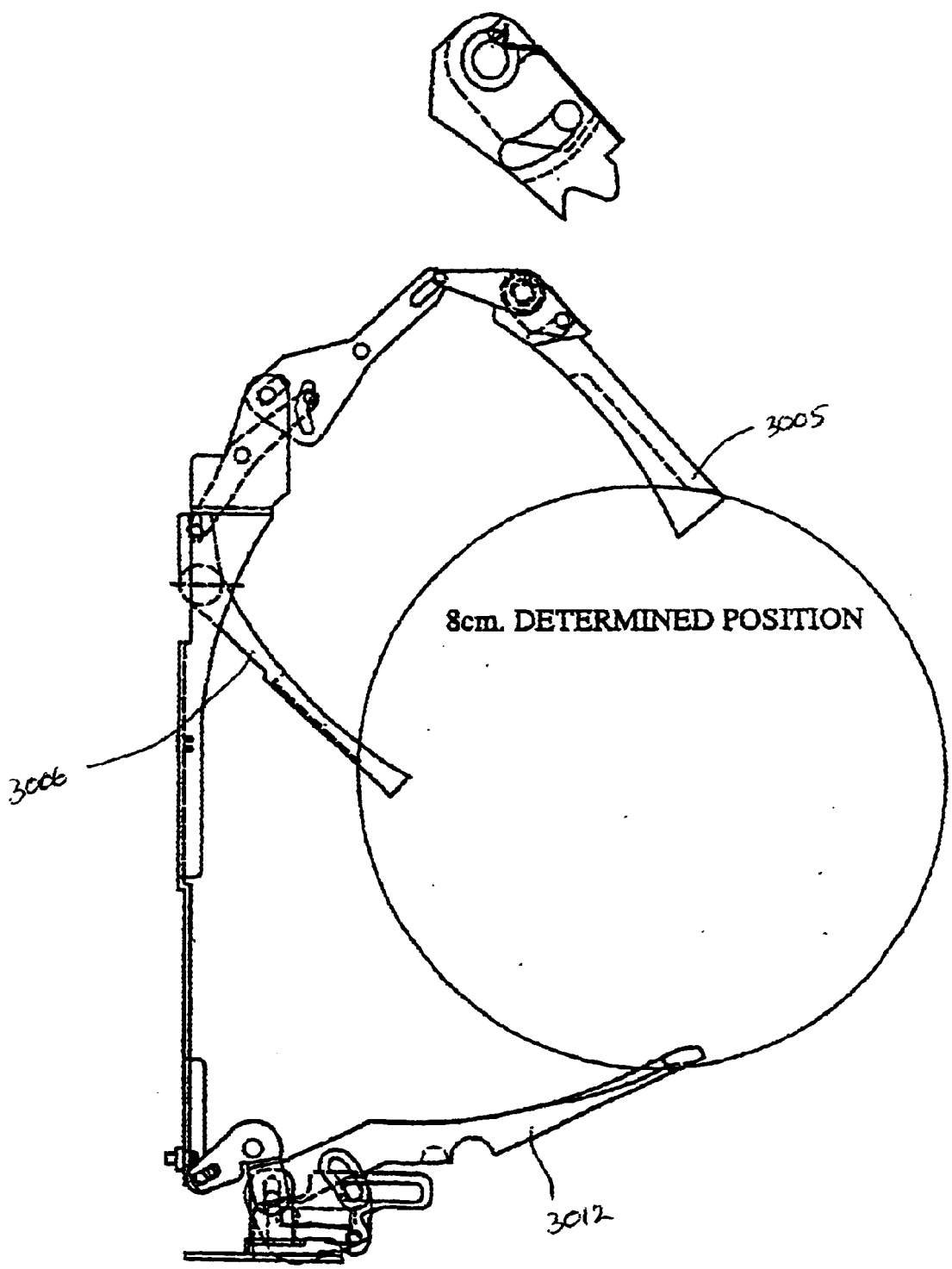
Figure 24D:
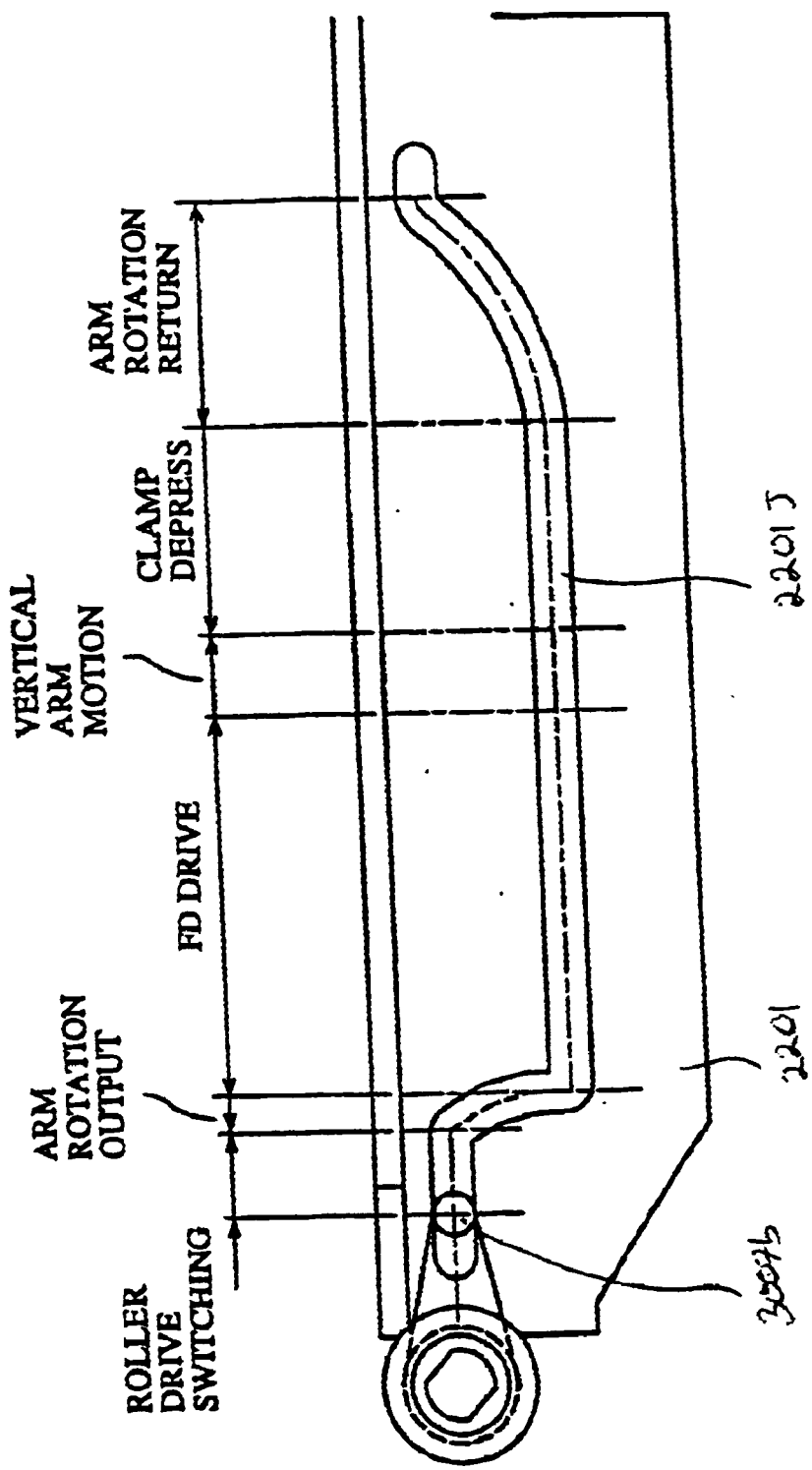

An elongated hole 2201f is formed on the plate 2201 which varies the angle of inclination so as to correspond with the respective differing operational modes as shown in FIG. 24(d), FIG. 23 (a) and FIG. 23 (e).

3007 is a freely rotating first lever on one section of which a projection is formed which is fixed with a play to slide in the elongated hole 2201f. The rotation shaft 3007a of this first lever 3007 is formed to be hollow. One section has respectively flat sections which are approximately parallel. A projection 3007b which projects in an approximately vertical direction is formed with respect to the rotation shaft on one end of the rotation shaft 3007a of the first lever 3007. The projection 3007b is fixed with a play to slide in the elongated hole 2201f of the plate 2201.

Since a plurality of angles of inclination are set for the elongated hole 2201f, the first lever 3007 rotates being linked to the displacement of the projection 3007b of the first lever 3007 in response to the angle of inclination of the elongated hole 2201f together with the displacement of the plate 2201. That is to say, when the plate 2201 displaces in direction A, the first lever 3007 rotates in a clockwise direction and when it displaces in direction B, the first lever 3007 rotates in an anti-clockwise direction.

A rotation shaft 3005b is formed on the first retaining arm 3005 which is housed in the hollow section 3007a of the first lever 3007. A projection 3007c is formed on the other end. One section of the rotation shaft 3005b forms respectively flat sections which are approximately parallel. The rotation operation of the first lever 3007 is linked and performs the rotation of the first retaining arm as the flat sections formed on the rotation shaft 3005b of the first retaining arm 3005 and the flat section 3007a formed on the hollow section of the first lever 3007 are engaged. Since the first retaining arm 3005 and the first lever 3007 have the above relationship, the first retaining arm is adapted to displace in the direction of the rotation shaft with respect to the first lever 3007.

That is to say, the first lever 3007 comprises a section of the disk position determination mechanism and the disk position determination mechanism itself does not displace in the axial direction, or conversely does not displace in a rising direction. On the other hand, the first retaining arm 3005, and the second retaining arm 3006 are adapted to displace in the axial direction.

3008 is a second lever on one end of which an elongated hole 3008a is formed which loosely fixes a projection 3005c formed on said first retaining arm 3005 so that the projection can slide. The second lever 3008 is formed to rotate about a rotation shaft 3008b. The second lever 3008 is adapted to rotation in an anti-clockwise direction being linked to the rotation of the first lever 3007 in a clockwise direction.

3009 is a third lever forming a projection 3009a on one end and a projection 3009b on another end. The projection 3009a of the third lever 3009 is fixed loosely to slide in an elongated hole 3008c formed on the second lever 3008 and displaces in direction C being linked to the displacement of the second lever 3008 in an anti-clockwise direction.

3010 is a fourth lever forming on one end an elongated hole 3010a which loosely fixes a projection 3009b formed on the third lever 3009 so that the projection 3009b can slide. The fourth lever 3010 can rotate about a rotation shaft 3010b. When the third lever 3009 displaces in the direction C, the fourth lever 3010 is linked to the displacement and rotates in an anti-clockwise direction.

3011 is a fifth lever forming an elongated hole 3011a on one end. The elongated hole 3011a loosely fixes a projection 3010c which is formed on the other end of the fourth lever 3010 in a slidable position.

3012 is a third retaining arm forming a groove 3012a which retains a disk. The front section of the third retaining arm 3012 engages with a peripheral section of the disk. The third retaining arm 3012 is linked to the displacement of the fifth lever 3011 in direction D and rotates in an anti-clockwise direction.

4000 is a disk playing mechanism which plays a disk. Since the optical pickup and the turntable provided in order to perform playing of the disk will be described in detail below further description will be omitted.

The disk playing mechanism 4000 is adapted to rotate in an anti-clockwise direction about a rotation axis X and to be linked to the rotation of the gear 3001. That is to say, the respective displacement of disk retaining mechanism 3000 and the disk playing mechanism 4000 are adapted to be synchronized.

Figure 25A:
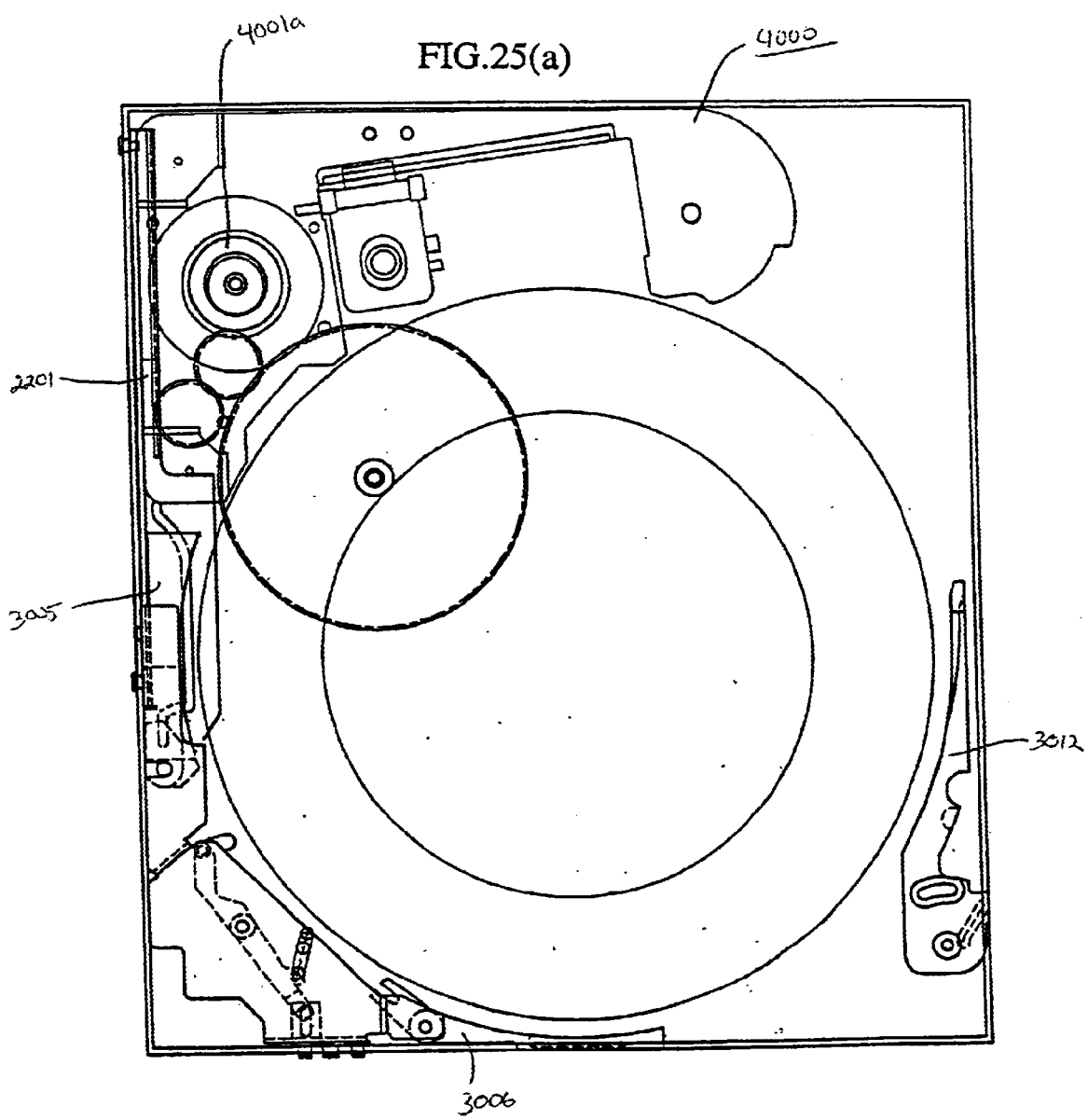
FIG. 25 is an explanatory view of the action of the disk retaining mechanism of the disk device as shown in FIG. 1.
Figure 25B:
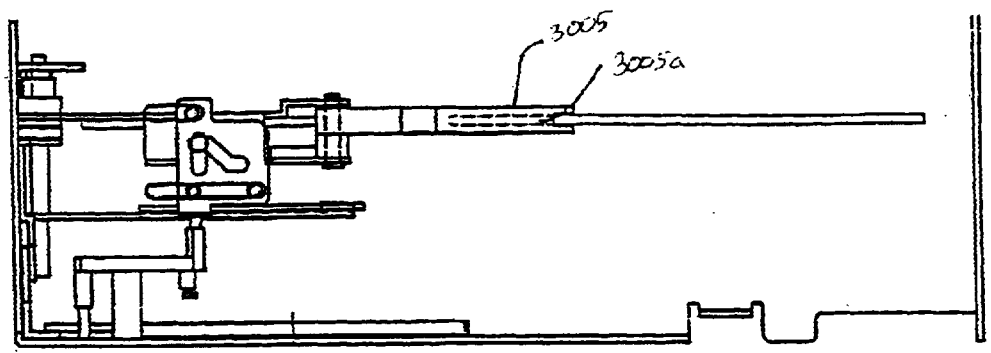
Figure 25C:
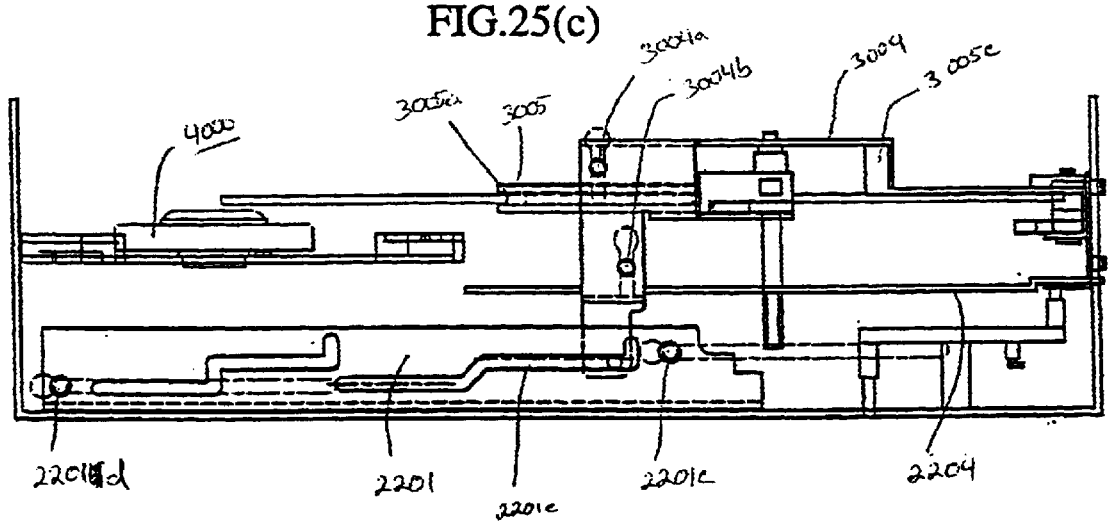
Figure 26A:
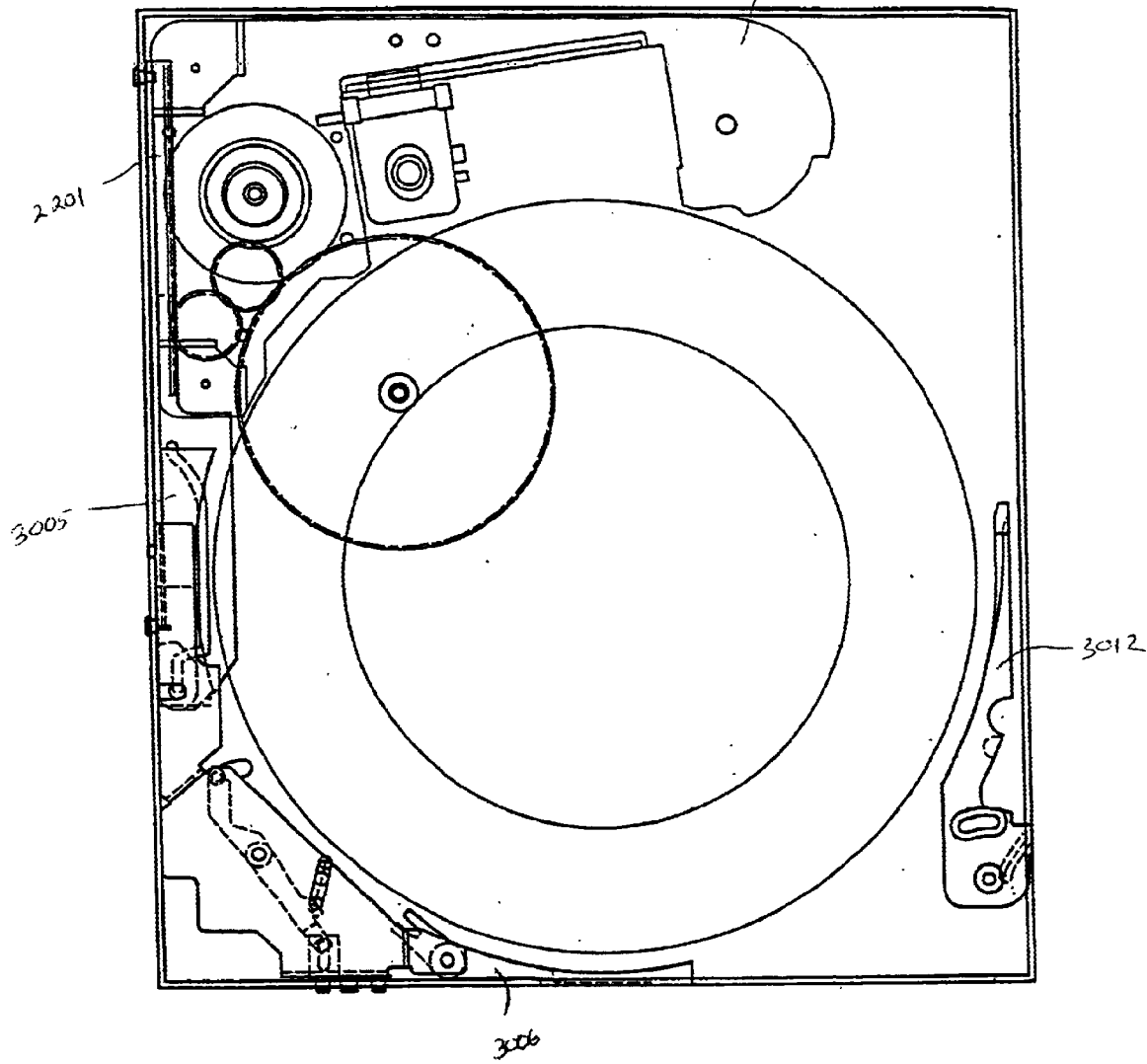
FIG. 26 is an explanatory view of the action of the disk retaining mechanism of the disk device as shown in FIG. 1.
Figure 26B:
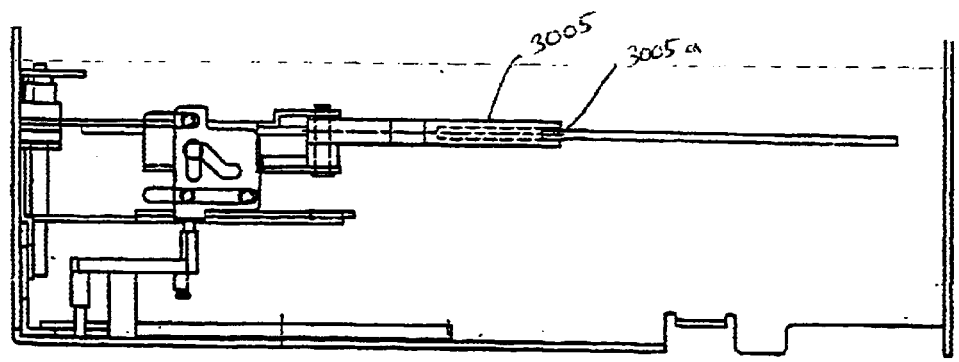
Figure 26C:
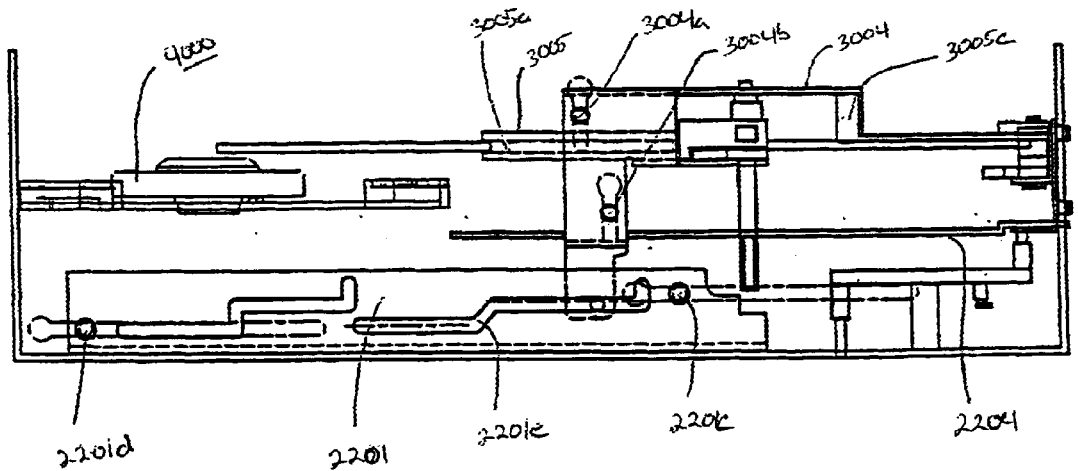

Next the operation of the disk retaining mechanism will be described with reference to FIG. 25 to FIG. 32. In FIG. 25 and FIG. 26, a disk inserted through the disk insertion/ejection mechanism 2000–1000 is placed in a determined position by the disk position determination mechanism 2000. The disk retaining arms 3005, 3006 and 3012 for refuge to a refuge position and the disk playing mechanism 4000 also refuges to a refuge position.

Figure 27A:
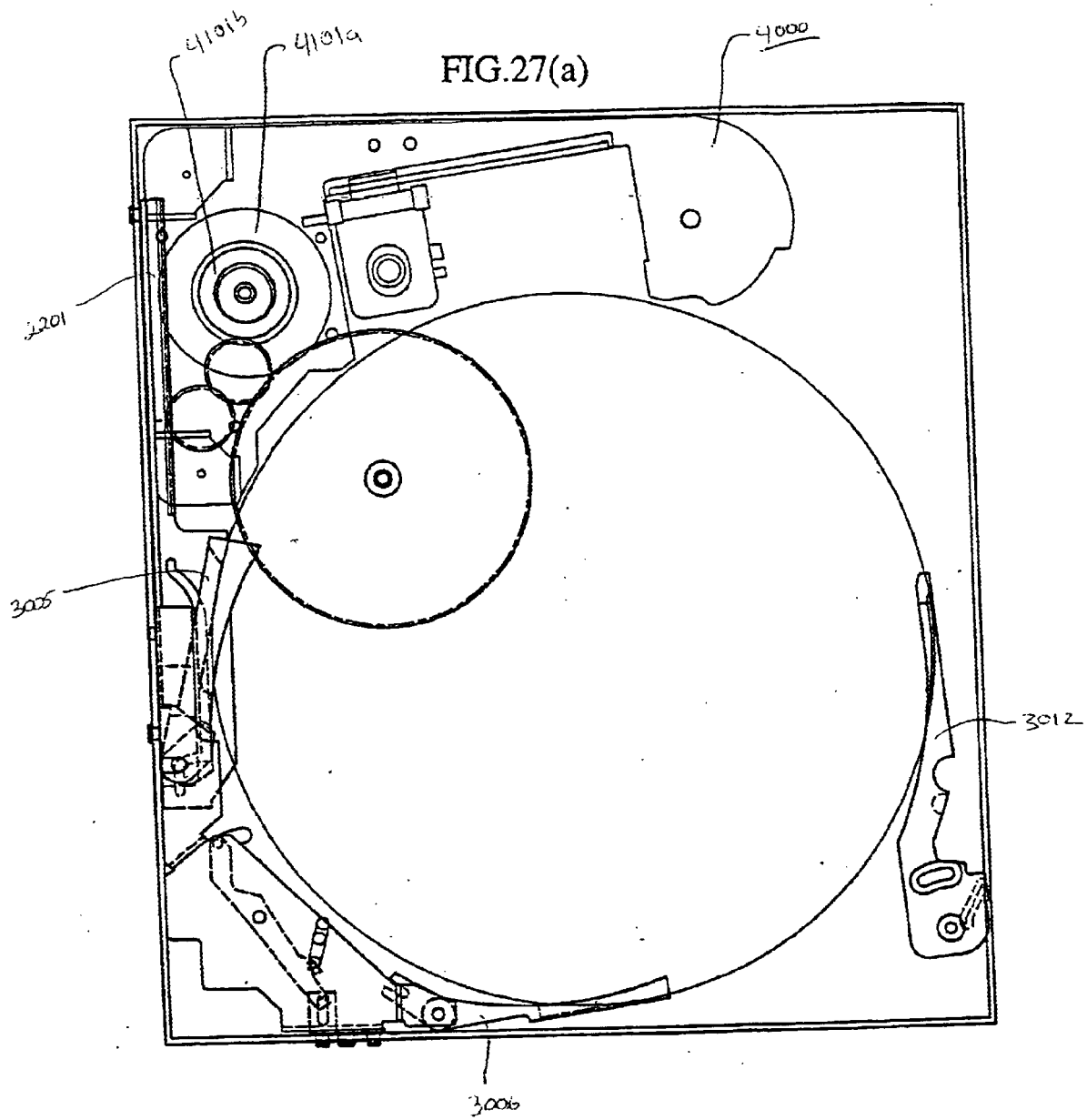
FIG. 27 is an explanatory view of the action of the disk retaining mechanism of the disk device as shown in FIG. 1.
Figure 27B:
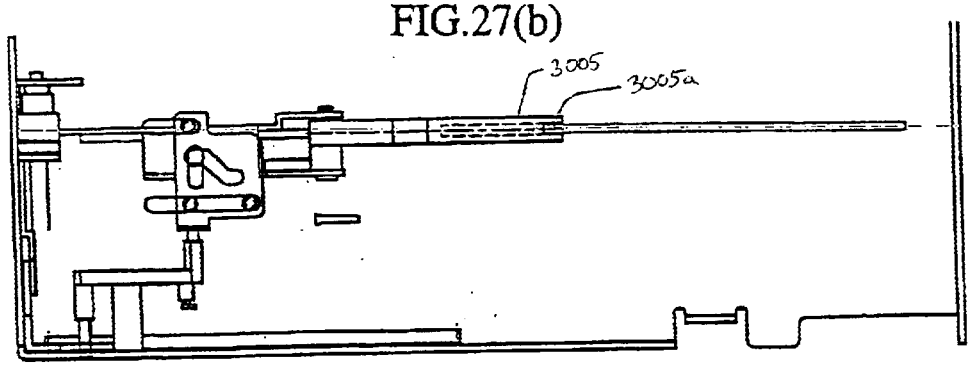
Figure 27C:
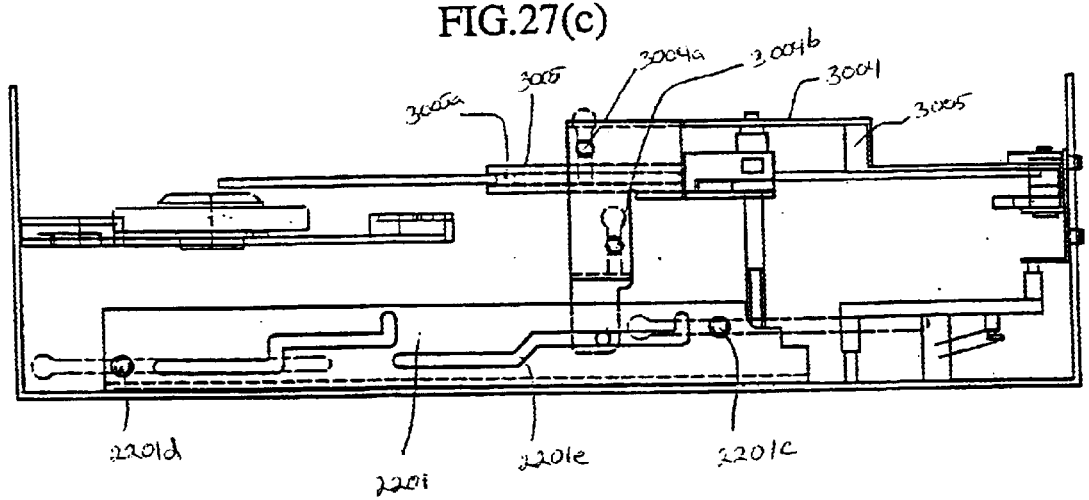
Figure 28A:
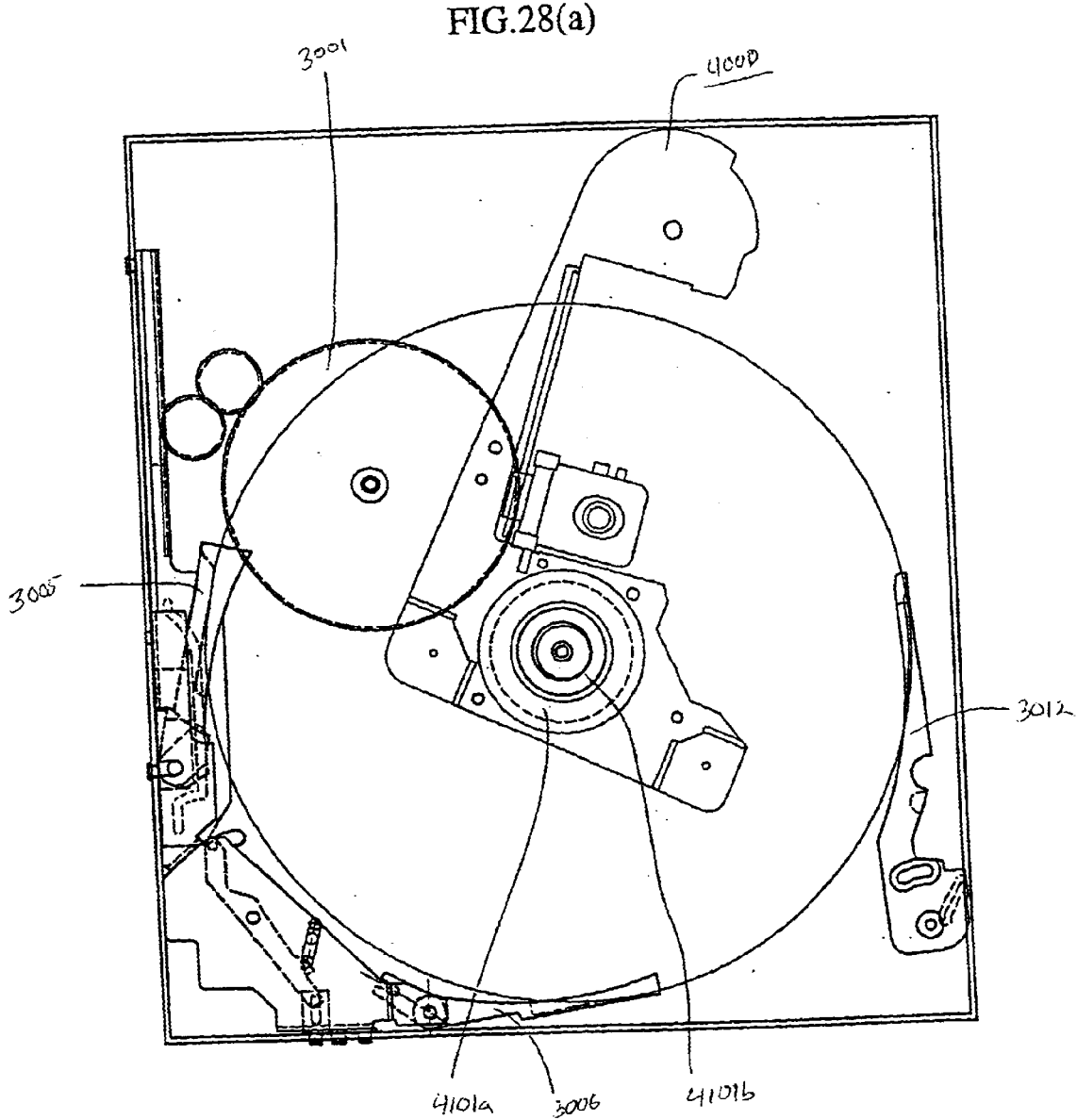
FIG. 28 is an explanatory view of the action of the disk retaining mechanism of the disk device as shown in FIG. 1.
Figure 28B:
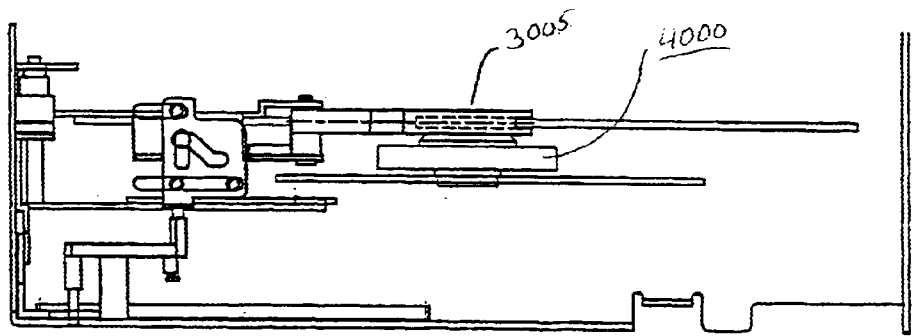
Figure 28C:
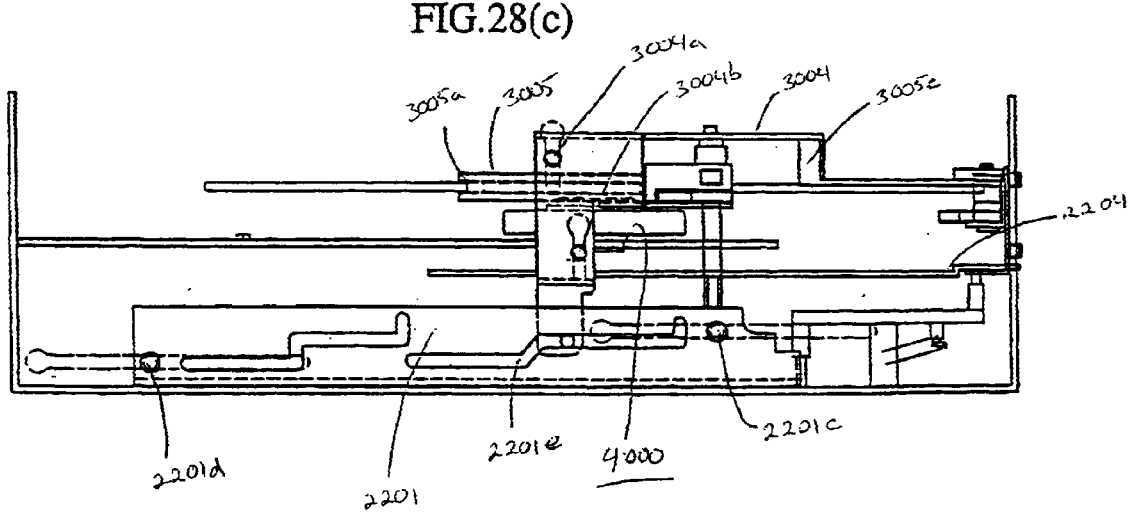

In FIG. 27, the cam plate 2201 is displaced in direction A due to a drive force (discussed below) transmitted from the disk playing mechanism 4000. The disk retaining mechanism 3000 rotates approximately parallel to the face of the disk towards the disk and retains a section of the outer periphery of the disk. In FIG. 28, the cam plate 2201 is further displaced in direction A and the disk playing mechanism 4000 rotates in an anti-clockwise direction and displaces to a disk playing position from the refuge position. At this point, the rotational axis of the turntable 4101a (discussed below) and the rotational axis of the disk supported by the disk retaining mechanism 3000 are in alignment.

Figure 29A:
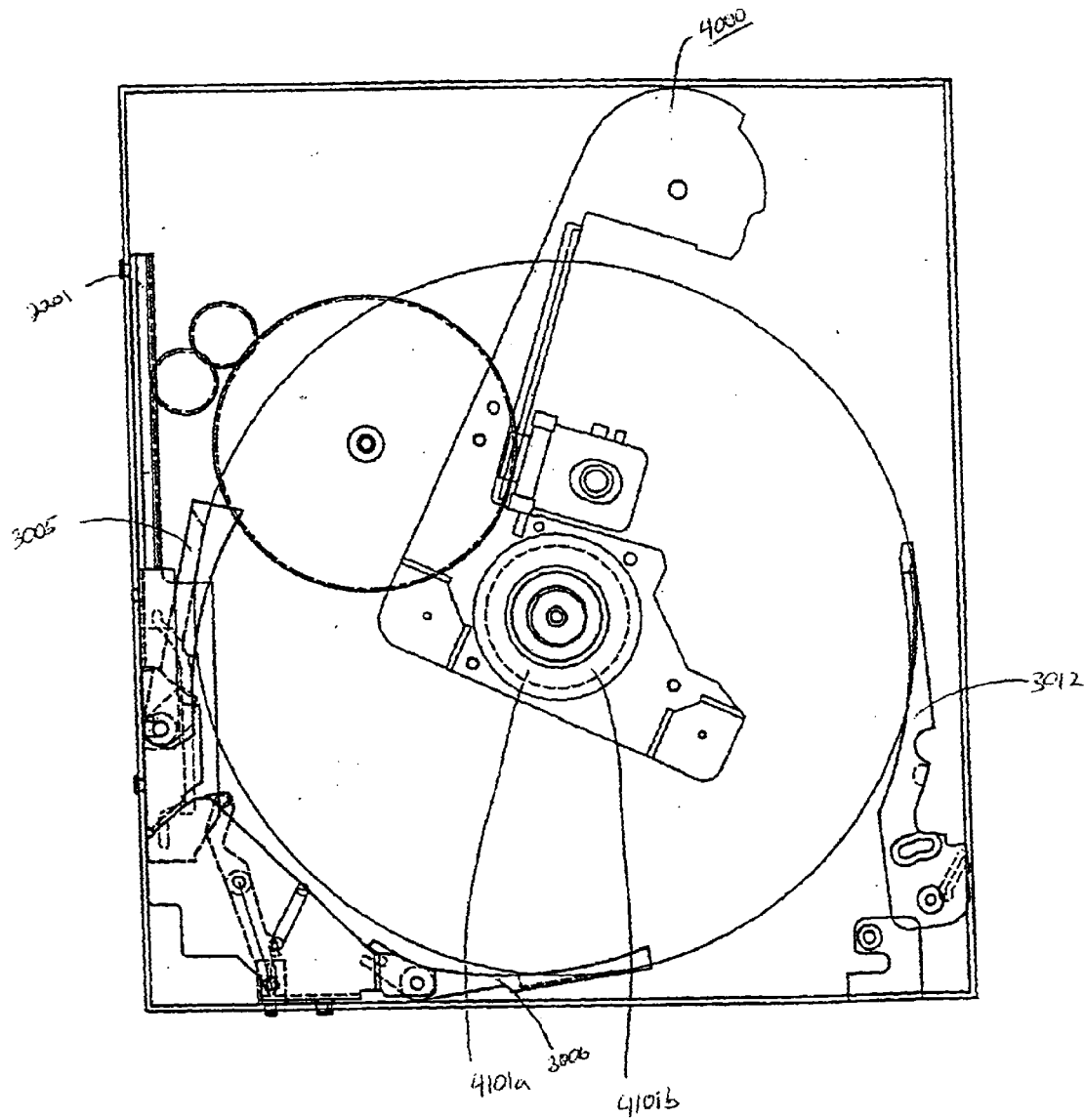
FIG. 29 is an explanatory view of the action of the disk retaining mechanism of the disk device as shown in FIG. 1.
Figure 29B:
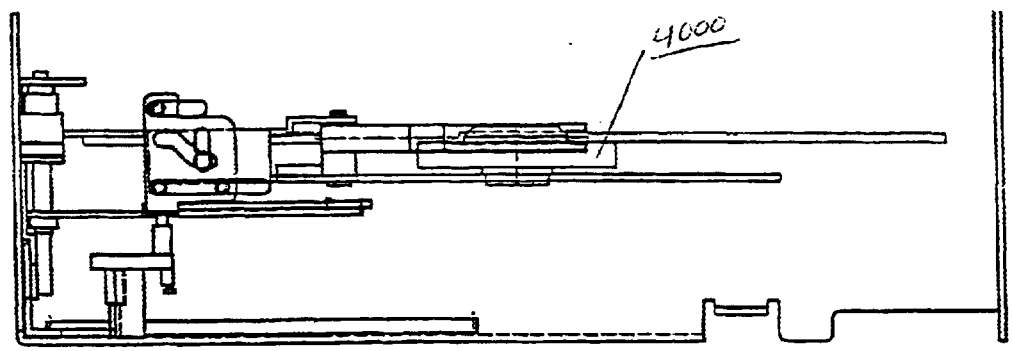
Figure 29C:
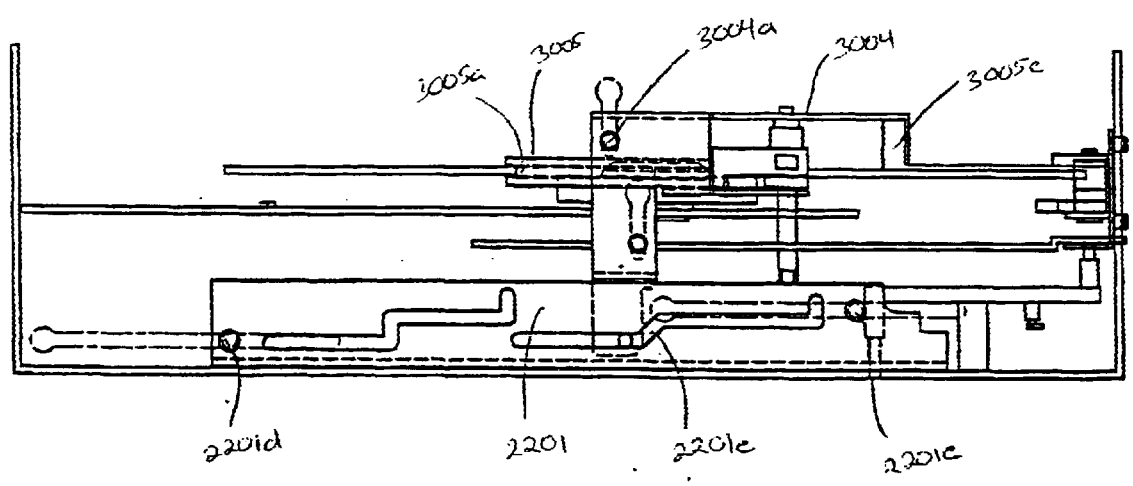

In FIG. 29, the cam plate 2201 displaces further in direction A and the disk retaining mechanism 3000 displaces towards the turntable 4101a, that is to say, is displaced upwardly. In this way, inner diameter of the disk engages with the engaging section (discussed below) formed on the turntable 4101a and the mounting operation on the turntable 4101a is completed.

Figure 30A:
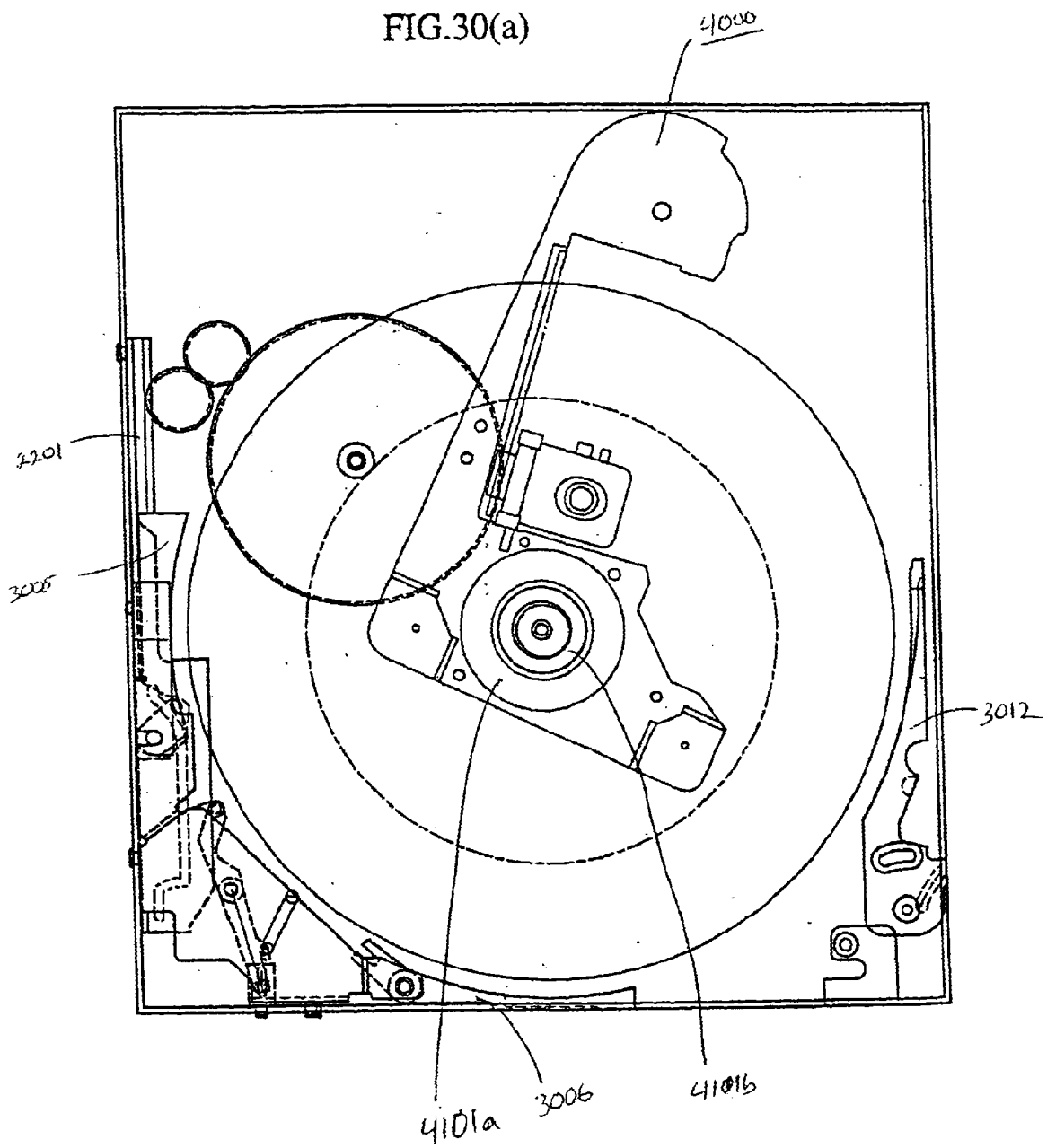
FIG. 30 is an explanatory view of the action of the disk retaining mechanism of the disk device as shown in FIG. 1.
Figure 30B:
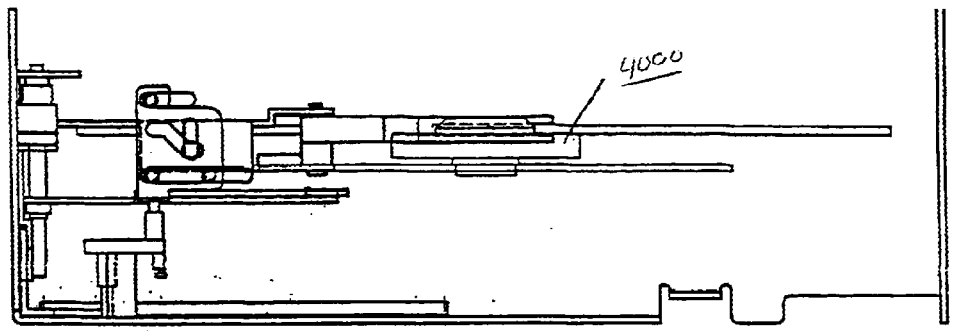
Figure 30C:
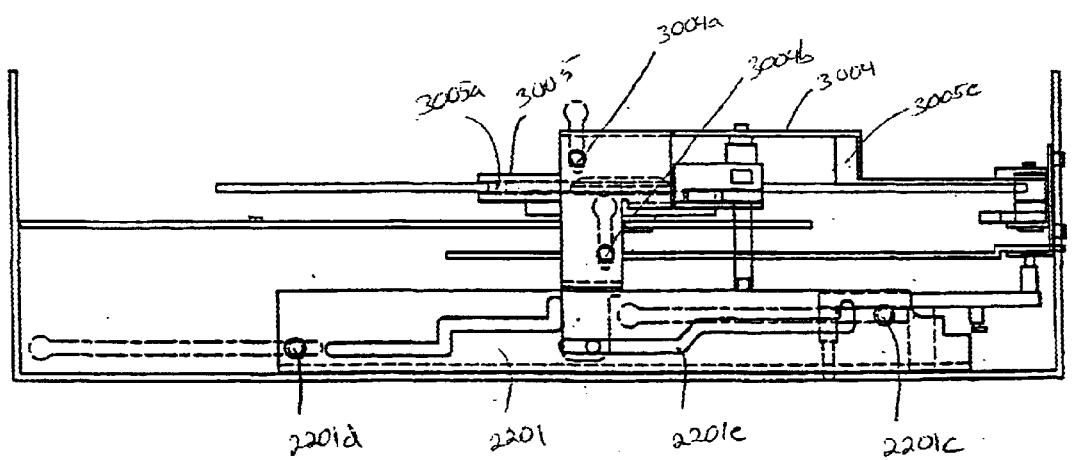

In FIG. 30, the cam plate 2201 displaces further in direction A and the clamp mechanism 4200 of the disk playing mechanism 4000 clamps the disk. After clamping, the retaining arms 3005, 3006, 3012 of the disk retaining mechanism 3000 displace to a refuge position, and after displacement to the refuge position, the lock of the fixed disk playing mechanism is released and is in a floating state. After completion of the operation of lock release, the disk playing operation is commenced.

The contents of the description above were based on the operation using a large diameter disk (for example a 12 cm disk). However below the description of the operation with respect to a small diameter disk (for example a 8 cm disk) will only detail the points of difference to the large diameter disk operation.

Figure 31A:
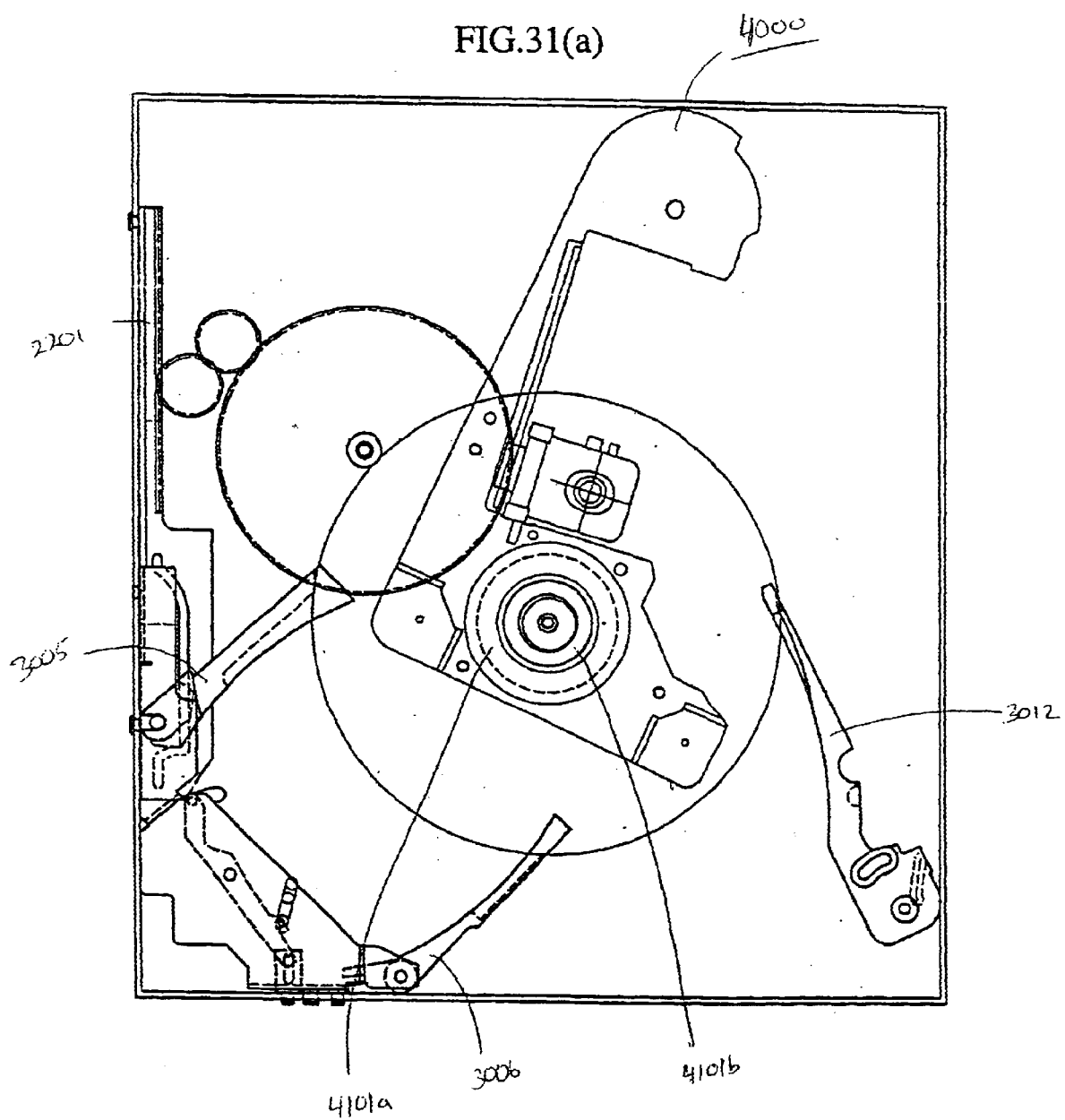
FIG. 31 is an explanatory view of the action of the disk retaining mechanism of the disk device as shown in FIG. 1.
Figure 31B:
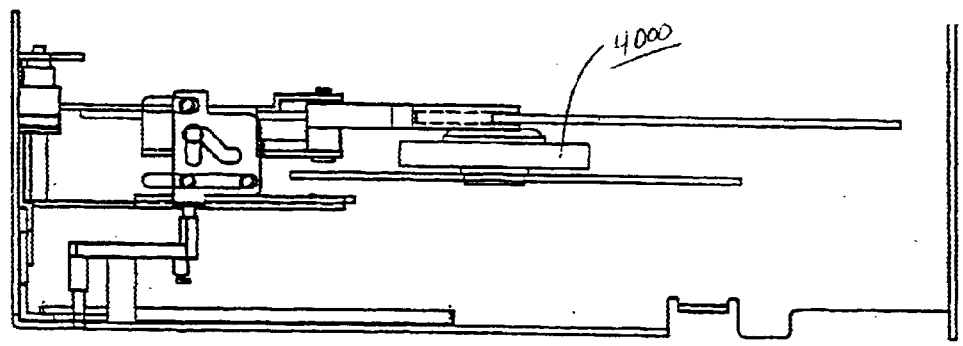
Figure 31C:
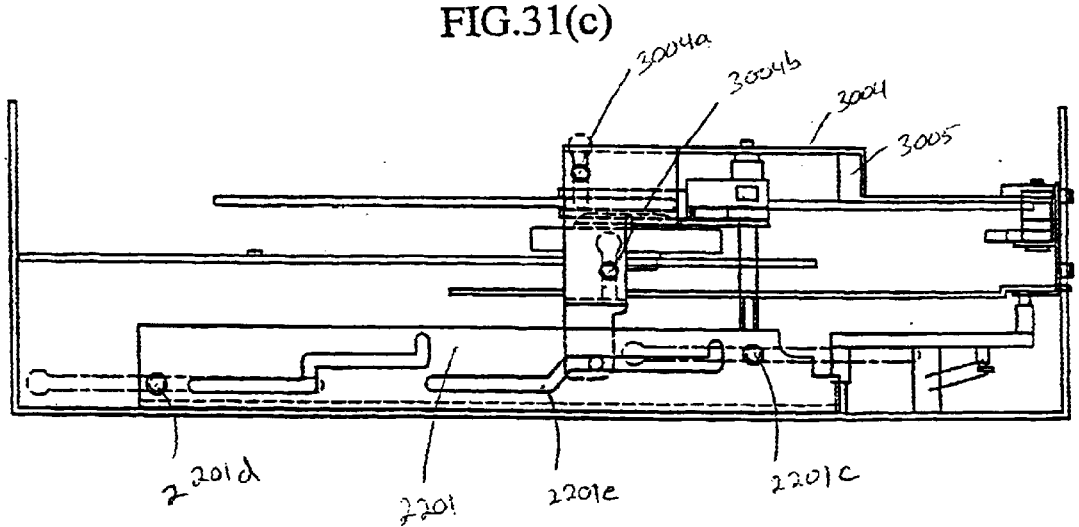
Figure 32A:
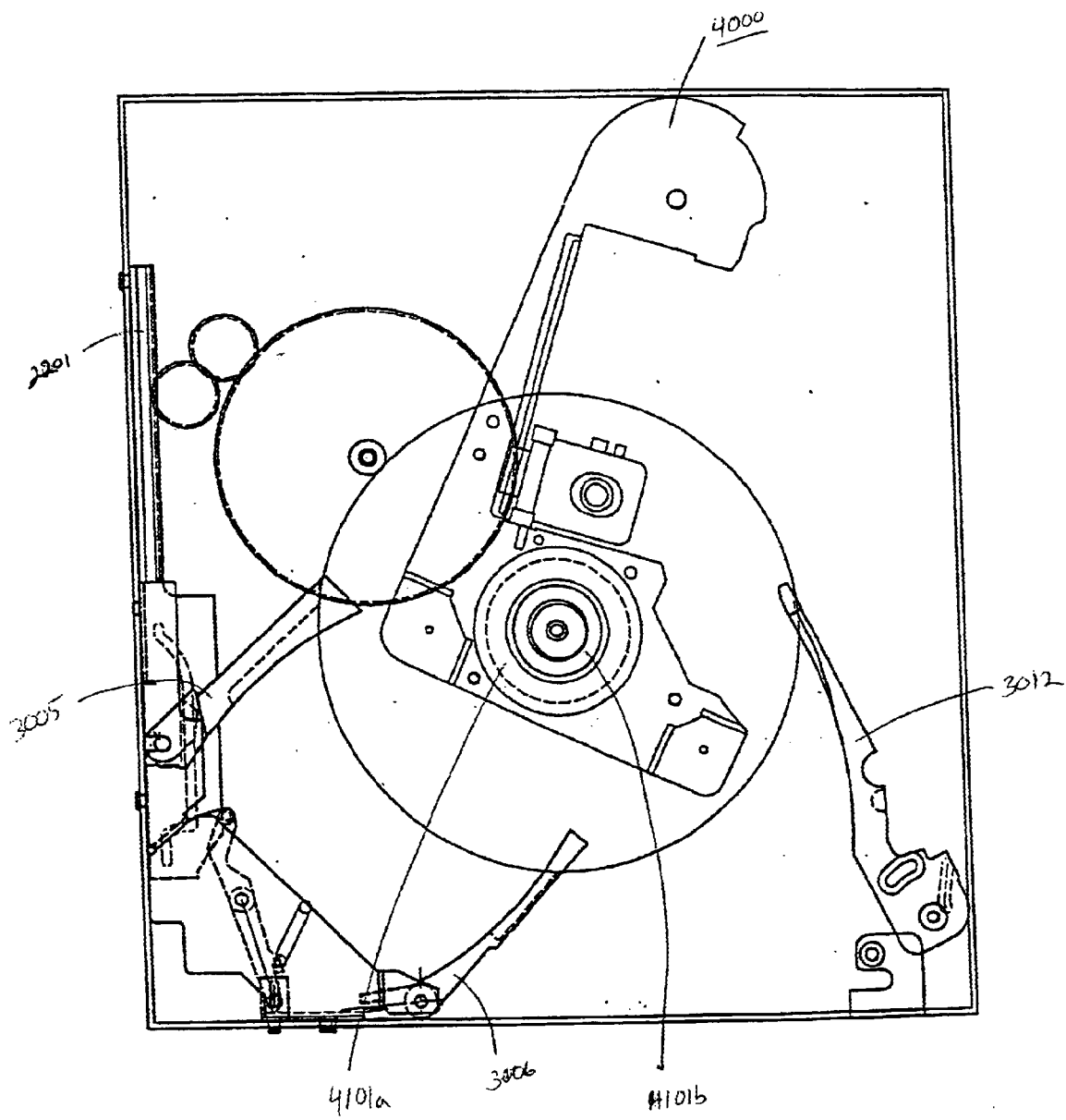
FIG. 32 is an explanatory view of the action of the disk retaining mechanism of the disk device as shown in FIG. 1.
Figure 32B:
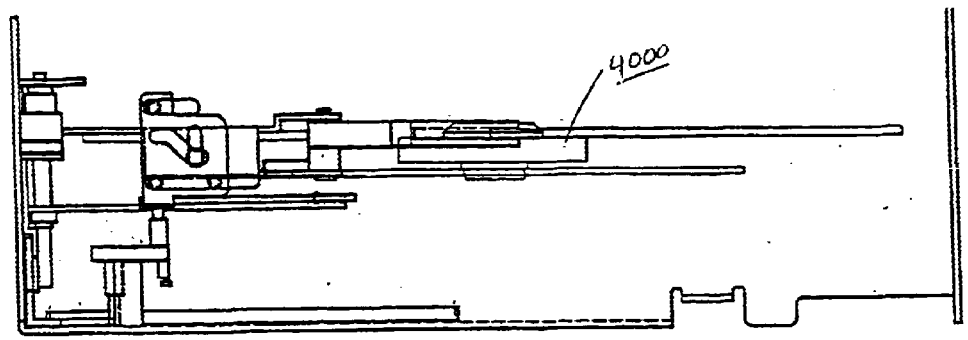
Figure 32C:
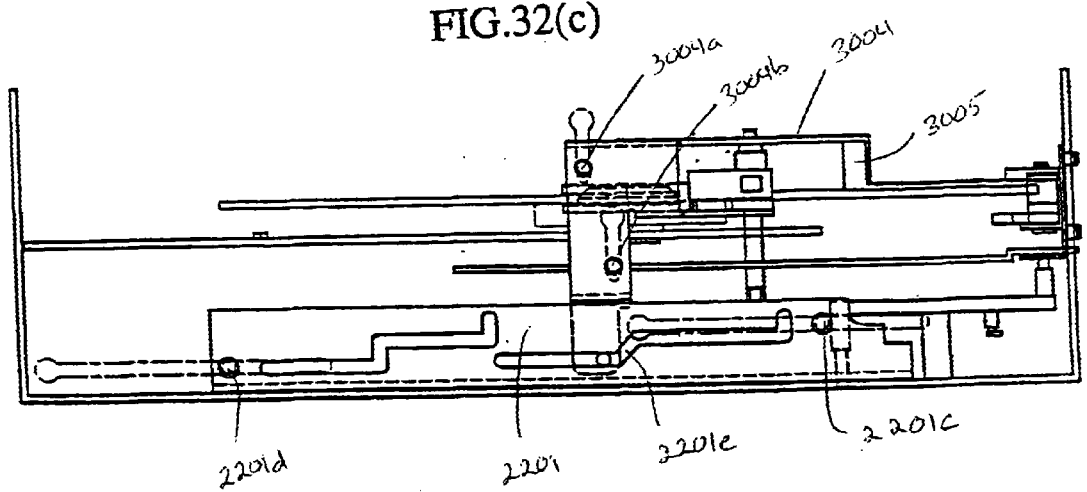

In contrast to the large diameter disk operation as shown in FIG. 28 and FIG. 29, the small disk operation is shown in FIG. 31 and FIG. 32. In these figures, the rotation displacement amount of the retaining arms 3005, 3006, 3012 is increased in order to support the outer periphery of the disk.

(5. Disk Playing Mechanism)

Figure 33:
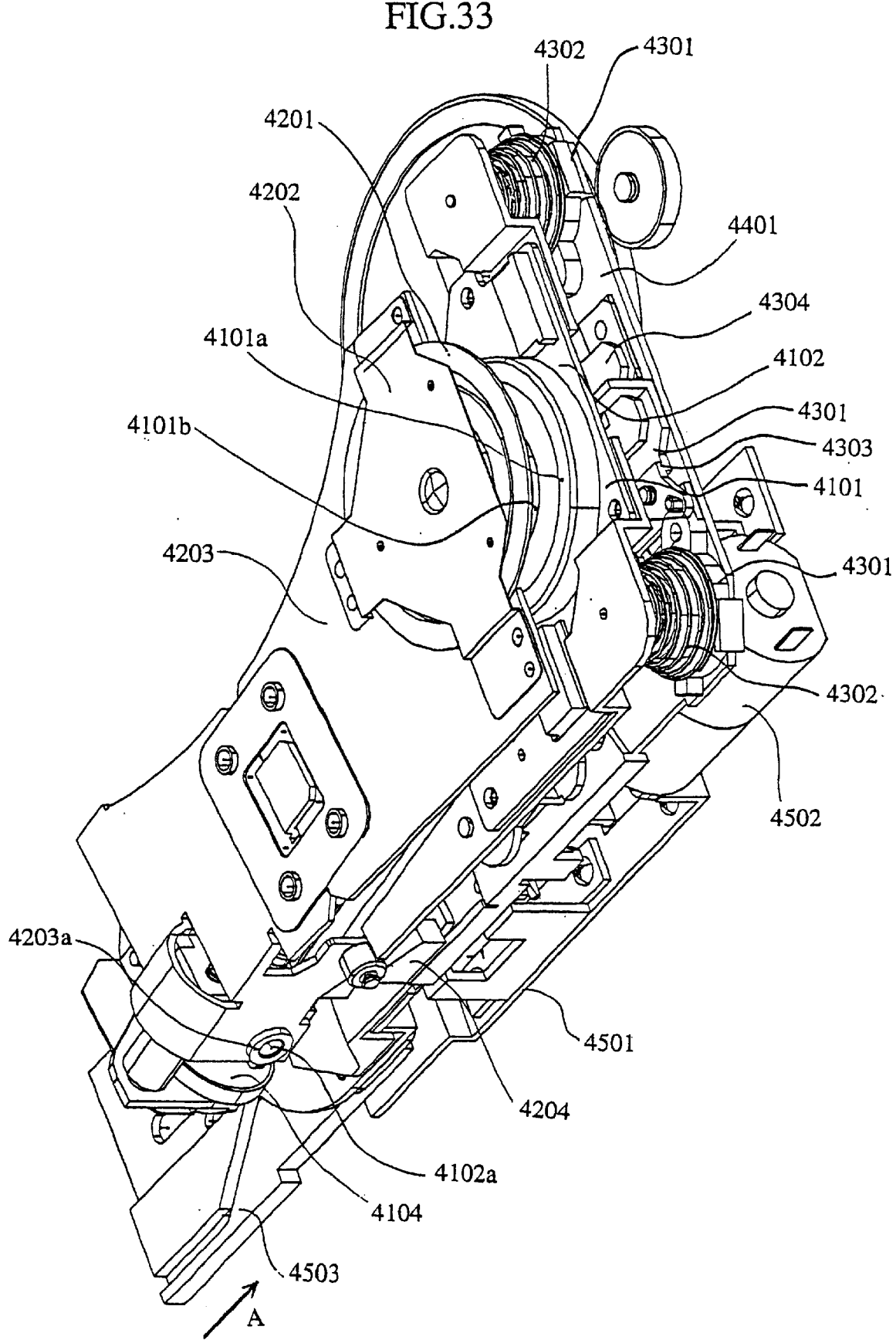
FIG. 33 is an overall view of a disk playing mechanism of the disk device as shown in FIG. 1.
Figure 34:
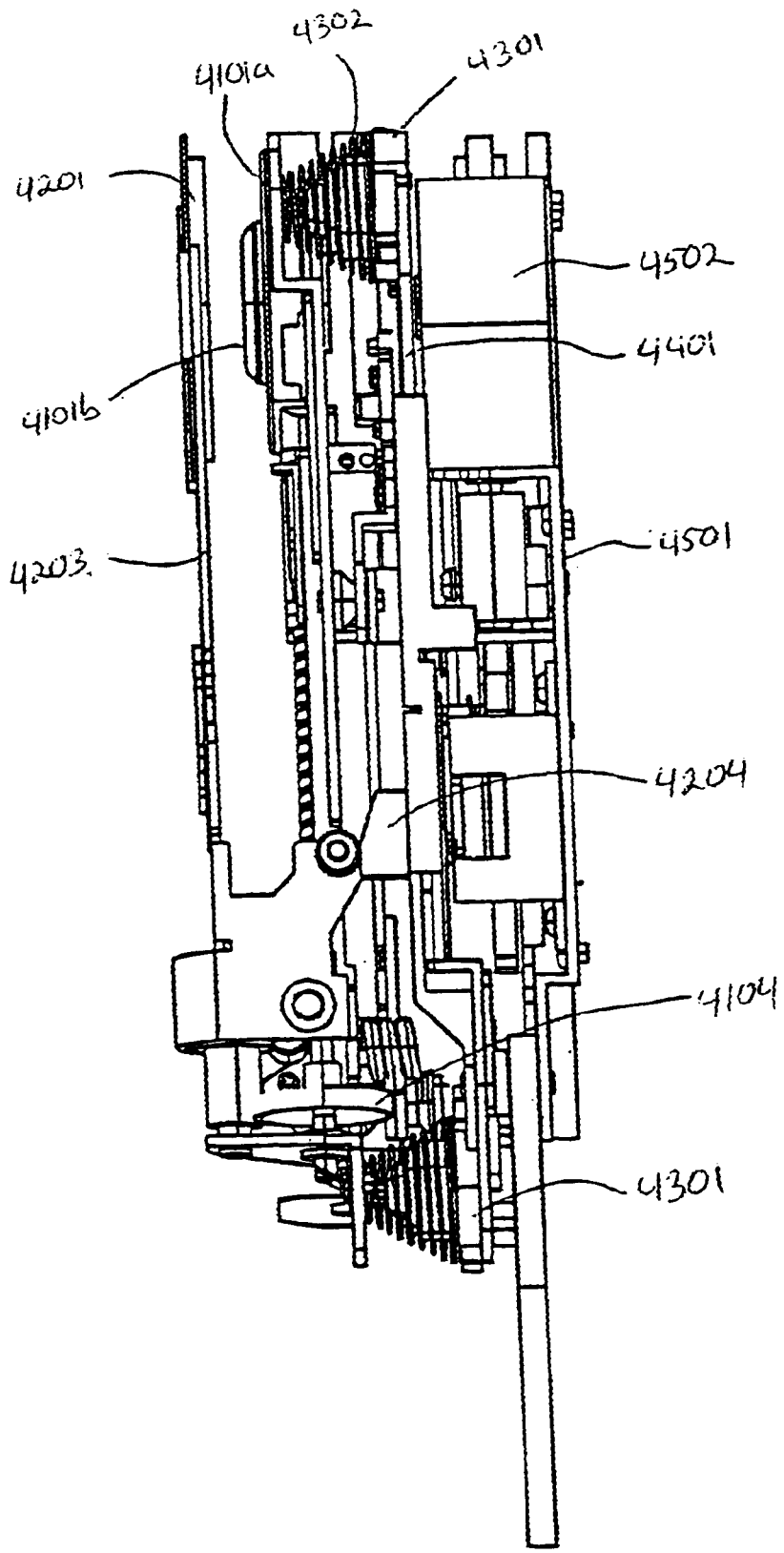
FIG. 34 is an overall view of a disk playing mechanism of the disk device as shown in FIG. 1.

FIG. 33 is a perspective view of component of the device according to the present invention. The operation and structure of the disk playing mechanism 4000 will be described with reference to FIG. 33.

The disk playing mechanism 4000 is divided into the five following mechanisms, that is to say, the playing mechanism 4100, the clamp mechanism 4200, the fixing mechanism 4300, the rotation mechanism 4400 and the base mechanism 4500.

Firstly, the playing mechanism 4100 comprises an optical pickup which reads a signal recorded on the disk and a feed mechanism for the optical pickup and a mechanism for playing the disk such as a turntable which mounts the disk. The clamp mechanism 4200 comprises mechanism which clamps the disk when the disk is mounted on the turntable provided for mounting disks. The fixing mechanism 4300 is a mechanism which fixes and releases the floating state of the disk playing mechanism when playing a disk or when the disk playing mechanism is in a floating state or when a disk is not played.

The rotation mechanism 4400 is a mechanism which is displaced by the rotation action of rotating between a refuge position which refuges the disk playing mechanism 4000 and the playing position which performs the playing action for disks. The base mechanism 4500 comprises the motor 4501 which functioning as a source of motive force which performs fixed operations on the clamp mechanism 4200, the fixing mechanism 4300 and the rotation mechanism 3300, the transmission mechanism which transmits the drive force of the motor 4501 to the clamp mechanism 4200, the fixing mechanism 4300 and the rotation mechanism 4400 and the mounting base 4503 which mounted the components of the playing mechanism 4100, the clamp mechanism 4200, the fixing mechanism 4300 and the rotation mechanism 4400.

The playing mechanism 4100 comprises a spindle motor 4101 which rotates a disk, the playing base 4102 which supports the spindle motor 4101, the pickup 4103 which reads information loaded on the disk and the pickup transfer mechanism 4104 which displaces the pickup 4103 between the outer and inner peripheral section of the disk surface.

A turntable 4101*a* is mounted which has the function of mounting a disk on a rotation rotor of the spindle motor 4101. An engaging section 4101*b* which engages with the inner diameter of the disk is formed on the turntable 4101*a*.

A projection 4304 is formed on the playing base 4102. In order to secure the floating state of the projection 4304, a lock lever 4303 (discussed below) provided on the rotation base 4401 (discussed below) secures the projection 4304.

On the clamp mechanism 4200, a clamp 4201 which performs clamping of the disk by pressuring a disk mounted on the turntable towards the turntable, a clamp cap 4202 which supports an approximately central section of the clamp 4201 and allows the clamp 4201 to rotate, a clamp arm 4203 which is mounted on the clamp cap, and a hole 4203*a* on a section of the clamp arm 4203 are formed. A projection 4102*a* which is formed on a section of the playing base 4102 is loosely fixed to rotate in the hole 4203*a*. Furthermore a displacement mechanism 4204 is formed which displaces the clamp arm 4203 to a fixed operational position (playing operation position or refuge position).

The lock mechanism 4300 is provided with an oil damper 4301 which is disposed between the playing base 4102 and the rotation base 4401 (discussed below) and a spring 4302 which is disposed between the playing base 4102 and the rotation base 4401 so that an outer peripheral section of the oil damper is covered. The playing base 4102 normally floats on the rotation base 4401 due to the spring 4302 and the oil damper 4301.

Switching from a floating to a fixed state is performed as stated above.

The rotation mechanism 4400 is a rotation base 4401 which is provided with a playing mechanism 4100, a clamp mechanism 4200 and a fixing mechanism 4300. The rotation base 4401 is adapted to rotate between a playing position and a refuge position on an shaft 4503 extending from the mounting base 4501 (discussed below).

The base mechanism 4500 is provided with a base 4501 mounted on the housing 50. On the mounting base 4501, a motor 4502 and a drive force transmission mechanism (not shown) of the motor 4502 are provided. A cam plate 4503 is provided which displaces in direction A due to the drive force transmitted from the drive force transmission mechanism.

The operation of the rotation mechanism 4400 and the base mechanism 4500 will be explained mainly using FIG. 35 to FIG. 44.

Figure 35:
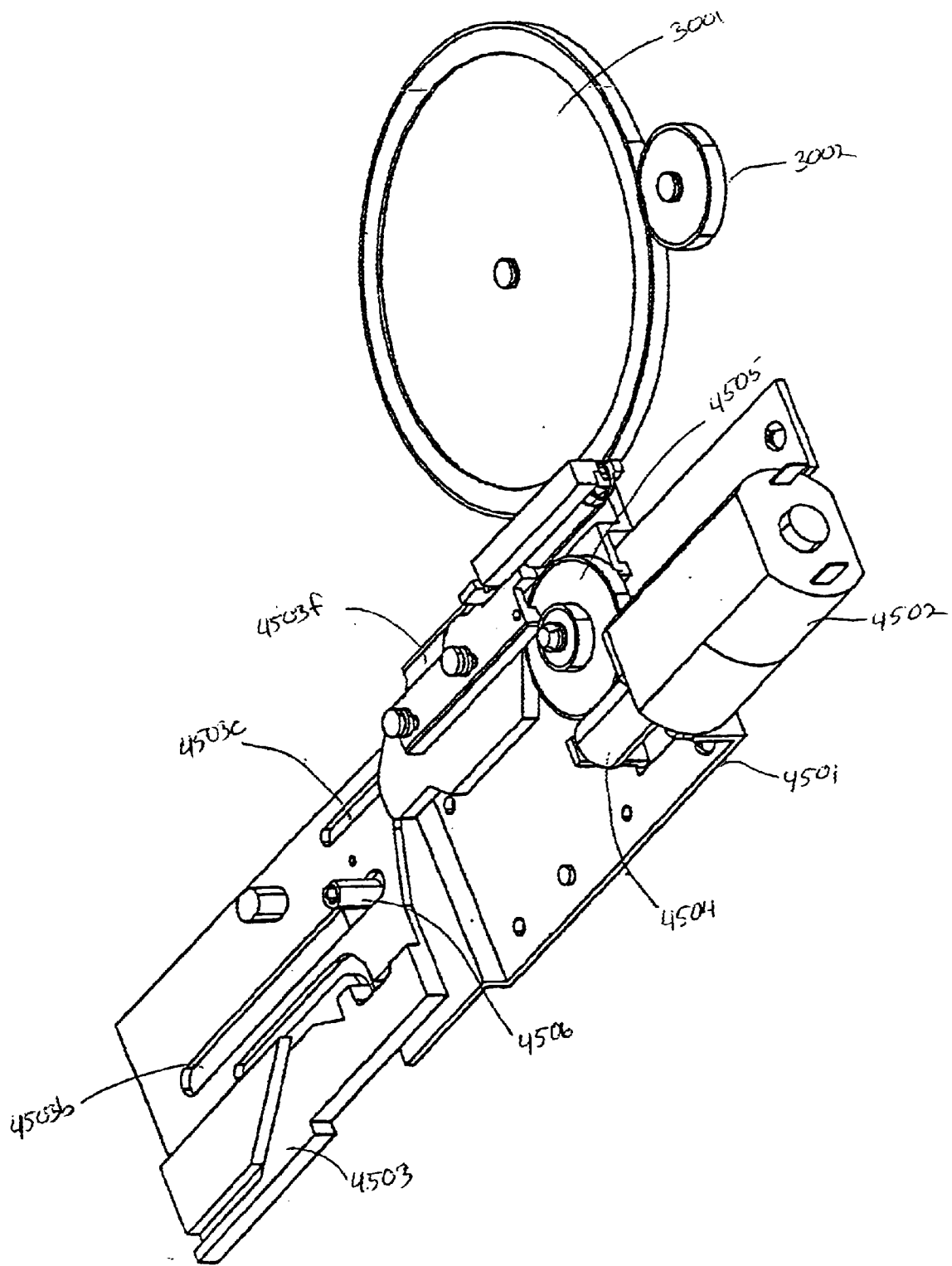
FIG. 35 is an overall view of a disk playing mechanism of the disk device as shown in FIG. 1.
Figure 36:
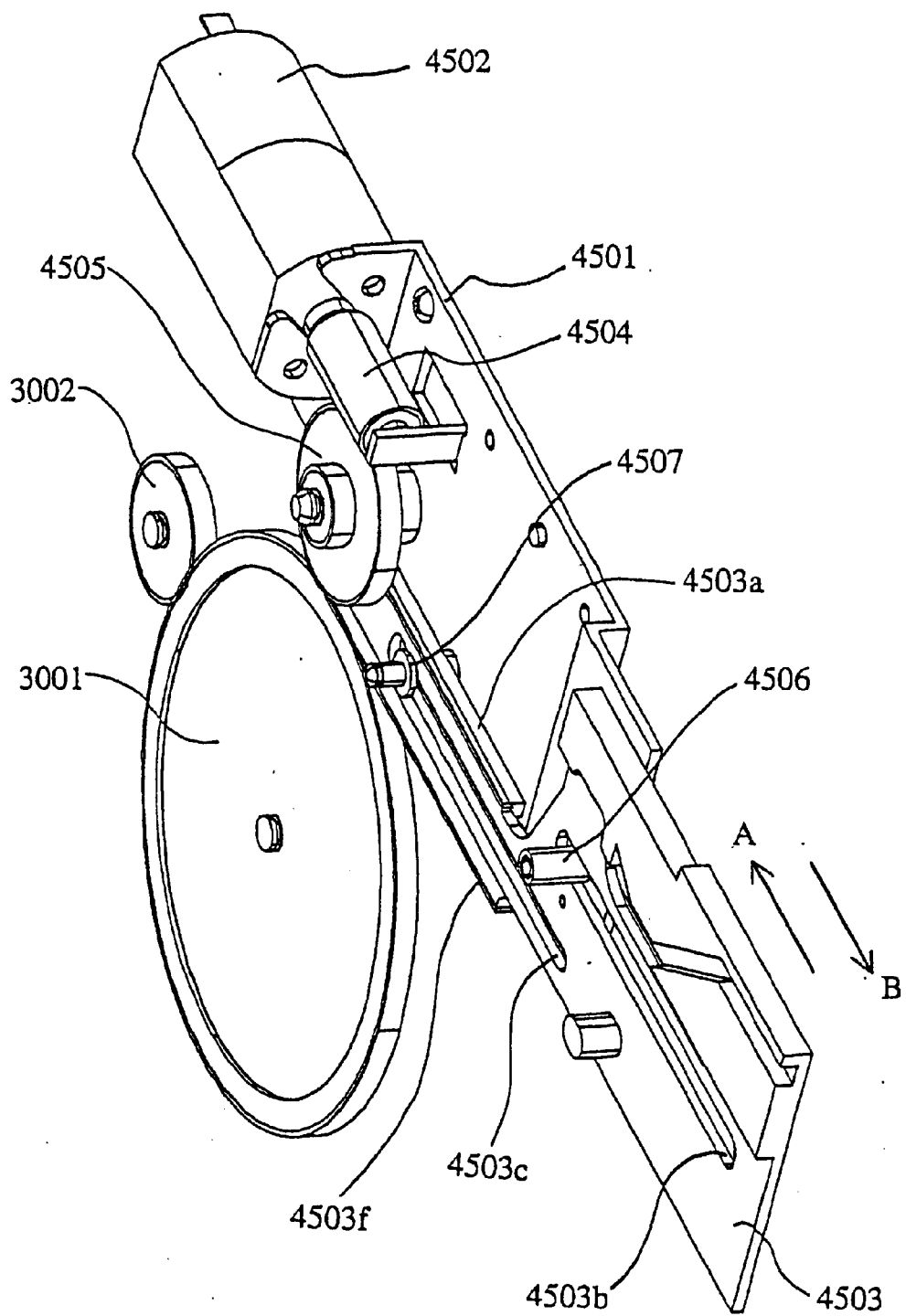
FIG. 36 is an overall view of a disk playing mechanism of the disk device as shown in FIG. 1.
Figure 37:
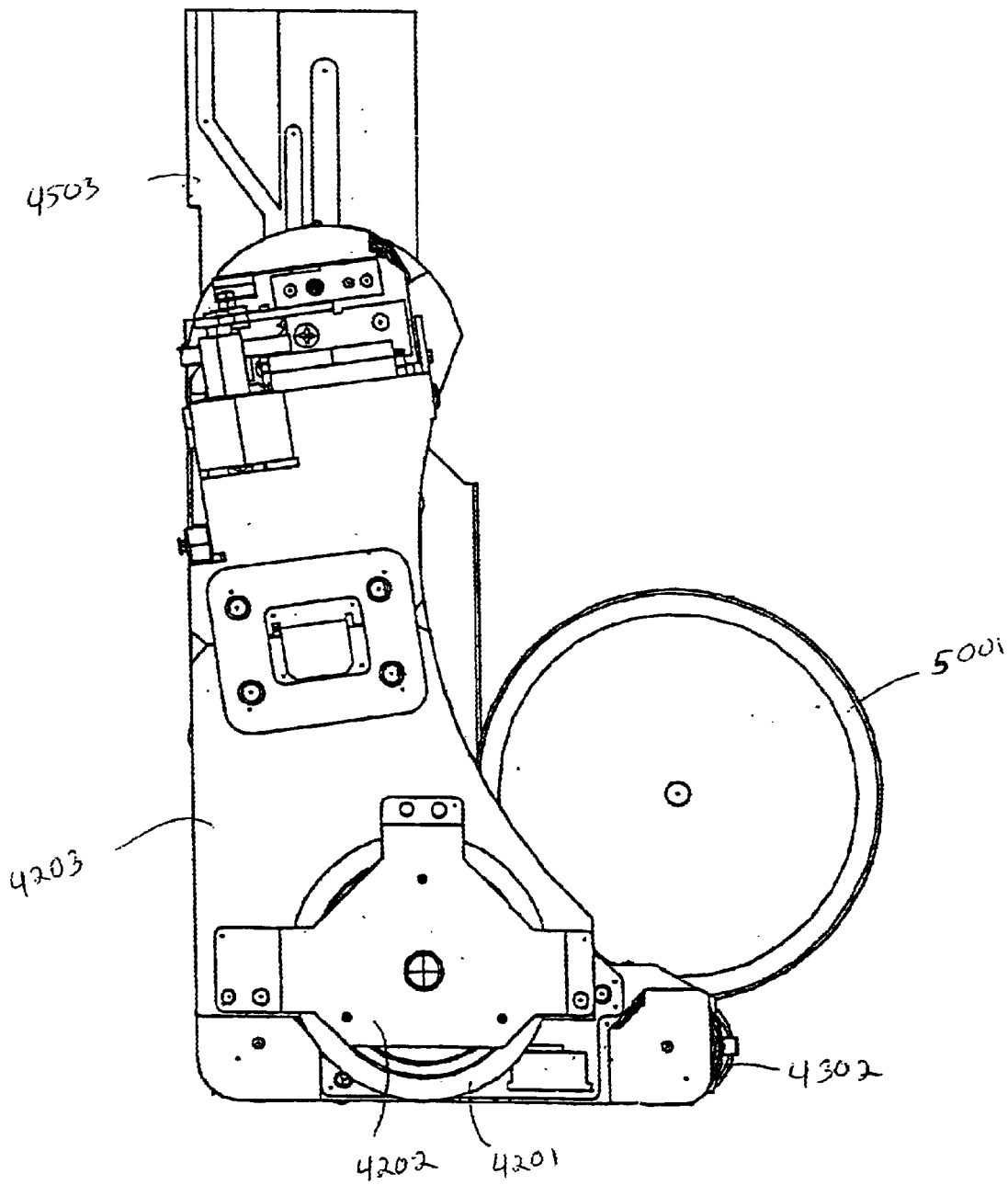
FIG. 37 is an explanatory view of the action of the disk playing mechanism of the disk device as shown in FIG. 1.

Firstly with reference to FIG. 35 and FIG. 36, the operation of the base mechanism 4500 will be described. The worm gear 4504, the large diameter gear and the small diameter gear provided on the rotation shaft of the motor 4502 mounted on the mounting base 4501 mesh with the large diameter gear of the co-axially integrated gear 4505. The large diameter gear of the gear 4505 and the integrated small radius gear meshes with the rack section 4503*a* of the cam plate 4503 formed on the rack 4503*a*.

By such an arrangement, the cam plate 4503 is displaced in direction A or direction B through the gear 4505 being linked to the rotation of the motor 4502. Elongated holes 4503*b*, 4503*c* are formed towards the base 4501 of the cam plate 4503. Projections 4506, 4507 which extend from the housing 50 are loosely fixed and slide in the respective elongated holes 4503*b*, 4503*c*. A cam groove 4503*d* which controls the rotation of the rotation mechanism 4400 and a cam groove 4503*e* which controls the disk clamping operation of the clamp mechanism 4200 are formed on the cam plate 4503. A rack section 4503*f* is formed at positions on the rack plate 4503 which sandwich the elongated groove 4503*c* with respect to the rack section 4503*a*. By this structure, the rack 4503*f* meshes with the gear 3001, the plate 2201 can be displaced and the disk retaining mechanism 3000 can be driven.

A rack plate 4508 is formed in the fixing mechanism 4300 and sets the playing base 4102 to a fixed or a floating state.

Figure 39:
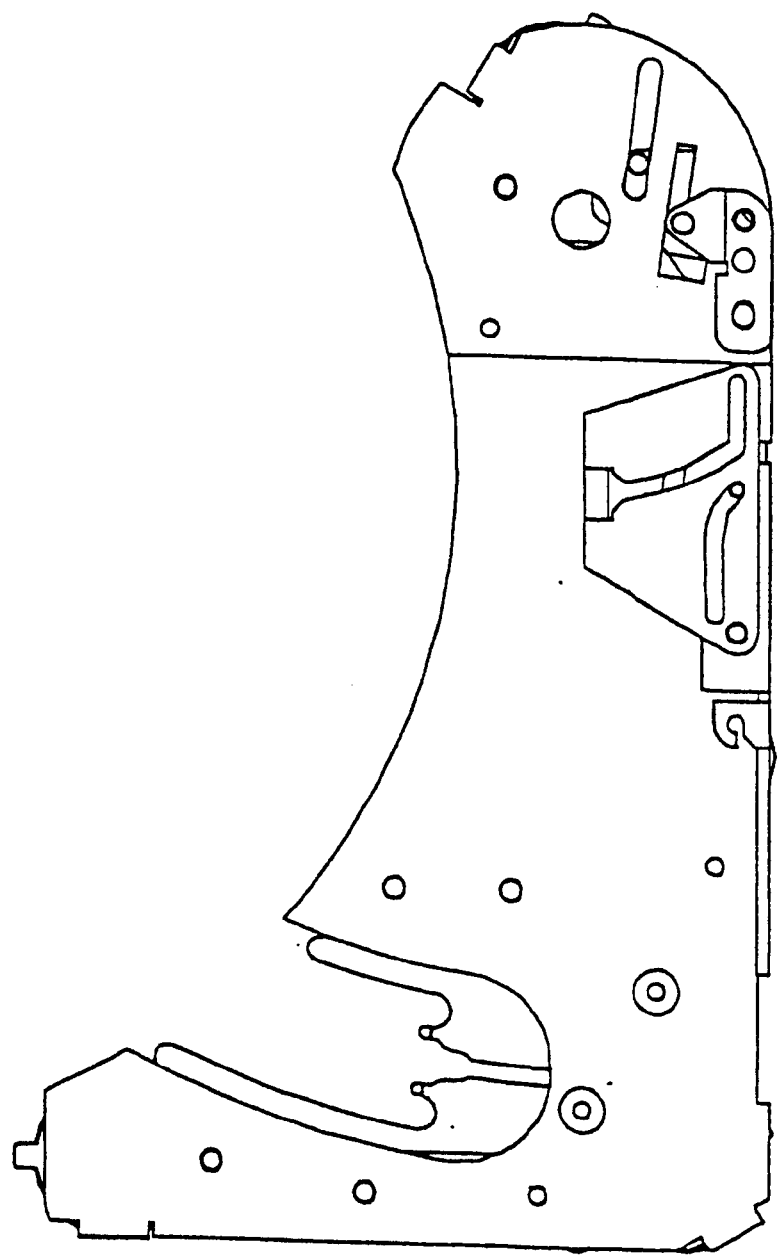
FIG. 39 is an explanatory view of the action of the disk playing mechanism of the disk device as shown in FIG. 1.
Figure 40:
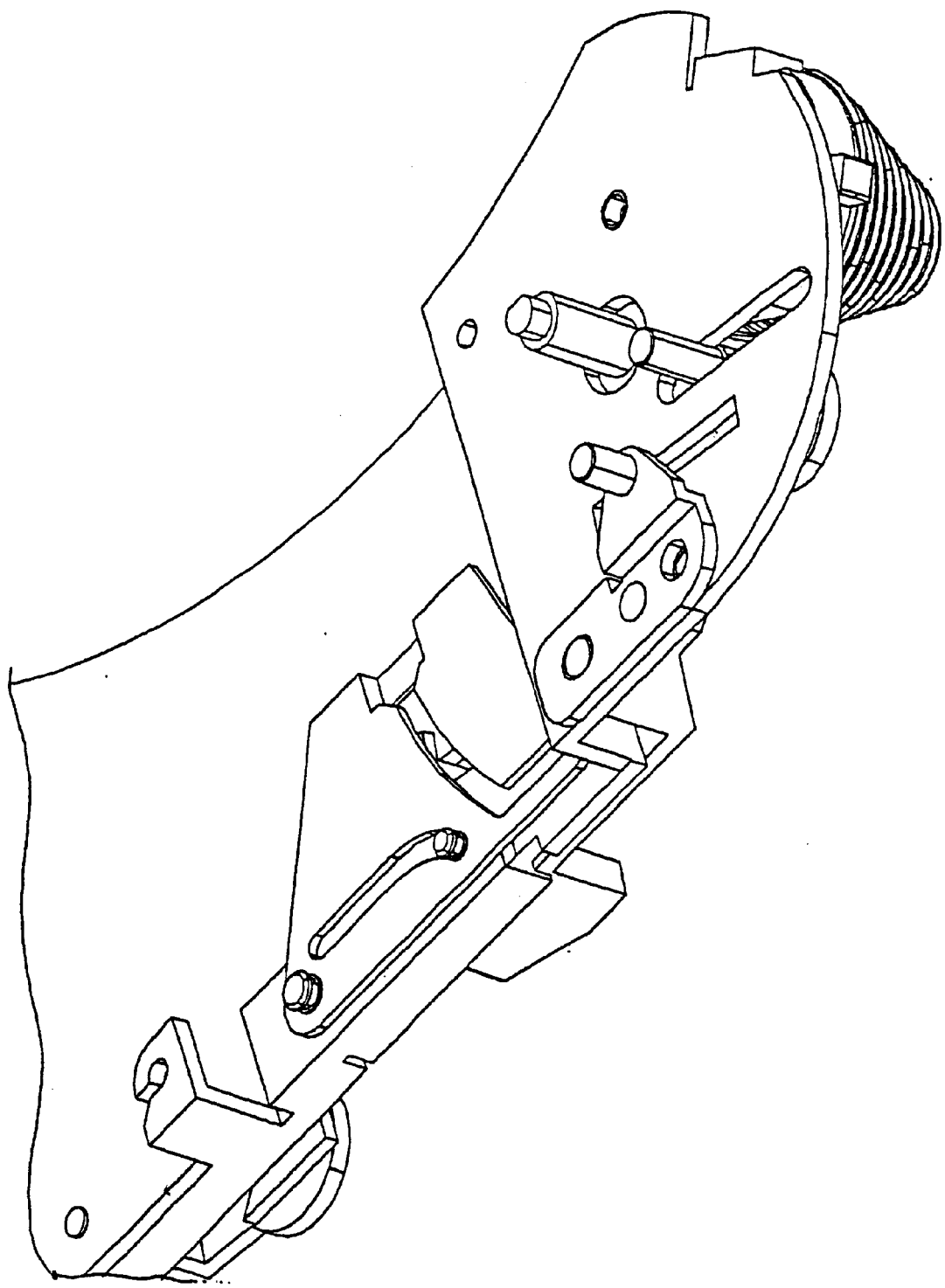
FIG. 40 is an explanatory view of the action of the disk playing mechanism of the disk device as shown in FIG. 1.

With reference to FIG. 39 and FIG. 40, a hole 4401*a* is provided on the rotation base 4401 and acts as a rotation center when rotating in either a refuge position or a position which plays a disk by a rotational operation. A projection 4506 which extends from the housing 50 to the hole 4401*a* is loosely fixed and rotates approximately parallel to the disk surface of the disk which is played.

Figure 41:
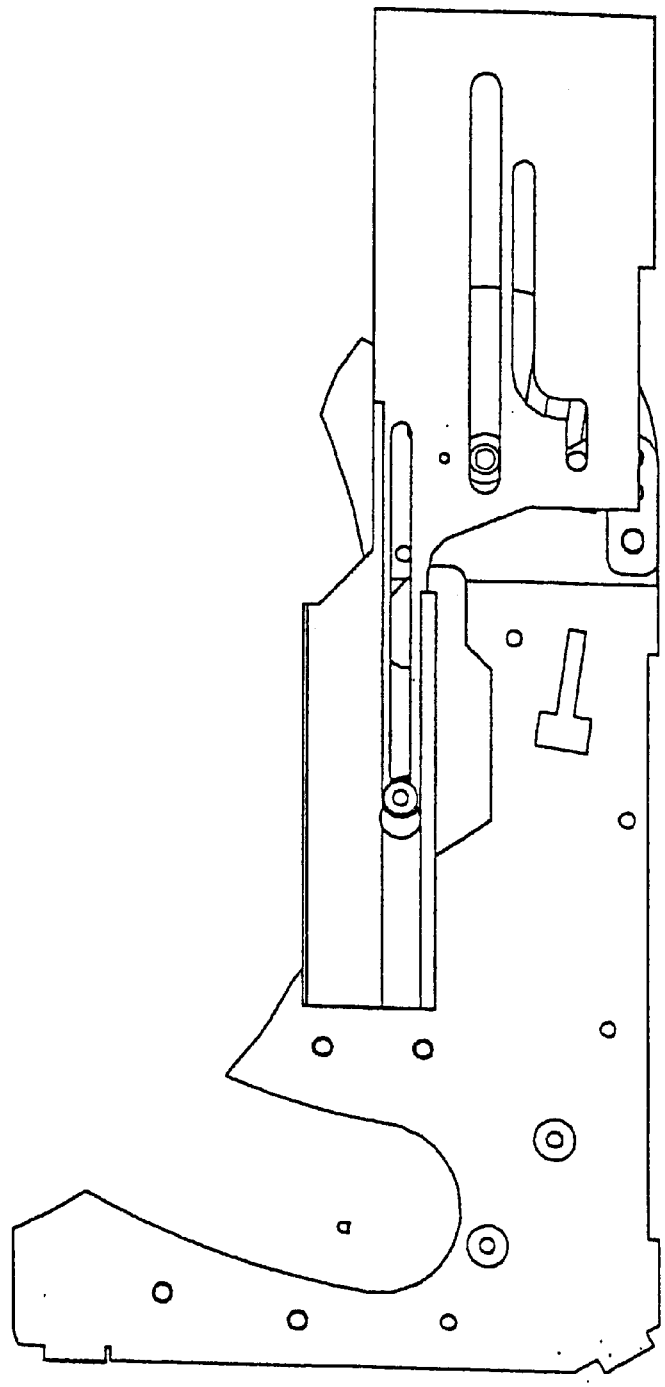
FIG. 41 is an explanatory view of the action of the disk playing mechanism of the disk device as shown in FIG. 1.

A mounting plate 4402 is disposed on a rear face of the rotation base 4401 and is provided with a projection 4402*a* which engages with the cam groove 4503*d* of the cam plate 4503. Thus the cam plate 4503 displaces in direction A as shown in FIG. 41 (disk playing mechanism refuge position) to FIG. 44 (disk playing position) and the rotation base 4401 is rotated in response to each groove position of the cam groove 4503*d* of the cam plate 4503.

With reference to FIG. 39, stoppers 5241 (discussed below) formed on the threaded element 5240 of the disk loading mechanism 5000 on the face of the rotation base 4401 are guided and determined to a fixed position. A fixing section 4403 which can be fixed to the stopper 5241 is formed which is fixed to the stopper 5241 during disk playing and released from the stopper 5241 during other operations.

The fixing section 4403 has a width which corresponds to the diameter of the stopper 5241 and only fixes that stopper 5241 to the position determining section 4403*a*, which represents a fixed position. When members other than the stopper 5241 come into play, refuging sections 4403*b*, 4403*c*, 4403*d* perform refuging operations so that the position is not determined by the position determination section 4403*a*.

The position of the position determination section 4403*a* is set so as to be co-axially disposed with respect to the rotation shaft of the spindle motor 4101 of the playing mechanism 4100 which is disposed above the rotation base 4401. When a disk is played, since the positional relationship of the rotation shaft of the disk loading mechanism 5000 (discussed below) and the rotated disk playing mechanism 4000 is not always equal, the disk is mounted on the turntable and a series of operations is performed until disk play is accomplished. As a result it is possible to improve the reliability of the disk device.

(6. Disk Loading Mechanism)

An elongated hole 2201*f* is formed on the plate 2201 which varies the angle of inclination so as to correspond with the respective differing operational modes as shown in FIG. 24(*d*), FIG. 23 (*a*) and FIG. 23(*e*).

The schematic components of the disk loading mechanism 5000 will be described with reference to FIG. 61. Details of each component will be described with reference to FIG. 62.

Figure 61:
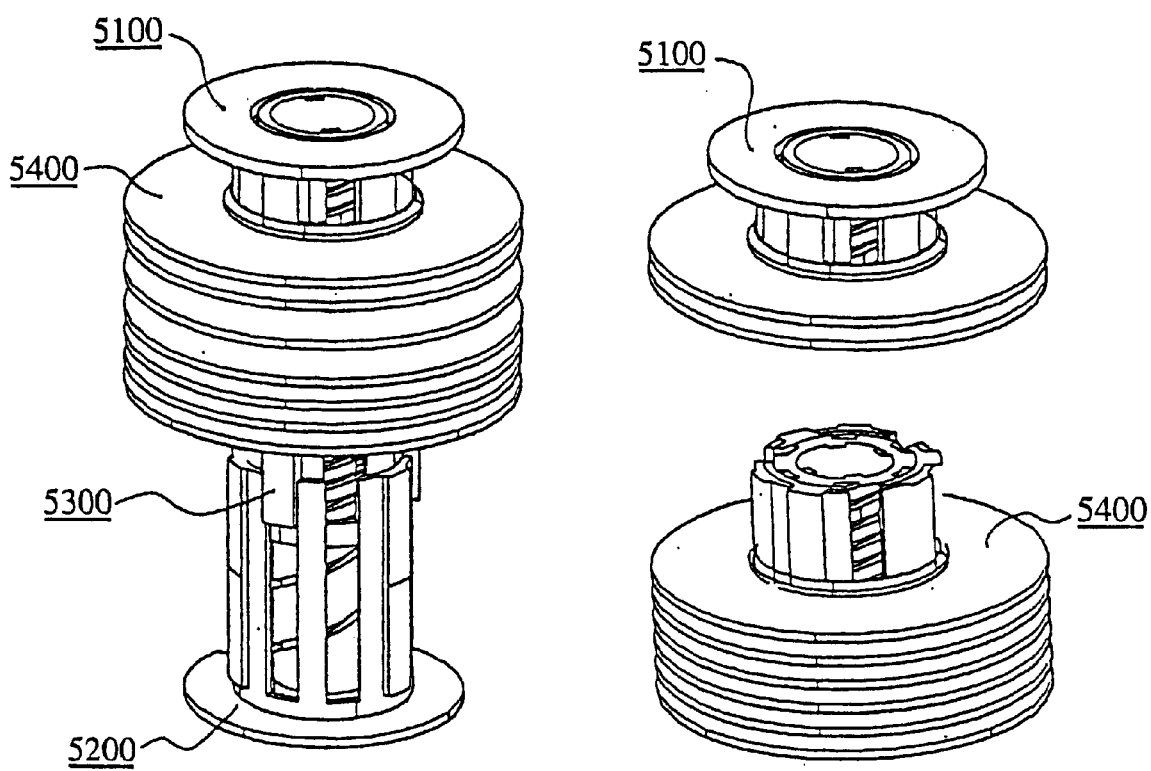
FIG. 61 is an overall view of the disk loading mechanism of the disk device as shown in FIG. 1.

In FIG. 61, the disk loading mechanism 5000 is broadly divided into four component mechanisms. A first mandrel mechanism 5100, a second mandrel mechanism 5200, a third mandrel mechanism 5300, and a disk supporting mechanism 5400 are provided. The first mandrel mechanism 5100 is disposed to rotate due to the rotational force of a drive source (discussed below) and a section is fixed to a roof section of the housing 50. The second mandrel mechanism 5200 which is disposed to rotate due to the rotational force of a drive source (discussed below) and a section is fixed to a bottom section of the housing 50. The third mandrel mechanism 5300 which is disposed to displace the direction of a rotation shaft in response to the rotations of the second mandrel mechanism 5200 and is disposed so that the second mandrel mechanism 5200 is engaged to an inner section. The donut-shaped disk supporting mechanism 5400 is fixed with a play to the first mandrel mechanism 5100 and the third mandrel mechanism 5300 and forms a projection on a peripheral section which is engageable with the grooves formed on the third mandrel mechanism 5300 and the first mandrel mechanism 5100.

The disk support mechanism 5400 displaces towards the rotational shaft along the groove on the third mandrel mechanism 5300 and the groove of the first mandrel mechanism 5100 in response to the rotational action of the third mandrel mechanism 5300 and the first mandrel mechanism 5100. That is to say, the disk support mechanism 5400 is adapted to displace freely in a vertical direction with respect to the device and to have the function of supporting disks.

One end of the first mandrel mechanism 5100 is mounted on the gear 5101 through a roof plate of the housing 50. A rotatable first guide member 5110 forms three grooves 5112–5114 on an outer periphery. A ring-shaped biased spring member 5120 is disposed on the inner section 5115 of the first guide member 5110 and biases the first guide member 5110 in direction A. The three grooves 5112–5114 open at positions which correspond to the other end of the first guide section 5110. This mouth corresponds with an mouth of the groove formed on the second guide section (discussed below).

A hollow first holder 5130 is provided to guide the first guide member 5110 to an inner peripheral section 5131. The first guide member 5110 is maintained on the housing 50 by fixation of a section of the first guide member 5110 to a roof section of the housing 50. Three slits 5132–5134 are formed at equal intervals along the axial direction on the first holder 5130. The opening face of these slits 5132–5134 has openings 5132a–5134a.

Three indentations 5115–5117 are formed at equal intervals on the outer periphery of the opening face on the first holder 5130. Three indentations 5115–5117 are formed at equal intervals on the outer periphery of the other end face of the first guide section 5110.

The second mandrel section 5200 comprises a second holder 5210, a shaft 5220, a second guide member 5230 and a threaded member 5240. The second holder 5210 is formed in a hollow shape and one end abuts with the bottom face of the housing 50. The shaft 5220 is loaded in the second holder 5120, one end abuts with the bottom face of the housing 50 and functions as a rotating shaft for the second guide 5230 (discussed below). The second guide member 5230 loosely fixes the shaft 5220 as a rotation shaft and forms three grooves 5231–5233 in an outer peripheral section. The threaded member 5240 prevents separation of the second guide 5230 from the other end of the shaft 5220 after the second guide member 5230 is fixed loosely to the shaft 5220. Although being secured by the threaded member to the second guide 5230 can rotate the shaft 5220 as a rotation shaft. Furthermore a stopper 5241 is formed on the threaded member 5240 on the opposite side to that fixed by the spring. The stopper 5241 fixes the stopper of the disk playing mechanism which is rotated to a playing position.

The second guide member 5230 has a gear 5234 on and end face near the bottom of the housing 50. The, gear 5234 is linked to the transmission mechanism of the roller displacement mechanism 103 (not shown). Six slits 5211–5216 are formed at equal intervals along the axial direction on the second holder 5210.

The third mandrel mechanism 5300 comprises the third holder 5301 which is formed hollow and has three projections 5302–5304 formed in equal intervals on an inner peripheral section. Three guide sections 5305–5307 are formed at equal intervals along the axial direction of the outer peripheral section and three slits 5308–5310 are formed at equal intervals along the axial direction. The third holder 5301 is arranged so that the slits 5213–5216 of the second holder 5210 guide the guide sections 5305–5307 of the third holder 5301 and displaces the third holder 5301 in a rotation shaft direction.

The third holder 5301 forms three projections 5311–5313 at equal intervals on an end face towards the roof of the housing 50. When the third holder 5301 displaces in the rotation shaft direction, the projections 5311–5313 respectively engage with the indentations 5115–5117 of the first holder 5130. Notched claws 5314–5316 are formed on a section of the outer peripheral face. The projections 5302–5304 formed on the inner peripheral section engage slidably with grooves 5231–5233 of the second guide section 5230, are linked with the rotation of the second guide and can displace in the direction of the rotational axis of the third holder 5301.

A third guide 5330 is provided forming spiral shaped grooves 5332–5334 and a concentric groove 5331 on an outer peripheral face and is fixed with a play into the third holder 5301. The end face of the spiral shaped grooves 5332–5334 of the third guide 5330 near to the roof of the housing are open and this open face is linked to the open face of the spiral shaped grooves 5112–5114 of the first guide 5110 when the third mandrel mechanism 5300 and the first mandrel mechanism 5100 are linked. The third mandrel mechanism 5300 is formed hollow and the second guide 5230 is fixed therein with a play. The third mandrel mechanism is adapted to displace in the direction of a rotation shaft in response to the rotations of the second guide 5230.

A section of the claw 5313–5316 formed on the third holder 5301 projects inwardly. The distal end of the claw abuts with the concentrically shaped groove 5331 formed on the third guide 5330, that is to say, it is fixed. Due to such an arrangement, the third holder 5301 rotates freely so that the third guide 5330 does not separate from the third holder 5301. Three projections are formed at equal intervals on the third guide 5330 which project towards the roof face on the end face towards the roof of the housing 50.

When the third guide 5330 displaces in a direction of a rotational shaft together with the third holder based on the rotations of the second guide 5230 and displaces towards the roof of the housing, the projections 5335–5337 formed on the third guide engage and are linked with the indentations 5115–5117 of the first guide 5110. When the third guide 5330 and the first guide 5110 are linked, the rotation of the gear 5234 formed on the second guide 5230 is fixed and the gear 5101 engaged with the first guide 5110 is rotated. Thus the first guide 5110 and the third guide 5330 become integrated and a rotation action is performed on the integrated basis. In this case, no displacement occurs in the direction of the rotational axis.

5400 is a support mechanism. On the surface facing the disk, the support mechanism 5400 comprises a first support section 5411 of the flat section which abuts with and supports a section of the inner periphery of the disk. The proximity of the inner periphery is somewhat thickened and comprises a section support section 5412. A first spacer 5410 is provided with which the inner diameter of the disk is engaged on the second support section 5412. The first spacer 5410 forms three projections 5401–5403 at equal distances on an inner section. The projections 5401–5403 are adapted to slidably engage with the grooves 5112–5114 of the first guide member 5110 and with the grooves 5332–5334 of the third guide member 5330. The first spacer 5410 is adapted to displace based on the rotation of the first guide member 5110 and the third guide member 5330 towards the rotation shaft so that the flat section is approximately perpendicular to the rotation shaft.

A first plate spring 5420 is fixed to the opposite face of the first support section 5411 which abuts with and supports the disk. The first plate spring 5420 has a larger diameter than the first spacer 5410. A peripheral section of the first plate spring 5420 extend towards the rotation shaft and in the present embodiment four extend downwardly at equal intervals. In the present embodiment of the present invention, four projections project at equal intervals downwardly in the device. These projections 5421–5424 are biased towards a lower section of the device.

Figure 62:
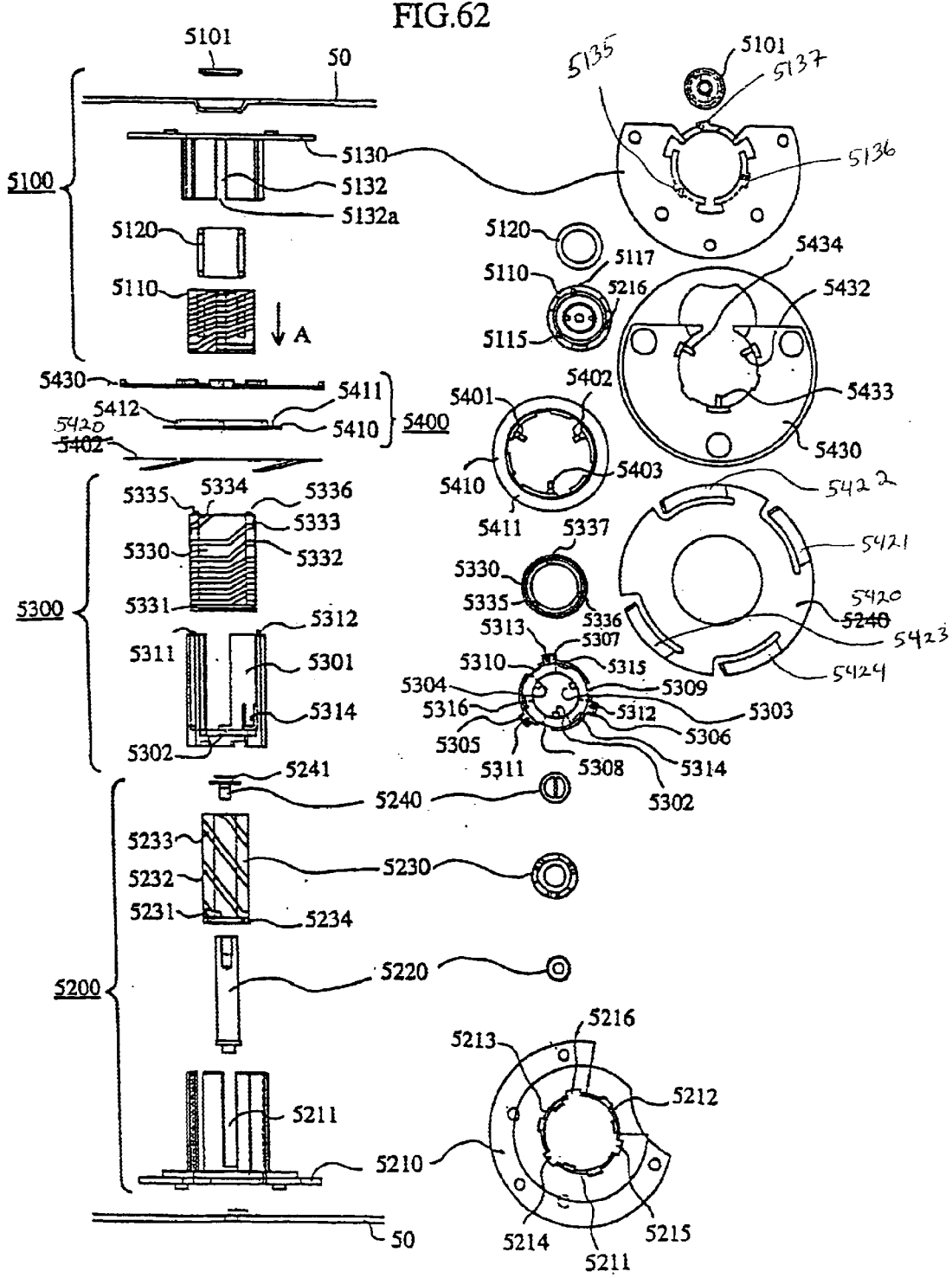
FIG. 62 is an exploded view of the components of a disk loading mechanism of the disk device as shown in FIG. 1.
Figure 63:
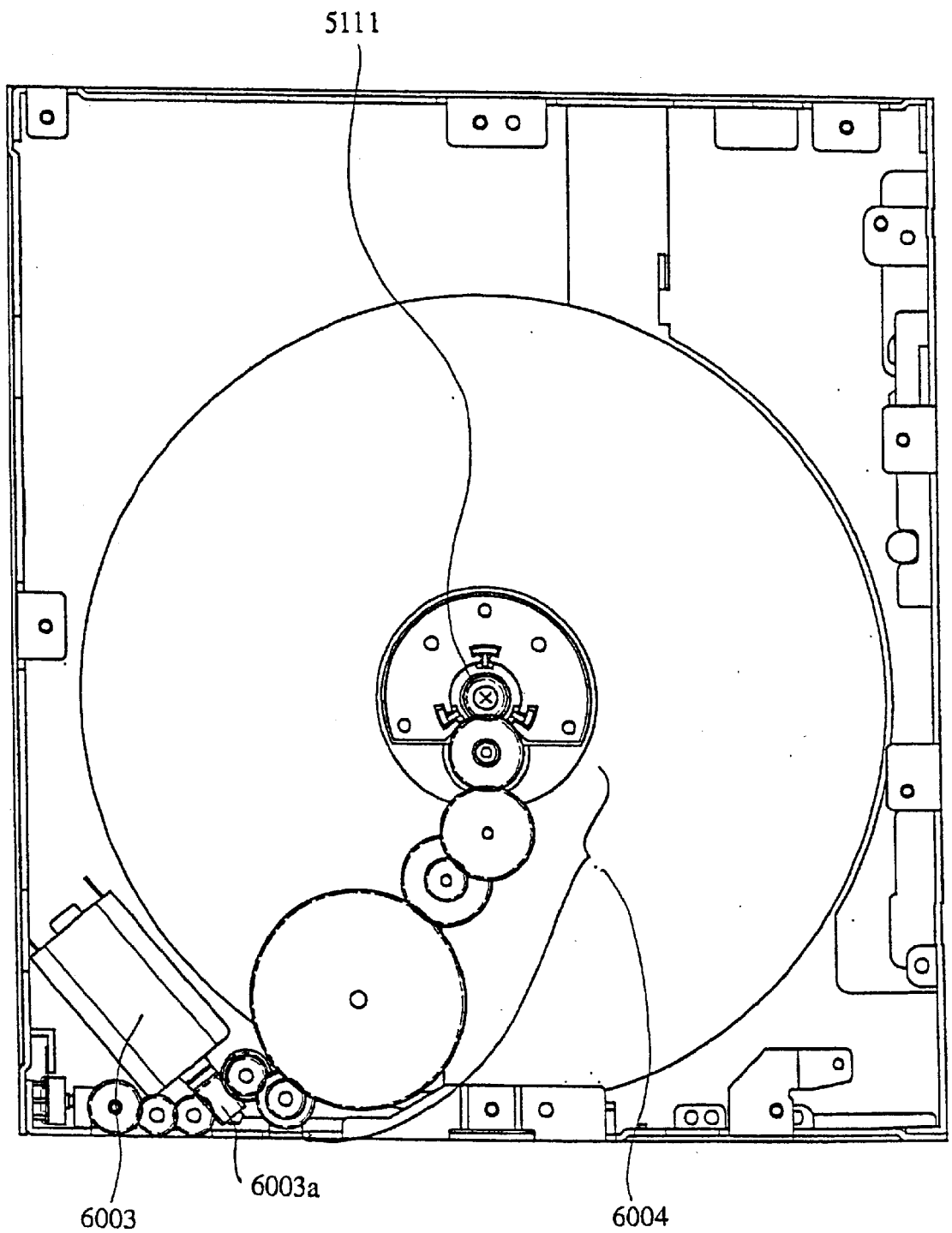
FIG. 63 is a block diagram of the upper surface of the components of a disk loading mechanism of the disk device as shown in FIG. 1.
Figure 64:
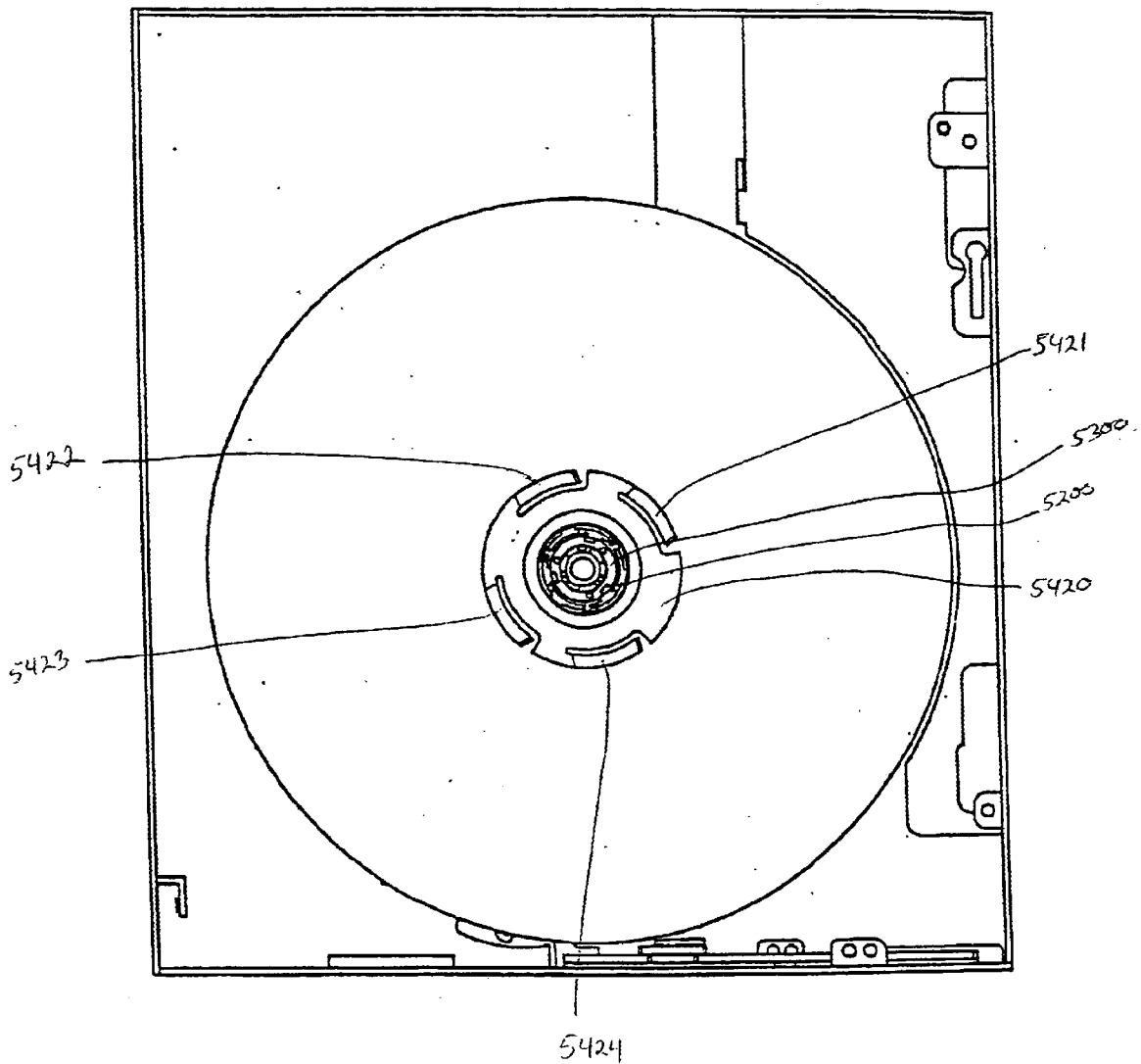
FIG. 64 is a block diagram of the upper surface of the components of a disk loading mechanism of the disk device as shown in FIG. 1.

In FIG. 62, only a first spacer 5410 and a first plate spring 5420 are given as examples of a spacer and a plate spring. However this embodiment of the present device is adapted to load six disks with respective spacers 5410 and springs 5420 provided for each disk. (The structure of the other spacers and other plate springs is the same as that of the first spacer 5410 and a first plate spring 5420. The order of first spacer and spring to sixth spacer and spring is provided from the upper section of the device to the lower section of the device.) That is to say, these components are disposed from the upper section to the lower section of the device in the order given below.

(1) Upper biasing member (uppermost step), (2) Plate spring member, (3) First spacer, (4) First plate spring member, (5) Second spacer, (6) Second plate spring member, (7) Third spacer, (8) Third plate spring member, (9) Fourth spacer, (10) Fourth plate spring member, (11) Fifth spacer, (12) Fifth plate spring member, (13) Sixth spacer, (14) Sixth plate spring member (lowermost step).

On the support mechanism 5400, a plate spring (not shown in the figure, but the same as the first plate spring 5420) is provided which is disposed on the upper step of the first spacer 5410 which biases the disk downwardly by abutting. An upper biasing member 5430 is provided which grips the disk with the first support section 5411 of the first spacer 5410 and the plate spring. The upper biasing member 5430 is provided with an approximately central hole in the same way as the first plate spring 5420 and the first spacer 5410. Three projections 5432–5434 are provided at equal intervals in the inner peripheral section of the approximately central hole. The upper biasing member 5430 is adapted in the same way as the first spacer 5410 so that the three projections 5432–5434 are disposed to slidably engage with the grooves 5332–5334 of the third guide member and the grooves 5112–5114 of the first guide member 5110. The upper biasing section 5430 is adapted to displace towards a rotation shaft based on the rotational operation of the first guide member 5430 and the third guide member.

When the spacer supports a disk, since the plate spring immediately above the spacer biases the disk towards the spacer (for example, when a disk is loaded in the third spacer, the second plate spring immediately above biases the disk onto the third spacer), the disk is more firmly supported (retained).

The projections 5421–5424 of the first plate spring 5420 are all adapted to extend in the same direction, that is to say as shown in FIG. 62, from a right hand direction to a left hand direction.

Figure 96A:
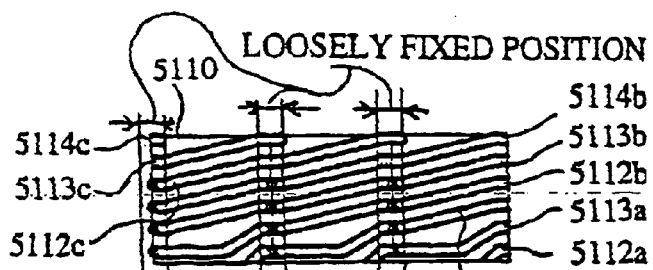
FIG. 96 is an explanatory view of the action of the components of the disk loading mechanism of the disk device as shown in FIG. 1.
Figure 96B:
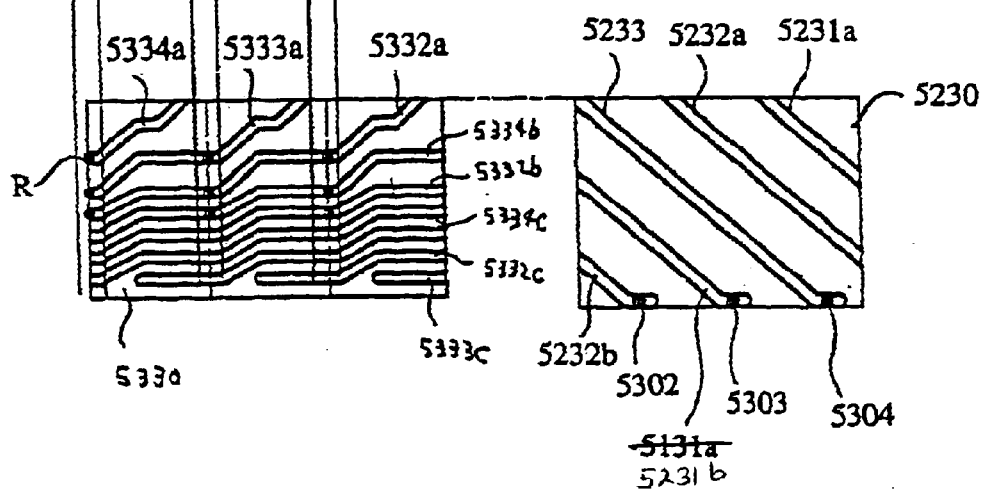
Figure 97A:
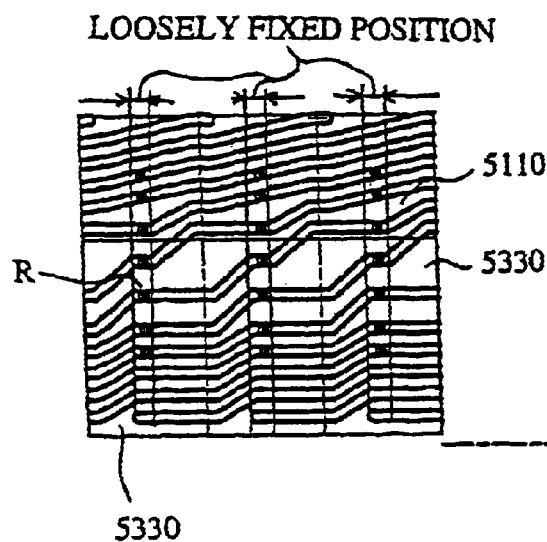
FIG. 97 is an explanatory view of the action of the components of the disk loading mechanism of the disk device as shown in FIG. 1.
Figure 97B:
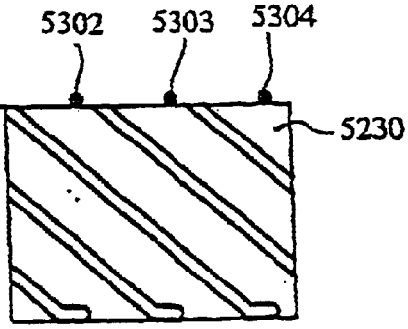

Using FIG. 63–FIG. 97, the operation of the disk loading mechanism 5000 will be described. Firstly, the principle of varying the height of the disk will be described based on FIG. 96 and FIG. 97. In the figures, a groove formed on a first mandrel mechanism 5100 and a third mandrel mechanism 5300 will be described. These figures are development elevations open along a rotation shaft. FIG. 96 shows a separated state of the third guide member 5330 and the first guide member 5510. FIG. 97 shows a linked state of the third guide member 5330 and the first guide member 5110. The separated state of the third guide member 5330 and the first guide member 5110 as shown in FIG. 96 is set to the position of the disk insertion/ejection operation or the disk playing operation. The linked state of the third guide member 5330 and the first guide member 5110 as shown in FIG. 97 is set to the position of varying the height of a disk which is loaded in the disk loading mechanism. In FIG. 96, in the first guide member 5110, projections formed on the first, second and third spacers, and the upper biasing section are fixed with a play to each groove (● shows the position of each projection). In the third guide member 5330, projections formed on the fourth, fifth and sixth spacers are fixed with a play to each groove. The gaps between each groove is as shown in the figure. In FIG. 97, the fourth disk R is shown as the disk to be the object of an operation. Furthermore the projections 5551, 5552 of the fourth spacer which supports the fourth disk R are shown. By the arrangement above, when the disk retaining mechanism 3000 supports a disk which is indicated from among the disks loaded in the disk loading mechanism 5000, a mechanism is provided to prevent the disk retaining mechanism 3000 from coming into contact with linked disks when the disk retaining mechanism 3000 is interposed between disks adjacent to disk R.

In the figure, three respective grooves are formed on the first and third guide members, 5110, 5330. That is to say, on the first guide member 5110, grooves 5112, 5113, 5114 are formed, and on the second guide member 5230, grooves 5231, 5232, 5233 are formed. The three grooves have the same structure and are formed with a 120 degree phase difference. When the disk loading mechanism 5000 rotates through 120 degrees, this results in either the operation of the raising of the height of the disk by one step or the lowering of the height of the disk through one step. As shown in FIG. 96 and FIG. 97, with respect to the groove of the first guide member 5110, the right end of the first groove 5112*a* is fixed to the left end of the first groove 5112*b* and the right end of the first groove 5112*b* is fixed to the left end of the first groove 5112*c* to form a single groove. Since the second grooves 5231–5233 and the third grooves 5114*a*–5114*c* are formed in the same way as the first groove as described above, further description will be omitted. Furthermore since the grooves 5332, 5533, 5534 of the third guide member 5330 are formed in the same way as the first groove 5112*a* of the first guide member 5110 above, further description will be omitted. When the device is set to the state as shown in FIG. 97 from the state as shown in FIG. 96, that is to say, after the device is set to a linked state from a state in which the first guide member 5110 and the third guide member 5330 are separated, the disk R which is the object of the operation is rotated through a fixed angle in a direction which raises the disk by a step, (the first and third guide member rotate in an anti-clockwise direction) and the device is set to the position as shown in FIG. 97. The projections 5302, 5303, 5304 of the third holder 5301 in the grooves 5231, 5232, 5233 of the second guide member 5230 have the function of retaining the third guide member 5330 in a rotatable state. Thus the device shifts from the state as shown in FIG. 96 to the state as shown in FIG. 97, due to the second guide member 5230 rotating (the position as shown in FIG. 96 shows the second guide member 5230 completely fixed with a play to the inner section of the third guide member 5330).

As described above, when the first guide member 5110 and the third guide member 5330 are separated, the position at which the projection formed on the spacer is loosely fixed is as shown in FIG. 96. On the other hand, when the disk which is to be the object of an operation is supported and refuged by the disk retaining mechanism 3000, the position of fixation of the projection is as shown in FIG. 97.

That is to say, when the first guide member 5110 and the third guide member 5330 are linked and the disk to be the object of an operation becomes selectable, firstly the device displaces to the position as shown in FIG. 97. Thereafter the disk to be the object of an operation is set to the position of the disk R. As a result of such an operation, the plate spring member mounted on the spacer on which a disk is loaded which is one step higher than the disk R to be the object of an operation is adapted to bias the disk R to be the object of an operation downwardly. Thus the disk R to be the object of an operation is firmly biased to prevent a shaking movement. Thus the supporting action of the disk retaining mechanism 3000 with respect to the disk R to be the object of an operation is facilitated.

On the other hand, when the first guide member 5110 and the third guide member 5330 are separated, firstly as shown in FIG. 96, the disk which is disposed one step higher than the disk R which is the object of the operation when the above components are linked is displaced to the groove of the first guide member 5110 from the third guide member 5330.

Next a sequence of operations of the disk loading mechanism 5000 will be described. In the Figures, (b) is a development elevation showing the positional relationship between the first member 5110, the second guide member 5230 and the third guide member 5330 during the operation as shown in (a). That is to say, it shows the positional relationship of the groove with the projection of each spacer.

Figure 67A:
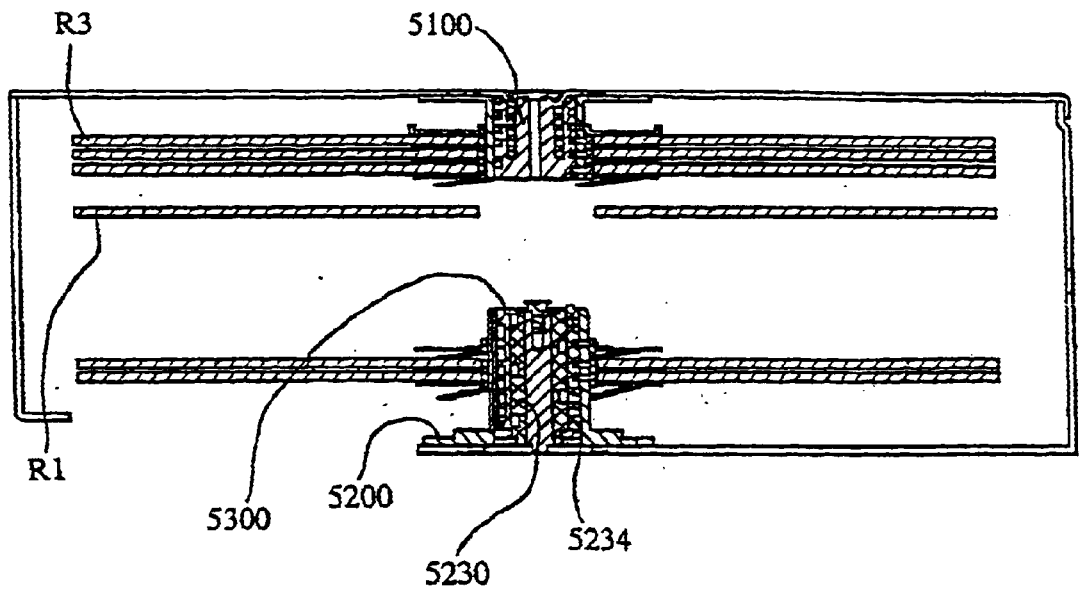
FIG. 67 is an explanatory view of the action of a disk loading mechanism of the disk device as shown in FIG. 1.
Figure 67B:
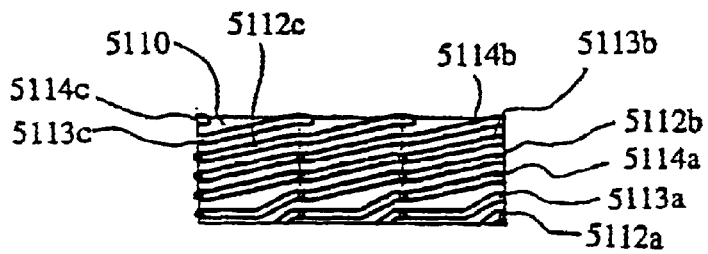
Figure 67C:
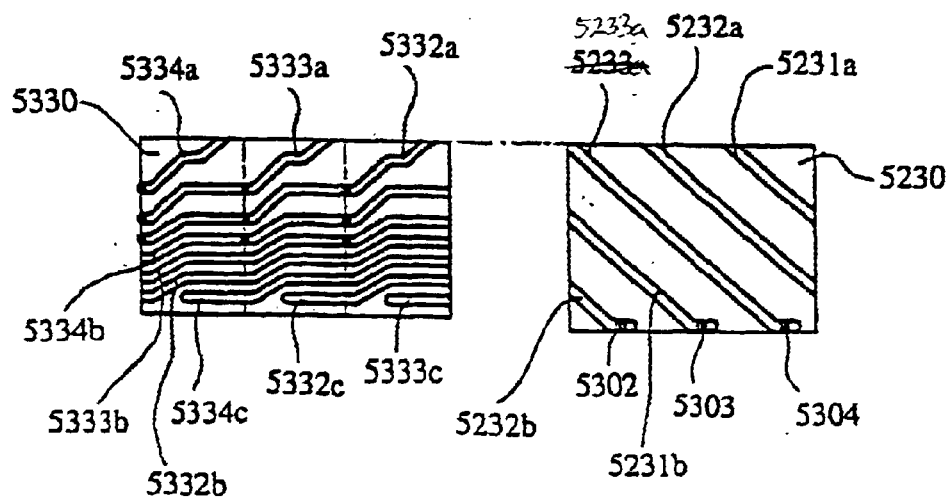

Firstly as shown in FIG. 67, the disk R1 is supported by the disk retaining mechanism 3000 (not shown in the present figure). The first guide member 5110 and the third guide member 5330 become linked thereafter in FIG. 70 due to the operation as shown in FIG. 68 and FIG. 69.

Figure 70A:
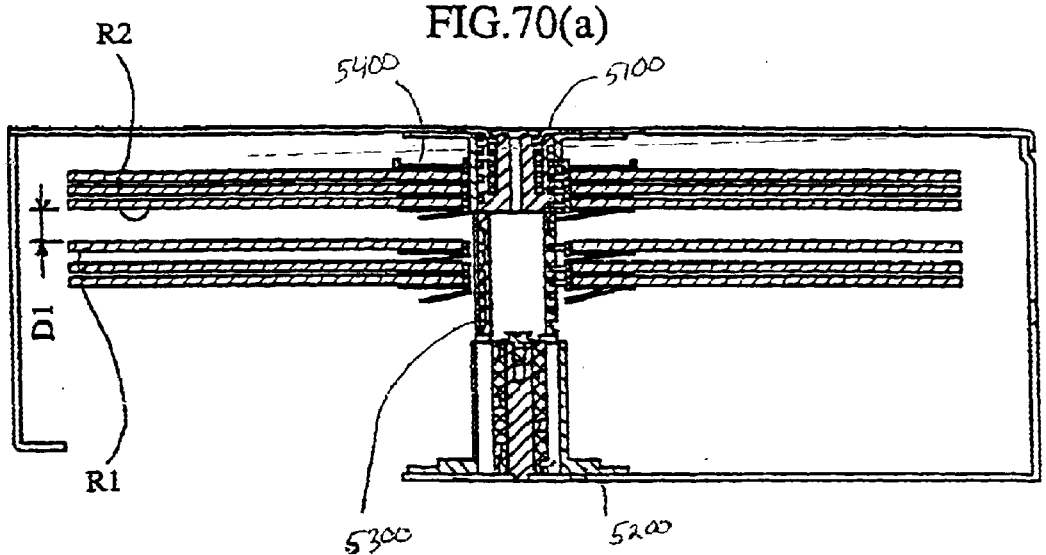
FIG. 70 is an explanatory view of the action of a disk loading mechanism of the disk device as shown in FIG. 1.
Figure 70B:
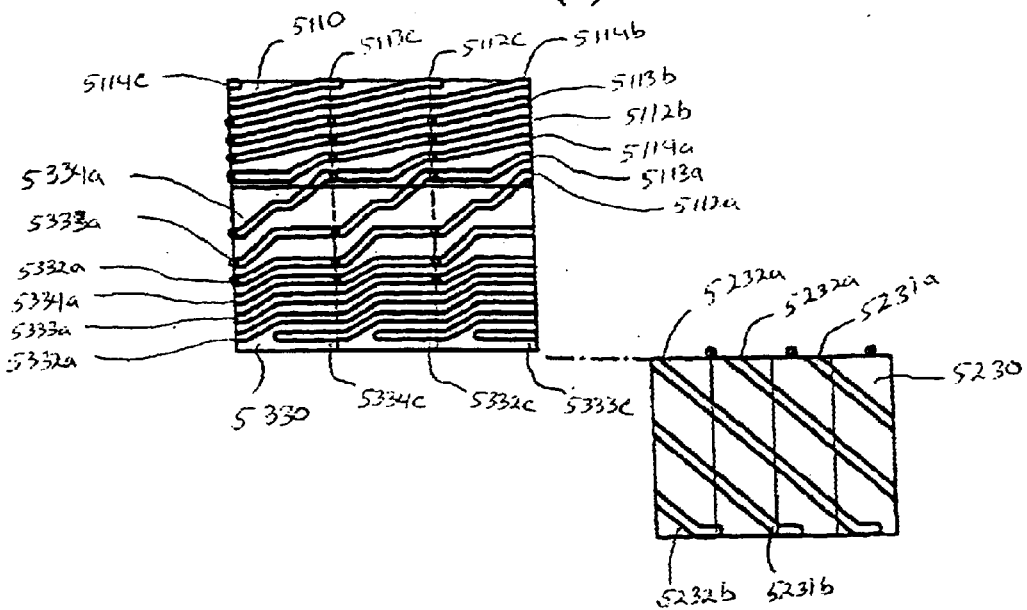
Figure 74A:
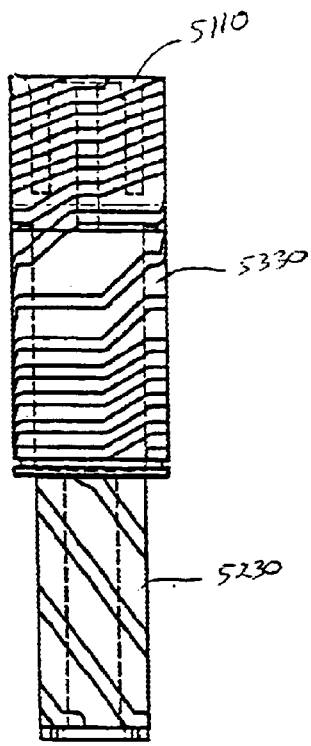
FIG. 74 is an explanatory view of the action of the components of the disk loading mechanism of the disk device as shown in FIG. 1.
Figure 74B:
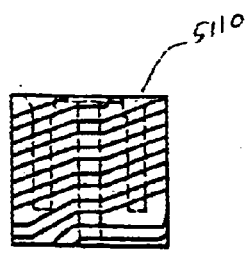
Figure 81:
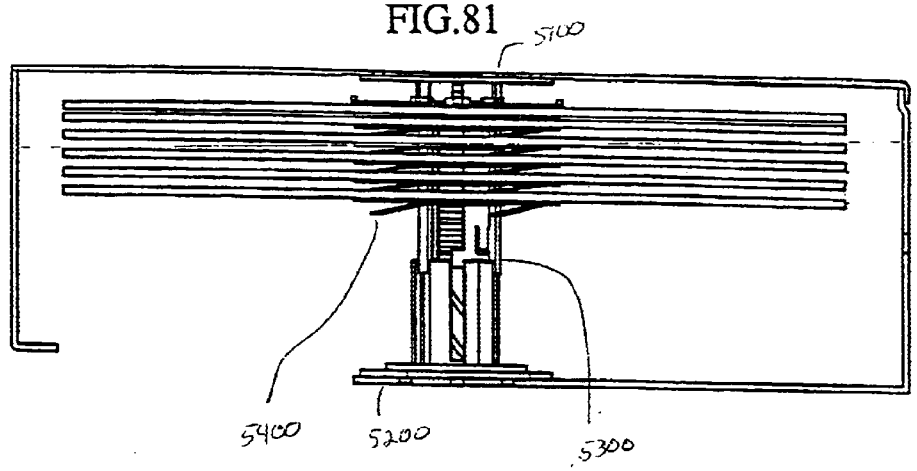
FIG. 81 is an explanatory view of the action of the components of the disk loading mechanism of the disk device as shown in FIG. 1.
Figure 82:
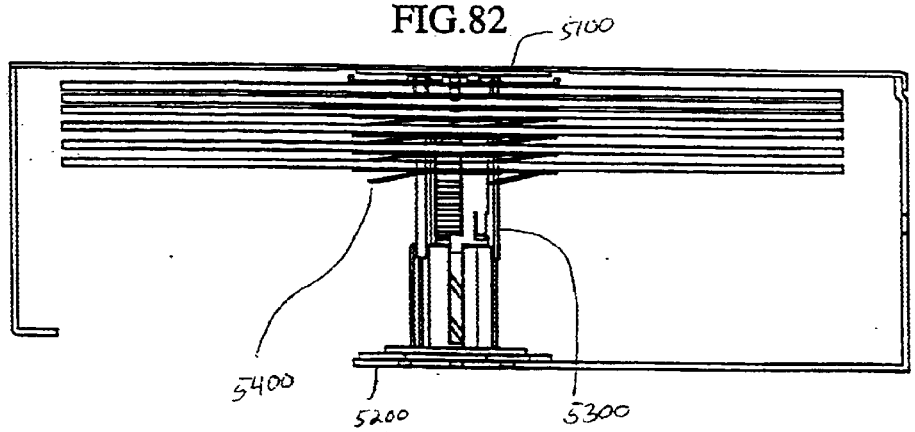
FIG. 82 is an explanatory view of the action of the components of the disk loading mechanism of the disk device as shown in FIG. 1.
Figure 83:
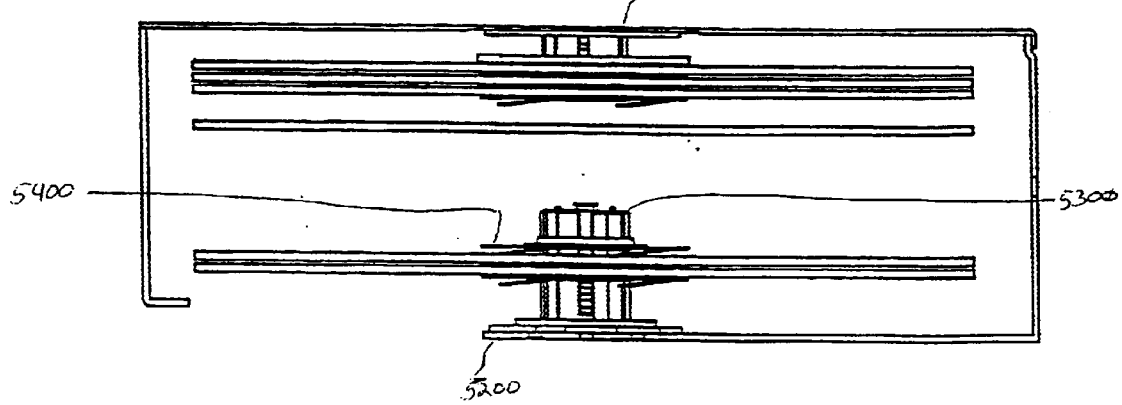
FIG. 83 is an explanatory view of the action of the disk loading mechanism of the disk device as shown in FIG. 1.
Figure 87:
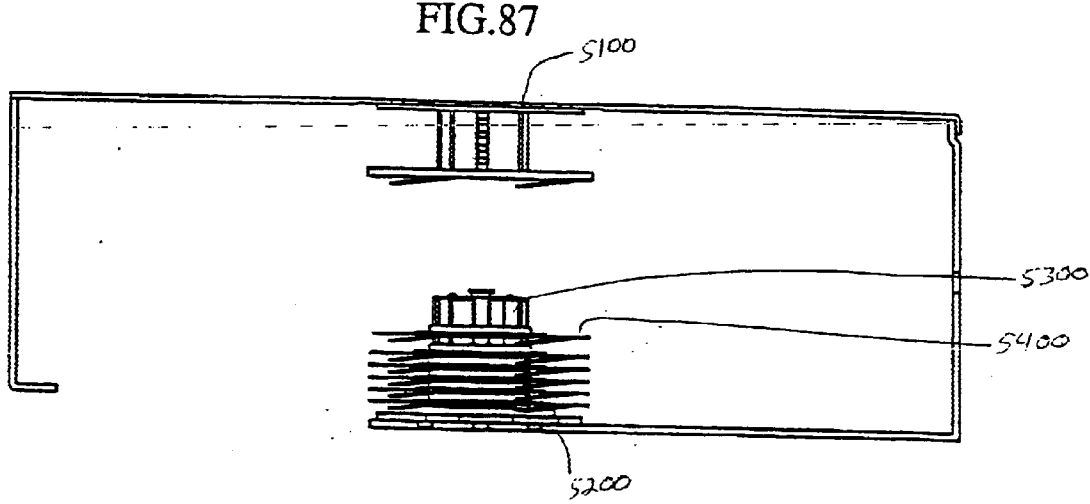
FIG. 87 is an explanatory view of the action of the components of the disk loading mechanism of the disk device as shown in FIG. 1.
Figure 88:
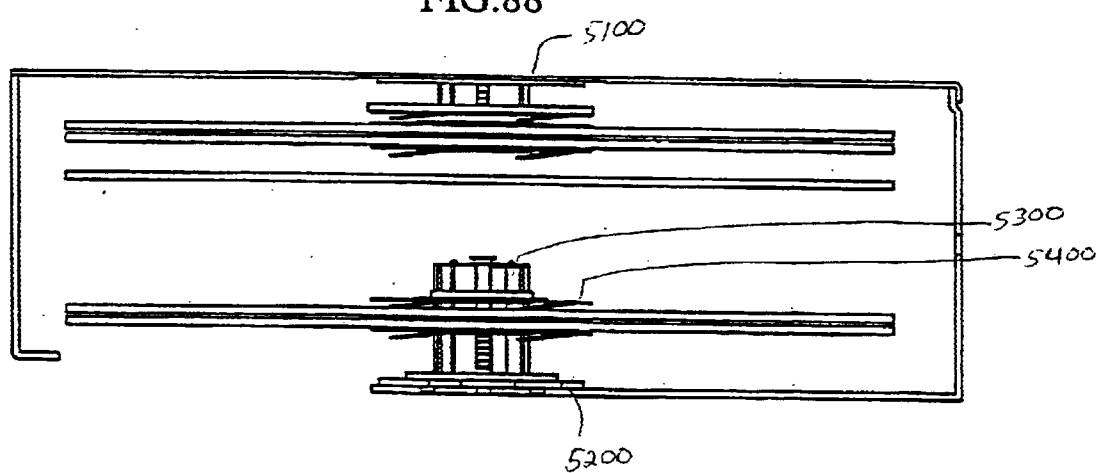
FIG. 88 is an explanatory view of the action of the components of the disk loading mechanism of the disk device as shown in FIG. 1.
Figure 89:
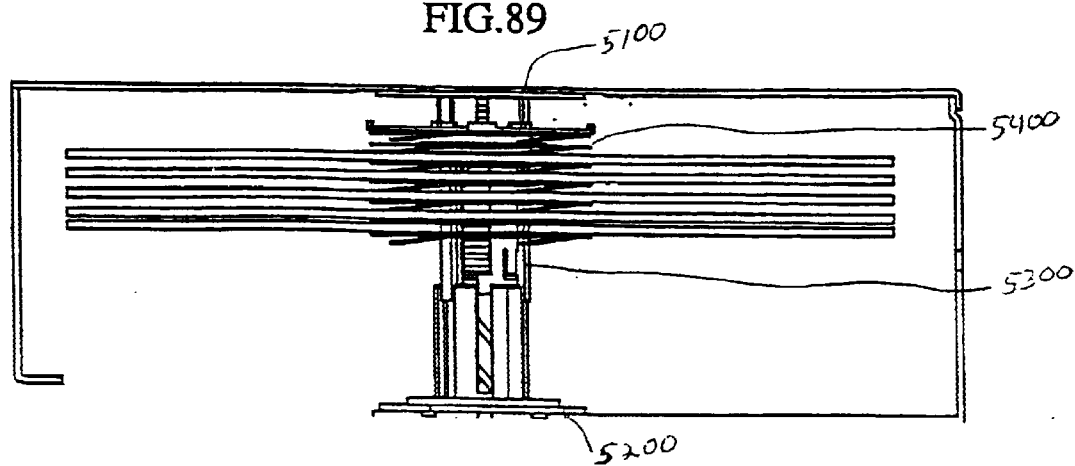
FIG. 89 is an explanatory view of the action of the components of the disk loading mechanism of the disk device as shown in FIG. 1.

The operation of each mandrel mechanism from that as shown in FIG. 67 to that as shown in FIG. 70 will be described using FIG. 65 and FIG. 66.

In the figures, the projection 1043*c* of the plate 1043 abuts with a projection 6001*a* formed on one end of the lever 6001 due to the displacement of the plate 1043 in direction A. Together with the displacement of the plate 1043, the lever 6001 rotates in direction C. A gear section 6001*b* is formed on the curved section of the lever 6001. Together with the displacement of the lever in direction B, the gear link which meshes with the gear section 6001*b* is rotated. Such rotations are transmitted to the gear section 5234 formed on a lower end of the second guide member 5234 and thus the gear section 5234 is rotated. That is to say, the second guide member 5230 is rotated and the third mandrel mechanism 5300 is displaced in the direction of the rotation shaft (in the present embodiment, the third mandrel mechanism 5300 displaces towards an upper section of the device). On the other hand, when the operation of returning the plate 1043 in direction B is performed, the linked lever 6001 is rotated in direction D and the third mandrel mechanism 5300 is displaced in the direction of the rotation shaft (in the present embodiment, the third mandrel mechanism 5300 displaces towards an lower section of the device).

Figure 68A:
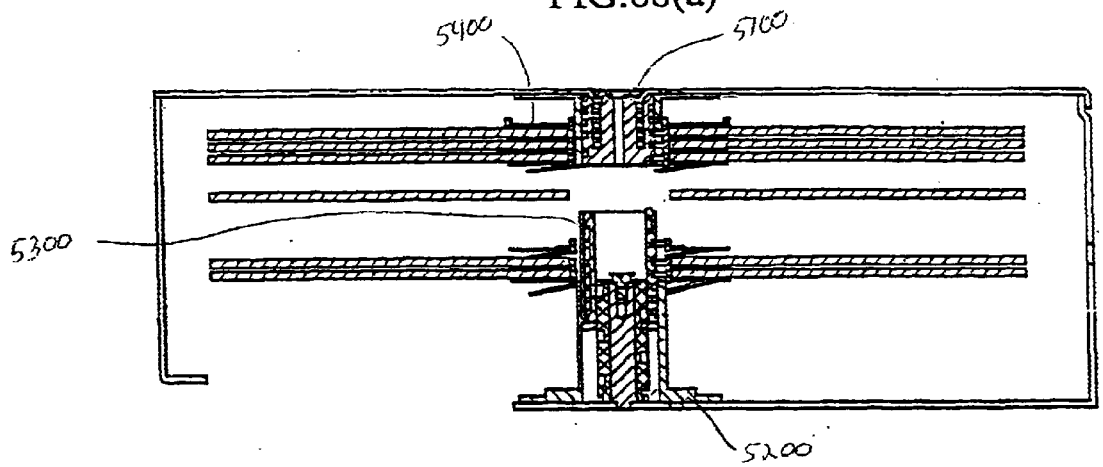
FIG. 68 is an explanatory view of the action of a disk loading mechanism of the disk device as shown in FIG. 1.
Figure 68B:
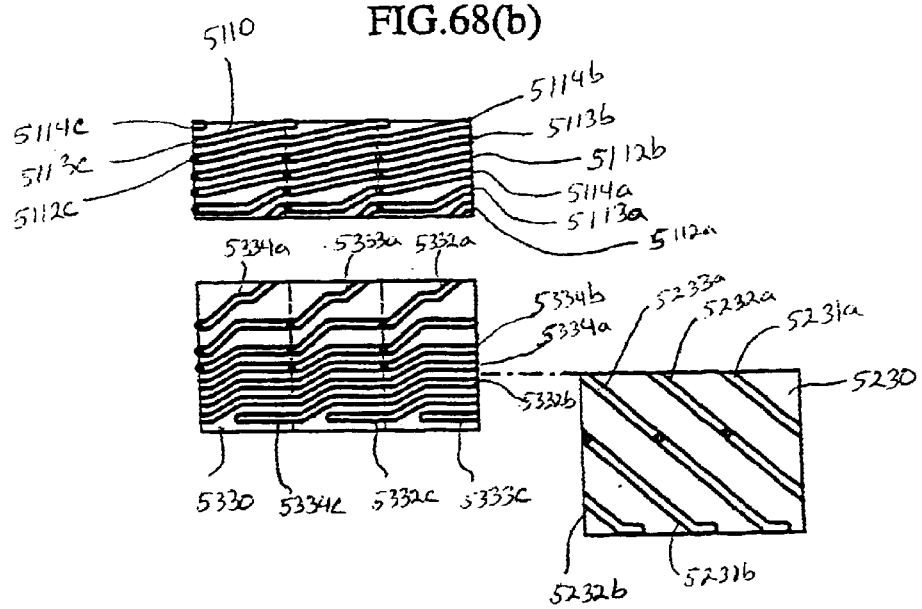
Figure 69A:
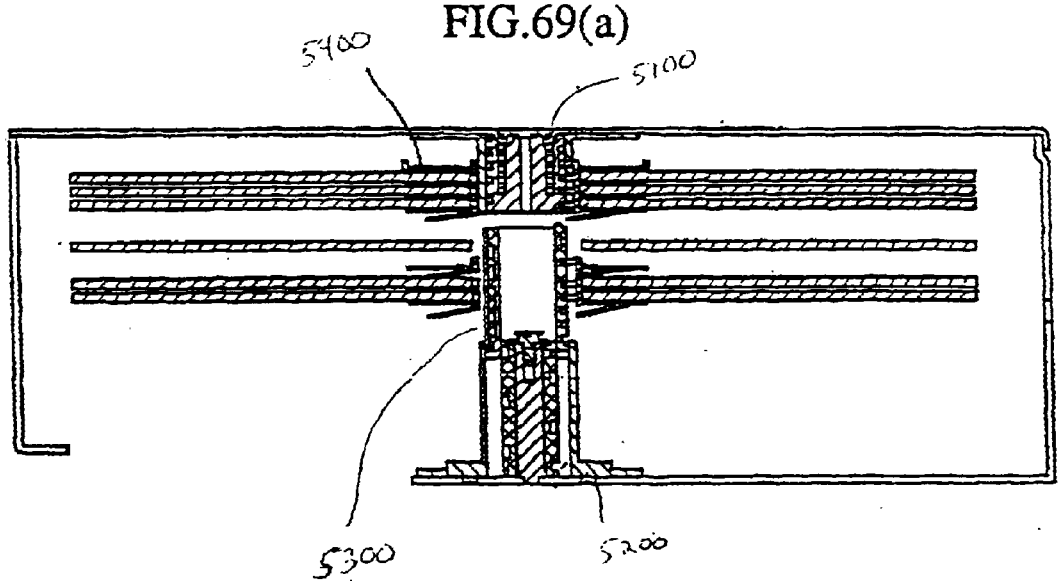
FIG. 69 is an explanatory view of the action of a disk loading mechanism of the disk device as shown in FIG. 1.
Figure 69B:
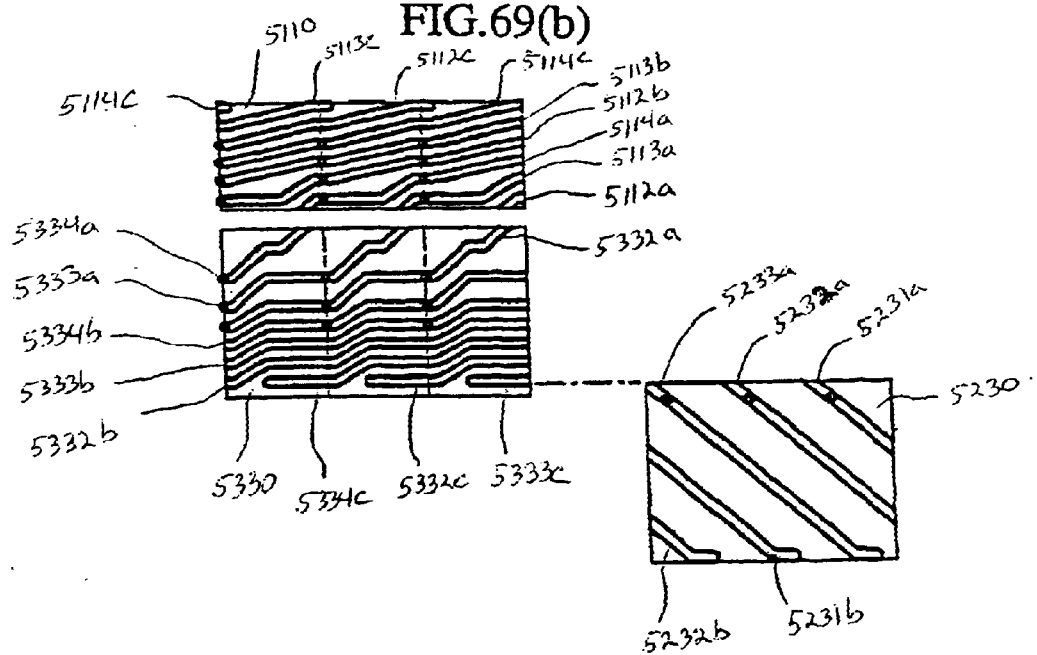

By such an operation, the third mandrel mechanism 5300 slowly rises to a proximate position with the first mandrel mechanism 5100 due to the rotational operation of the second guide member as shown in FIG. 68 and FIG. 69.

Figure 66:
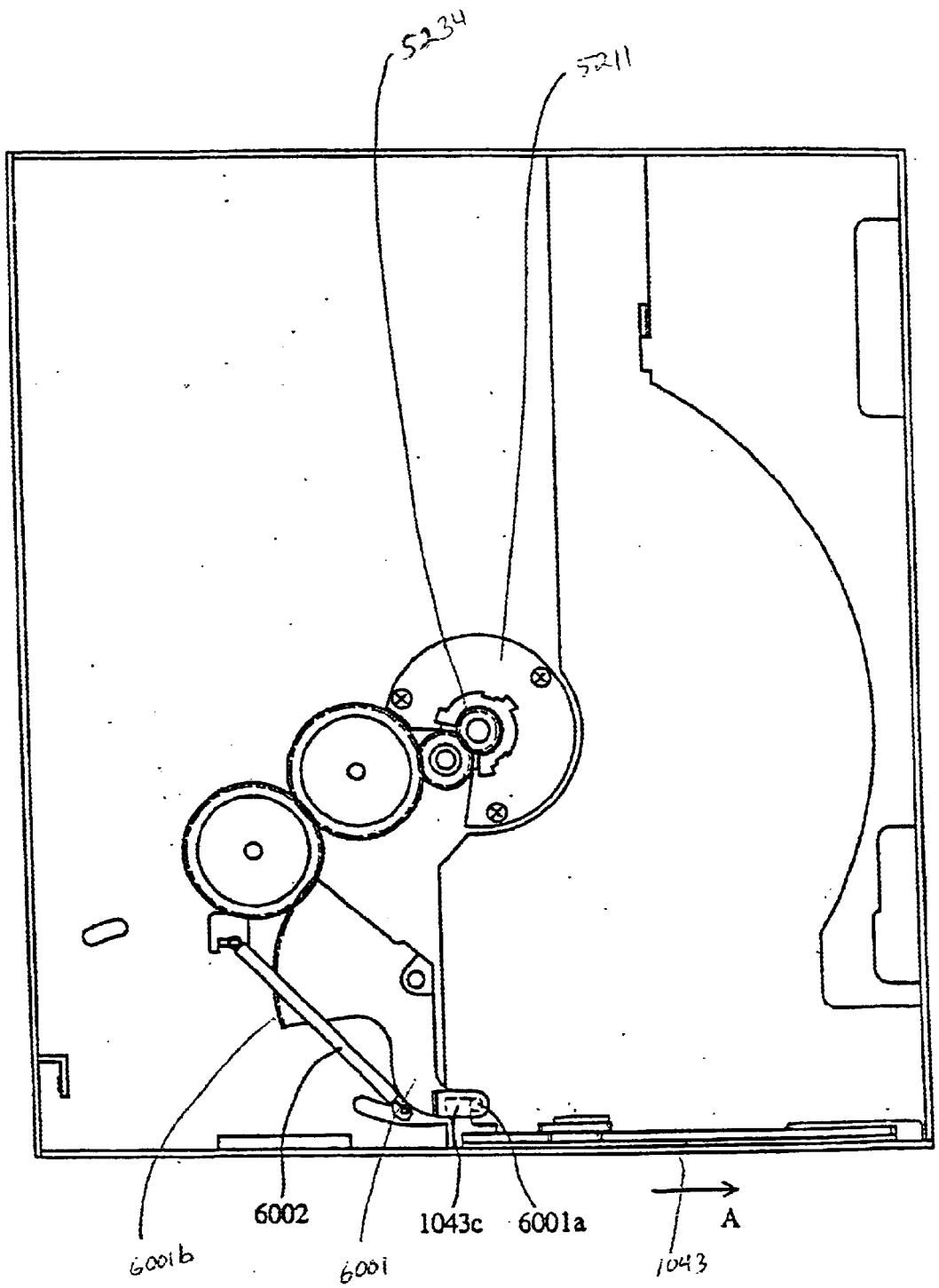
FIG. 66 is a block diagram of the upper surface of the components of a disk loading mechanism of the disk device as shown in FIG. 1.

As shown in FIG. 66, the plate 1043 reaches a position completing the displacement operation and the first mandrel mechanism 5100 and the third mandrel mechanism 5300 are linked as shown in FIG. 70. The indentations 5135, 5136, 5137 of the first holder 5130 are engaged with the projections 5311, 5312, 5313 of the third holder 5301. The indentations 5115, 5116, 5117 of the first guide member 5110 are engaged with the projections 5335, 5336, 5337 of the third guide member 5330. The respective openings of the grooves 5112, 5112, 5113 of the first guide member 5110 and the grooves 5332, 5333, 5334 of the third guide member 5330 are aligned, that is to say, so that three linked grooves are formed. Furthermore the respective openings of the slits 5132, 5133, 5134 of the first guide member 5110 and the slits 5308, 5309, 5310 of the third holder 5301 are aligned so that three linked slits are formed.

The operation of varying the height of a section of a disk is performed as shown in FIG. 70 and FIG. 71. The operation of varying the height of a disk will be described with reference to FIG. 63. In FIG. 71, the rear side of the roof section of the housing 50 is shown. In the figure, the drive force of a motor 6003 which provides worm gear 6003*a* on a rotation shaft is transmitted through a gear link 6004 to rotate a gear 5111 with which the gear link 6004 meshes. In this way, the first guide member 5110 which is integrated with the gear 5111 is adapted to rotate. The upper biasing section 5430 and the first to sixth spacers are adapted to displace in the direction of a rotation shaft due to the rotating operation of the first guide member 5110. In the FIG. 70, a space D1 is provided between the disk R1 which is the object of the operation and the disk R2 which is positioned one step above the disk R1. When the operation as shown in FIG. 71 is performed, the gap D1 between the disk R1 which is the object of the operation and the disk R2 which is positioned one step above the disk R1 becomes smaller and displaces the spacer to the position D2. That is to say, the narrowing of the gap from D1 to D2 displaces the spacer which is positioned between the disk R1 and the disk R2 to a proximate position with respect to the disk R1 and allows the force of biasing of the plate spring member integrated with the spacer to operate. Thus the disk R1 is biased in a downward direction in the device and it is possible to prevent shaking of the disk R.

The exchange of a disk R1 to be the object of an operation to a disk R3 which is loaded in a disk loading mechanism 5000 was described by the above series of operations.

However after the operation in FIG. 71, when the disk R3 is played, an opposite sequence of operations to that described above is performed. That is to say, the sequence of operations from FIG. 71 to FIG. 67 is performed (the selected disk is the disk R1, however this is changed to R3) and thus the disk is played and the device is in the position (state) as shown in FIG. 73.

(7. Description of the operation of the entire device)

FIG. 99 to FIG. 101 describe the operational state of each component in each operational mode of the entire device. FIG. 99 shows the insertion of a disk from the disk insertion mouth, and the operation of each component up to playing the disk. FIG. 100 shows the operation of each component from the playing of a disk to the ejection of the played disk from the insertion mouth. FIG. 101 shows a disk played by the disk playing mechanism 4000 as loaded in the disk loading mechanism 5000 and a single disk which is retained by the disk loading mechanism 5000 being exchanged for a disk to be played. To give an example, the figures show the operational state of each component when the device shifts from a state in which there are 4 play disks and 1 loaded disk to a state in which there are 4 played disks and one loaded disk.

The numerals on the right side denote names of operated components and the numerals on the upper step denote the sequence of transitions in operational modes. Each numeral for each component name shows figure numerals of components with respect to the sequence of transitional state of operational modes.

(7-1. Description from disk insertion operation to disk playing operation)

Based on FIG. 99, each step (one process) performed from disk insertion to disk playing will be described.

Firstly, when the device is in a disk insertion ready state (first step), (1) The drive roller 101 and the peripheral mechanisms of the drive roller 101 in the disk insertion/ejection mechanism 1000 (hereafter termed disk insertion/ejection mechanism) are disposed at a position (state) as shown in FIG. 2.

(2) The disk position determination mechanism 2000 is provided in the position (state) as shown in FIG. 7.

(3) The drive roller switching mechanism which switches the drive motor of the drive roller 101 is set to the position (state) as shown in FIG. 19.

(4) The shutter mechanism 2200 is set to the position (state) as shown in FIG. 16.

(5) The switching mechanism 2300 in the disk position determination mechanism 2000 is set to the position (state) as shown in FIG. 13.

(6) The disk retaining mechanism 3000 is set to the position (state) as shown in FIG. 25.

Figure 38:
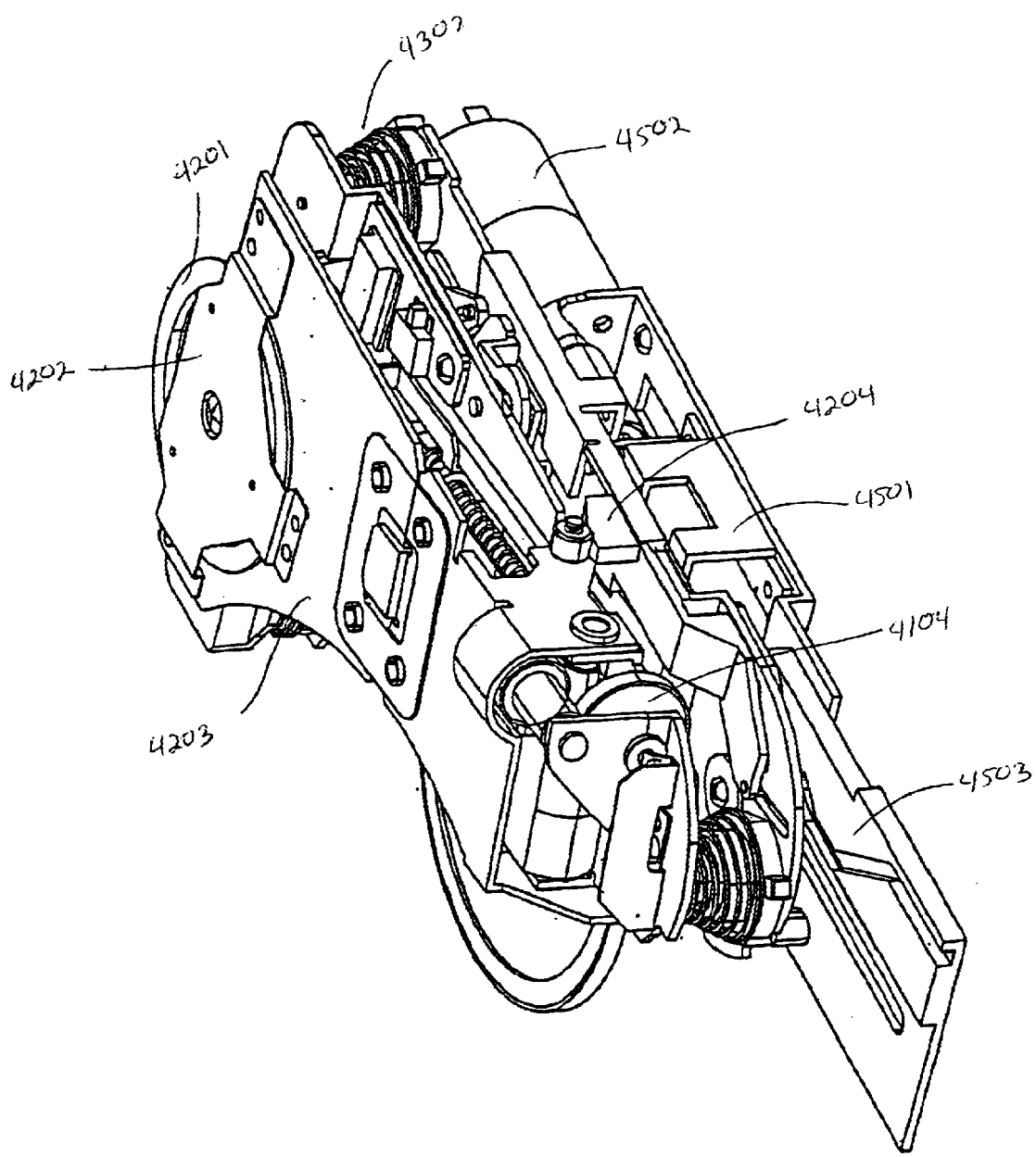
FIG. 38 is an explanatory view of the action of the disk playing mechanism of the disk device as shown in FIG. 1.

(7) The playing section of the disk playing mechanism 4000 continues the setting of the position (state) as shown in FIG. 38 (including FIG. 37, FIG. 39–FIG. 41), in other words, the operation of displacing the disk playing mechanism is not performed.

(8) The disk loading mechanism 5000 is set to the position (state) as shown in FIG. 67.

The set position for a second step is reached.

(1) The disk insertion/ejection mechanism 1000 continues the setting of the position (state) as shown in FIG. 2, in other words, the operation of displacing the disk insertion/ejection mechanism is not performed.

(2) The disk position determination mechanism 2000 displaces from the position as shown in FIG. 7 in the direction G and is set to the position (state) as shown in FIG. 8.

(3) The drive roller switching mechanism which switches the drive motor of the drive roller 101 continues the setting of the position (state) as shown in FIG. 19, in other words, the operation of displacing the drive roller switching mechanism is not performed.

(4) The shutter mechanism 2200 continues the setting of the position (state) as shown in FIG. 16, in other words, the operation of displacing the shutter mechanism is not performed.

(5) The switching mechanism 2300 in the disk position determination mechanism 2000 continues the setting of the position (state) as shown in FIG. 13, in other words, the operation of displacing the switching mechanism is not performed.

(6) The disk retaining mechanism 3000 continues the setting of the position (state) as shown in FIG. 25, in other words, the operation of displacing the disk retaining mechanism 3000 is not performed.

(7) The playing section of the disk playing mechanism 4000 continues the setting of the position (state) as shown in FIG. 38 (including FIG. 37, FIG. 39–FIG. 41), in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a third step is reached.

(1) The disk insertion/ejection mechanism 1000 continues the setting of the position (state) as shown in FIG. 2, in other words, the operation of displacing the disk insertion/ejection mechanism is not performed.

(2) The disk position determination mechanism 2000 displaces further from the position as shown in FIG. 8 in the direction G and is set to the position (state) as shown in FIG. 9.

(3) The drive roller switching mechanism which switches the drive motor of the drive roller 101 continues the setting of the position (state) as shown in FIG. 19, in other words, the operation of displacing the drive roller switching mechanism is not performed.

(4) The shutter mechanism 2200 continues the setting of the position (state) as shown in FIG. 16, in other words, the operation of displacing the shutter mechanism is not performed.

(5) The switching mechanism 2300 in the disk position determination mechanism 2000 continues the setting of the position (state) as shown in FIG. 13, in other words, the operation of displacing the switching mechanism is not performed.

(6) The disk retaining mechanism 3000 continues the setting of the position (state) as shown in FIG. 25, in other words, the operation of displacing the disk retaining mechanism 3000 is not performed.

(7) The playing section of the disk playing mechanism 4000 continues the setting of the position (state) as shown in FIG. 38 (including FIG. 37, FIG. 39–FIG. 41), in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a fourth step is reached.

(1) The disk insertion/ejection mechanism 1000 displaces from the position as shown in FIG. 2 to the direction of A and is provided in the position (state) as shown in FIG. 3.

(2) The disk position determination mechanism 2000 displaces further from the position as shown in FIG. 9 in the direction G and is set to the position (state) as shown in FIG. 10.

(3) The drive roller switching mechanism which switches the drive motor of the drive roller 101 displaces from the position as shown in FIG. 19 and is set to the position (state) as shown in FIG. 20.

(4) The shutter mechanism 2200 continues the setting of the position (state) as shown in FIG. 16, in other words, the operation of displacing the shutter mechanism is not performed.

(5) The switching mechanism 2300 in the disk position determination mechanism 2000 continues the setting of the position (state) as shown in FIG. 13. Further it displaces in a vertical direction with respect to the device and is set to the position (state) as shown in FIG. 24.

(6) The disk retaining mechanism 3000 continues the setting of the position (state) as shown in FIG. 25, in other words, the operation of displacing the disk retaining mechanism 3000 is not performed.

(7) The playing section of the disk playing mechanism 4000 continues the setting of the position (state) as shown in FIG. 38 (including FIG. 37, FIG. 39–FIG. 41), in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a fifth step is reached.

(1) The disk insertion/ejection mechanism 1000 continues the setting of the position (state) as shown in FIG. 3, in other words, the operation of displacing the disk insertion/ejection mechanism is not performed.

(2) The disk position determination mechanism 2000 continues the setting of the position (state) as shown in FIG. 10, in other words, the operation of displacing the disk position determination mechanism is not performed.

(3) The drive roller switching mechanism which switches the drive motor of the drive roller 101 displaces from the position as shown in FIG. 20 and is set to the position (state) as shown in FIG. 22.

(4) The shutter mechanism 2200 displaces from the position as shown in FIG. 16 and is set to the position (state) as shown in FIG. 17.

(5) The switching mechanism 2300 in the disk position determination mechanism 2000 continues the setting of the position (state) as shown in FIG. 13 and the vertical setting of the position (state) as shown in FIG. 24, in other words, the displacing operation is not performed.

(6) The disk retaining mechanism 3000 displaces from the position as shown in FIG. 25 and is set to the position (state) as shown in FIG. 26.

(7) The playing section of the disk playing mechanism 4000 displaces from the position as shown in FIG. 38 (including FIG. 37, FIG. 39–FIG. 41) and is set to the position as shown in FIG. 42a.

(8) The disk loading mechanism 5000 continues the setting of the position (state) as shown in FIG. 67, in other words, the operation of displacing the disk loading mechanism is not performed.

The set position for a sixth step is reached.

(1) The disk insertion/ejection mechanism 1000 continues the setting of the position (state) as shown in FIG. 3, in other words, the operation of displacing the disk insertion/ejection mechanism is not performed.

(2) The disk position determination mechanism 2000 continues the setting of the position (state) as shown in FIG. 10, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting (state in the fourth step) of the position (state) as shown in FIG. 13, in other words, the operation of displacing the switching mechanism is not performed.

(6) The disk retaining mechanism 3000 displaces from the position as shown in FIG. 26 and is set to the position (state) as shown in FIG. 27.

(7) The playing section of the disk playing mechanism 4000 displaces from the position as shown in FIG. 42a and is set to the position as shown in FIG. 27.

(8) The disk loading mechanism 5000 continues the setting of the position (state) as shown in FIG. 67, in other words, the operation of displacing the disk loading mechanism is not performed.

The set position for a seventh step is reached.

(1) The disk insertion/ejection mechanism 1000 continues the setting of the position (state) as shown in FIG. 3, in other words, the operation of displacing the disk insertion/ejection mechanism is not performed.

(2) The disk position determination mechanism 2000 continues the setting of the position (state) as shown in FIG. 10, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 displaces from the position as shown in FIG. 13 and is set to the position (state) as shown in FIG. 14.

(6) The disk retaining mechanism 3000 continues the setting of the position (state) as shown in FIG. 27, in other words, the operation of displacing the disk retaining mechanism 3000 is not performed.

Figure 42:
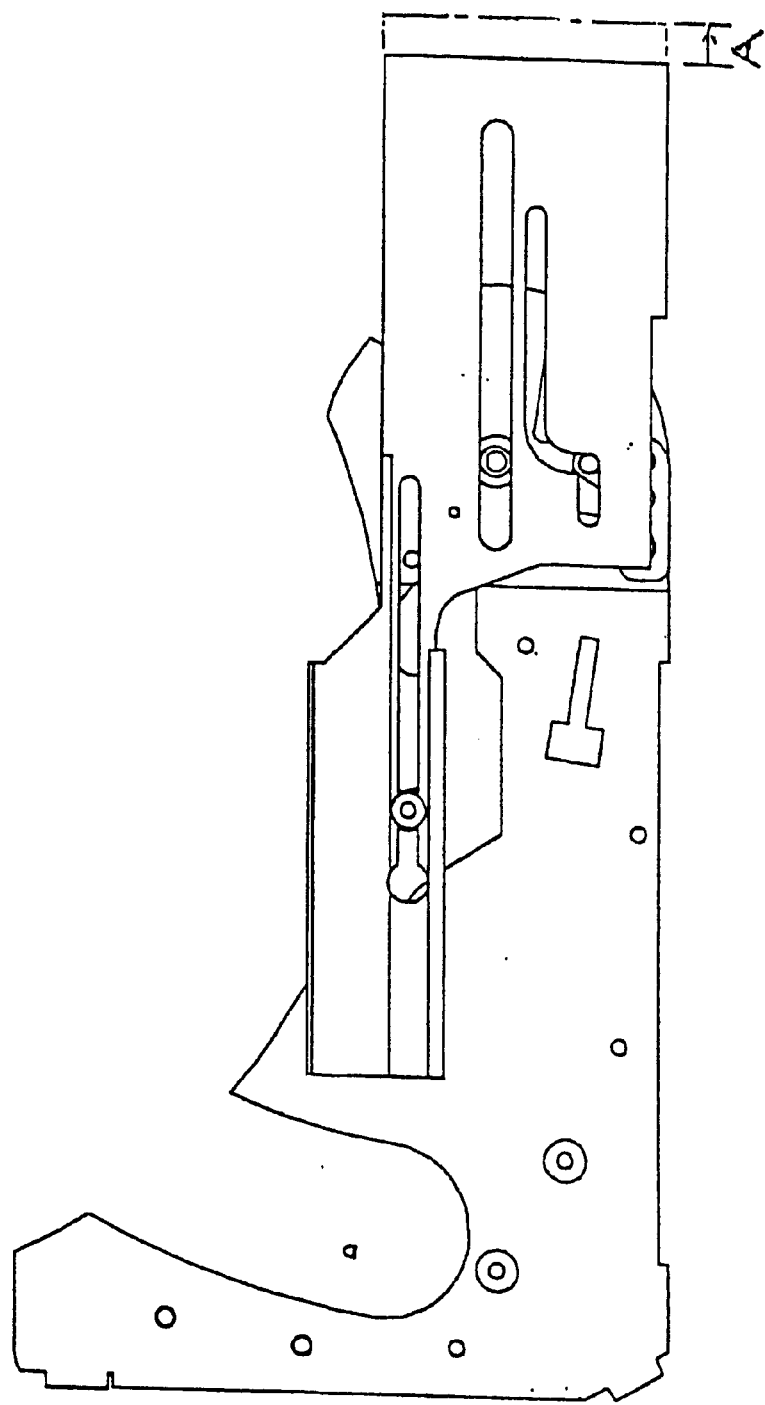
FIG. 42 is an explanatory view of the action of the disk playing mechanism of the disk device as shown in FIG. 1.

(7) The playing section of the disk playing mechanism 4000 continues the setting of the position (state) as shown in FIG. 42, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for an eighth step is reached.

(1) The disk insertion/ejection mechanism 1000 displaces further from the position as shown in FIG. 3 in the direction A and is set to the position (state) as shown in FIG. 4.

(2) The disk position determination mechanism 2000 displaces from the position as shown in FIG. 10 and is set to the position (state) as shown in FIG. 15.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 displaces from the position as shown in FIG. 14 and is set to the position (state) as shown in FIG. 15.

(6) The disk retaining mechanism 3000 continues the setting of the position (state) as shown in FIG. 27, in other words, the operation of displacing the disk retaining mechanism 3000 is not performed.

(7) The disk playing mechanism 4000 continues the setting of the position (state) as shown in FIG. 42, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a ninth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 27, in other words, the operation of displacing the disk retaining mechanism 3000 is not performed.

Figure 43:
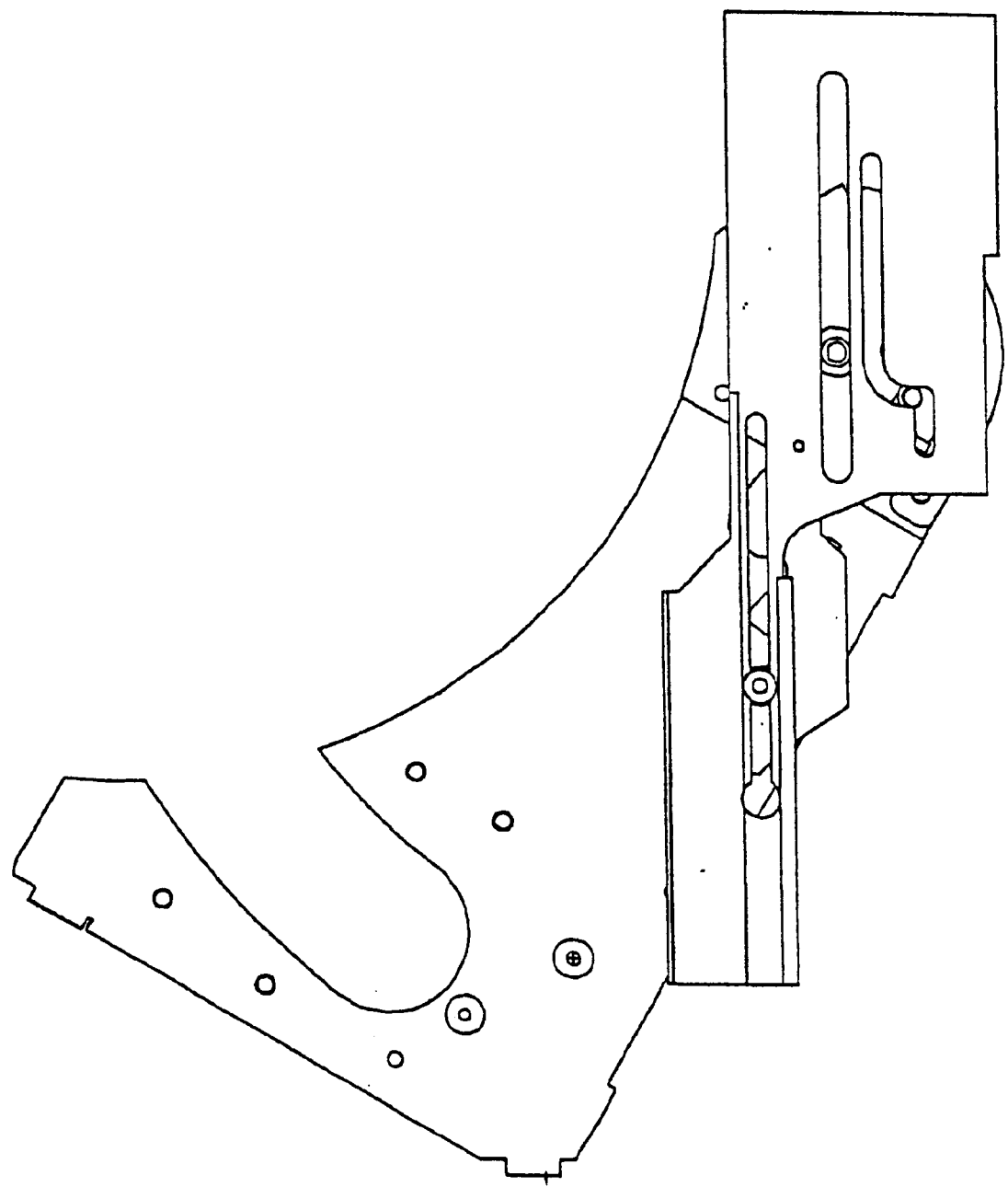
FIG. 43 is an explanatory view of the action of the disk playing mechanism of the disk device as shown in FIG. 1.

(7) The playing section of the disk playing mechanism 4000 rotates from the position as shown in FIG. 42 and is set to the position (state) as shown in FIG. 43.

(8) The disk loading mechanism 5000 continues the setting of the position (state) as shown in FIG. 67, in other words, the operation of displacing the disk loading mechanism is not performed.

The set position for a tenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 displaces from the position as shown in FIG. 27 and is set to the position (state) as shown in FIG. 28.

Figure 44:
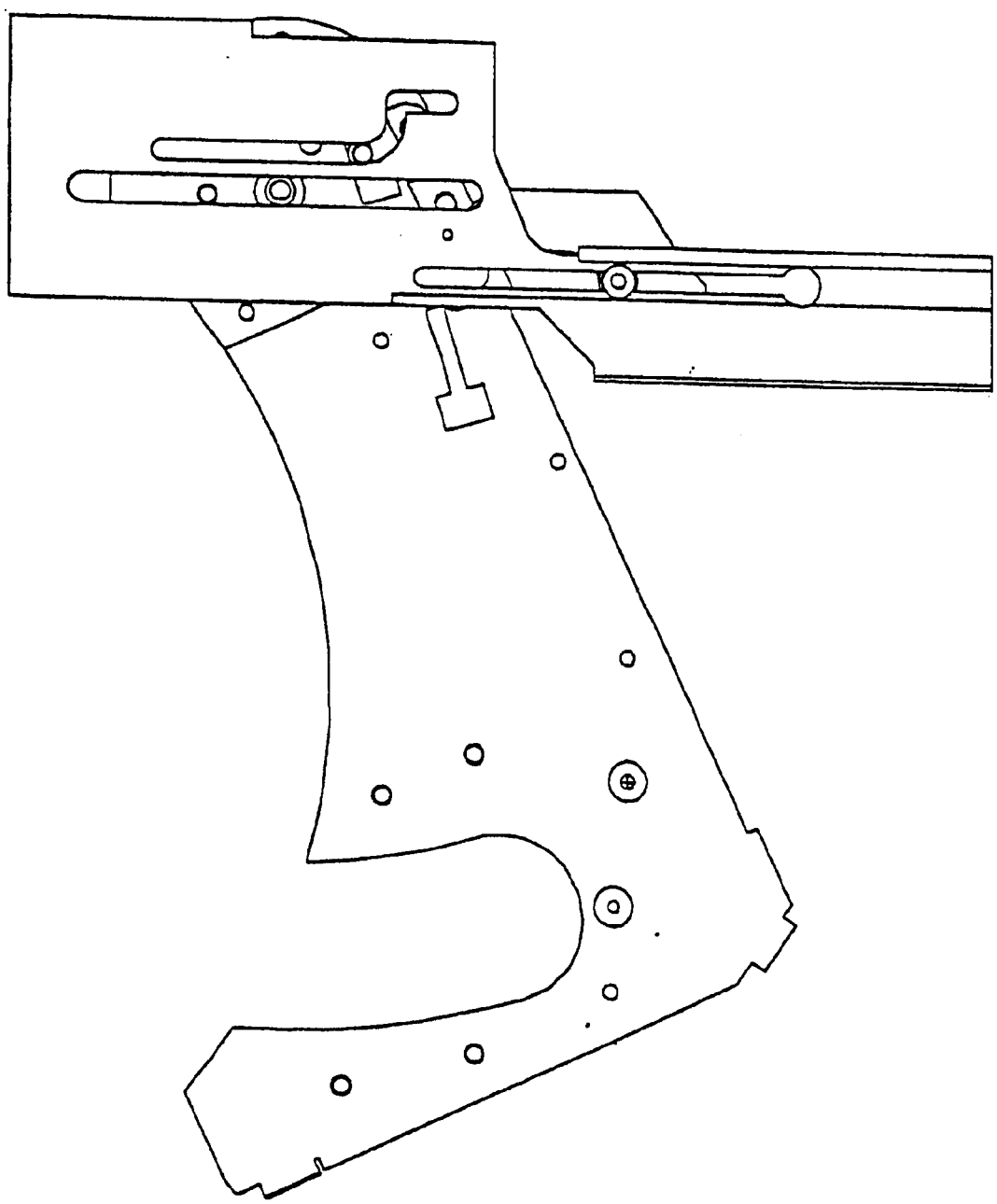
FIG. 44 is an explanatory view of the action of the disk playing mechanism of the disk device as shown in FIG. 1.

(7) The disk playing mechanism 4000 rotates further from the position as shown in FIG. 43 and is set to the position (state) as shown in FIG. 44.

(8) The disk loading mechanism 5000 continues the setting of the position (state) as shown in FIG. 67, in other words, the operation of displacing the disk loading mechanism is not performed.

The set position for a eleventh step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 displaces from the position as shown in FIG. 17 and is set to the position (state) as shown in FIG. 18.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 displaces from the position as shown in FIG. 28 and is set to the position (state) as shown in FIG. 29.

(7) The playing section of the disk playing mechanism 4000 continues the setting of the position (state) as shown in FIG. 44, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a twelfth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the switching mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 29, in other words, the operation of displacing the disk retaining mechanism 3000 is not performed.

Figure 45:
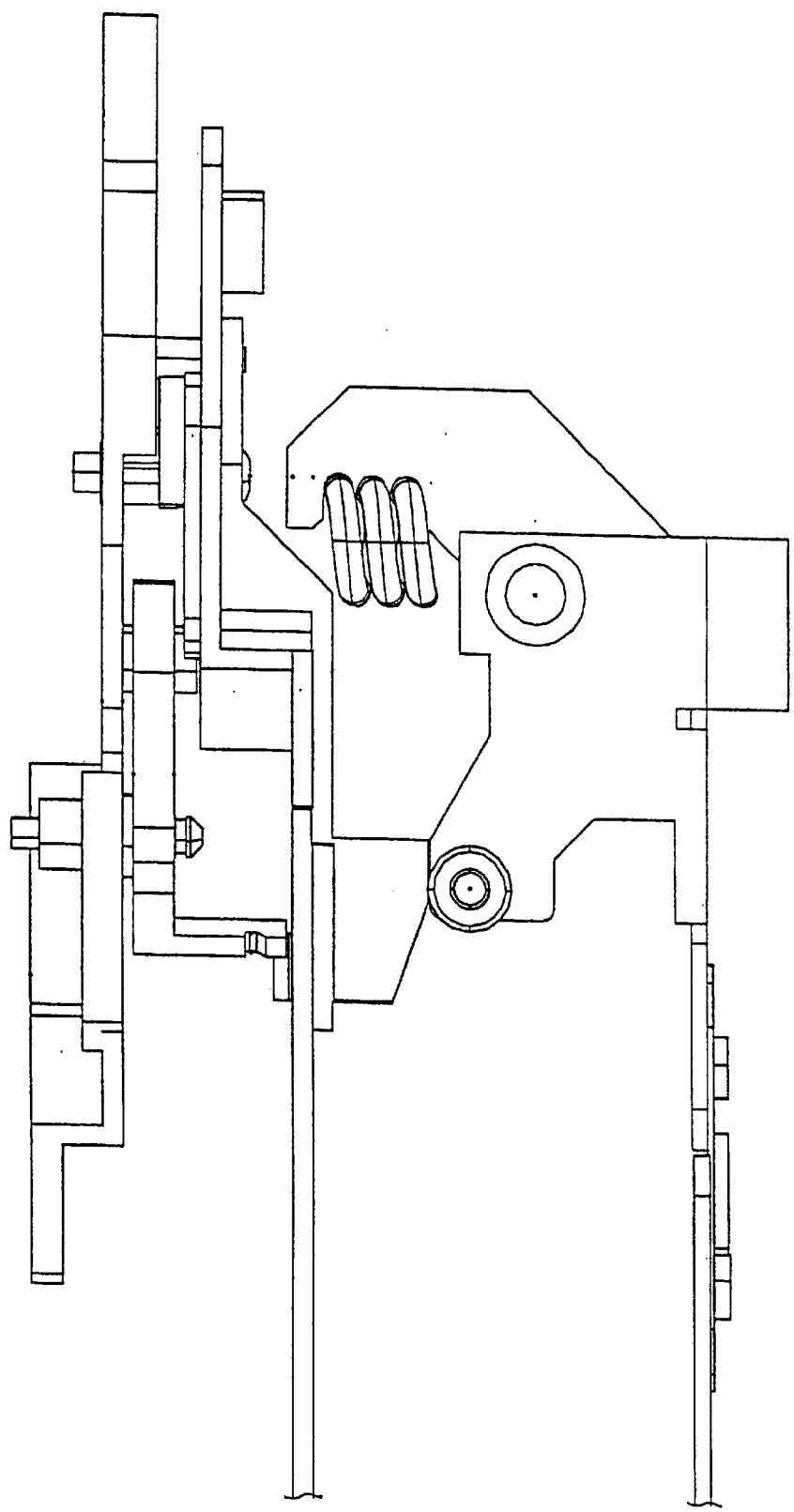
FIG. 45 is an explanatory view of the action of the disk playing mechanism of the disk device as shown in FIG. 1.
Figure 46:
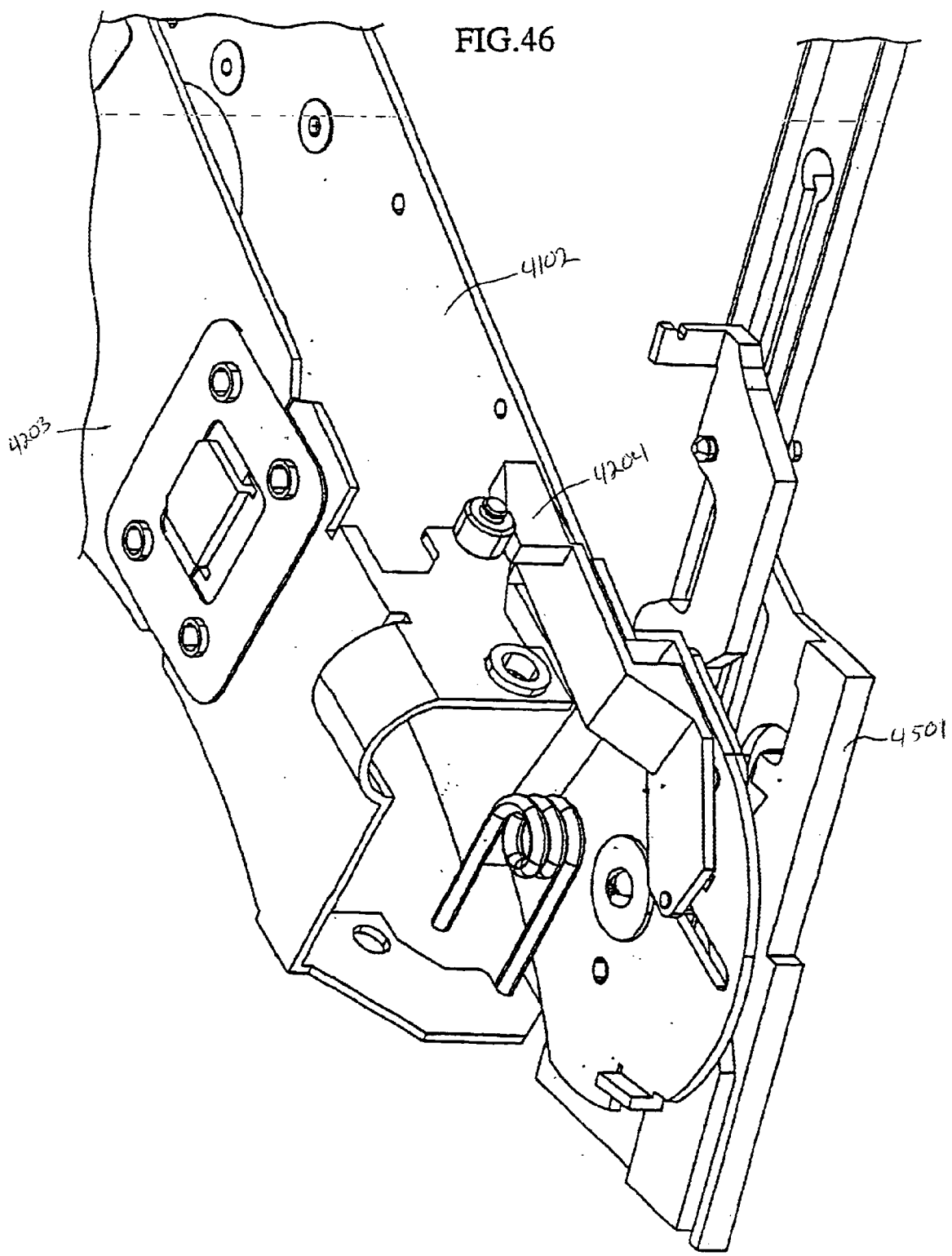
FIG. 46 is an explanatory view of the action of the disk playing mechanism of the disk device as shown in FIG. 1.
Figure 47:
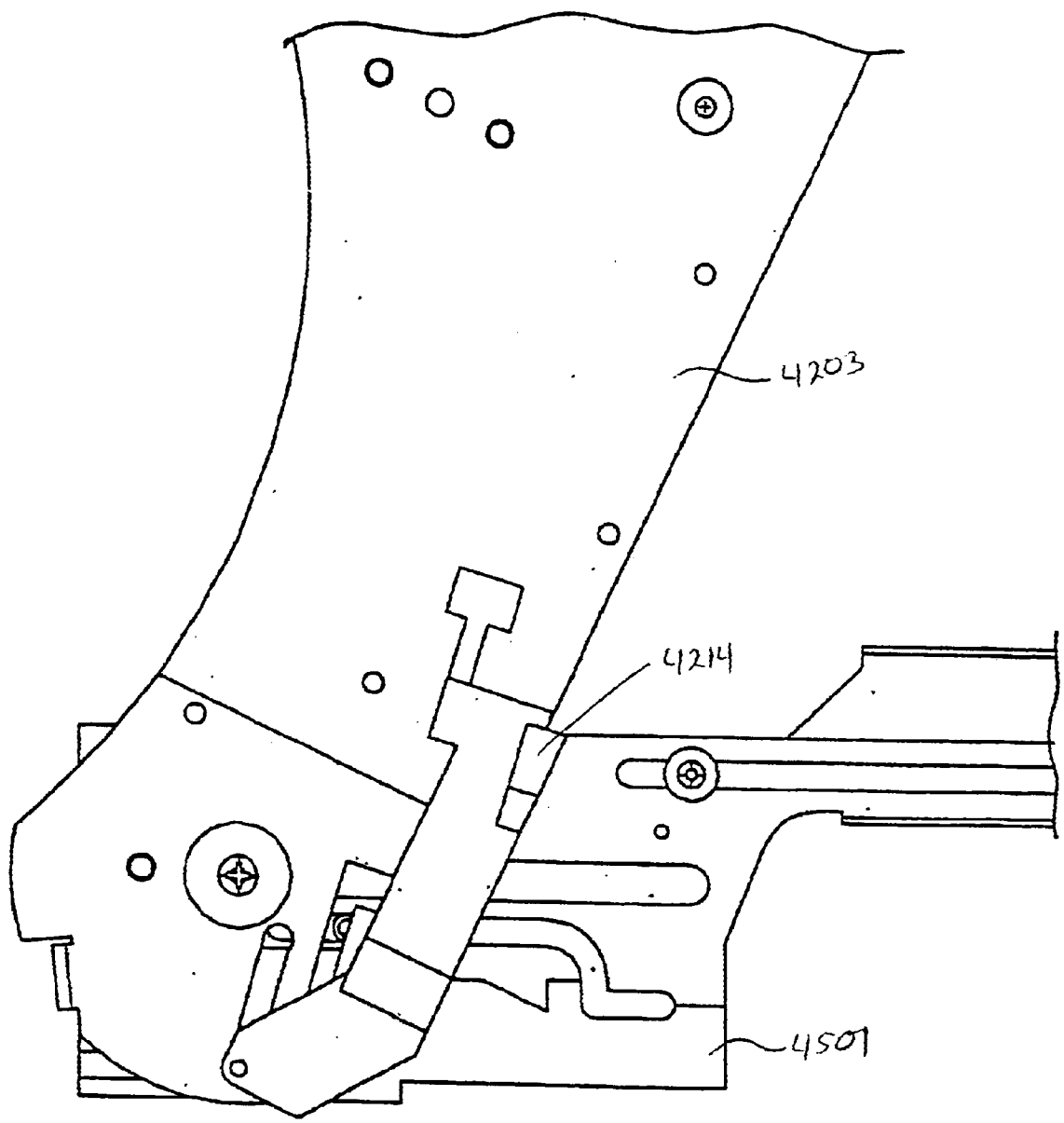
FIG. 47 is an explanatory view of the action of the disk playing mechanism of the disk device as shown in FIG. 1.
Figure 48:
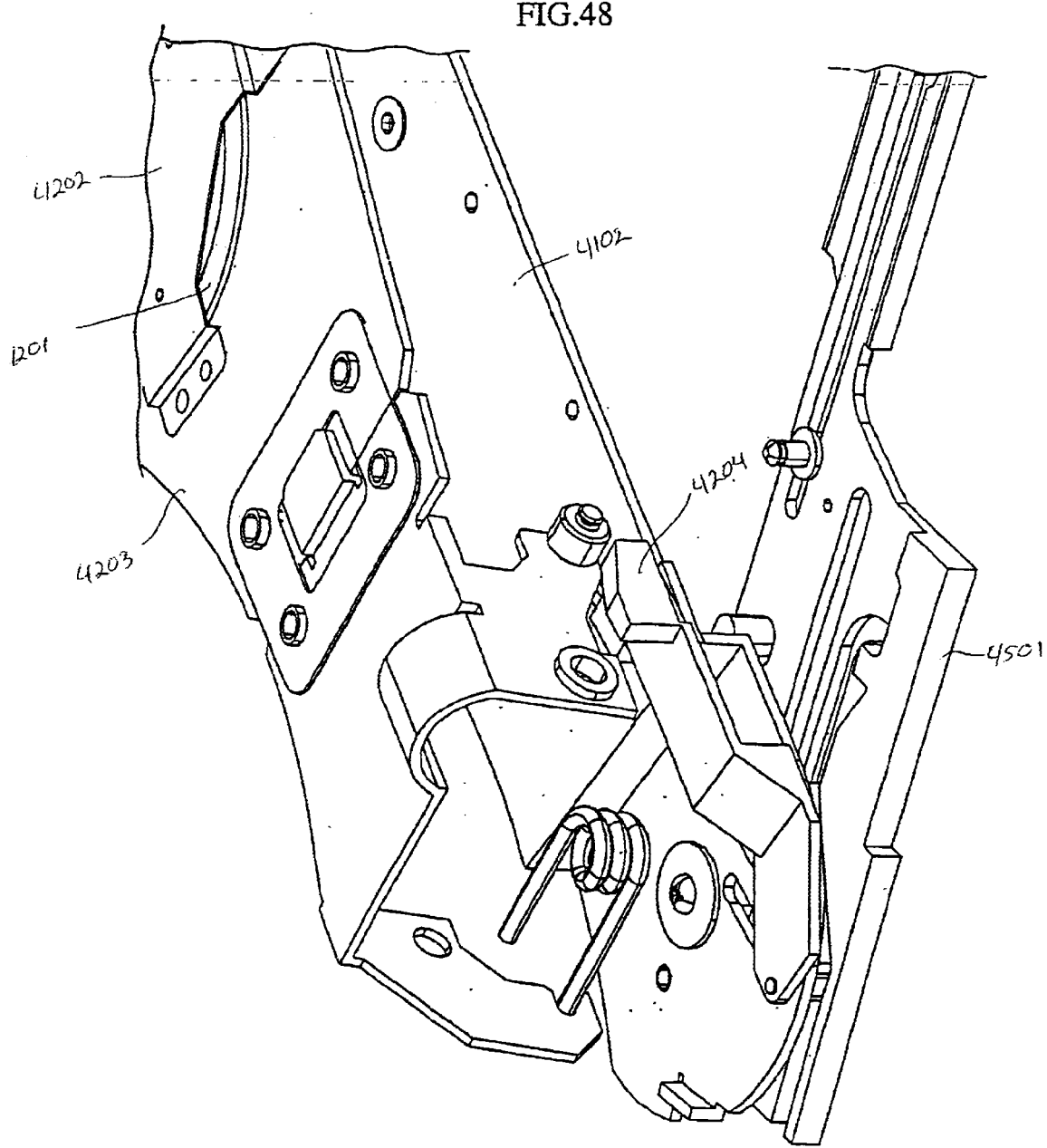
FIG. 48 is an explanatory view of the action of the disk playing mechanism of the disk device as shown in FIG. 1.
Figure 49:
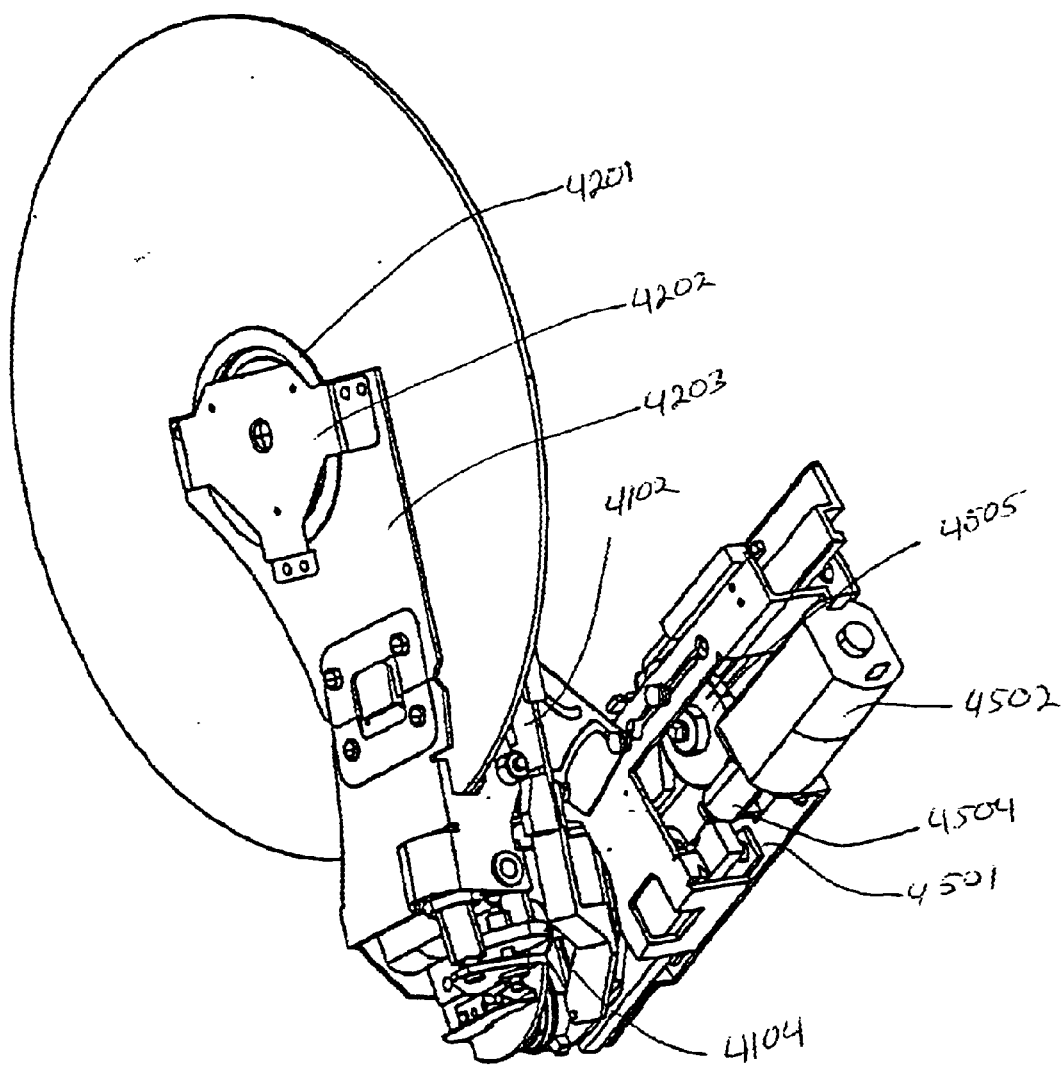
FIG. 49 is an explanatory view of the action of the disk playing mechanism of the disk device as shown in FIG. 1.
Figure 50:
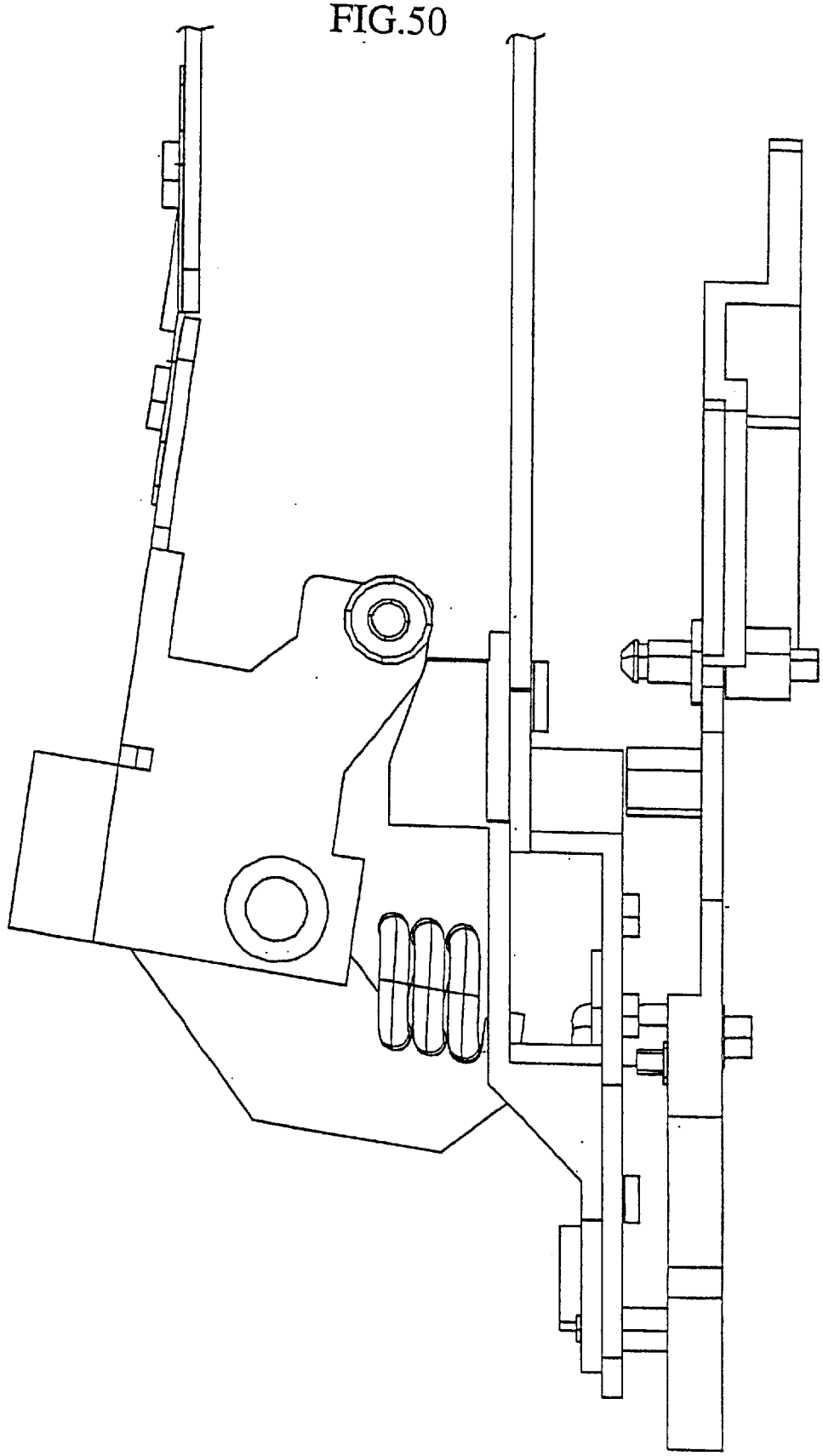
FIG. 50 is an explanatory view of the action of the disk playing mechanism of the disk device as shown in FIG. 1.

(7) The playing section of the disk playing mechanism 4000 displaces from the position as shown in FIG. 44 and is set to the position (state) as shown in FIG. 45 and FIG. 46 (the clamp operation is performed).

(8) The disk loading mechanism 5000 continues the setting of the position (state) as shown in FIG. 67, in other words, the operation of displacing the disk loading mechanism is not performed.

The set position for a thirteenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the switching mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 29, in other words, the operation of displacing the disk support mechanism 3000 is not performed.

(7) The playing section of the disk playing mechanism 4000 displaces from the position as shown in FIG. 45 and FIG. 46 and is set to the position (state) as shown in FIG. 47–FIG. 50 (the clamp operation is performed).

(8) The disk loading mechanism 5000 continues the setting of the position (state) as shown in FIG. 67, in other words, the operation of displacing the disk loading mechanism is not performed.

The set position for a fourteenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 displaces from the position as shown in FIG. 17 and is set to the position (state) as shown in FIG. 18.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 displaces from the position as shown in FIG. 29 and is set to the position (state) as shown in FIG. 30.

(7) The playing section of the disk playing mechanism 4000 continues the setting of the position (state) as shown in FIG. 47–FIG. 50, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a fifteenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism 2200 is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

Figure 51:
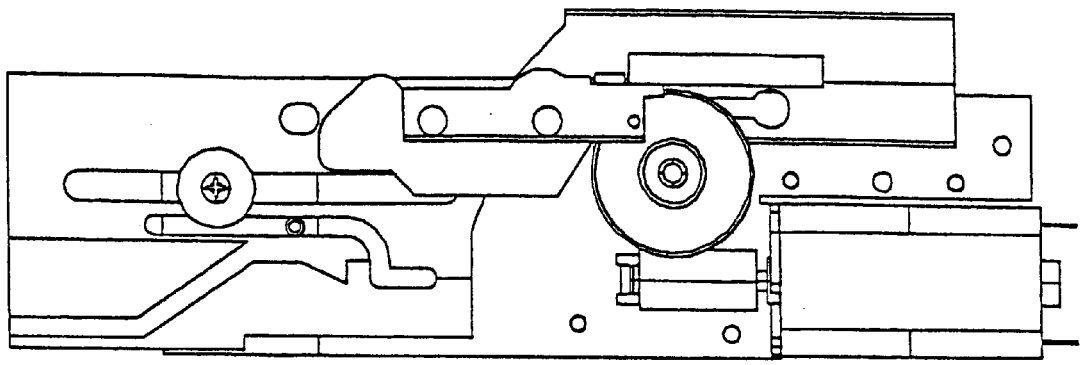
FIG. 51 is an explanatory view of the action of the disk playing mechanism of the disk device as shown in FIG. 1.

(7) The disk playing mechanism 4000 is set to the position (state) as shown in FIG. 51 in which the lock mechanism locks the disk playing mechanism 4000.

(8) The disk loading mechanism 5000 continues the setting of the position (state) as shown in FIG. 67, in other words, the operation of displacing the disk loading mechanism is not performed.

The set position for a sixteenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism 2200 is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk support mechanism 3000 is not performed.

Figure 52:
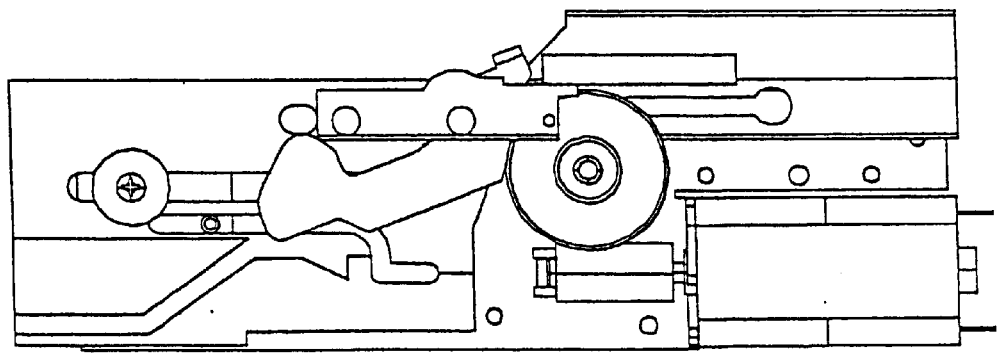
FIG. 52 is an explanatory view of the action of the disk playing mechanism of the disk device as shown in FIG. 1.

(7) The lock mechanism of the disk playing mechanism 4000 displaces from the position as shown in FIG. 51 and is set to the position (state) as shown in FIG. 52.

(8) The disk loading mechanism 5000 continues the setting of the position (state) as shown in FIG. 67, in other words, the operation of displacing the disk loading mechanism is not performed.

The set position for a seventeenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism 2200 is not performed.

(5) The switching mechanism 2300 in the disk position determination mechanism 2000 continues the setting of the position (state) as shown in FIG. 15, in other words, the operation of displacing the switching mechanism is not performed.

(6) The disk support mechanism 3000 continues the setting of the position (state) as shown in FIG. 30, in other words, the operation of displacing the disk retaining mechanism 3000 is not performed.

Figure 53:
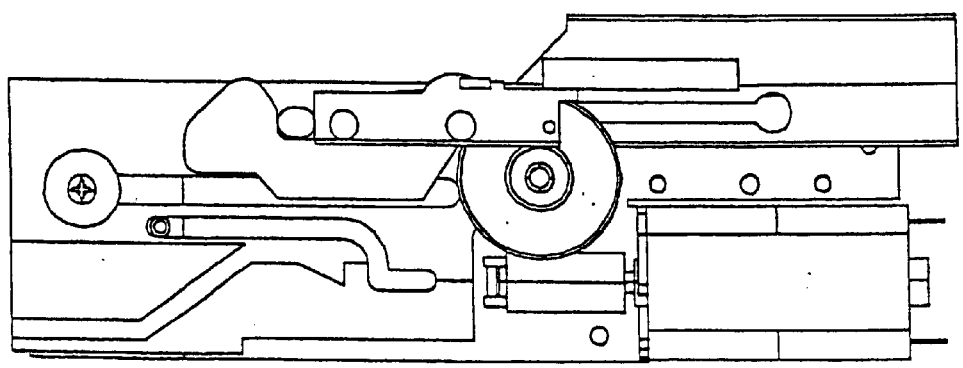
FIG. 53 is an explanatory view of the action of the disk playing mechanism of the disk device as shown in FIG. 1.
Figure 54:
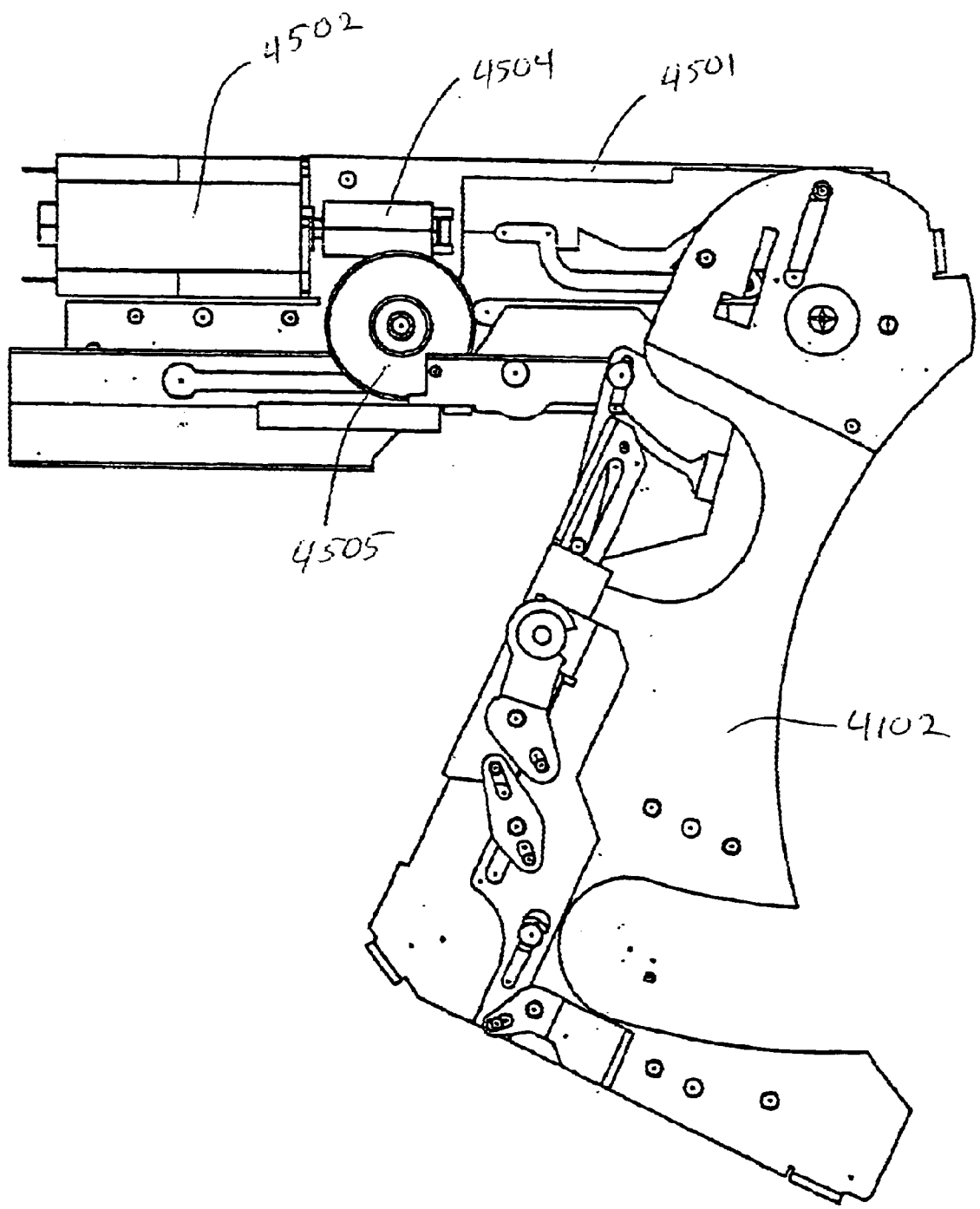
FIG. 54 is an explanatory view of the action of the disk playing mechanism of the disk device as shown in FIG. 1.
Figure 55:
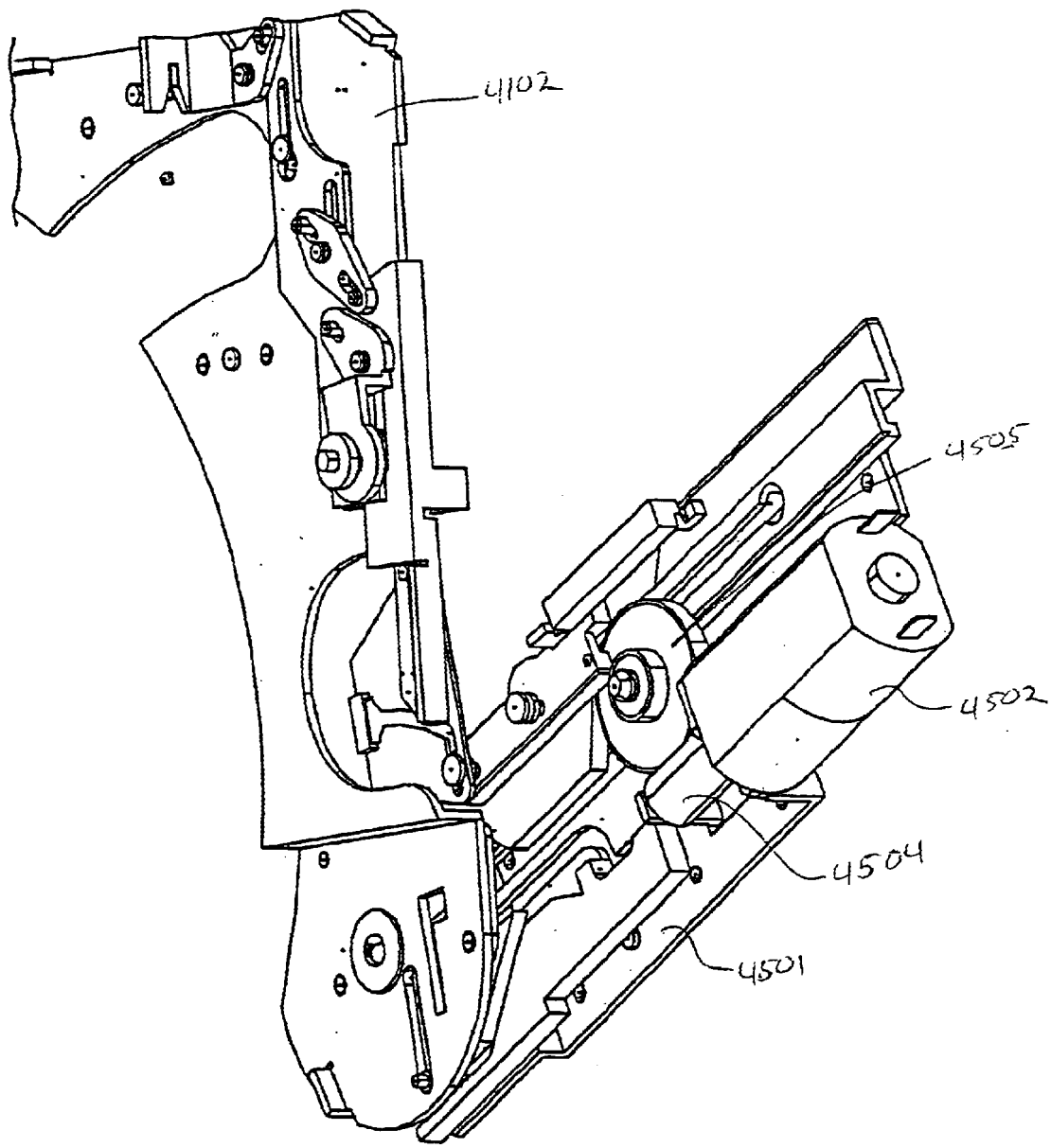
FIG. 55 is an explanatory view of the action of the disk playing mechanism of the disk device as shown in FIG. 1.
Figure 56:
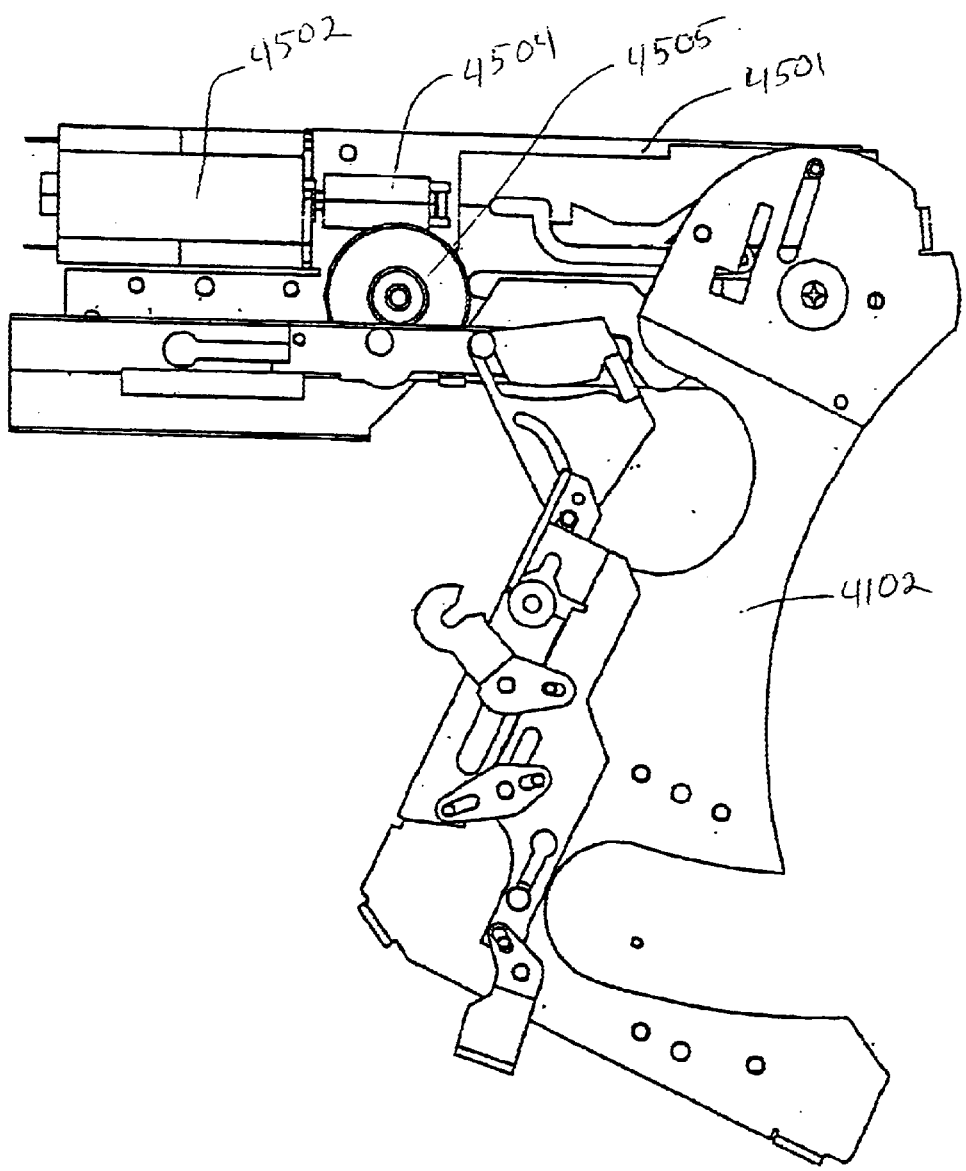
FIG. 56 is an explanatory view of the action of the disk playing mechanism of the disk device as shown in FIG. 1.
Figure 57:
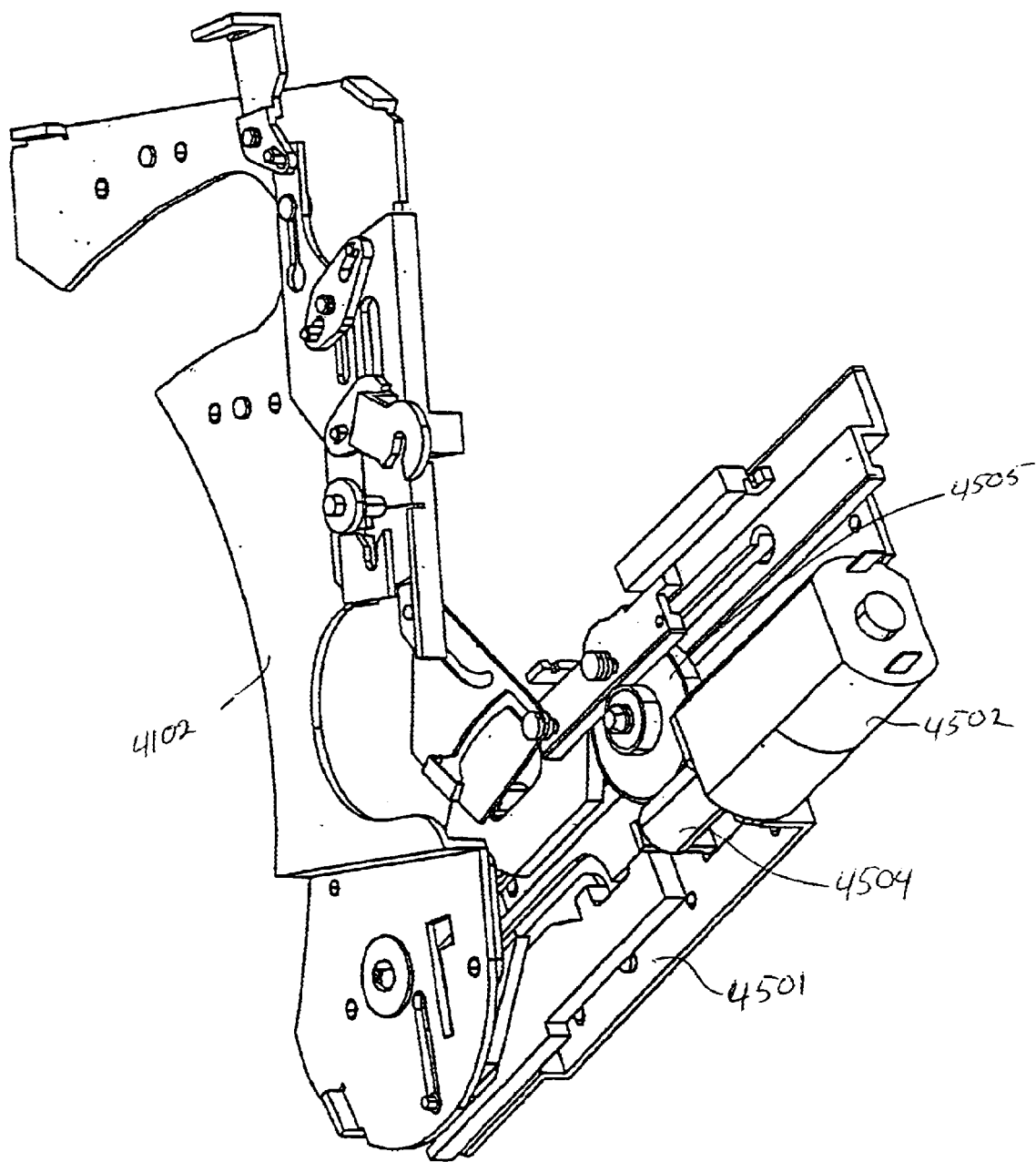
FIG. 57 is an explanatory view of the action of the disk playing mechanism of the disk device as shown in FIG. 1.
Figure 58:
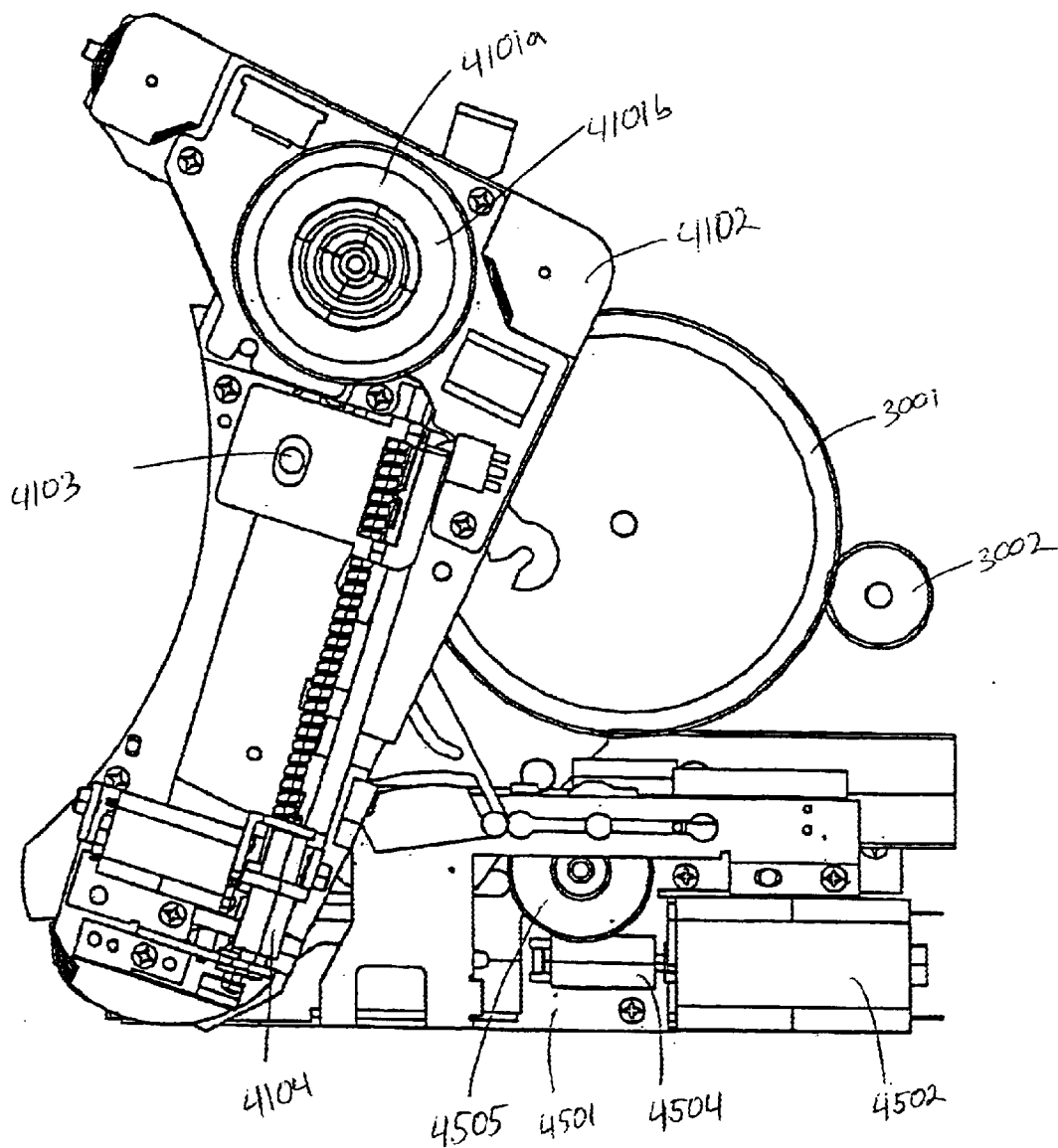
FIG. 58 is an explanatory view of the action of the disk playing mechanism of the disk device as shown in FIG. 1.
Figure 59:
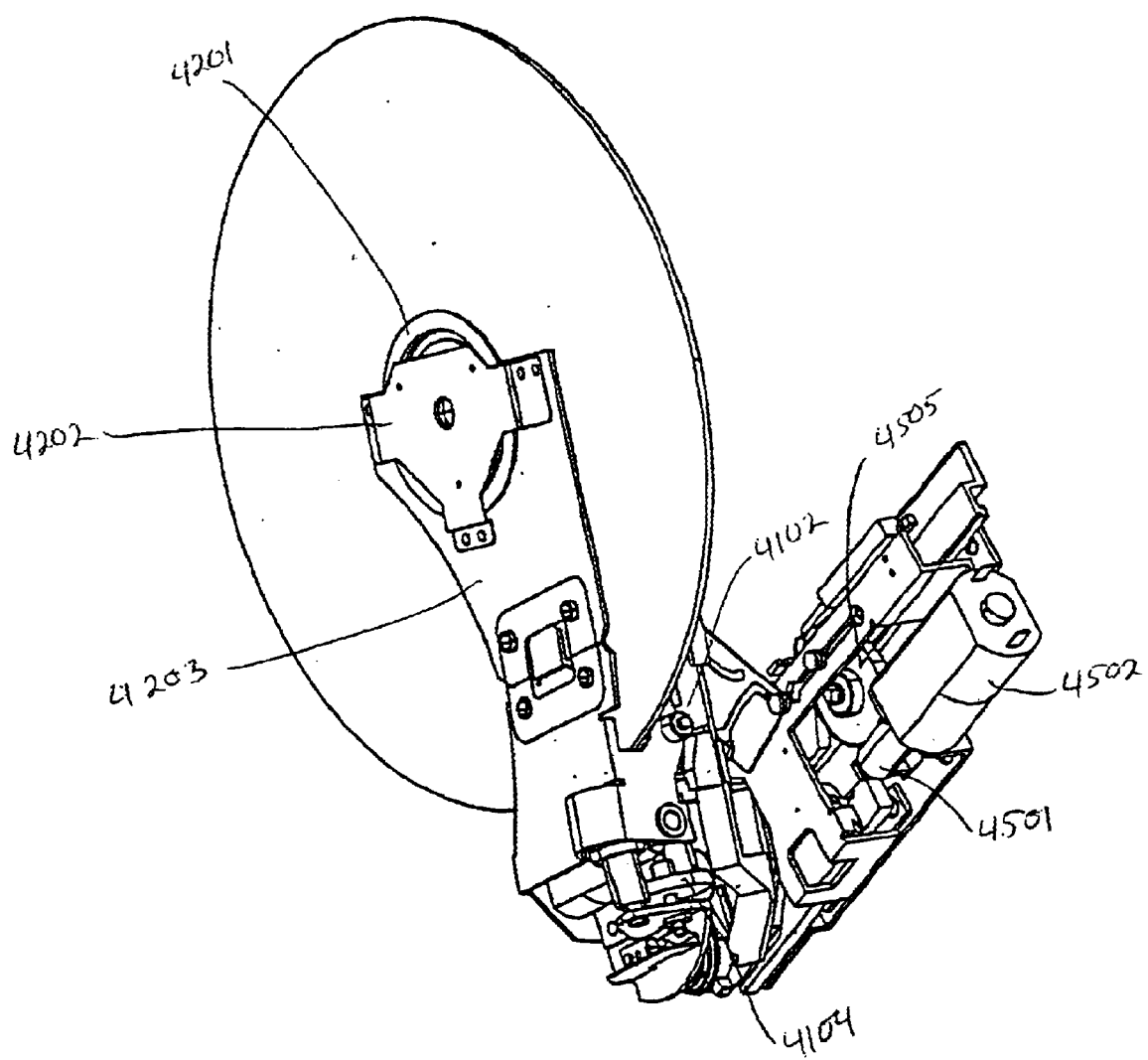
FIG. 59 is an explanatory view of the action of the disk playing mechanism of the disk device as shown in FIG. 1.

(7) The lock mechanism of the disk playing mechanism 4000 displaces from the position as shown in FIG. 52 and is set to the position (state) as shown in FIG. 53–FIG. 55.

The set position for a eighteenth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism 2200 is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

(7) The disk playing mechanism 4000 displaces from the position showing the lock mechanism in FIG. 53–FIG. 55 and is set to the position (state) as shown in FIG. 56–FIG. 59.

(8) The disk loading mechanism 5000 continues the setting of the position (state) as shown in FIG. 67, in other words, the operation of displacing the disk loading mechanism is not performed.

The set position for a nineteenth step is reached.

(1) The disk insertion/ejection mechanism 1000 continues the setting of the position (state) as shown in FIG. 4, in other words, the operation of displacing the disk insertion/ejection mechanism is not performed.

Figure 60:
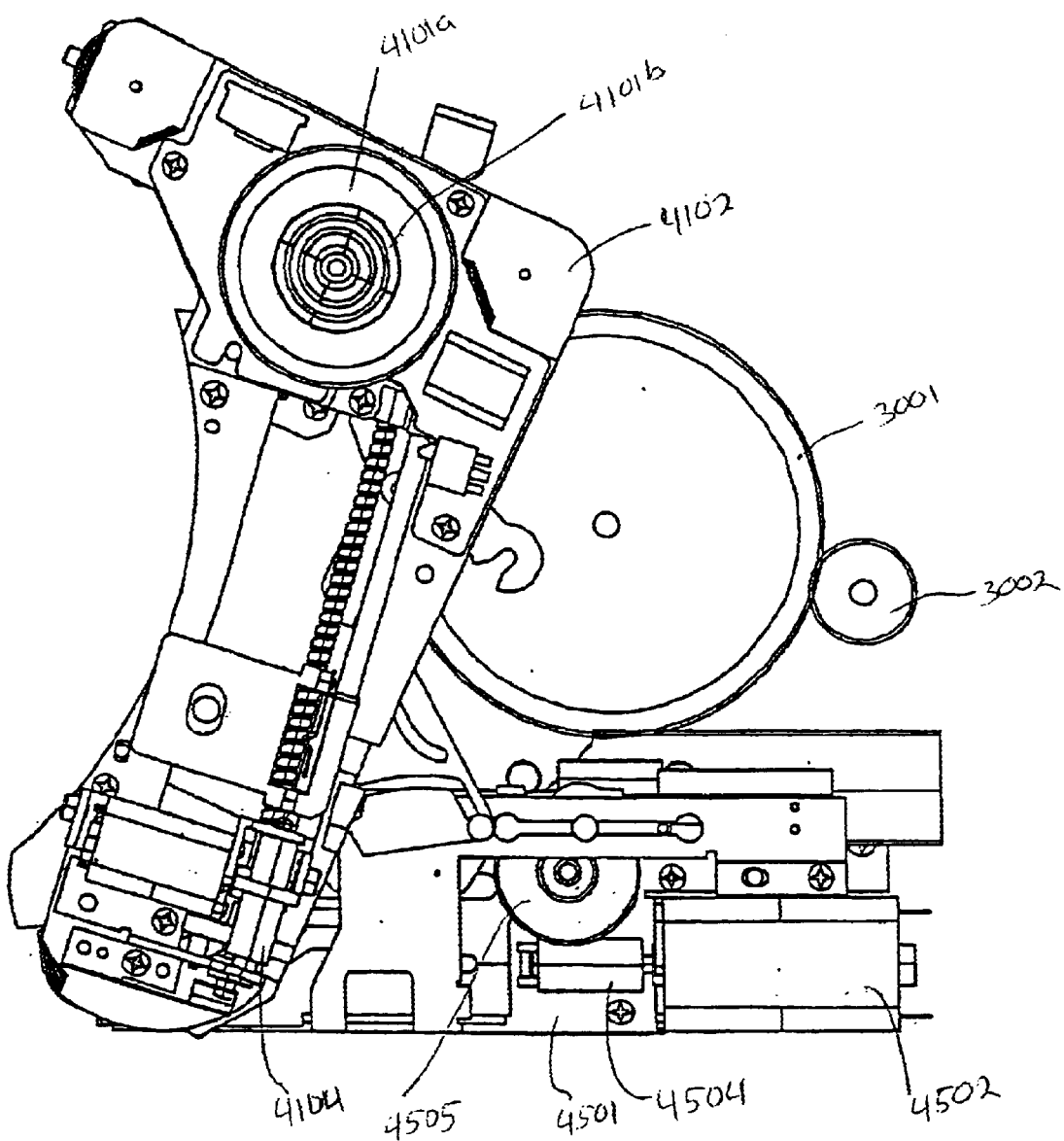
FIG. 60 is an explanatory view of the action of the disk playing mechanism of the disk device as shown in FIG. 1.

(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The lock mechanism of the disk playing mechanism 4000 displaces from the position as shown in FIG. 56–FIG. 59 and is set to the position (state) as shown in FIG. 60.
(8) The disk loading mechanism 5000 continues the setting of the position (state) as shown in FIG. 67, in other words, the operation of displacing the disk loading mechanism is not performed.

With the completion of the operation up to step 19, the disk playing mode is commenced.

The above explanation concerned the insertion of a large diameter disk, however the insertion of a small diameter disk will be explained below.

The disk position determination mechanism 2000 in steps 1 to 3 is set to a position (state) as shown in FIG. 11. The disk position determination mechanism 2000 in steps 4 to 7 is set to the position as shown in FIG. 12 from the position as shown in FIG. 11. After step 8, the mechanism is set to the position as shown in FIG. 15.

The disk retaining mechanism 3000 is set to the position (state) as shown in FIG. 25 from step 1 to step 4. During step 5, the position changes from that as shown in FIG. 25 to that as shown in FIG. 26. During step 6, the position (state) is set to that as shown in FIG. 24 and continues up to step 9. During step 10, the position changes from that as shown in FIG. 24 to that as shown in FIG. 31. During step 11, the position changes from that as shown in FIG. 31 to that as shown in FIG. 32. During step 14, the position is set to that as shown in FIG. 30. After step 14, the disk refuge mechanism continues to be set to the position (state) t as shown in FIG. 30.

(7-2. Description from disk playing operation to disk ejection operation)

Based on FIG. 100, each step (one process) performed from disk playing to disk ejection will be described.

Firstly, when the device is in a disk playing state (first step), it is set to the same position (state) as the nineteenth step as shown in FIG. 99, in other words,
(1) The disk insertion/ejection mechanism is set to the position (state) as shown in FIG.4.
(2) The disk position determination mechanism 2000 is set to the position (state) as shown in FIG. 15.
(3) The drive roller switching mechanism which switches the drive motor of the drive roller 101 is set to the position (state) as shown in FIG. 22.
(4) The shutter mechanism 2200 is set to the position (state) as shown in FIG. 18.
(5) The switching mechanism 2300 in the disk position determination mechanism 2000 is set to the position (state) as shown in FIG. 15.
(6) The disk retaining mechanism 3000 is set to the position (state) as shown in FIG. 30.
(7) The disk playing mechanism 4000 is set to the position (state) as shown in FIG. 60.
(8) The disk loading mechanism 5000 continues the setting of the position (state) as shown in FIG. 67, in other words, the operation of displacing the disk loading mechanism is not performed.

The set position for a second step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The disk playing mechanism 4000 displaces from the position as shown in FIG. 60 and is set to the position (state) as shown in FIG. 56–FIG. 59.
(8) The disk loading mechanism 5000 continues the setting of the position (state) as shown in FIG. 67, in other words, the operation of displacing the disk loading mechanism is not performed.

The set position for a third step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The playing section of the disk playing mechanism 4000 displaces from the position as shown in FIG. 56–FIG. 59 and is set to the position (state) as shown in FIG. 53–FIG. 55.
(8) The disk loading mechanism 5000 continues the setting of the position (state) as shown in FIG. 67, in other words, the operation of displacing the disk loading mechanism is not performed.

The set position for a fourth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The disk playing mechanism 4000 displaces from the position as shown in FIG. 53–FIG. 55 and is set to the position (state) as shown in FIG. 52.
(8) The disk loading mechanism 5000 continues the setting of the position (state) as shown in FIG. 67, in other words, the operation of displacing the disk loading mechanism is not performed.

The set position for a fifth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The disk playing mechanism 4000 displaces from the position as shown in FIG. 52 and is set to the position (state) as shown in FIG. 51.
(8) The disk loading mechanism 5000 continues the setting of the position (state) as shown in FIG. 67, in other words, the operation of displacing the disk loading mechanism is not performed.

The set position for a sixth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 101 is not performed.
(5) The switching mechanism 2300 in the disk position determination mechanism 2000 continues the setting of the position. (state) as shown in FIG. 15, in other words, the operation of displacing the switching mechanism is not performed.
(6) The disk retaining mechanism 3000 displaces from the position as shown in FIG. 30 and is set to the position (state) as shown in FIG. 29.
(7) The disk playing mechanism 4000 continues the setting of the position (state) as shown in FIG. 51, in other words, the operation of displacing the disk playing mechanism is not performed.
(8) The disk loading mechanism 5000 continues the setting of the position (state) as shown in FIG. 67, in other words, the operation of displacing the disk loading mechanism is not performed.

The set position for a seventh step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 29, in other words, the operation of displacing the disk retaining mechanism 3000 is not performed.
(7) The disk playing mechanism 4000 sets the clamp mechanism to the position (state) as shown in FIG. 47–FIG. 50.
(8) The disk loading mechanism 5000 continues the setting of the position (state) as shown in FIG. 67, in other words, the operation of displacing the disk loading mechanism is not performed.

The set position for an eighth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 29, in other words, the operation of displacing the disk retaining mechanism 3000 is not performed.
(7) The disk playing mechanism 4000 displaces from the position as shown in FIG. 47–FIG. 50 and is set to the position (state) as shown in FIG. 44–FIG. 46.
(8) The disk loading mechanism 5000 continues the setting of the position (state) as shown in FIG. 67, in other words, the operation of displacing the disk loading mechanism is not performed.

The set position for a ninth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 displaces from the position as shown in FIG. 18 and is set to the position (state) as shown in FIG. 17.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 displaces from the position as shown in FIG. 29 and is set to the position (state) as shown in FIG. 28.
(7) The disk playing mechanism 4000 continues the setting of the position (state) as shown in FIG. 44, FIG. 45 and FIG. 46. The operation of displacing the disk playing mechanism is not performed.
(8) The disk loading mechanism 5000 continues the setting of the position (state) as shown in FIG. 67, in other words, the operation of displacing the disk loading mechanism is not performed.

The set position for a tenth step is reached.
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches the drive motor of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism 2200 is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 28, in other words, the operation of displacing the disk retaining mechanism 3000 is not performed.
(7) The disk playing mechanism 4000 displaces from the position as shown in FIG. 44 and is set to the position (state) as shown in FIG. 43.
(8) The playing section of the mechanism disk loading mechanism 5000 continues the setting of the position (state) as shown in FIG. 67, in other words, the operation of displacing the disk loading mechanism is not performed.

The set position for a eleventh step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism 2200 is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 displaces from the position as shown in FIG. 28 and is set to the position (state) as shown in FIG. 27.

(7) The playing section of the disk playing mechanism 4000 displaces from the position as shown in FIG. 43 and is set to the position (state) as shown in FIG. 42.

(8) The disk loading mechanism 5000 continues the setting of the position (state) as shown in FIG. 67, in other words, the operation of displacing the disk loading mechanism is not performed.

The set position for a twelfth step is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism 2200 is not performed.

(5) The switching mechanism 2300 in the disk position determination mechanism 2000 displaces from the position as shown in FIG. 15 and is set to the position (state) as shown in FIG. 14.

(6) The disk retaining mechanism 3000 continues the setting of the position (state) as shown in FIG. 27, in other words, the operation of displacing the disk retaining mechanism 3000 is not performed.

(7) The playing section of the disk playing mechanism 4000 continues the setting of the position (state) as shown in FIG. 42, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a thirteenth step is reached.

(1) The disk insertion/ejection mechanism 1000 displaces from the position as shown in FIG. 4 and is set to the position (state) as shown in FIG. 3.

(2) The disk position determination mechanism 2000 displaces from the position as shown in FIG. 15 and is set to the position (state) as shown in FIG. 10.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism 2200 is not performed.

(5) The switching mechanism 2300 in the disk position determination mechanism 2000 displaces from the position as shown in FIG. 14 and is set to the position (state) as shown in FIG. 13.

(6) The disk retaining mechanism 3000 continues the setting of the position (state) as shown in FIG. 27, in other words, the operation of displacing the disk retaining mechanism 3000 is not performed.

(7) The playing section of the disk playing mechanism 4000 continues the setting of the position (state) as shown in FIG. 42, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a fourteenth step is reached.

(1) The disk insertion/ejection mechanism 1000 continues the setting of the position (state) as shown in FIG. 3, in other words, the operation of displacing the disk insertion/ejection mechanism is not performed.

(2) The disk position determination mechanism 2000 continues the setting of the position (state) as shown in FIG. 10, in other words, the operation of displacing the disk position determination mechanism is not performed.

(3) The drive roller switching mechanism which switches the drive motor of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism 2200 is not performed.

(5) The switching mechanism 2300 in the disk position determination mechanism 2000 continues the setting of the position (state) as shown in FIG. 13, in other words, the operation of displacing the disk position determination mechanism is not performed.

(6) The disk retaining mechanism 3000 displaces from the position as shown in FIG. 27 and is set to the position (state) as shown in FIG. 26.

(7) The playing section of the disk playing mechanism 4000 displaces from the position as shown in FIG. 42 and is set to the position (state) as shown in FIG. 42a.

(8) The disk loading mechanism 5000 continues the setting of the position (state) as shown in FIG. 67, in other words, the operation of displacing the disk loading mechanism is not performed.

The set position for a fifteenth step is reached.

(1) The disk insertion/ejection mechanism 1000 displaces from the position as shown in FIG. 3 and is set to the position (state) as shown in FIG. 2.

(2) The disk position determination mechanism 2000 continues the setting of the position (state) as shown in FIG. 10, in other words, the operation of displacing the disk position determination mechanism is not performed.

(3) The drive roller switching mechanism which switches the drive motor of the drive roller 101 displaces from the position as shown in FIG. 22 and is set to the position (state) as shown in FIG. 20.

(4) The shutter mechanism 2200 displaces from the position as shown in FIG. 17 and is set to the position (state) as shown in FIG. 16.

(5) The switching mechanism 2300 in the disk position determination mechanism 2000 continues the setting of the position (state) as shown in FIG. 13, in other words, the operation of displacing the disk position determination mechanism is not performed.

(6) The disk retaining mechanism 3000 displaces from the position as shown in FIG. 26 and is set to the position (state) as shown in FIG. 25.

(7) The playing section of the disk playing mechanism 4000 displaces from the position as shown in FIG. 42a and is set to the position (state) as shown in FIG. 37–FIG. 41.

(8) The disk loading mechanism 5000 continues the setting of the position (state) as shown in FIG. 67, in other words, the operation of displacing the disk loading mechanism is not performed.

The set position for a sixteenth step is reached.

(1) The disk insertion/ejection mechanism 1000 continues the setting of the position (state) as shown in FIG. 2, in other words, the operation of displacing the disk insertion/ejection mechanism is not performed.

(2) The disk position determination mechanism 2000 displaces from the position as shown in FIG. 10 and is set to the position (state) as shown in FIG. 9.

(3) The drive roller switching mechanism which switches the drive motor of the drive roller 101 continues the setting of the position (state) as shown in FIG. 20, in other words, the operation of displacing the drive roller switching mechanism is not performed.

(4) The shutter mechanism 2200 continues the setting of the position (state) as shown in FIG. 16, in other words, the operation of displacing the shutter 2200 mechanism is not performed.

(5) The switching mechanism 2300 in the disk position determination mechanism 2000 continues the setting of the position (state) as shown in FIG. 13, in other words, the operation of displacing the disk position determination mechanism is not performed.

(6) The disk retaining mechanism 3000 continues the setting of the position (state) as shown in FIG. 25, in other words, the operation of displacing the disk retaining mechanism 3000 is not performed.

(7) The playing section of the disk playing mechanism 4000 continues the setting of the position (state) as shown in FIG. 37–FIG. 41, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

The set position for a seventeenth step is reached.

(1) The disk insertion/ejection mechanism 1000 continues the setting of the position (state) as shown in FIG. 2, in other words, the operation of displacing the disk insertion/ejection mechanism is not performed.

(2) The disk position determination mechanism 2000 displaces from the position as shown in FIG. 9 and is set to the position (state) as shown in FIG. 8.

(3) The drive roller switching mechanism which switches the drive motor of the drive roller 101 continues the setting of the position (state) as shown in FIG. 20, and is set to the position (state) as shown in FIG. 19.

(4) The shutter mechanism 2200 continues the setting of the position (state) as shown in FIG. 16, in other words, the operation of displacing the shutter 2200 mechanism is not performed.

(5) The switching mechanism 2300 in the disk position determination mechanism 2000 continues the setting of the position (state) as shown in FIG. 13, in other words, the operation of displacing the disk position determination mechanism is not performed.

(6) The disk retaining mechanism 3000 continues the setting of the position (state) as shown in FIG. 25, in other words, the operation of displacing the disk retaining mechanism 3000 is not performed.

(7) The disk playing mechanism 4000 continues the setting of the position (state) as shown in FIG. 37–FIG. 41, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

Finally the set position for an eighteenth step is reached.

(1) The disk insertion/ejection mechanism 1000 continues the setting of the position (state) as shown in FIG. 2, in other words, the operation of displacing the disk insertion/ejection mechanism is not performed.

(2) The disk position determination mechanism 2000 displaces from the position as shown in FIG. 8 and is set to the position (state) as shown in FIG. 7.

(3) The drive roller switching mechanism which switches the drive motor of the drive roller 101 continues the setting of the position (state) as shown in FIG. 19, in other words, the operation of displacing the drive roller switching mechanism is not performed.

(4) The shutter mechanism 2200 continues the setting of the position (state) as shown in FIG. 16, in other words, the operation of displacing the shutter mechanism 2200 is not performed.

(5) The switching mechanism 2300 in the disk position determination mechanism 2000 continues the setting of the position (state) as shown in FIG. 13, in other words, the operation of displacing the disk position determination mechanism is not performed.

(6) The disk retaining mechanism 3000 continues the setting of the position (state) as shown in FIG. 25, in other words, the operation of displacing the disk retaining mechanism 3000 is not performed.

(7) The disk playing mechanism 4000 continues the setting of the position (state) as shown in FIG. 37–FIG. 41, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

With the completion of the operation up to the eighteenth step, the device reaches disk ejection mode.

In the above description, the operation for the insertion of a large diameter disk was described whereas below the operation for a small diameter disk will be described.

The disk position determination mechanism 2000 in steps 1–17 is set to the position (state) as shown in FIG. 12 and is set to step 18 as shown in FIG. 1. The disk retaining mechanism 3000 is set to the position (state) as shown in FIG. 30 from step 1 to step 5, during the step 6 is set to the position (state) as shown in FIG. 32, during the step 9 is set to the position (state) as shown in FIG. 31, during the step 11 is set to the position (state) as shown in FIG. 24, during the step 14 is set to the position (state) as shown in FIG. 26, during the step 15 is set to the position (state) as shown in FIG. 25, and this state continues up to step 18.

(7-3. Description of the process of switching a fourth disk being played to a first disk and playing the first disk)

The operation of switching a fourth disk which is being played to a first disk which is loaded and playing the first disk will be described in by each step (one process) based on FIG. 101.

First when the fourth disk is being played (step 1), (1) The disk insertion/ejection mechanism 1000 is set to the position (state) as shown in FIG. 4.

(2) The disk position determination mechanism 2000 is set to the position as shown in FIG. 15.

(3) The drive roller switching mechanism which switches the operation mode of the drive roller 101 is set to the position (state) as shown in FIG. 22.

(4) The shutter mechanism 2200 is set to the position (state) as shown in FIG. 18.

(5) The switching mechanism 2300 in the disk position determination mechanism 2000 is set to the position (state) as shown in FIG. 15.

(6) The disk retaining mechanism 3000 is set to the position (state) as shown in FIG. 30.

(7) The disk playing mechanism 4000 is set to the position (state) as shown in FIG. 60, and the disk playing mechanism is fixed.

(8) The disk loading mechanism 5000 is set to the position (state) as shown in FIG. 67.

Thus the set position for step 2 is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position as shown in FIG. 15 in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

(7) The playing section of the disk playing mechanism 4000 displaces from the position shown in FIG. 60 to the setting of the position (state) as shown in FIG. 56–FIG. 59.

(8) The disk loading mechanism 5000 continues the setting of the position (state) as shown in FIG. 67, in other words, the operation of displacing the disk loading mechanism is not performed.

Thus the set position for step 3 is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

(7) The playing section of the disk playing mechanism 4000 displaces from the position shown in FIG. 56 to FIG. 59 to the setting of the position (state) as shown in FIG. 53–FIG. 55.

(8) The disk loading mechanism 5000 continues the setting of the position (state) as shown in FIG. 67, in other words, the operation of displacing the disk loading mechanism is not performed.

Thus the set position for step 4 is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The playing section of the disk playing mechanism 4000 displaces from the position shown in FIG. 53 to FIG. 56 to the setting of the position (state) as shown in FIG. 52.
(8) The disk loading mechanism 5000 continues the setting of the position (state) as shown in FIG. 67, in other words, the operation of displacing the disk loading mechanism is not performed.

Thus the set position for step 5 is reached.

(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The playing section of the disk playing mechanism 4000 displaces from the position shown in FIG. 52 to the setting of the position (state) as shown in FIG. 51.
(8) The disk loading mechanism 5000 continues the setting of the position (state) as shown in FIG. 67, in other words, the operation of displacing the disk loading mechanism is not performed.

Thus the set position for step 6 is reached.

(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 displaces from the setting of the position (state) as shown in FIG. 30, to the setting of the position (state) as shown in FIG. 29.
(7) The playing section of the disk playing mechanism 4000 continues the setting of the position (state) as shown in FIG. 51, in other words, the operation of displacing the disk playing mechanism is not performed.
(8) The disk loading mechanism 5000 continues the setting of the position (state) as shown in FIG. 67, in other words, the operation of displacing the disk loading mechanism is not performed.

Thus the set position for step 7 is reached (1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 29, in other words, the operation of displacing the disk retaining mechanism 3000 is not performed.
(7) The disk playing mechanism 4000 displaces from the position shown in FIG. 51 to the set position (state) shown in FIG. 47–FIG. 50.
(8) The disk loading mechanism 5000 continues the setting of the position (state) as shown in FIG. 67, in other words, the operation of displacing the disk loading mechanism is not performed.

Thus the set position for step 8 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 29, in other words, the operation of displacing the disk retaining mechanism 3000 is not performed.

(7) The disk playing mechanism 4000 is set to the position (state) shown in FIG. 44, the clamp is set to the position (state) shown in FIG. 45 and FIG. 46.

(8) The disk loading mechanism 5000 continues the setting of the position (state) as shown in FIG. 67, in other words, the operation of displacing the disk loading mechanism is not performed.

Thus the set position for step 9 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 is displaced from the position as shown in FIG. 18 and set to the position (state) shown in FIG. 17.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 is displaced from the position as shown in FIG. 29 and set to the position (state) shown in FIG. 28.

(7) The disk playing mechanism 4000 continues the setting of the position (state) as shown in FIG. 44 to FIG. 46, in other words, the operation of displacing the disk playing mechanism is not performed.

(8) The disk loading mechanism 5000 continues the setting of the position (state) as shown in FIG. 67, in other words, the operation of displacing the disk loading mechanism is not performed.

Thus the set position for step 10 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 is set to the position (state) shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 28 in other words, the operation of displacing the disk retaining mechanism 3000 is not performed.

(7) The playing section of the disk playing mechanism 4000 is displaced from the position (state) shown in FIG. 44, and is set to the position (state) shown in FIG. 43.

(8) The disk loading mechanism 5000 continues the setting of the position (state) as shown in FIG. 67, in other words, the operation of displacing the disk loading mechanism is not performed.

Thus the set position for step 11 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 is displaced from the position (state) shown in FIG. 28, and is set to the position (state) shown in FIG. 27.

(7) The playing section of the disk playing mechanism 4000 is displaced from the position (state) shown in FIG. 43, and is set to the position (state) shown in FIG. 42.

(8) The disk loading mechanism 5000 continues the setting of the position (state) as shown in FIG. 67, in other words, the operation of displacing the disk loading mechanism is not performed.

Thus the set position for step 12 is reached (1) The disk insertion/ejection mechanism 1000 is displaced from the position (state) shown in FIG. 4, and is set to the position (state) shown in FIG. 5.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 27, in other words, the operation of displacing the disk retaining mechanism 3000 is not performed.

(7) The playing section of the disk playing mechanism 4000 continues the setting of the position (state) as shown in FIG. 42, in other words, the operation of displacing the disk playing mechanism is not performed.

Figure 65:
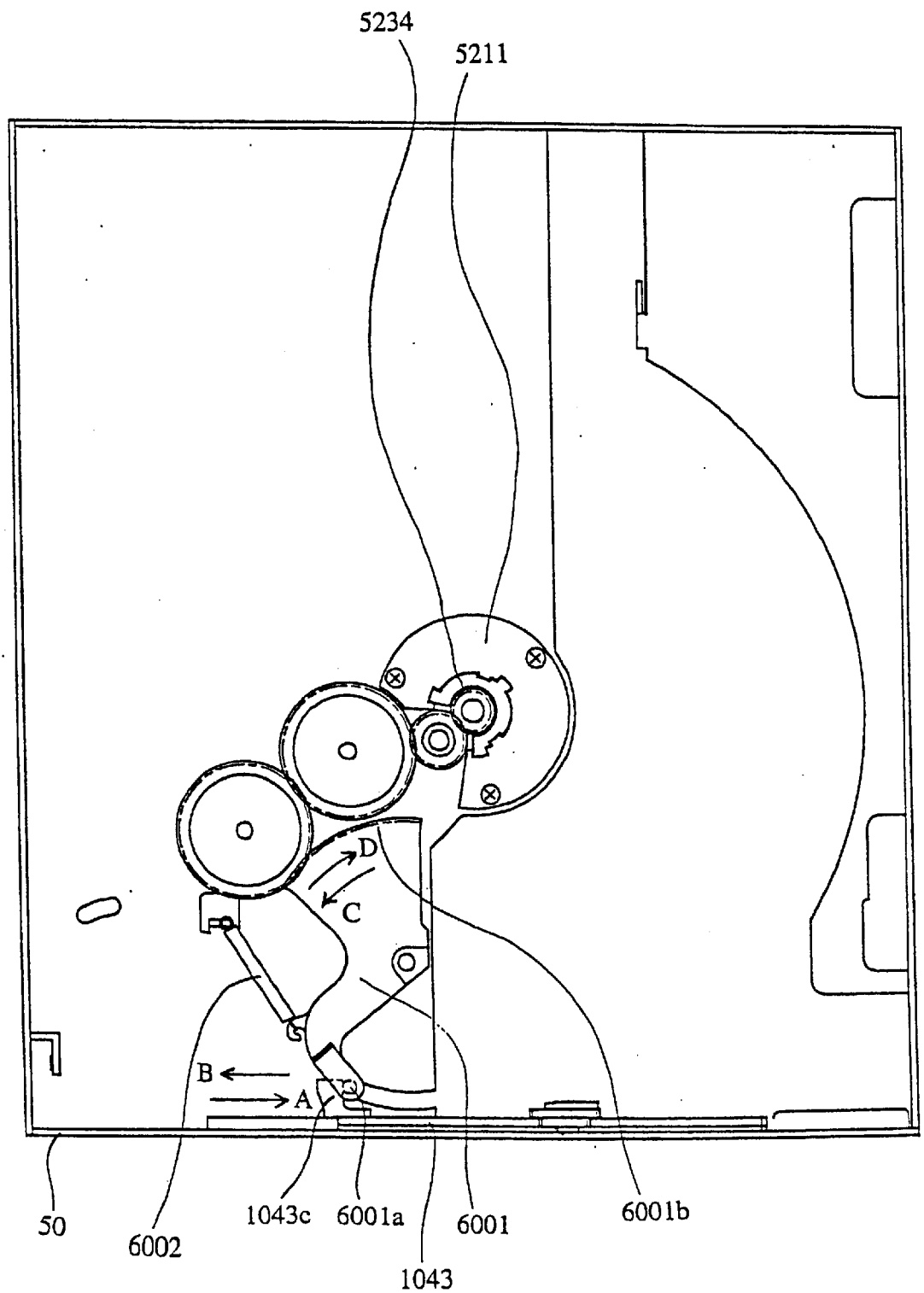
FIG. 65 is a block diagram of the upper surface of the components of a disk loading mechanism of the disk device as shown in FIG. 1.

(8) The disk loading mechanism 5000 is displaced from the position (state) shown in FIG. 67, and is set to the position (state) shown in FIG. 65.

Thus the set position for step 13 is reached (1) The disk insertion/ejection mechanism 1000 continues the setting of the position (state) as shown in FIG. 5, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 27, in other words, the operation of displacing the disk retaining mechanism 3000 is not performed.

(7) The playing section of the disk playing mechanism 4000 continues the setting of the position (state) as shown in FIG. 42, in other words, the operation of displacing the disk playing mechanism is not performed.

(8) The disk loading mechanism 5000 is displaced from the position (state) shown in FIG. 65, and is set to the position (state) shown in FIG. 68.

Thus the set position for step 14 is reached (1) The disk insertion/ejection mechanism 1000 continues the setting of the position (state) as shown in FIG. 5, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 27, in other words, the operation of displacing the disk retaining mechanism 3000 is not performed.

(7) The disk playing mechanism 4000 continues the setting of the position (state) as shown in FIG. 42, in other words, the operation of displacing the disk playing mechanism is not performed.

(8) The disk loading mechanism 5000 is displaced from the position (state) shown in FIG. 68, and is set to the position (state) shown in FIG. 69.

Thus the set position for step 15 is reached (1) The disk insertion/ejection mechanism 1000 is displaced from the position (state) as shown in FIG. 5, to the position (state) as shown in FIG. 6.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 27, in other words, the operation of displacing the disk retaining mechanism 3000 is not performed.
(7) The playing section of the disk playing mechanism 4000 continues the setting of the position (state) as shown in FIG. 42, in other words, the operation of displacing the disk playing mechanism is not performed.
(8) The disk loading mechanism 5000 is displaced from the position (state) shown in FIG. 69, and is set to the position (state) shown in FIG. 66 and FIG. 70.

Thus the set position for step 16 is reached (1) The disk insertion/ejection mechanism 1000 continues the setting of the position (state) as shown in FIG. 6, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 27, in other words, the operation of displacing the disk retaining mechanism 3000 is not performed.
(7) The playing section of the disk playing mechanism 4000 continues the setting of the position (state) as shown in FIG. 42, in other words, the operation of displacing the disk playing mechanism is not performed.
(8) The disk loading mechanism 5000 is displaced from the position (state) shown in FIG. 66 and FIG. 70, and is set to the position (state) shown in FIG. 71.

Thus the set position for step 17 is reached (1) The disk insertion/ejection mechanism 1000 continues the setting of the position (state) as shown in FIG. 6, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 is displaced from the position (state) shown in FIG. 27, and is set to the position (state) shown in FIG. 26.
(7) The playing section of the disk playing mechanism 4000 is displaced from the position (state) shown in FIG. 42, and is set to the position (state) shown in FIG. 42a.
(8) The disk loading mechanism 5000 continues the setting of the position (state) as shown in FIG. 71, in other words, the operation of displacing the disk loading mechanism is not performed.

Thus the set position for step 18 is reached (1) The disk insertion/ejection mechanism 1000 continues the setting of the position (state) as shown in FIG. 6, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 26, in other words, the operation of displacing the disk retaining mechanism 3000 is not performed.
(7) The playing section of the disk playing mechanism 4000 continues the setting of the position (state) as shown in FIG. 42a, in other words, the operation of displacing the disk playing mechanism is not performed.
(8) The disk loading mechanism 5000 is displaced from the position as shown in FIG. 71 to position (state) as shown in FIG. 72.

Thus the set position for step 19 is reached (1) The disk insertion/ejection mechanism 1000 continues the setting of the position (state) as shown in FIG. 6, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 is displaced from the position as shown in FIG. 26 to position (state) as shown in FIG. 27.
(7) The playing section of the disk playing mechanism 4000 is displaced from the position as shown in FIG. 42*a* to position (state) as shown in FIG. 42.
(8) The disk loading mechanism 5000 continues the setting of the position (state) as shown in FIG. 72, in other words, the operation of displacing the disk loading mechanism is not performed.

Thus the set position for step 20 is reached
(1) The disk insertion/ejection mechanism 1000 is displaced from the position as shown in FIG. 6 to position (state) as shown in FIG. 5.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 27, in other words, the operation of displacing the disk retaining mechanism 3000 is not performed.
(7) The playing section of the disk playing mechanism 4000 continues the setting of the position (state) as shown in FIG. 42, in other words, the operation of displacing the disk playing mechanism is not performed.
(8) The disk loading mechanism 5000 is displaced from the position as shown in FIG. 72 to position (state) as shown in FIG. 65 and FIG. 73.

Thus the set position for step 21 is reached
(1) The disk insertion/ejection mechanism 1000 is displaced from the position as shown in FIG. 5 to position (state) as shown in FIG. 4.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 27, in other words, the operation of displacing the disk retaining mechanism 3000 is not performed.
(7) The playing section of the disk playing mechanism 4000 continues the setting of the position (state) as shown in FIG. 42, in other words, the operation of displacing the disk playing mechanism is not performed.
(8) The disk loading mechanism 5000 continues the setting of the position (state) as shown in FIG. 65 and FIG. 73, in other words, the operation of displacing the disk loading mechanism is not performed.

Thus the set position for step 22 is reached
(1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 17, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 27, in other words, the operation of displacing the disk retaining mechanism 3000 is not performed.
(7) The playing section of the disk playing mechanism 4000 is displaced from the position as shown in FIG. 42 to position (state) as shown in FIG. 43.
(8) The disk loading mechanism 5000 continues the setting of the position (state) as shown in FIG. 65 and FIG. 73, in other words, the operation of displacing the disk loading mechanism is not performed.

Thus the set position for step 23 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 17, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 is displaced from the position as shown in FIG. 27 to position (state) as shown in FIG. 28.

(7) The playing section of the disk playing mechanism 4000 is displaced from the position as shown in FIG. 43 to position (state) as shown in FIG. 44.

(8) The disk loading mechanism 5000 continues the setting of the position (state) as shown in FIG. 65 and FIG. 73, in other words, the operation of displacing the disk loading mechanism is not performed.

Thus the set position for step 24 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 is displaced from the position as shown in FIG. 17 to set to the position as shown in FIG. 18.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 is displaced from the position as shown in FIG. 28 to position (state) as shown in FIG. 29.

(7) The playing section of the disk playing mechanism 4000 continues the setting of the position (state) as shown in FIG. 44, in other words, the operation of displacing the disk playing mechanism is not performed.

(8) The disk loading mechanism 5000 continues the setting of the position (state) as shown in FIG. 65 and FIG. 73, in other words, the operation of displacing the disk loading mechanism is not performed.

Thus the set position for step 25 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 29, in other words, the operation of displacing the disk retaining mechanism 3000 is not performed.

(7) The playing section of the disk playing mechanism 4000 is displaced from the position as shown in FIG. 44 and the clamp mechanism is set to a position (state) shown in FIG. 45 and FIG. 46.

(8) The disk loading mechanism 5000 continues the setting of the position (state) as shown in FIG. 65 and FIG. 73, in other words, the operation of displacing the disk loading mechanism is not performed.

Thus the set position for step 26 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 29, in other words, the operation of displacing the disk retaining mechanism 3000 is not performed.

(7) The clamp mechanism of the disk playing mechanism 4000 is displaced from the position as shown in FIG. 45 and FIG. 46 and is set to a position (state) shown in FIG. 47, FIG. 48, FIG. 49 and FIG. 50.

(8) The disk loading mechanism 5000 continues the setting of the position (state) as shown in FIG. 65 and FIG. 73, in other words, the operation of displacing the disk loading mechanism is not performed.

Thus the set position for step 27 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 is displaced from the position (state) as shown in FIG. 29 to a position as shown in FIG. 30.

(7) The clamp mechanism of the disk playing mechanism 4000 continues the setting of the position (state) as shown in FIG. 47, FIG. 48, FIG. 49 and FIG. 50, in other words, the operation of displacing the disk playing mechanism is not performed.

(8) The disk loading mechanism 5000 continues the setting of the position (state) as shown in FIG. 65 and FIG. 73, in other words, the operation of displacing the disk loading mechanism is not performed.

Thus the set position for step 28 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

(7) The disk playing mechanism 4000 is displaced from the position (state) as shown in FIG. 47 to FIG. 50 and is set to a position as shown in FIG. 51.

(8) The disk loading mechanism 5000 continues the setting of the position (state) as shown in FIG. 65 and FIG. 73, in other words, the operation of displacing the disk loading mechanism is not performed.

Thus the set position for step 29 is reached (1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.

(4) The shutter mechanism 2200 continues the setting of the position (state) as shown in FIG. 18, in other words, the operation of displacing the shutter mechanism is not performed.

(5) The switching mechanism 2300 in the disk position determination mechanism 2000 continues the setting of the position (state) as shown in FIG. 15, in other words, the operation of displacing the switching mechanism is not performed.

(6) The disk retaining mechanism 3000 continues the setting of the position (state) as shown in FIG. 30, in other words, the operation of displacing the disk retaining mechanism 3000 is not performed.

(7) The disk playing mechanism 4000 is displaced from the position (state) as shown in FIG. 51 and is set to a position as shown in FIG. 52.

(8) The disk loading mechanism 5000 continues. the setting of the position (state) as shown in FIG. 65 and FIG. 73, in other words, the operation of displacing the disk loading mechanism is not performed.

Thus the set position for step 30 is reached.

(1) The disk insertion/ejection mechanism 1000 continues the setting of the position (state) as shown in FIG. 4, in other words, the operation of displacing the disk insertion/ejection mechanism is not performed.

(2) The disk position determination mechanism 2000 continues the setting of the position (state) as shown in FIG. 15, in other words, the operation of displacing the disk position determination mechanism is not performed.

(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The disk playing mechanism 4000 is displaced from the position (state) as shown in FIG. 52 and is set to a position as shown in FIG. 53, FIG. 54 and FIG. 55.
(8) The disk loading mechanism 5000 continues the setting of the position (state) as shown in FIG. 65 and FIG. 73, in other words, the operation of displacing the disk loading mechanism is not performed.

Thus the set position for step 31 is reached (1) The disk insertion/ejection mechanism 1000 continues the setting of the position (state) as shown in FIG. 4, in other words, the operation of displacing the disk insertion/ejection mechanism is not performed.
(2) The disk position determination mechanism 2000 continues the setting of the position (state) as shown in FIG. 15, in other words, the operation of displacing the disk position determination mechanism is not performed.
(3) The drive roller switching mechanism which switches operational mode of the drive roller 101 continues the setting of the position (state) as shown in FIG. 22, in other words, the operation of displacing the drive roller switching mechanism is not performed.
(4) The shutter mechanism 2200 continues the setting of the position (state) as shown in FIG. 18, in other words, the operation of displacing the shutter mechanism is not performed.
(5) The switching mechanism 2300 in the disk position determination mechanism 2000 continues the setting of the position (state) as shown in FIG. 15, in other words, the operation of displacing the switching mechanism is not performed.
(6) The disk retaining mechanism 3000 continues the setting of the position (state) as shown in FIG. 30, in other words, the operation of displacing the disk retaining mechanism 3000 is not performed.
(7) The disk playing mechanism 4000 is displaced from the position (state) as shown in FIG. 53, FIG. 54 and FIG. 55 and is set to a position as shown in FIG. 56, FIG. 57, FIG. 58 and FIG. 59.
(8) The disk loading mechanism 5000 continues the setting of the position (state) as shown in FIG. 65 and FIG. 73, in other words, the operation of displacing the disk loading mechanism is not performed. On completion of operations up to step 30, the disk changeover (from the fourth disk to the first disk) which is to be played is completed.

The above description concerned the situation when the inserted disk is a large diameter disk. The treatment of a small diameter disk will be discussed below.

The disk position determination mechanism 2000 from after step 1 up to step 31 is set in the position as shown in FIG. 15. The disk retaining mechanism 3000 is set in the position (state) as shown in FIG. 30 from step 1 to step 5, is set in the position (state) as shown in FIG. 32 from step 6 to step 8, is set in the position (state) as shown in FIG. 31 from step 9 to step 10, is set in the position (state) as shown in FIG. 24 from step 11 to step 16, is set in the position (state) as shown in FIG. 26 from step 17 to step 18, is set in the position (state) as shown in FIG. 24 from step 19 to step 22, is set in the position (state) as shown in FIG. 31 in step 23, is set in the position (state) as shown in FIG. 32 from step 24 to step 26 and is set in the position (state) as shown in FIG. 30 after step 27 up to step 31.

(7.4 Description from a ready position in which a disk is loaded in a loading position for a fourth disk to a playing operation of a loaded first disk)

Based on FIG. 102, a command is given to store a fourth disk in the disk loading mechanism. The disk is inserted in a state of readiness for disk insertion and the disk is loaded in a loading position of the fourth disk. After this operation, a series of operations up to the playing operation of a first disk loaded in the disk loading mechanism will be described by each step (one process).

Figure 92:
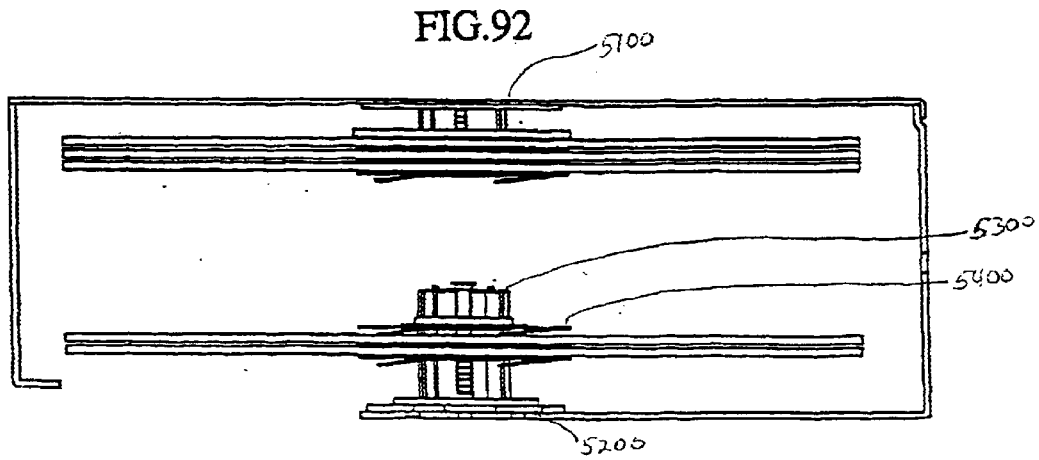
FIG. 92 is an explanatory view of the action of the components of the disk loading mechanism of the disk device as shown in FIG. 1.

First when the fourth disk is being played (step 1), (1) The disk insertion/ejection mechanism 1000 is set to the position (state) as shown in FIG. 2.
(2) The disk position determination mechanism 2000 is set to the position (state) as shown in FIG. 7.
(3) The drive roller switching mechanism which switches operational mode of the drive roller 101 is set to the position (state) as shown in FIG. 19.
(4) The shutter mechanism 2200 is set to the position (state) as shown in FIG. 16.
(5) The switching mechanism 2300 is set to the position (state) as shown in FIG. 13.
(6) The disk retaining mechanism 3000 is set to the position (state) as shown in FIG. 25.
(7) The disk playing mechanism 4000 is set to the position (state) as shown in FIG. 37, FIG. 38, FIG. 39, FIG. 40 and FIG. 41.
(8) The disk loading mechanism 5000 is set to the position (state) as shown in FIG. 92.

Thus the set position for step 2 is reached.

(1) The disk insertion/ejection mechanism 1000 continues the setting of the position (state) as shown in FIG. 2, in other words, the operation of displacing the disk insertion/ejection mechanism is not performed.
(2) The disk position determination mechanism 2000 continues the setting of the position (state) as shown in FIG. 7, in other words, the operation of-displacing the disk position determination mechanism is not performed.
(3) The drive roller switching mechanism which switches operational mode of the drive roller 101 is displaced from the position as shown in FIG. 19 to a position (state) as shown in FIG. 21.
(4) The shutter mechanism 2200 is displaced from the position as shown in FIG. 16 to a position (state) as shown in FIG. 17.
(5) The switching mechanism 2300 in the disk position determination mechanism 2000 is set to a position as shown in FIG. 13.
(6) The disk retaining mechanism 3000 is displaced from the position as shown in FIG. 25 to a position (state) as shown in FIG. 26.

(7) The disk playing mechanism 4000 is displaced from the position (state) as shown in FIG. 37, FIG. 38, FIG. 39, FIG. 40 and FIG. 41 and is set to a position as shown in FIG. 42a.

(8) The disk loading mechanism 5000 continues the setting of the position (state) as shown in FIG. 92.

Thus the set position for step 3 is reached.

(1) The disk insertion/ejection mechanism 1000 continues the setting of the position (state) as shown in FIG. .2.

(2) The disk position determination mechanism 2000 continues the setting of the position (state) as shown in FIG. 7.

(3) The drive roller switching mechanism which switches operational mode of the drive roller 101 is displaced from the position as shown in FIG. 21 to a position (state) as shown in FIG. 19.

(4) The shutter mechanism 2200 is displaced from the position as shown in FIG. 16 to a position (state) as shown in FIG. 17.

(5) The switching mechanism 2300 in the disk position determination mechanism 2000 continues setting to a position as shown in FIG. 13.

(6) The disk retaining mechanism 3000 is displaced from the position as shown in FIG. 26 to a position (state) as shown in FIG. 30.

(7) The disk playing mechanism 4000 is displaced from the position (state) as shown in FIG. 42a and is set to a position as shown in FIG. 42b.

(8) The disk loading mechanism 5000 continues the setting of the position (state) as shown in FIG. 92

Thus the set position for step 4 is reached.

(1) The disk insertion/ejection mechanism 1000 is displaced from the position as shown in FIG. 2 to a position (state) as shown in FIG. 3.

(2) The disk position determination mechanism 2000 continues the setting of the position (state) as shown in FIG. 7.

(3) The drive roller switching mechanism which switches operational mode of the drive roller 101 continues setting to a position as shown in FIG. 22.

(4) The shutter mechanism 2200 continues setting to a position as shown in FIG. 17.

(5) The switching mechanism 2300 in the disk position determination mechanism 2000 continues setting to a position (state) as shown in FIG. 13.

(6) The disk retaining mechanism 3000 continues the setting of the position (state) as shown in FIG. 30.

(7) The disk playing mechanism 4000 continues the setting of the position (state) as shown in FIG. 42b.

(8) The disk loading mechanism 5000 continues the setting of the position (state) as shown in FIG. 92.

Thus the set position for step 5 is reached.

(1) The disk insertion/ejection mechanism 1000 continues the setting of the position (state) as shown in FIG. 3.

(2) The disk position determination mechanism 2000 is displaced from a position as shown in FIG. 7 to a position (state) as shown in FIG. 8.

(3) The drive roller switching mechanism which switches operational mode of the drive roller 101 continues setting to a position as shown in FIG. 22.

(4) The shutter mechanism 2200 continues setting to a position as shown in FIG. 17.

(5) The switching mechanism 2300 in the disk position determination mechanism 2000 is displaced from a position as shown in FIG. 13 to a position (state) as shown in FIG. 14.

(6) The disk retaining mechanism 3000 continues the setting of the position (state) as shown in FIG. 30.

(7) The disk playing mechanism 4000 continues the setting of the position (state) as shown in FIG. 42b.

(8) The disk loading mechanism 5000 continues the setting of the position (state) as shown in FIG. 92.

Thus the set position for step 6 is reached.

(1) The disk insertion/ejection mechanism 1000 is set to the position (state) as shown in FIG. 4 from the position shown in FIG. 3.

(2) The disk position determination mechanism 2000 is displaced from a position as shown in FIG. 8 to a position (state) as shown in FIG. 15.

(3) The drive roller switching mechanism which switches operational mode of the drive roller 101 continues setting to a position as shown in FIG. 22.

(4) The shutter mechanism 2200 continues setting to a position as shown in FIG. 17.

(5) The switching mechanism 2300 in the disk position determination mechanism 2000 is displaced from a position as shown in FIG. 114 to a position (state) as shown in FIG. 15.

(6) The disk retaining mechanism 3000 continues the setting of the position (state) as shown in FIG. 30.

(7) The disk playing mechanism 4000 continues the setting of the position (state) as shown in FIG. 42b.

(8) The disk loading mechanism 5000 continues the setting of the position (state) as shown in FIG. 92.

Thus the set position for step 7 is reached.

(1) The disk insertion/ejection mechanism 1000 is set to the position (state) as shown in FIG. 5 from the position shown in FIG. 4.

(2) The disk position determination mechanism 2000 continues setting to a position as shown in FIG. 15.

(3) The drive roller switching mechanism which switches operational mode of the drive roller 101 continues setting to a position as shown in FIG. 22.

(4) The shutter mechanism 2200 continues setting to a position as shown in FIG. 17.

(5) The switching mechanism 2300 in the disk position determination mechanism 2000 continues setting to a position as shown in FIG. 15.

(6) The disk retaining mechanism 3000 continues the setting of the position (state) as shown in FIG. 30.

(7) The disk playing mechanism 4000 continues the setting of the position (state) as shown in FIG. 42b.

(8) The disk loading mechanism 5000 is set to the position (state) as shown in FIG. 65 from the position (state) shown in FIG. 92.

Thus the set position for step 8 is reached.

(1) The disk insertion/ejection mechanism 1000 is set to the position (state) as shown in FIG. 6 from the position shown in FIG. 5.

(2) The disk position determination mechanism 2000 continues setting to a position as shown in FIG. 15.

(3) The drive roller switching mechanism which switches operational mode of the drive roller 101 continues setting to a position as shown in FIG. 22.

(4) The shutter mechanism 2200 continues setting to a position as shown in FIG. 17.

(5) The switching mechanism 2300 in the disk position determination mechanism 2000 continues setting to a position as shown in FIG. 15.

(6) The disk retaining mechanism 3000 continues the setting of the position (state) as shown in FIG. 30.
(7) The disk playing mechanism 4000 continues the setting of the position (state) as shown in FIG. 42*b*.
(8) The disk loading mechanism 5000 is set to the position (state) as shown in FIG. 65 from the position (state) shown in FIG. 92.

Thus the set position for step 9 is reached.

(1) The disk insertion/ejection mechanism 1000 continues setting to a position as shown in FIG. 6.
(2) The disk position determination mechanism 2000 continues setting to a position as shown in FIG. 15.
(3) The drive roller switching mechanism which switches operational mode of the drive roller 101 continues setting to a position as shown in FIG. 22.
(4) The shutter mechanism .2200 continues setting to a position as shown in FIG. 17.
(5) The switching mechanism 2300 in the disk position determination mechanism 2000 continues setting to a position as shown in FIG. 15.
(6) The disk retaining mechanism 3000 continues the setting of the position (state) as shown in FIG. 30.
(7) The disk playing mechanism 4000 continues the setting of the position (state) as shown in FIG. 42*b*.
(8) The disk loading mechanism 5000 is set to the position (state) as shown in FIG. 65 from the position (state) shown in FIG. 92.

Thus the set position for step 10 is reached.

Figure 93:
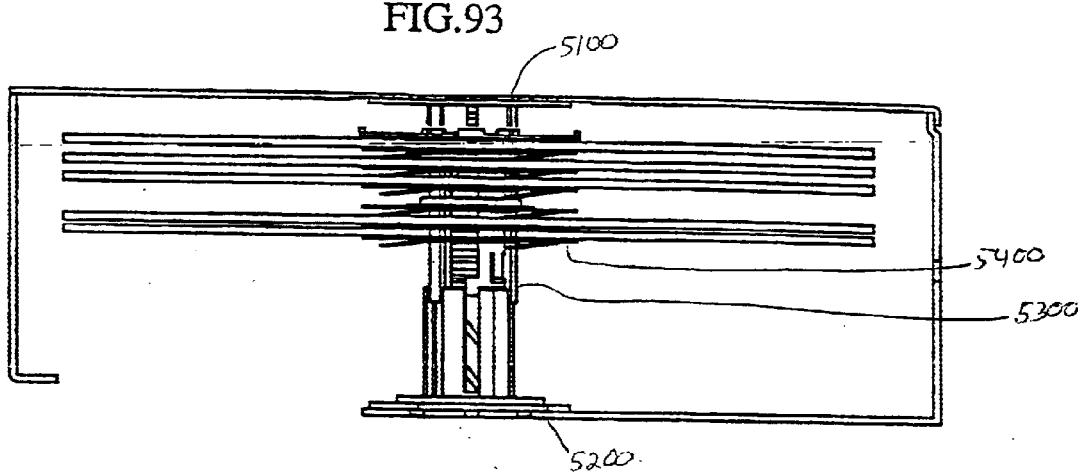
FIG. 93 is an explanatory view of the action of the components of the disk loading mechanism of the disk device as shown in FIG. 1.
Figure 94:
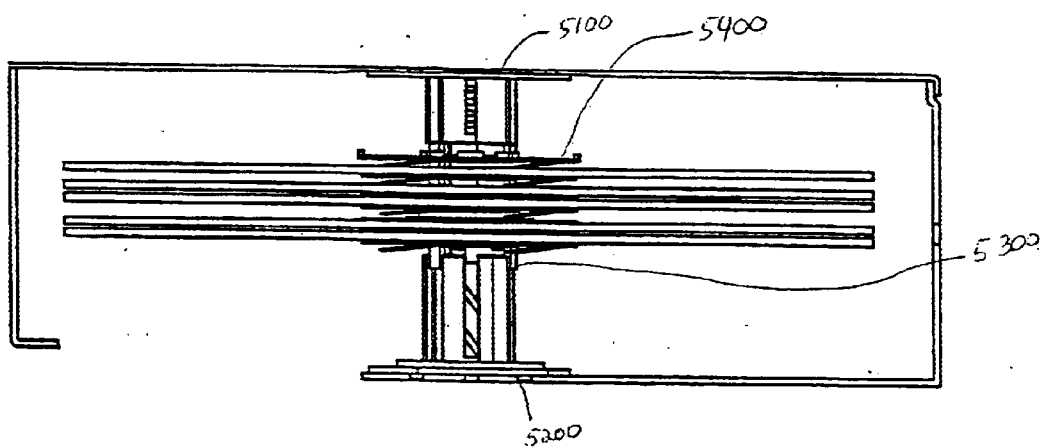
FIG. 94 is an explanatory view of the action of the components of the disk loading mechanism of the disk device as shown in FIG. 1.
Figure 95:
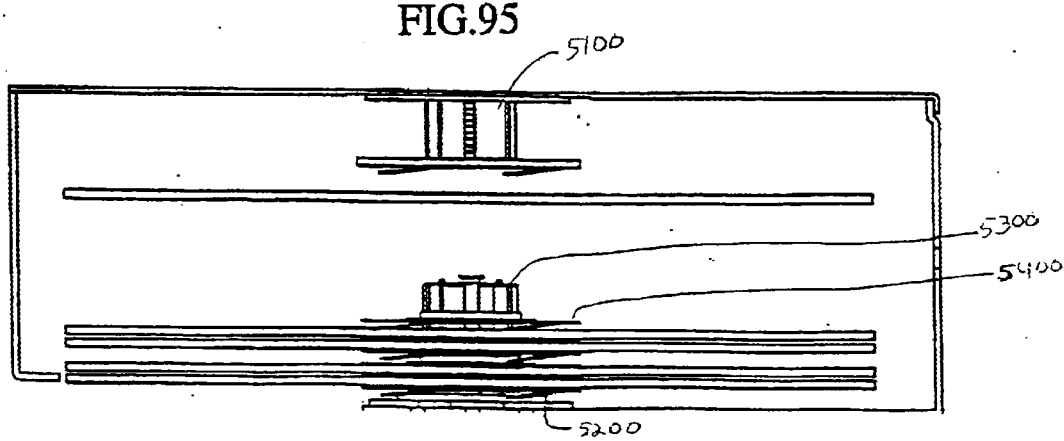
FIG. 95 is an explanatory view of the action of the components of the disk loading mechanism of the disk device as shown in FIG. 1.

(1) The disk insertion/ejection mechanism 1000 continues setting to a position as shown in FIG. 6.
(2) The disk position determination mechanism 2000 continues setting to a position as shown in FIG. 15.
(3) The drive roller switching mechanism which switches operational mode of the drive roller 101 continues setting to a position as shown in FIG. 22.
(4) The shutter mechanism 2200 continues setting to a position as shown in FIG. 17.
(5) The switching mechanism 2300 in the disk position determination mechanism 2000 continues setting to a position as shown in FIG. 15.
(6) The disk retaining mechanism 3000 is displaced to the position (state) as shown in FIG. 26 from the position (state) as shown in FIG. 30.
(7) The disk playing mechanism 4000 is displaced to the position (state) as shown in FIG. 42*a* from the position (state) as shown in FIG. 42*b*.
(8) The disk loading mechanism 5000 is displaced to the position (state) as shown in FIG. 93 from the position (state) as shown in FIG. 66.

The operation after step 11 are the same as the operation after step 18 shown in FIG. 101 (for example step 11 shown in FIG. 102 is the same as step 18 in FIG. 101, step 12 shown in FIG. 102 is the same as step 19 in FIG. 101,) and further description will be omitted. The displacement of each component will be described with reference to the numerals shown in FIG. 102. In FIG. 101, the fourth disk is shown in the figure, however during the operation in FIG. 102, it is noted that the fourth disk is not represented.

When the operation of the device up to step 24 is completed, the playing operation of the first disk is initiated and a series of operations are completed.

The description above corresponds to a large diameter disk. however when applied to a small diameter disk, the 12 cm of the large position determination mechanism in (2) is set to 8 cm, and the 12 cm disk support mechanism 12 cm is set to 8 cm.

(7.5 Description from the playing operation of the fourth disk to a ready position loading a disk in the loading position of the first disk.)

The series of operation up to a ready state so store a disk in a loading position for a first disk during the playing operation of the fourth disk based on FIG. 103 will be described with reference to sequential steps.

First the operation from step 1 up to step 17 is the same as the operation from step 1 to step 17 as shown in FIG. 101, such description will be omitted. For example step 1 shown in FIG. 103 is the same as step 1 in FIG. 101, step 2 shown in FIG. 103 is the same as step 2 in FIG. 101 and further description will be omitted. The displacement of each component will be described with reference to the numerals shown in FIG. 103. In FIG. 101, the first disk is shown, however during the operation in FIG. 103, it is noted that the first disk is not represented.

The description above corresponds to a large diameter disk, however when applied to a small diameter disk, the 12 cm of the large position determination mechanism in (2) is set to 8 cm, and the 12 cm disk retaining mechanism 12 cm is set to 8 cm.

The set position in step 18 is set as follows.

Figure 90:
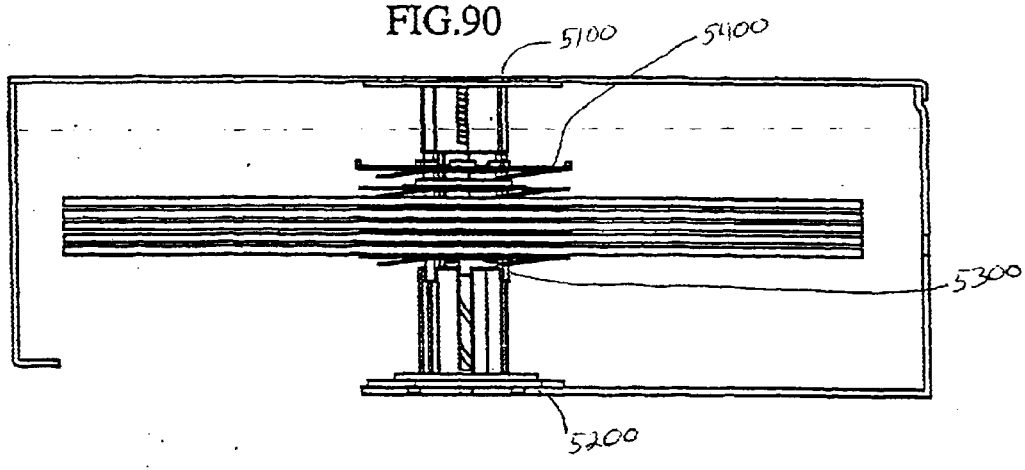
FIG. 90 is an explanatory view of the action of the components of the disk loading mechanism of the disk device as shown in FIG. 1.

(1) The disk insertion/ejection mechanism 1000 is set to the position (state) as shown in FIG. 6.
(2) The disk position determination mechanism 2000 is set to the position (state) as shown in FIG. 15.
(3) The drive roller switching mechanism which switches operational mode of the drive roller 101 is set to the position (state) as shown in FIG. 21.
(4) The shutter mechanism 2200 is set to the position (state) as shown in FIG. 17.
(5) The switching mechanism 2300 is set to the position (state) as shown in FIG. 15.
(6) The disk retaining mechanism 3000 is set to the position (state) as shown in FIG. 26.
(7) The disk playing mechanism 4000 is set to the position (state) as shown in FIG. 42*a*.
(8) The disk loading mechanism 5000 is set to the position (state) as shown in FIG. 90.

Thus the set position for step 19 is reached.

(1) The disk insertion/ejection mechanism 1000 continues the setting of the position (state) as shown in FIG. 6.
(2) The disk position determination mechanism 2000 continues the setting of the position (state) as shown in FIG. 15.
(3) The drive roller switching mechanism which switches operational mode of the drive roller 101 continues the setting of the position (state) as shown in FIG. 21.
(4) The shutter mechanism 2200 continues the setting of the position (state) as shown in FIG. 17.
(5) The switching mechanism 2300 in the disk position determination mechanism 2000 continues the setting of the position (state) as shown in FIG. 15.
(6) The disk retaining mechanism 3000 is displaced to a position as shown in FIG. 27 from a position (state) as shown in FIG. 26.
(7) The disk playing mechanism 4000 is displaced from the position (state) as shown in FIG. 42*a* and is set to a position as shown in FIG. 42*b*.
(8) The disk loading mechanism 5000 continues the setting of the position (state) as shown in FIG. 90.

Thus the set position for step 20 is reached.

(1) The disk insertion/ejection mechanism 1000 is displaced from the position (state) as shown in FIG. 6 and is set to a position as shown in FIG. 5.

(2) The disk position determination mechanism 2000 continues the setting of the position (state) as shown in FIG. 15.

(3) The drive roller switching mechanism which switches operational mode of the drive roller 101 continues the setting of the position (state) as shown in FIG. 21.

(4) The shutter mechanism 2200 continues the setting of the position (state) as shown in FIG. 17.

(5) The switching mechanism 2300 in the disk position determination mechanism 2000 continues the setting of the position (state) as shown in FIG. 15.

(6) The disk retaining mechanism 3000 continues the setting of the position (state) as shown in FIG. 27.

(7) The disk playing mechanism 4000 continues the setting of the position (state) as shown in FIG. 42*b*.

Figure 91:
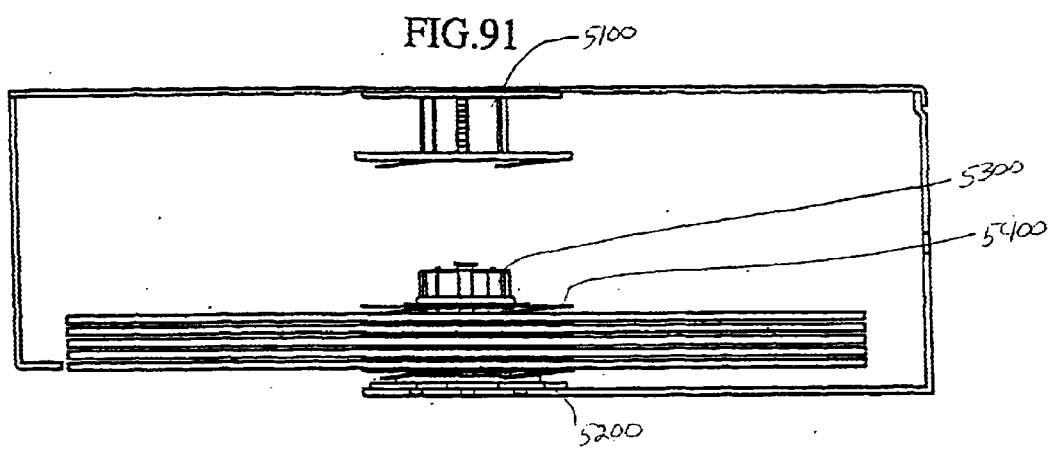
FIG. 91 is an explanatory view of the action of the components of the disk loading mechanism of the disk device as shown in FIG. 1.

(8) The disk loading mechanism 5000 is displaced from the position (state) as shown in FIG. 90 and is set to a position as shown in FIG. 65 and FIG. 91.

Thus the set position for step 21 is reached.

(1) The disk insertion/ejection mechanism 1000 is displaced from the position (state) as shown in FIG. 5 and is set to a position as shown in FIG. 4.

(2) The disk position determination mechanism 2000 continues the setting of the position (state) as shown in FIG. 15.

(3) The drive roller switching mechanism which switches operational mode of the drive roller 101 continues the setting of the position (state) as shown in FIG. 21.

(4) The shutter mechanism 2200 continues the setting of the position (state) as shown in FIG. 17.

(5) The switching mechanism 2300 in the disk position determination mechanism 2000 continues the setting of the position (state) as shown in FIG. 15.

(6) The disk retaining mechanism 3000 continues the setting of the position (state) as shown in FIG. 27.

(7) The disk playing mechanism 4000 continues the setting of the position (state) as shown in FIG. 42*b*.

(8) The disk loading mechanism 5000 continues the setting of the position (state) as shown in FIG. 65 and FIG. 91.

Thus the set position for step 22 is reached.

(1) The disk insertion/ejection mechanism 1000 continues the setting of the position (state) as shown in FIG. 4.

(2) The disk position determination mechanism 2000 is displaced from the position as shown in FIG. 15 and is set to the position (state) as shown in FIG. 8.

(3) The drive roller switching mechanism which switches operational mode of the drive roller 101 continues the setting of the position (state) as shown in FIG. 21.

(4) The shutter mechanism 2200 continues the setting of the position (state) as shown in FIG. 17.

(5) The switching mechanism 2300 in the disk position determination mechanism 2000 is displaced from the position as shown in FIG. 15 and is set to the position (state) as shown in FIG. 14.

(6) The disk retaining mechanism 3000 continues the setting of the position (state) as shown in FIG. 27.

(7) The disk playing mechanism 4000 continues the setting of the position (state) as shown in FIG. 42*b*.

(8) The disk loading mechanism 5000 continues the setting of the position (state) as shown in FIG. 65 and FIG. 91.

Thus the set position for step 23 is reached.

(1) The disk insertion/ejection mechanism 1000 is displaced from the position as shown in FIG. 4 and is set to the position (state) as shown in FIG. 3.

(2) The disk position determination mechanism 2000 is displaced from the position as shown in FIG. 8 and is set to the position (state) as shown in FIG. 7.

(3) The drive roller switching mechanism which switches operational mode of the drive roller 101 continues the setting of the position (state) as shown in FIG. 21.

(4) The shutter mechanism 2200 continues the setting of the position (state) as shown in FIG. 17.

(5) The switching mechanism 2300 in the disk position determination mechanism 2000 is displaced from the position as shown in FIG. 14 and is set to the position (state) as shown in FIG. 13.

(6) The disk retaining mechanism 3000 continues the setting of the position (state) as shown in FIG. 27.

(7) The disk playing mechanism 4000 continues the setting of the position (state) as shown in FIG. 42*b*.

(8) The disk loading mechanism 5000 continues the setting of the position (state) as shown in FIG. 65 and FIG. 91.

Thus the set position for step 24 is reached.

(1) The disk insertion/ejection mechanism 1000 continues the setting of the position (state) as shown in FIG. 3.

(2) The disk position determination mechanism 2000 continues the setting of the position (state) as shown in FIG. 7.

(3) The drive roller switching mechanism which switches operational mode of the drive roller 101 is displaced from the position as shown in FIG. 22 and is set to the position (state) as shown; in FIG. 21.

(4) The shutter mechanism 2200 continues the setting of the position (state) as shown in FIG. 17.

(5) The switching mechanism 2300 in the disk position determination mechanism 2000 continues the setting of the position (state) as shown in FIG. 13.

(6) The disk retaining mechanism 3000 is displaced from the position as shown in FIG. 27 and is set to the position (state) as shown in FIG. 26.

(7) The disk playing mechanism 4000 is displaced from the position as shown in FIG. 42*b* and is set to the position (state) as shown in FIG. 42*a*.

(8) The disk loading mechanism 5000 continues the setting of the position (state) as shown in FIG. 65 and FIG. 91.

Thus the set position for step 25 is reached.

(1) The disk insertion/ejection mechanism 1000 is displaced from the position as shown in FIG. 3 and is set to the position (state) as shown in FIG. 2.

(2) The disk position determination mechanism 2000 continues the setting of the position (state) as shown in FIG. 7.

(3) The drive roller switching mechanism which switches operational mode of the drive roller 101 is displaced from the position as shown in FIG. 21 and is set to the position (state) as shown in FIG. 19.

(4) The shutter mechanism 2200 continues the setting of the position (state) as shown in FIG. 17.

(5) The switching mechanism 2300 in the disk position determination mechanism 2000 continues the setting of the position (state) as shown in FIG. 13.

(6) The disk retaining mechanism 3000 is displaced from the position as shown in FIG. 26 and is set to the position (state) as shown in FIG. 25.

(7) The disk playing mechanism 4000 is displaced from the position as shown in FIG. 42a and is set to the position (state) as shown in FIG. 37, FIG. 38, FIG. 39, FIG. 40, and FIG. 41.

(8) The disk loading mechanism 5000 continues the setting of the position (state) as shown in FIG. 65 and FIG. 91.

With the completion of operations up to step 25, the device is in a ready state for disk insertion to that a first disk may be loaded in a loading position for the first disk and a sequence of operations is completed.

Thus as shown above, since it is not necessary to use an abutting operation on the recording face of a disk when loading a disk due to the fact that a disk is loaded using an inner diameter of the disk, it is possible to reduce damage in particular to the recorded face of the disk and increase device reliability.

Furthermore since any type of disk (for example, a 12 cm CD or a 8 cm CD) may be handled irrespective of the size of the disk diameter, it is possible to increase user friendliness.

Since the axial center of the loading position of the disk and the axial center of the playing position of the disk are aligned, the axial center does not diverge and an operation to align the axial center during disk exchange operations or the like is unnecessary. As a result, it is possible to reduce processing time.

Since it is possible to handle any type of disk irrespective of disk diameter by constituting the disk playing mechanism with a rotating type of mechanism, user friendliness of the device is enhanced.

Even if there is an irregularity in the thickness of the disk due to the biasing force of the plate spring member as a result of mounting the plate spring member in the spacer of the disk loading mechanism, it is possible to reduce shaking and to improve device performance.

Even in positions in which a disk is not loaded in the spacer of the disk loading mechanism, it is possible to reduce shaking due to the biasing force of the plate spring member as a result of mounting the plate spring member in the space of the disk loading mechanism and to improve device reliability.

The provision of a stopper which is fixed at positions outside the rotational shaft of the disk playing mechanism allows the disk to be supported at two positions, namely, the rotation shaft and the stopper when the disk is played. Thus the performance of the anti-vibration mechanism provided in the disk playing mechanism can be improved and it is possible to stabilize the playing of the disk and improve device performance.

Since the axial center of the disk playing device and the axial center of the stopper which stops the disk playing mechanism during disk playing operations are aligned, it is possible to minimize the operational distance from the disk loading position to the disk playing position, to reduce transfer time from the disk loading position to the disk playing position and to reduce processing time in the device.

Since the gap with the spacer which is proximate to the spacer of the disk which is to be played is greater than the gap between spacers which are not proximate, it is possible to operate the disk support mechanism when supporting the disk which is to be played and it is possible to improve device reliability as a result.

Since the disk insertion/ejection mechanism is adapted to be refuged by the face of the projection during disk exchange, it is possible to use the spacer normally setting the disk insertion/ejection mechanism as a section of the spacer required during disk playing, thus enabling the downsizing of the device.

Since the disk insertion/ejection mechanism is adapted to displace in the direction of disk insertion/ejection, it is possible to displace the disk insertion/ejection mechanism to near a fixed disk position when the device is in a ready state for disk insertion. Thus it is possible to insert a small diameter disk into the device in a stable manner, that is to say, it is possible to insert a disk accurately into the device irrespective of the type of disk diameter and thus to improve the performance of the device.

Since respective disks may be freely inserted and ejected independently one by one, user friendliness is enhanced.

Embodiment 2

Figure 98C:
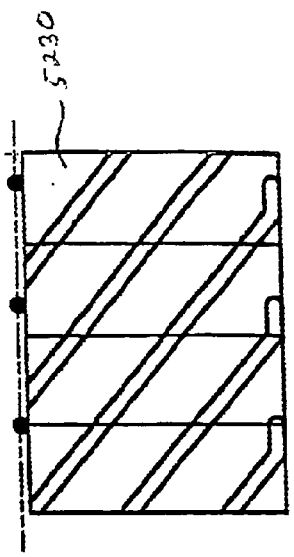
FIG. 98 is an explanatory view of the action of the components of the disk loading mechanism of the disk device according to a second embodiment of the present invention.
Figure 98B:
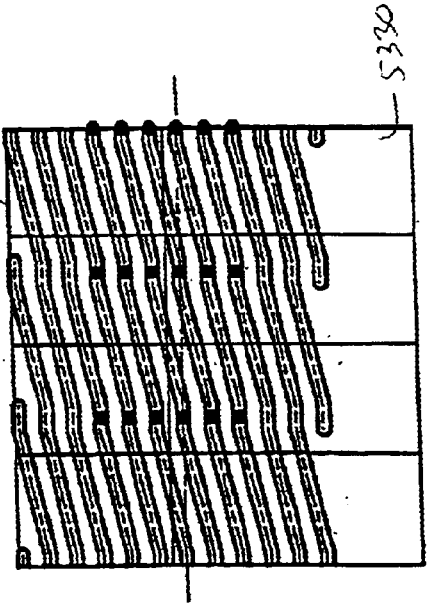
Figure 98A:
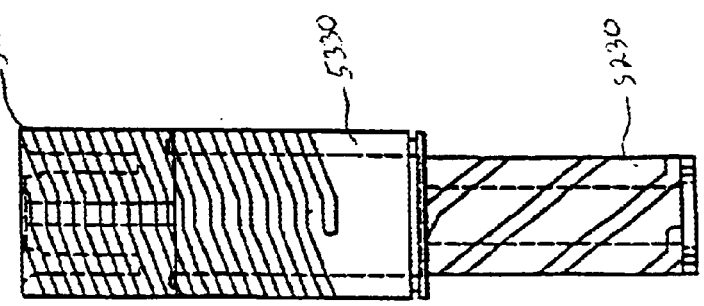
Figure 104:
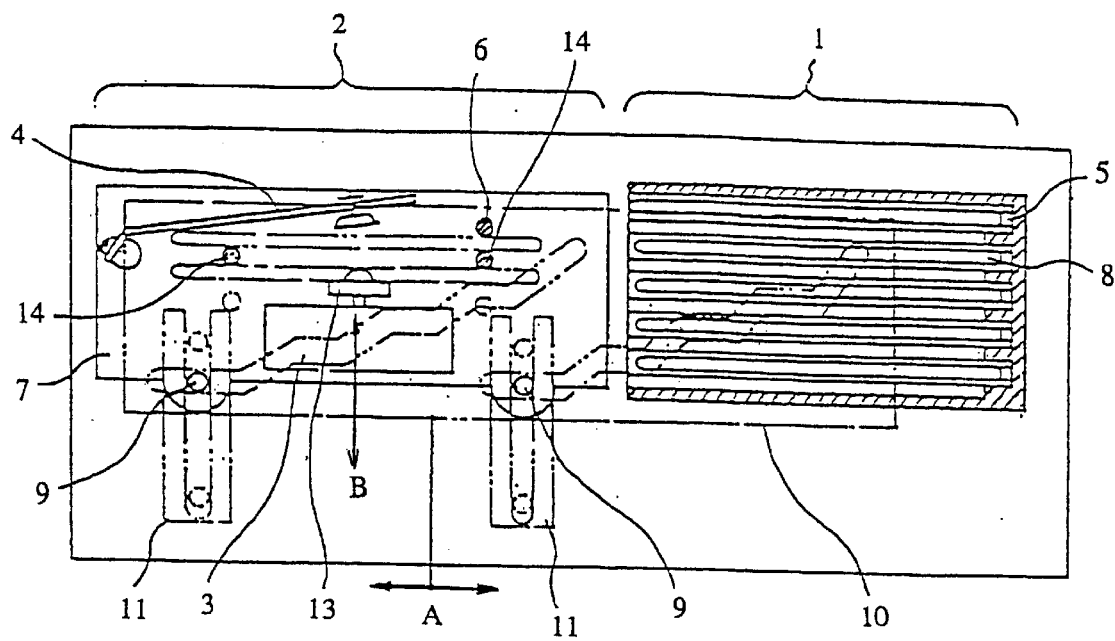
FIG. 104 shows a schematic view of a conventional disk device.
Figure 105:
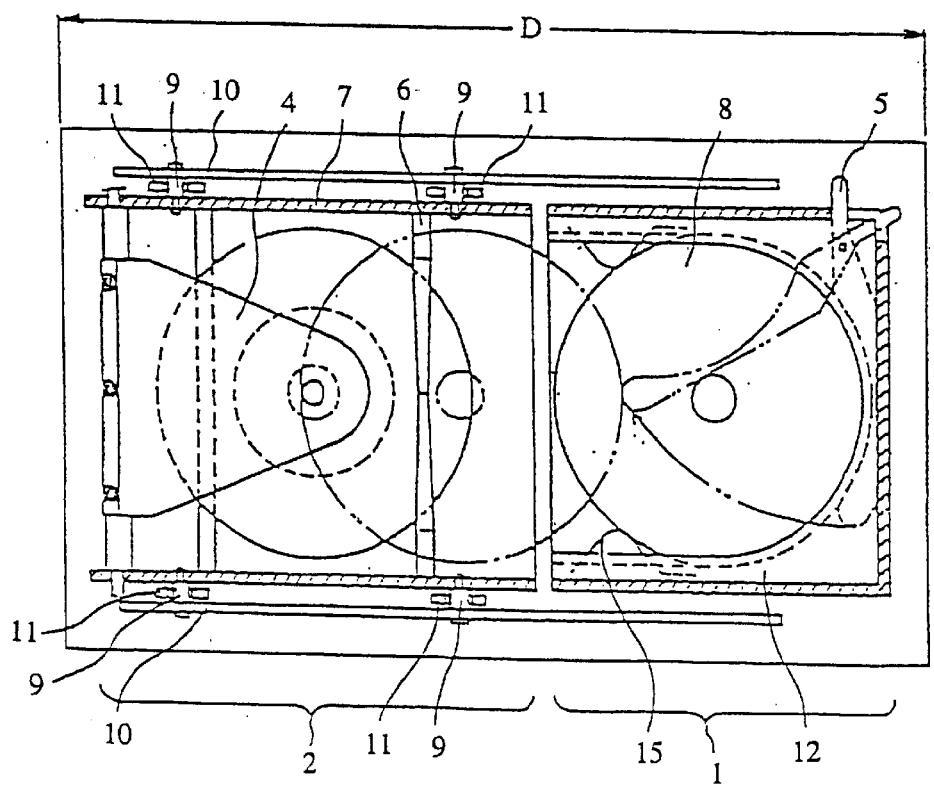
FIG. 105 shows a lateral cross section of a side face of a conventional disk device.
Figure 106:
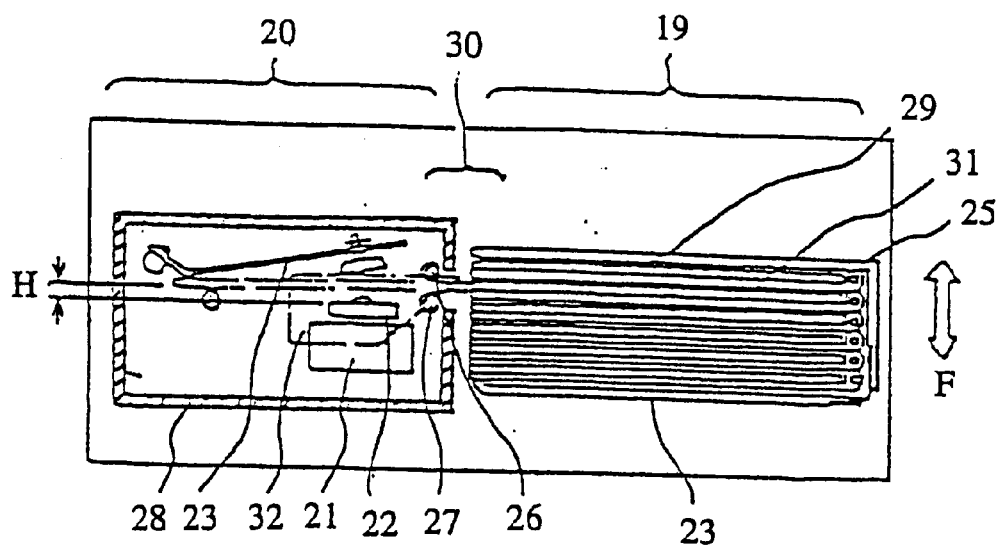
FIG. 106 shows an upper cross section of an upper face of a conventional disk device.
Figure 107:
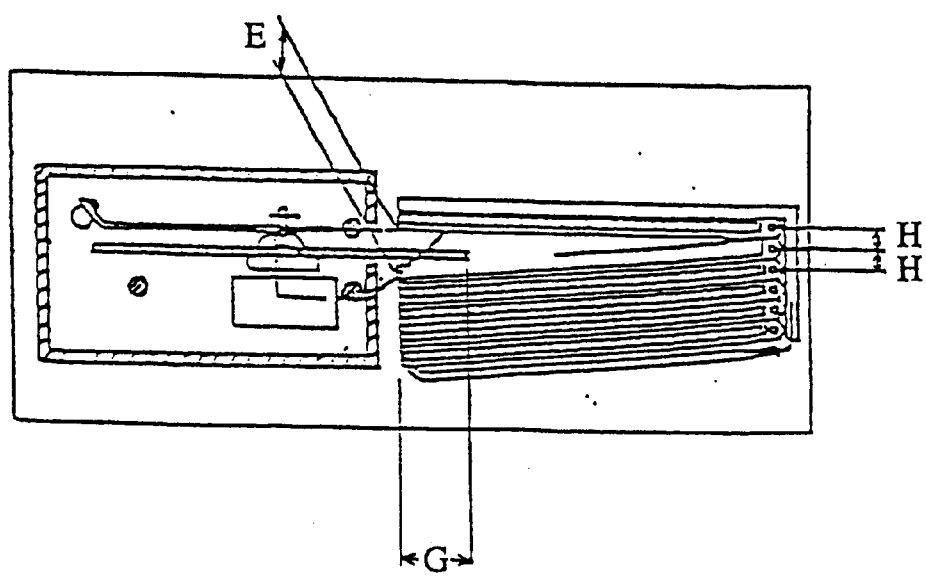
FIG. 107 shows an upper cross section of an upper face of a conventional disk device.
Figure 108:
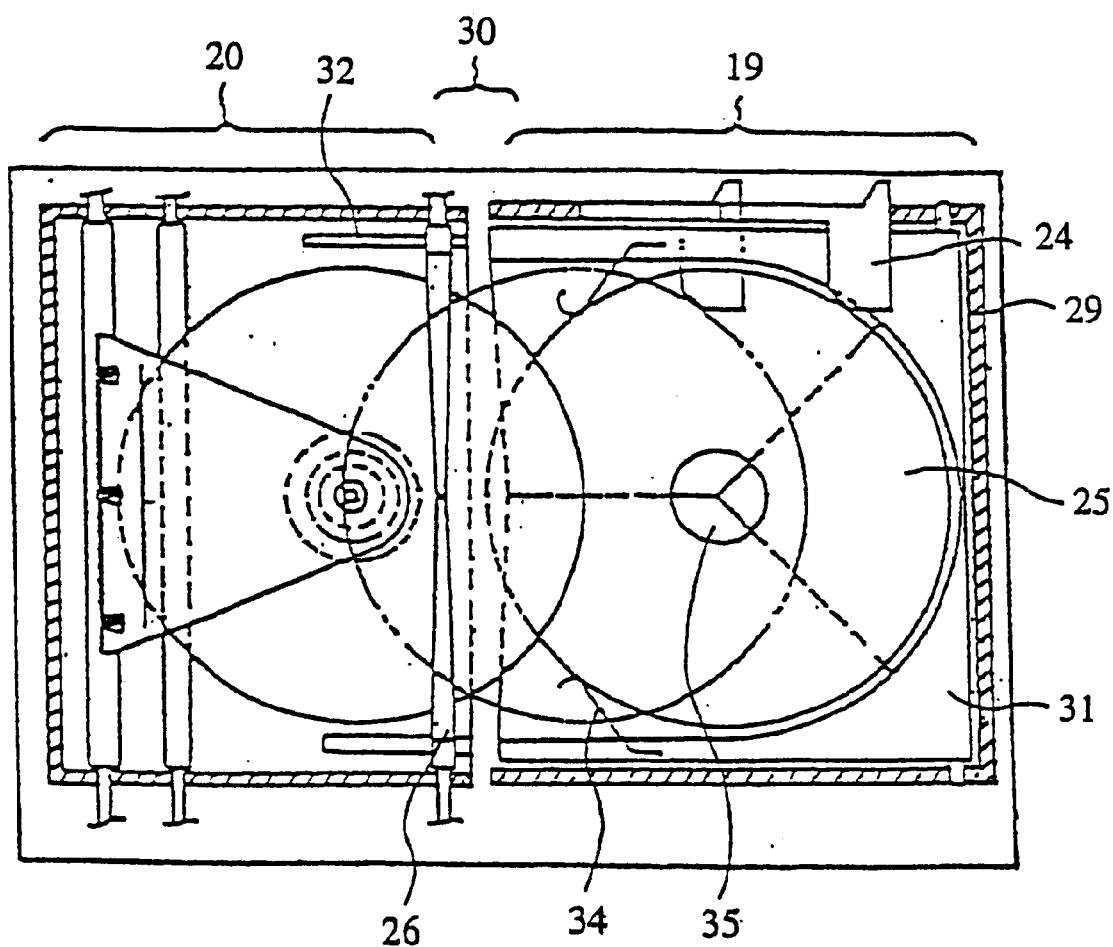
FIG. 108 shows a lateral cross section of a side face of a conventional disk device.

A second embodiment of the disk device of the present invention will be explained with reference to FIG. 98. In the first embodiment as discussed above, a gap was provided between respective grooves formed between the first guide member 5110 and the third guide member 5330 and the size of this gap is adapted to differ. However an arrangement of gaps formed at equal intervals as shown in FIG. 98 may be employed. Thus it is possible to increase the speed of the switching operation to each mode, that is to say, it is possible to improve the processing speed of the device.

Embodiment 3

A third embodiment of the device will be discussed below. In the first embodiment as discussed above, the displacement of each component was described in each operational mode on the basis of FIG. 86 to FIG. 88. The operation of each component set in the respective modes may be respectively synchronized, that is to say, that the displacement operations may be linked. Since each component is synchronized in such an arrangement, it is possible to increase the speed of the displacement operations, to improve the reliability of the device and to reduce processing time.

Embodiment 4

A fourth embodiment of the device will be discussed below. In the first embodiment as discussed above, the manner in which components are switched during displacement operations in the progression of operational modes was not noted. However normally although the device may be adapted so that switching occurs gradually during switched operational modes, the same result may be obtained by switching which occurs collectively.

Embodiment 5

A fifth embodiment of the device will be discussed below. In the first embodiment as discussed above, the disk insertion/ejection mechanism 1000 comprised a disk biasing section 102 which functions as a mechanism to grip the disk and which does not have a member for rotation with the a drive roller 101 which drives rotation. However variation of the disk biasing section into a roller member is also possible and such an arrangement allows the prevention of damage to the disk surface.

Embodiment 6

A sixth embodiment of the device will be discussed below. In the first embodiment as discussed above, when a disk is inserted into the device, it has not been noted in which manner the operation is performed automatically. However when a disk is inserted from the disk insertion mouth, the disk insertion/ejection mechanism 1000 inserts the disk, the disk retaining mechanism 3000 retains the disk, and the disk is set to be played by the disk playing mechanism 4000. That is to say, the simple insertion of a disk results in the setting of the disk to be played. Such an arrangement increases user friendliness.

Embodiment 7

A seventh embodiment of the device will be discussed below. It has been noted that first retaining arm 3005 to third retaining arm 3012 are provided on the disk retaining mechanism 3000. However a corner of the groove formed on the first to third retaining arms 3005, 3006, 3012 may be beveled. Such an arrangement prevents damage to the surface of the disk.

Embodiment 8

A eighth embodiment of the device will be discussed below. In the second embodiment as discussed above, since the gap of each spacer which supports the disk has been placed closely together, disk movement due to external force or the like are reduced and the plate spring member provided in each spacer may be omitted. Thus it is possible to reduce the number of components and to reduce manufacturing costs.

Embodiment 9

A ninth embodiment of the device will be discussed below. In the first embodiment as discussed above, a plate spring member is mounted in the spacer section. However a pressure spring may be provided instead of the plate spring member and an equivalent effect obtained.

Embodiment 10

A tenth embodiment of the device will be discussed below. In the first embodiment as discussed above, a retaining member for a reduced space may be provided by a plate spring member which retains the inner diameter of the disk on the engaging section of the spacer. Such an arrangement allows the strengthening of disk support and reduction in the movement of the disk due to external forces or the like. Thus the plate spring member may be omitted and it is possible to downsize the device.

Embodiment 11

An eleventh embodiment of the device will be discussed below. In the first embodiment as discussed above, grooves were formed on the first guide member and third guide member which loosely fixes the projection of the spacer and spacer. A plurality of three or more of such grooves may be provided to prevent shaking of the spacer and the improve the reliability of the device.

INDUSTRIAL APPLICABILITY

As shown above, the disk device of the present invention is adapted for use as a disk device mounted in a vehicle with a reduced size and adapted for each operation of loading a plurality of disks without the provision of a loading magazine, that is to say, perform the operations of selectively inserting, ejecting and playing each disk.

What is claimed is:

1. A disk device comprising:

a disk loading mechanism, having a bar-shaped fixing means which loosely fixes to a hole formed in an inner diameter of a disk and stores a plurality of disks, for displacing said disk along the shaft direction of said fixing means by rotating said fixing means;

a disk insertion/ejection mechanism having a drive roller which carries a disk inserted from the outside or a disk ejected to the outside through a disk insertion mouth, and a disk biasing section which is disposed at a position opposite to said drive roller and which grips said disk, said insertion/ejection mechanism for carrying said disk to a position in which said fixing means of said disk loading mechanism is divided, and the shaft center of said fixing means is aligned substantially with the center of the inner diameter of said disk; and a disk playing mechanism, dislocating to the position of the disk carried by said disk insertion/ejection mechanism, for playing said disk with retaining it.

2. The disk device according to claim 1, wherein the disk insertion/ejection mechanism is provided with a displacement means for displacing the drive roller and the disk biasing section along the disk insertion/ejection direction.

3. The disk device according to claim 2, wherein the disk insertion/ejection mechanism displaces along an elongated hole formed to reduce a gap between said drive roller and disk biasing section when said drive roller is displaced from the disk insertion mouth to the disk loading mechanism.

4. The disk device according to claim 2, wherein the disk insertion/ejection mechanism is displaced toward the direction of the disk insertion mouth when the disk playing mechanism plays the disk.

5. The disk device according to claim 2, wherein the disk insertion/ejection mechanism is dislocated toward the direction of the disk insertion mouth when the disk loading mechanism stores the disk, and is refuged to a position in which the drive roller and disk biasing section do not interfer with said stored disk.

* * * * *